US012124449B2

(12) United States Patent
Bove et al.

(10) Patent No.: US 12,124,449 B2
(45) Date of Patent: Oct. 22, 2024

(54) PROCESSING LEFT JOIN OPERATIONS VIA A DATABASE SYSTEM BASED ON FORWARDING INPUT

(71) Applicant: Ocient Holdings LLC, Chicago, IL (US)

(72) Inventors: Samuel Peter Bove, Chicago, IL (US); Jason Arnold, Chicago, IL (US); Susmita Saha, Chicago, IL (US); Sarah Kate Schieferstein, Chicago, IL (US); Max Guthmann, Chicago, IL (US); Ellis Mihalko Saupe, University City, MO (US); Greg R. Dhuse, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/321,906

(22) Filed: May 23, 2023

(65) Prior Publication Data

US 2023/0385278 A1 Nov. 30, 2023

Related U.S. Application Data

(60) Provisional application No. 63/365,216, filed on May 24, 2022.

(51) Int. Cl.
*G06F 16/2453* (2019.01)
*G06F 16/2455* (2019.01)

(52) U.S. Cl.
CPC .... *G06F 16/24544* (2019.01); *G06F 16/2456* (2019.01)

(58) Field of Classification Search
CPC ........................ G06F 16/24544; G06F 16/2456
See application file for complete search history.

(56) References Cited

U.S. PATENT DOCUMENTS

| | | | | |
|---|---|---|---|---|
| 5,548,770 | A | 8/1996 | Bridges | |
| 6,230,200 | B1 | 5/2001 | Forecast | |
| 6,633,772 | B2 | 10/2003 | Ford | |
| 6,957,210 | B1 * | 10/2005 | Ramesh | G06F 16/2237 707/999.1 |
| 7,499,907 | B2 | 3/2009 | Brown | |

(Continued)

OTHER PUBLICATIONS

A new high performance fabric for HPC, Michael Feldman, May 2016, Intersect360 Research.

(Continued)

*Primary Examiner* — Angelica Ruiz
(74) *Attorney, Agent, or Firm* — Garlick & Markison; Katherine C. Stuckman; Bruce E. Stuckman

(57) ABSTRACT

A database system is operable to determine a query for execution. The database system can execute a left join operation for the query based on receiving a plurality of left input rows, and forwarding all of the plurality of left input rows are forwarded. It is determined whether any right input rows match with each given left input row based on a hash map. When one right input row is identified as matching with the given left input row, a value of right input row is copied and emitted in conjunction with the given left input row. When no right input rows are identified as matching with the given left input row, a null value is emitted in conjunction with the given left input row.

20 Claims, 88 Drawing Sheets

(56) References Cited

U.S. PATENT DOCUMENTS

| | | | | |
|---|---|---|---|---|
| 7,908,242 | B1 | 3/2011 | Achanta | |
| 2001/0051949 | A1 | 12/2001 | Carey | |
| 2002/0032676 | A1 | 3/2002 | Reiner | |
| 2004/0162853 | A1 | 8/2004 | Brodersen | |
| 2008/0133456 | A1 | 6/2008 | Richards | |
| 2009/0063893 | A1 | 3/2009 | Bagepalli | |
| 2009/0183167 | A1 | 7/2009 | Kupferschmidt | |
| 2010/0082577 | A1 | 4/2010 | Mirchandani | |
| 2010/0241646 | A1 | 9/2010 | Friedman | |
| 2010/0274983 | A1 | 10/2010 | Murphy | |
| 2010/0312756 | A1 | 12/2010 | Zhang | |
| 2011/0219169 | A1 | 9/2011 | Zhang | |
| 2012/0011108 | A1* | 1/2012 | Bensberg ............ | G06F 16/2255 707/E17.017 |
| 2012/0109888 | A1 | 5/2012 | Zhang | |
| 2012/0151118 | A1 | 6/2012 | Flynn | |
| 2012/0185866 | A1 | 7/2012 | Couvee | |
| 2012/0254252 | A1 | 10/2012 | Jin | |
| 2012/0311246 | A1 | 12/2012 | McWilliams | |
| 2013/0332484 | A1 | 12/2013 | Gajic | |
| 2014/0047095 | A1 | 2/2014 | Breternitz | |
| 2014/0136510 | A1 | 5/2014 | Parkkinen | |
| 2014/0188841 | A1 | 7/2014 | Sun | |
| 2015/0205607 | A1 | 7/2015 | Lindholm | |
| 2015/0244804 | A1 | 8/2015 | Warfield | |
| 2015/0248366 | A1 | 9/2015 | Bergsten | |
| 2015/0293966 | A1 | 10/2015 | Cai | |
| 2015/0310045 | A1 | 10/2015 | Konik | |
| 2016/0034547 | A1 | 2/2016 | Lerios | |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy.com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37 node 37 data set query processing system 2510 query execution module
2504 database system 10 database system 10 query execution module 2504 database system 10 query execution module 2504 query execution module 2504 query execution module 2504 query execution module 2504 query execution module 2504 query execution module 2504 query execution module 2504 database system 10 query execution module 2504 query execution module 2504 query execution module 2504 query execution module 2504 query execution module 2504 query processing system 2510 query execution module 2504 query execution module 2504 query execution module 2504 query execution module 2504 query processing system 2510 query execution module 2504 step 2590 step 2586 database system 10 query execution module 2504 query execution module 2504 operator flow generator module 2514

TABLE

| colA | colB |
|---|---|
| 0 | -99 |
| 1 | -98 |
| ⋮ | ⋮ |
| 99 | 0 |

operator flow generator module 2514 operator flow generator module 2514 query processing system 2510 query execution module 2504 query execution module 2504 query execution module 2504 query execution module 2504 query execution module 2504 query execution module 2504 database system 10 query execution module 2504 operator execution module 3215 query execution module 2504

Query execution module 2504

Query execution module 2504

Query execution module 2504

Query execution module 2504

PROCESSING LEFT JOIN OPERATIONS VIA A DATABASE SYSTEM BASED ON FORWARDING INPUT

CROSS-REFERENCE TO RELATED APPLICATIONS

The present U.S. Utility Patent Applications claims priority pursuant to 35 U.S.C. § 119(e) to U.S. Provisional Application No. 63/365,216, entitled "IMPLEMENTING JOIN EXPRESSIONS IN DATABASE SYSTEMS", filed May 24, 2022, which is hereby incorporated herein by reference in its entirety and made part of the present U.S. Utility Patent Applications for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

DETAILED DESCRIPTION OF THE INVENTION

Figure 1:
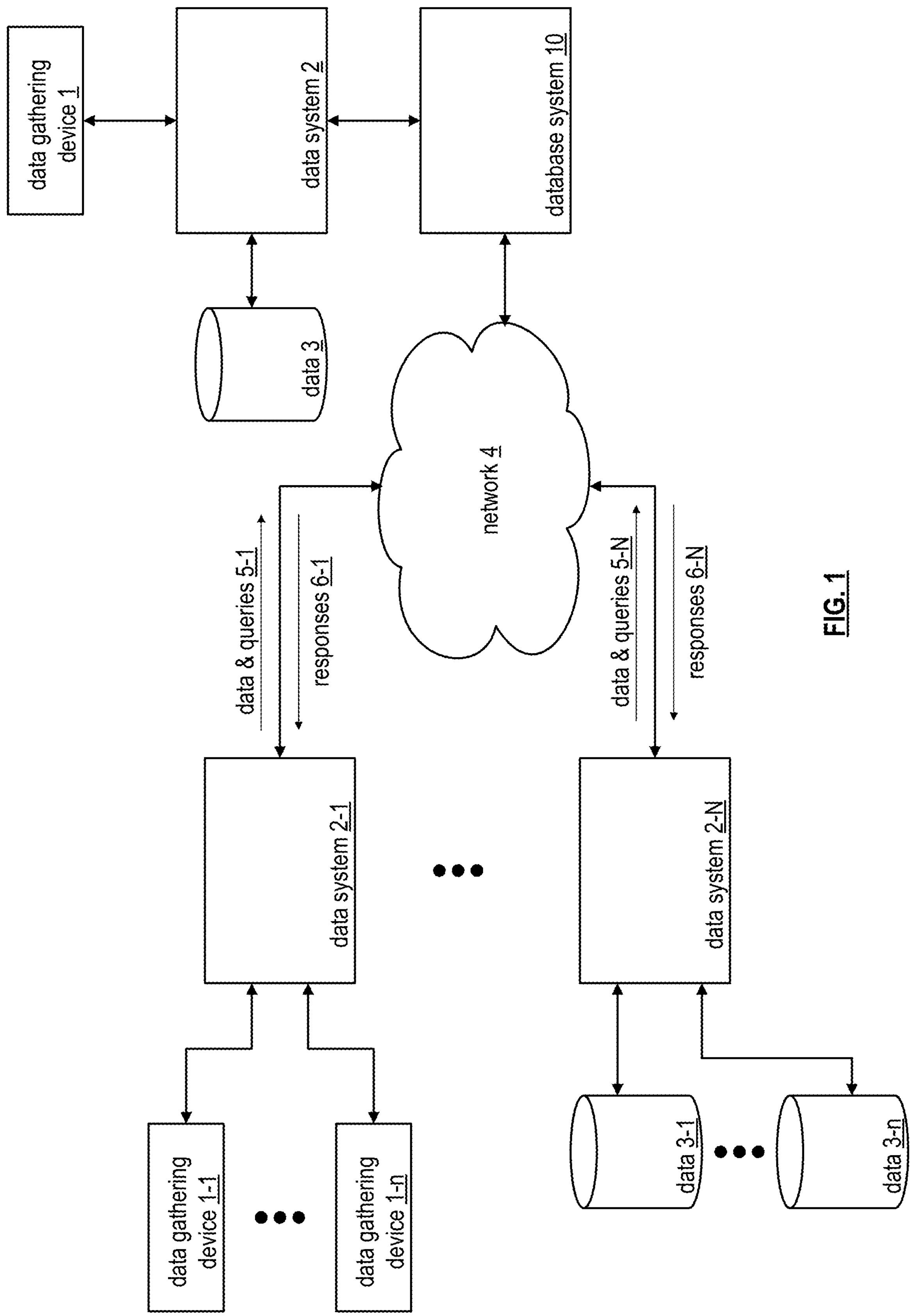
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
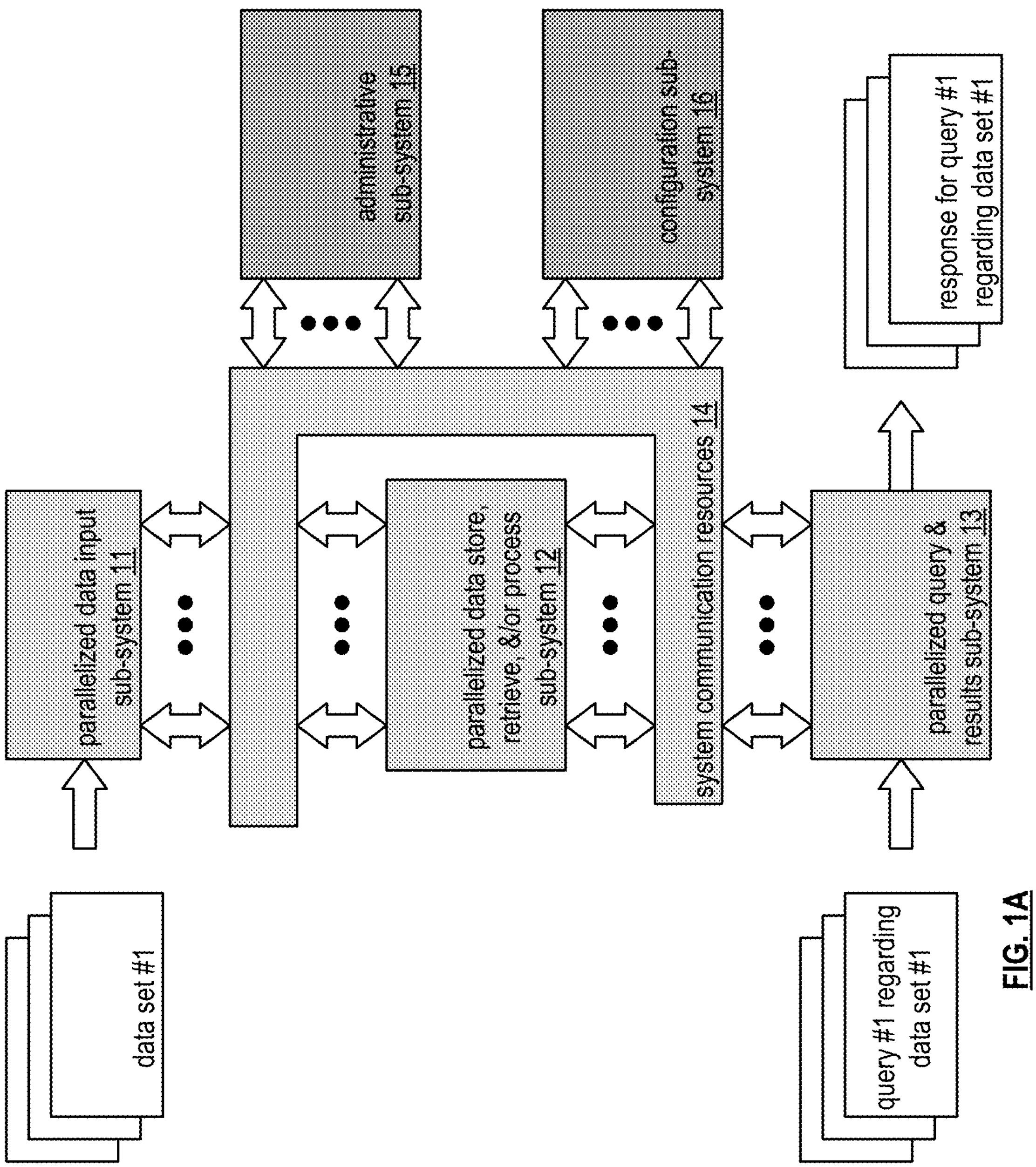
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
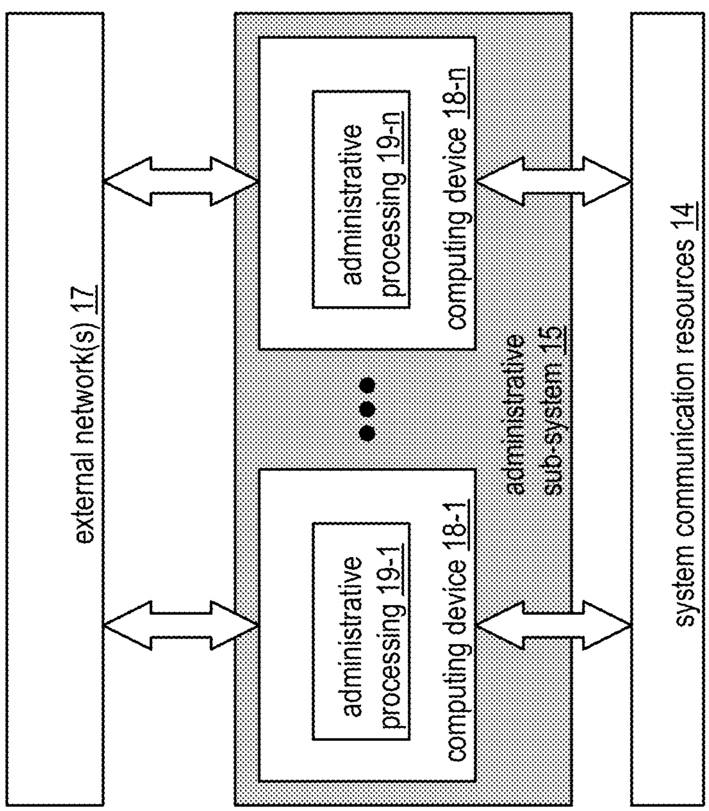
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-*n*. Each of the computing devices executes an administrative processing function utilizing a corresponding administrative processing of administrative processing 19-1 through 19-*n* (which includes a plurality of administrative operations) that coordinates system level operations of the database system.

Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
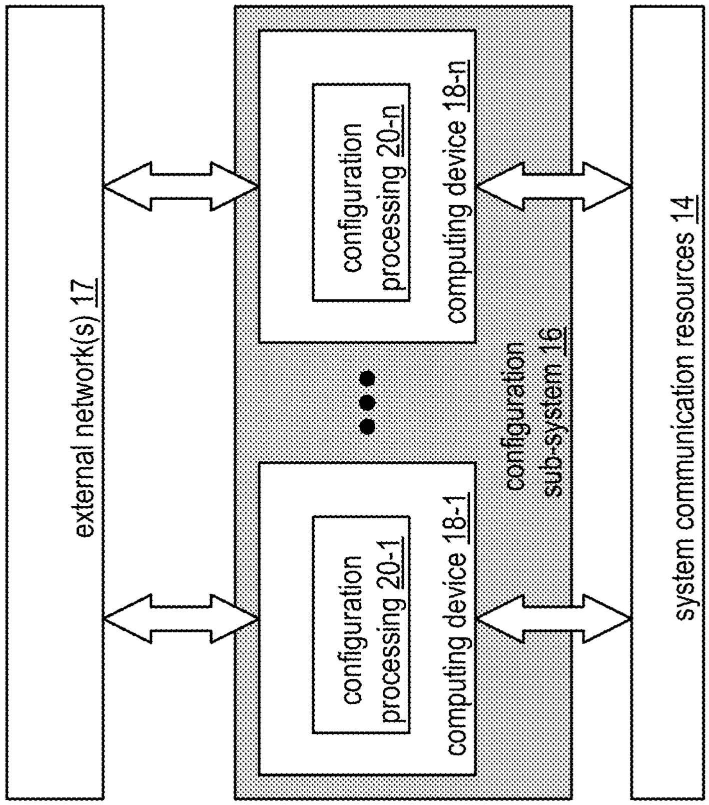
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
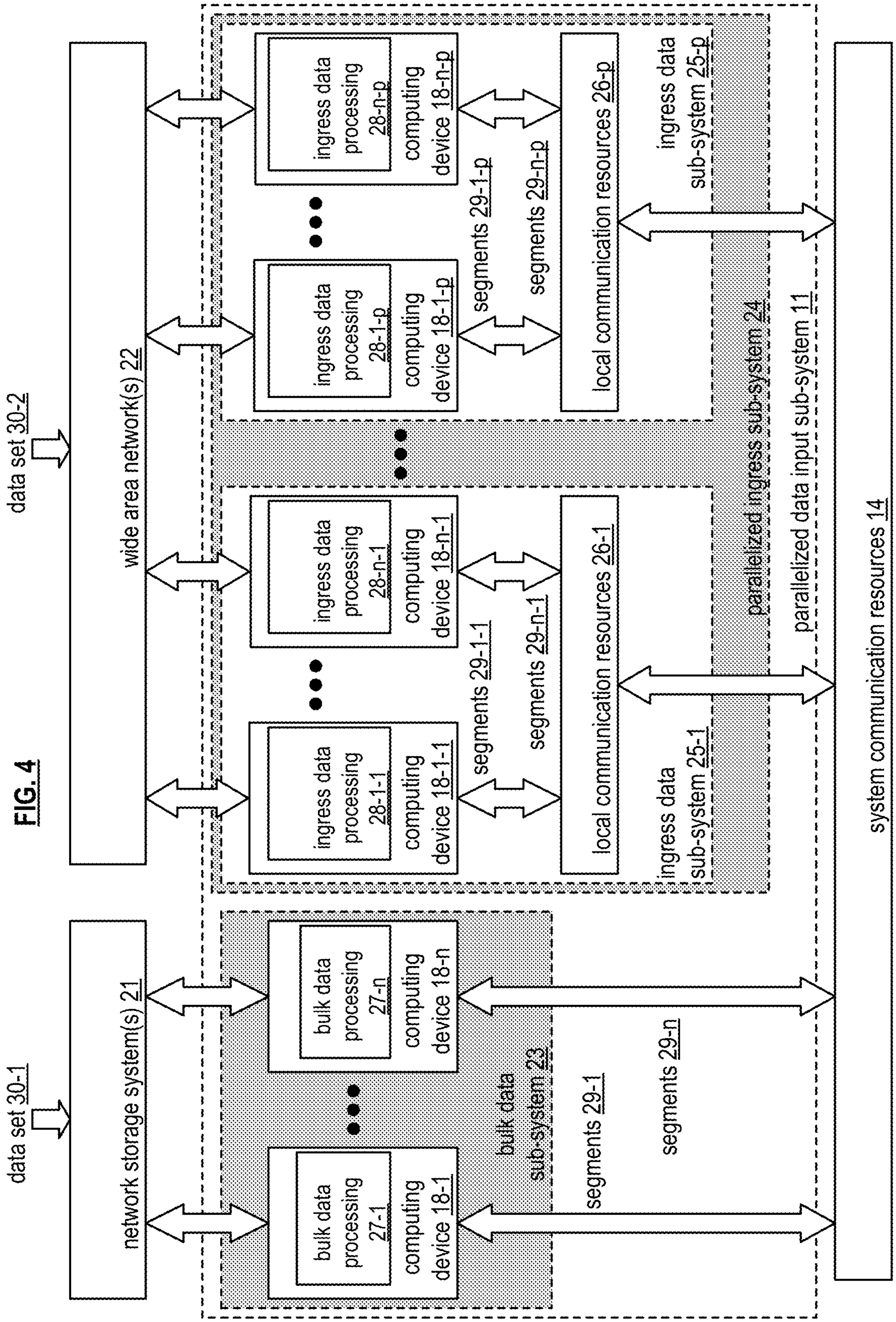
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
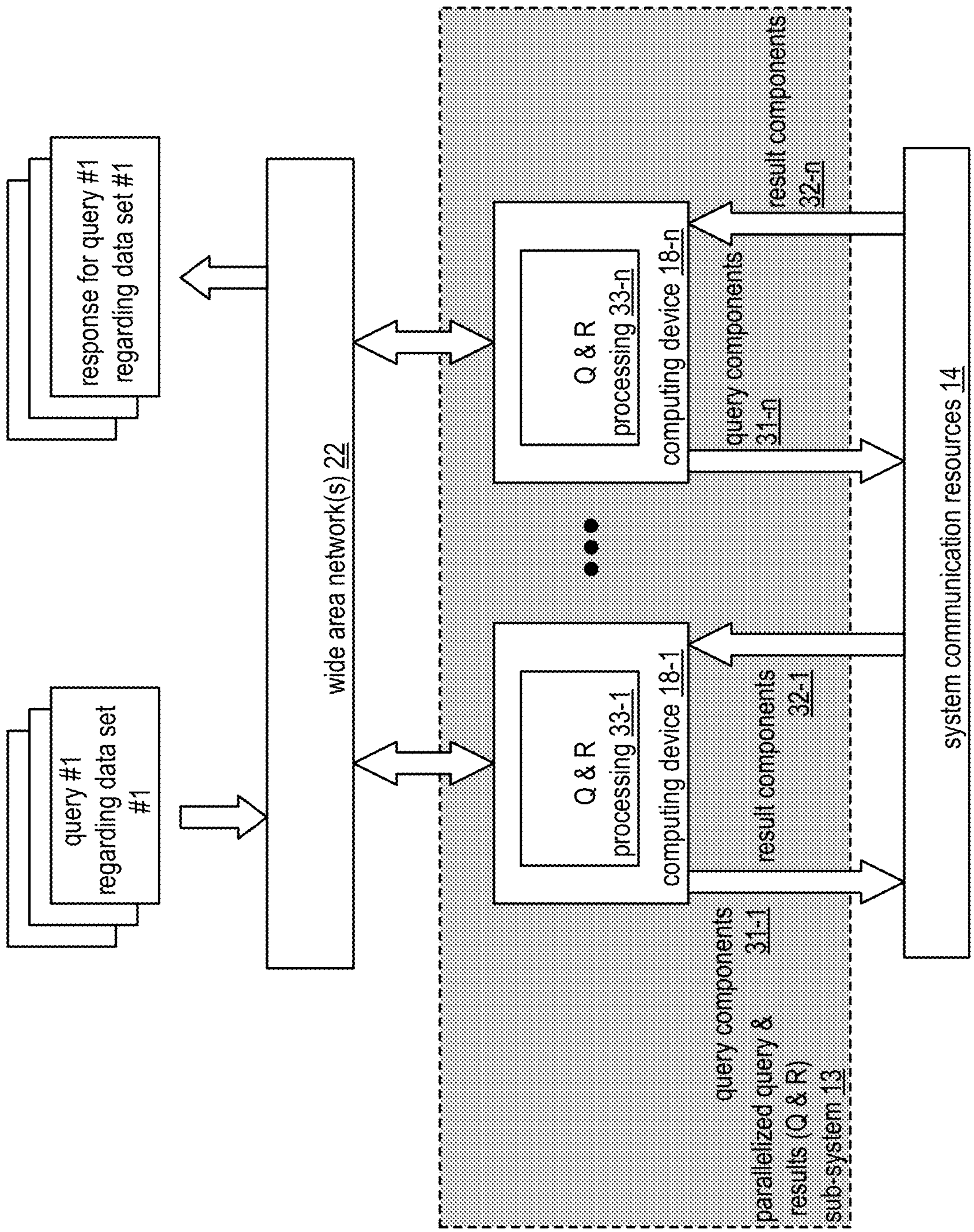
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
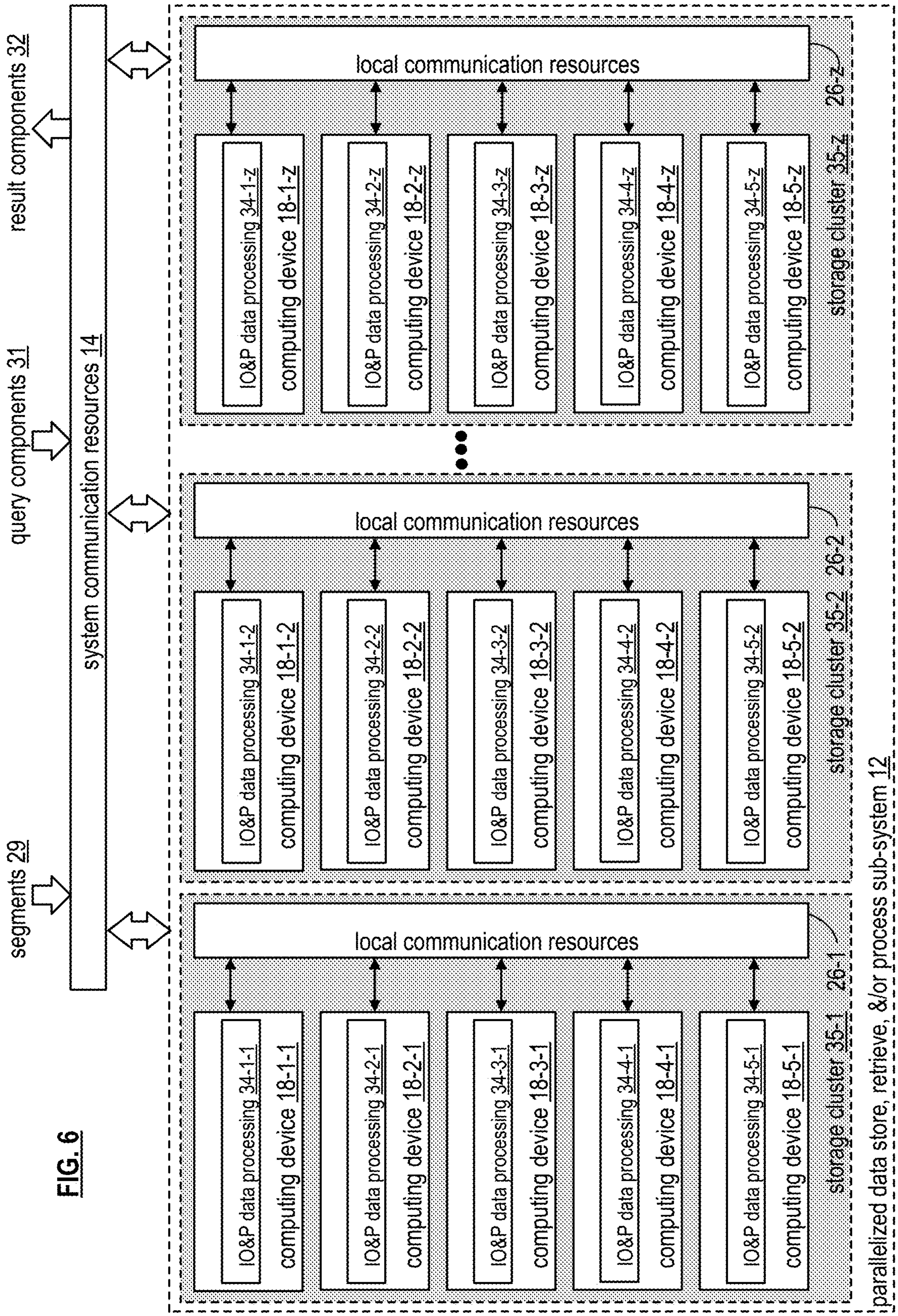
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IQ &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through **35-*n* are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1** is storing and/or processing a second segment group while it is storing/or and processing a first segment group.

Figure 7:
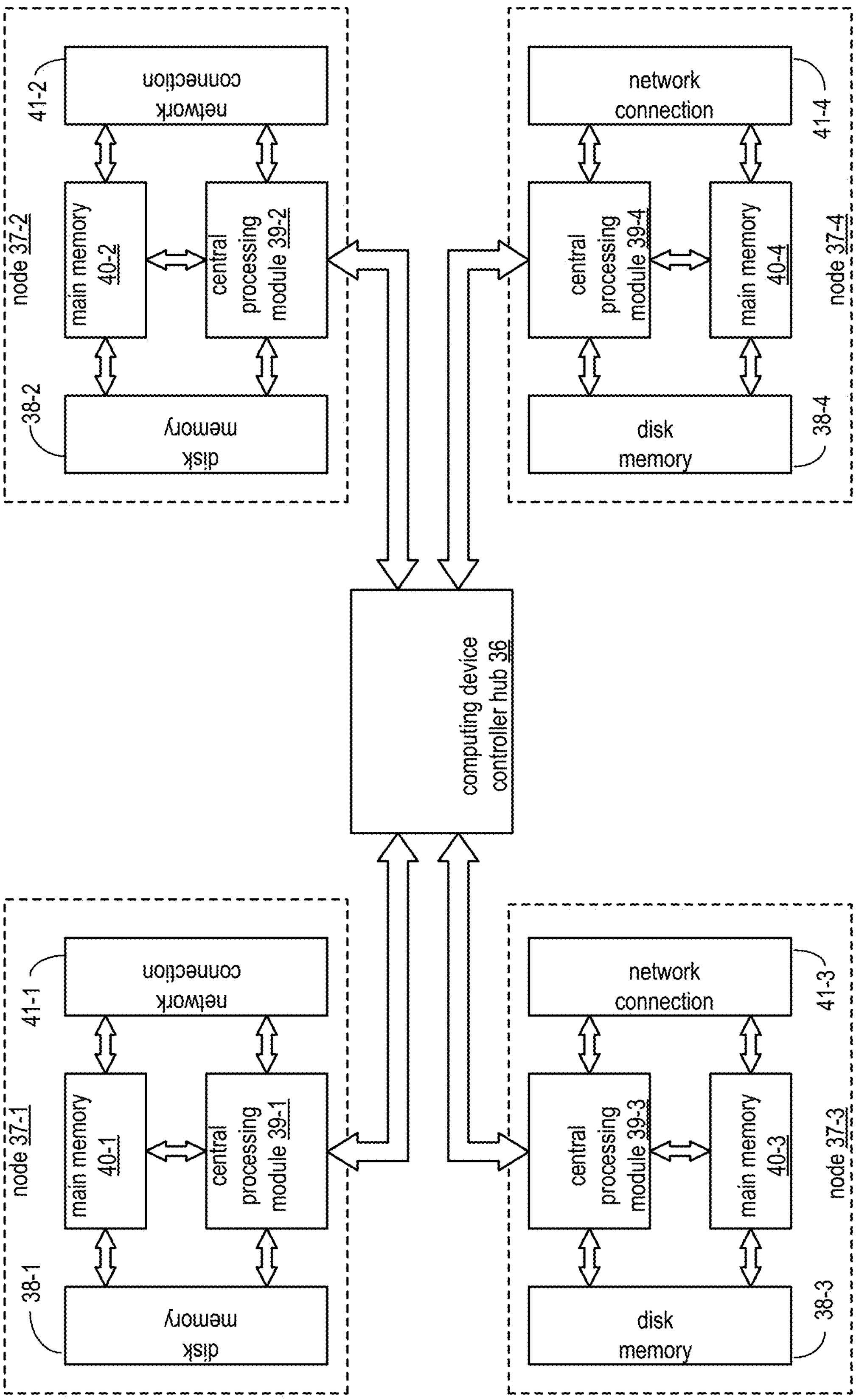
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra-path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
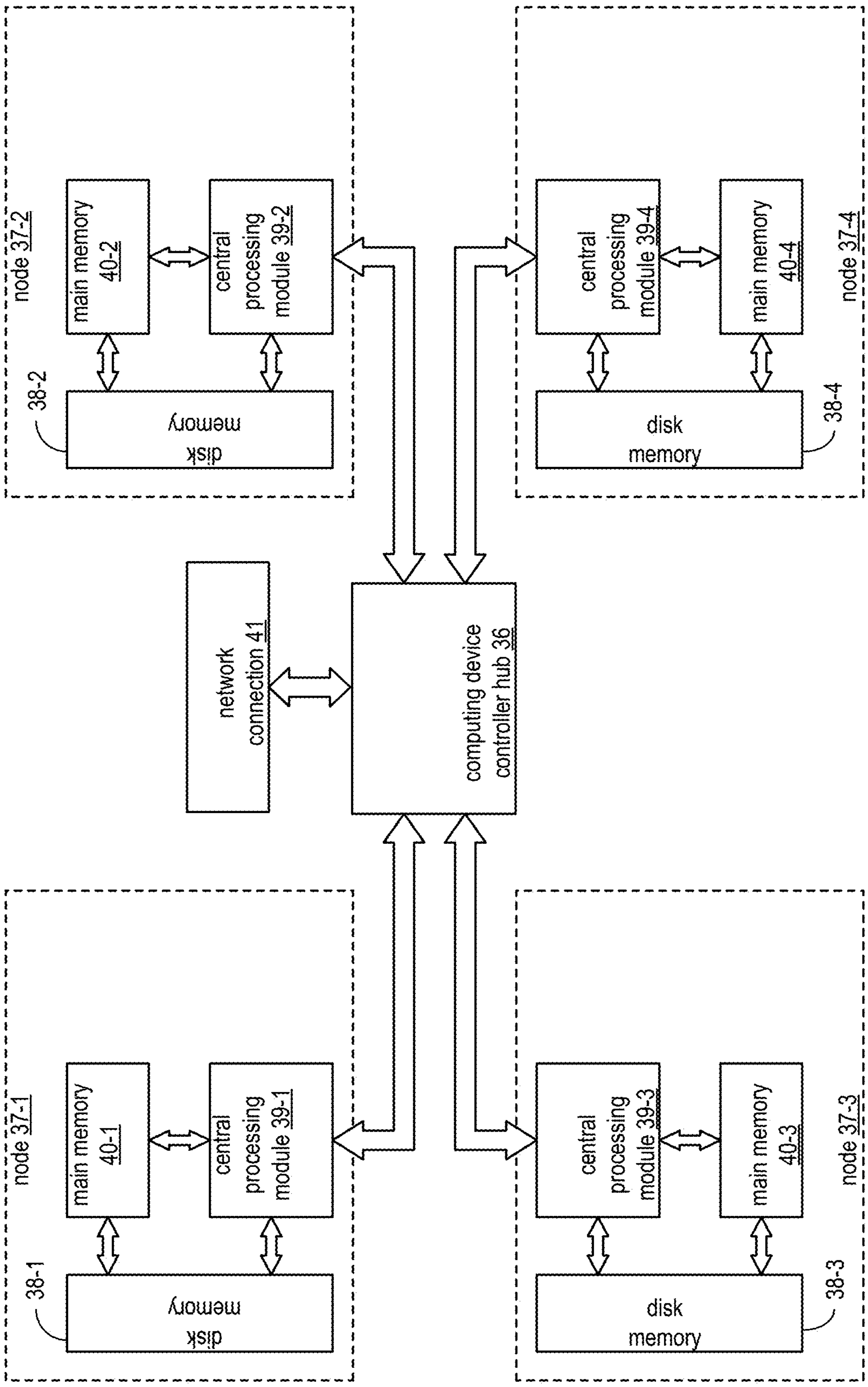
FIG. 8 is a schematic block diagram of another embodiment of a computing device in accordance with the present invention.

FIG. 8 is a schematic block diagram of another embodiment of a computing device that is similar to the computing device of FIG. 7 with an exception that it includes a single network connection 41, which is coupled to the computing device controller hub 36. As such, each node coordinates with the computing device controller hub to transmit or receive data via the network connection.

Figure 9:
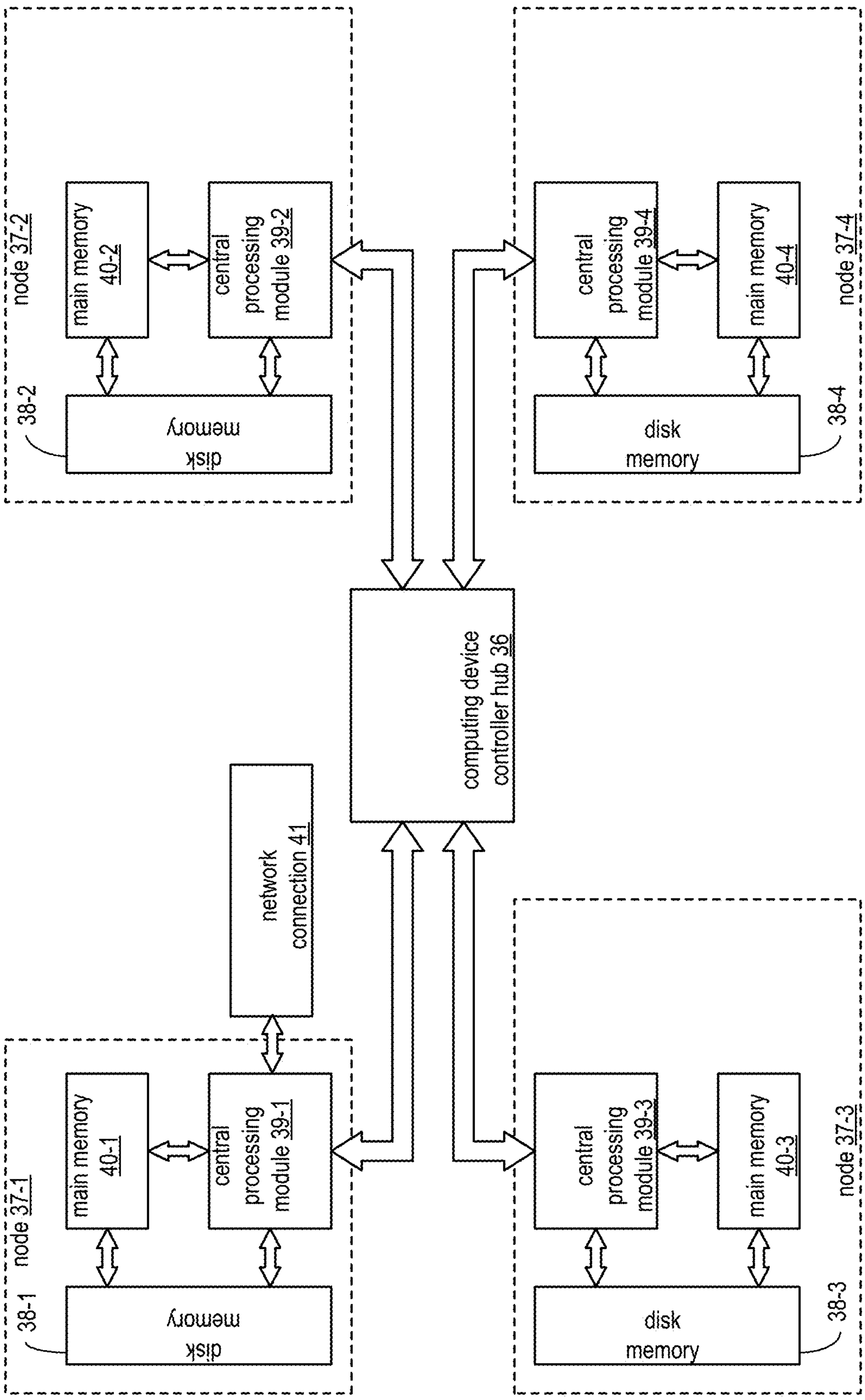
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
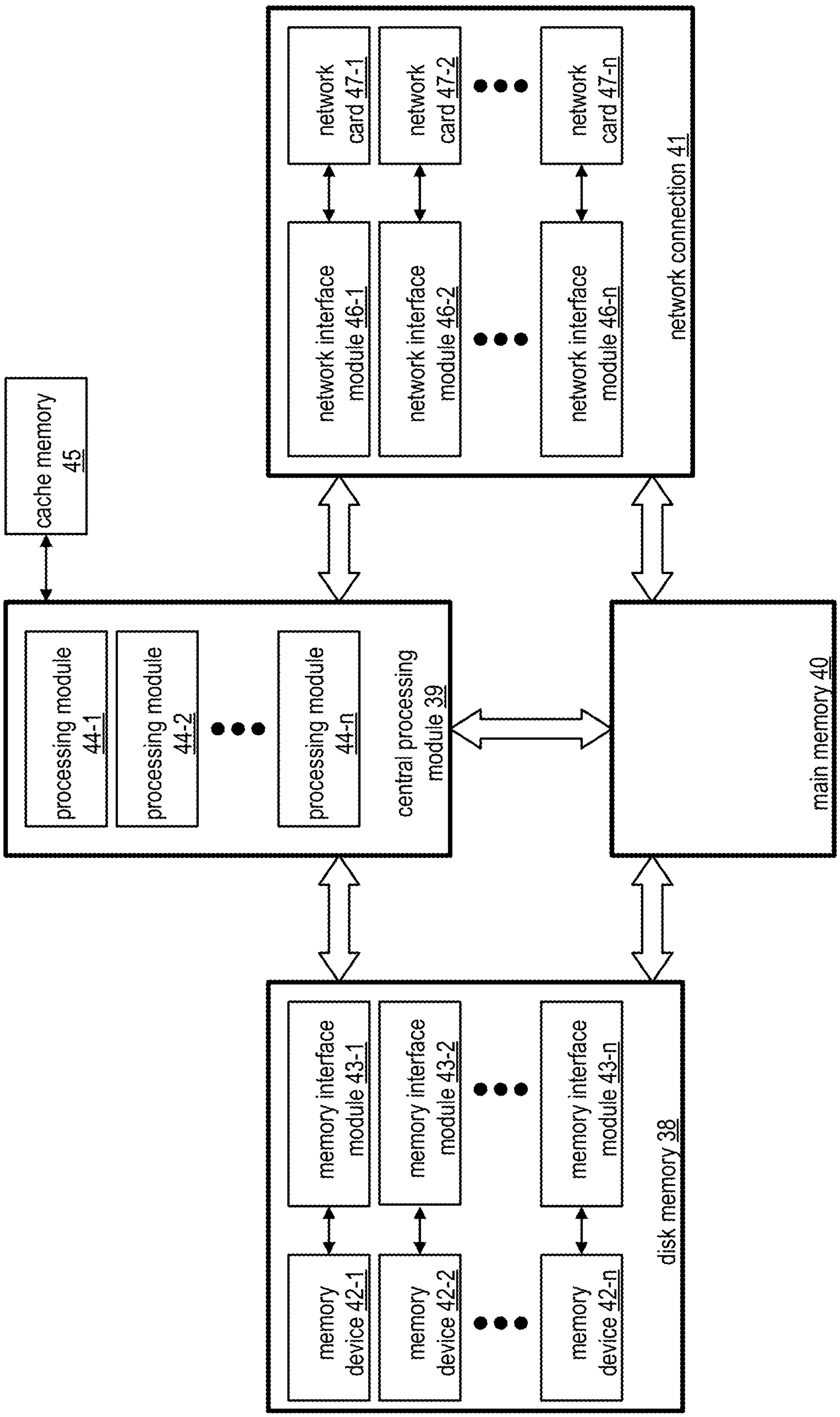
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through **44-*n* and an associated one or more cache memory 45**. A processing module is as defined at the end of the detailed description.

The disk memory 38 includes a plurality of memory interface modules 43-1 through **43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n*** is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through **46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39** or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
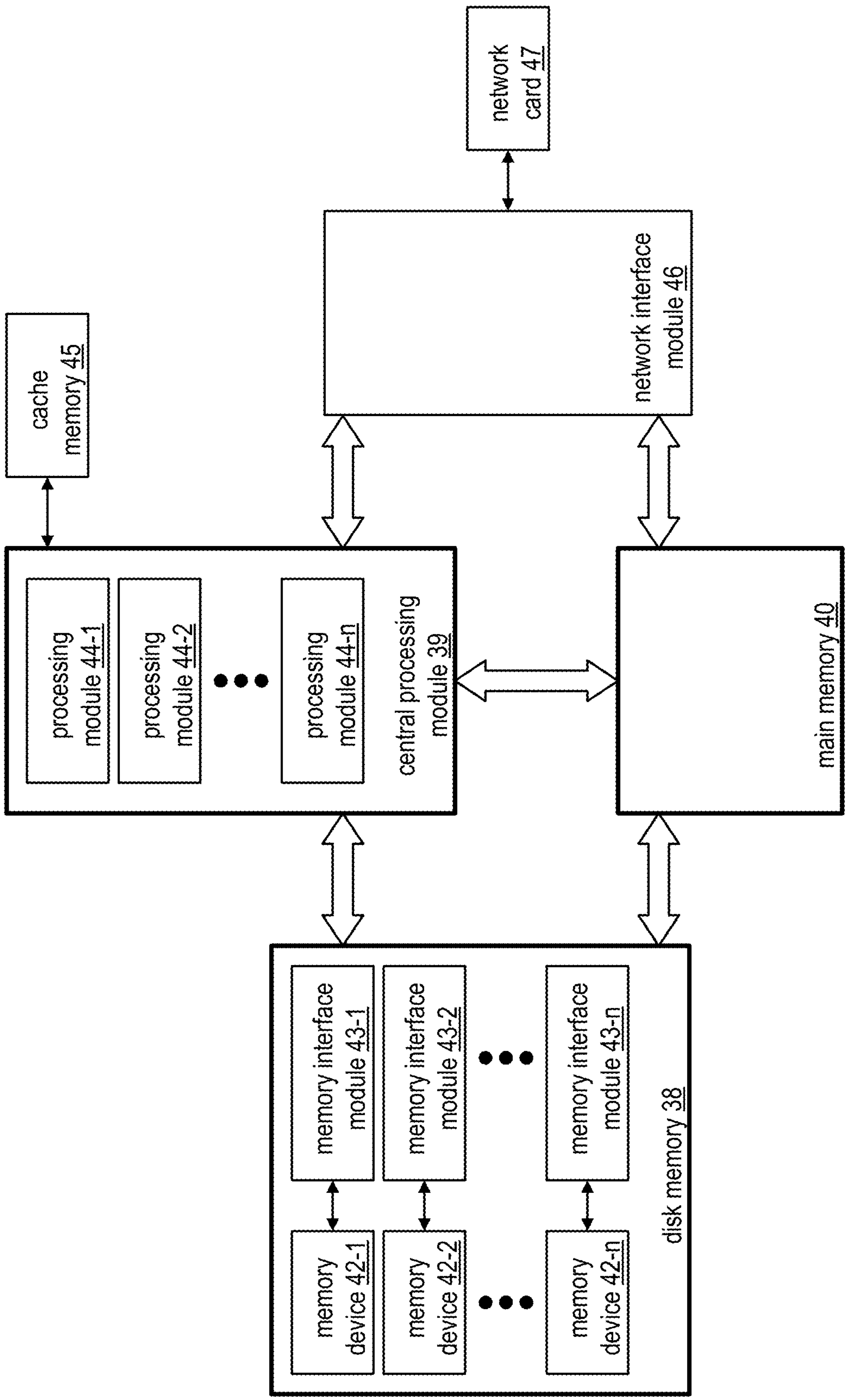
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
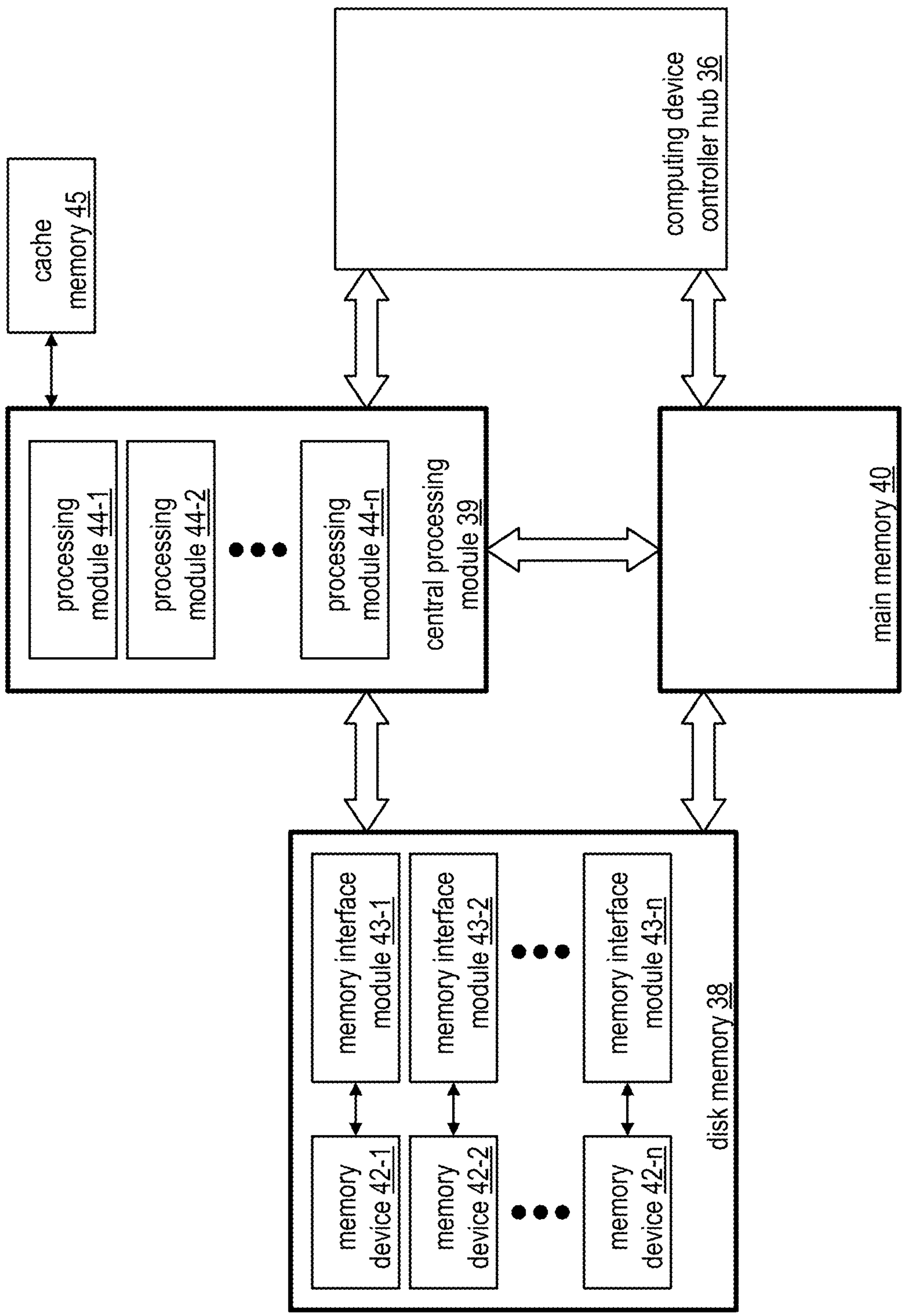
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
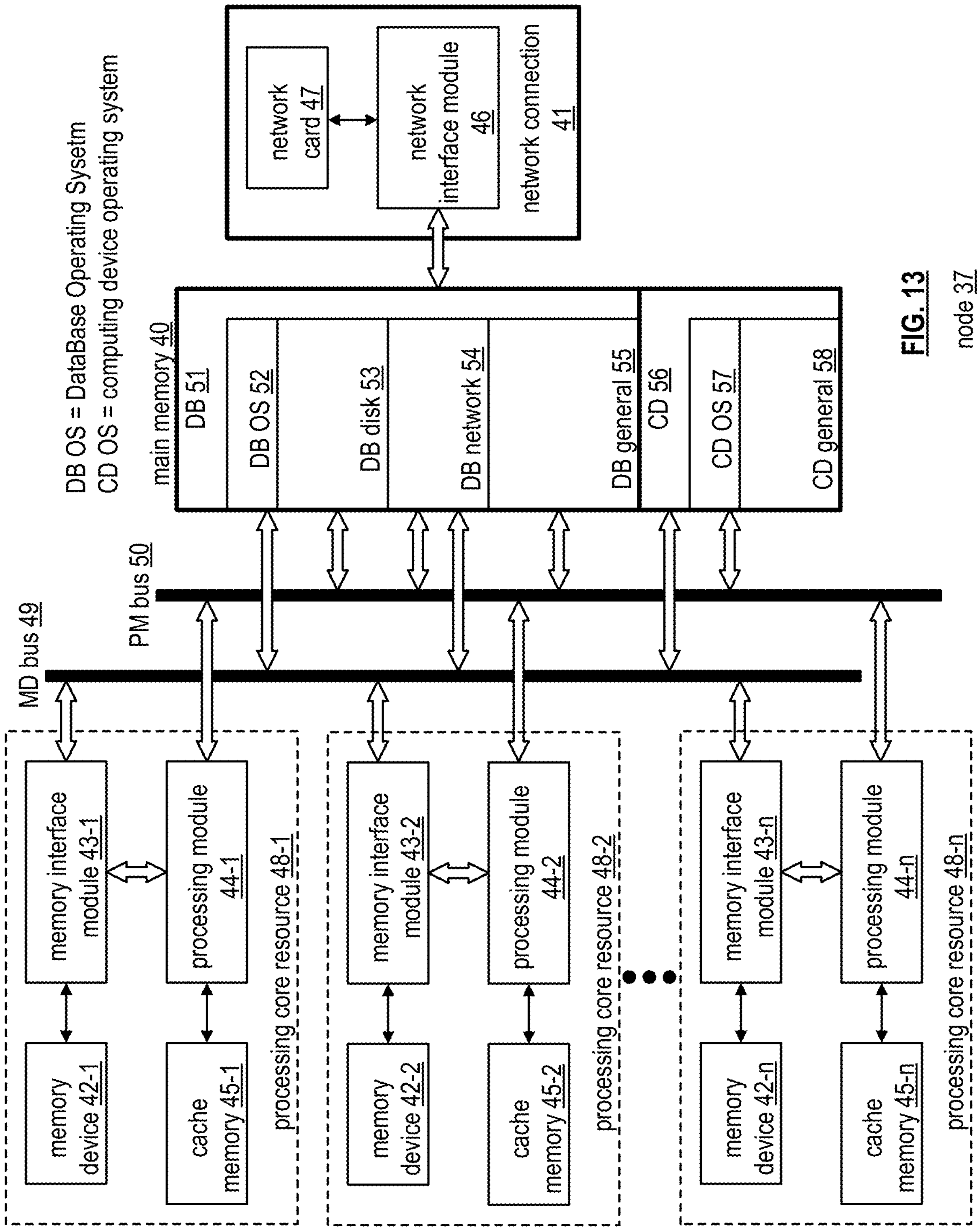
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through **48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n***. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
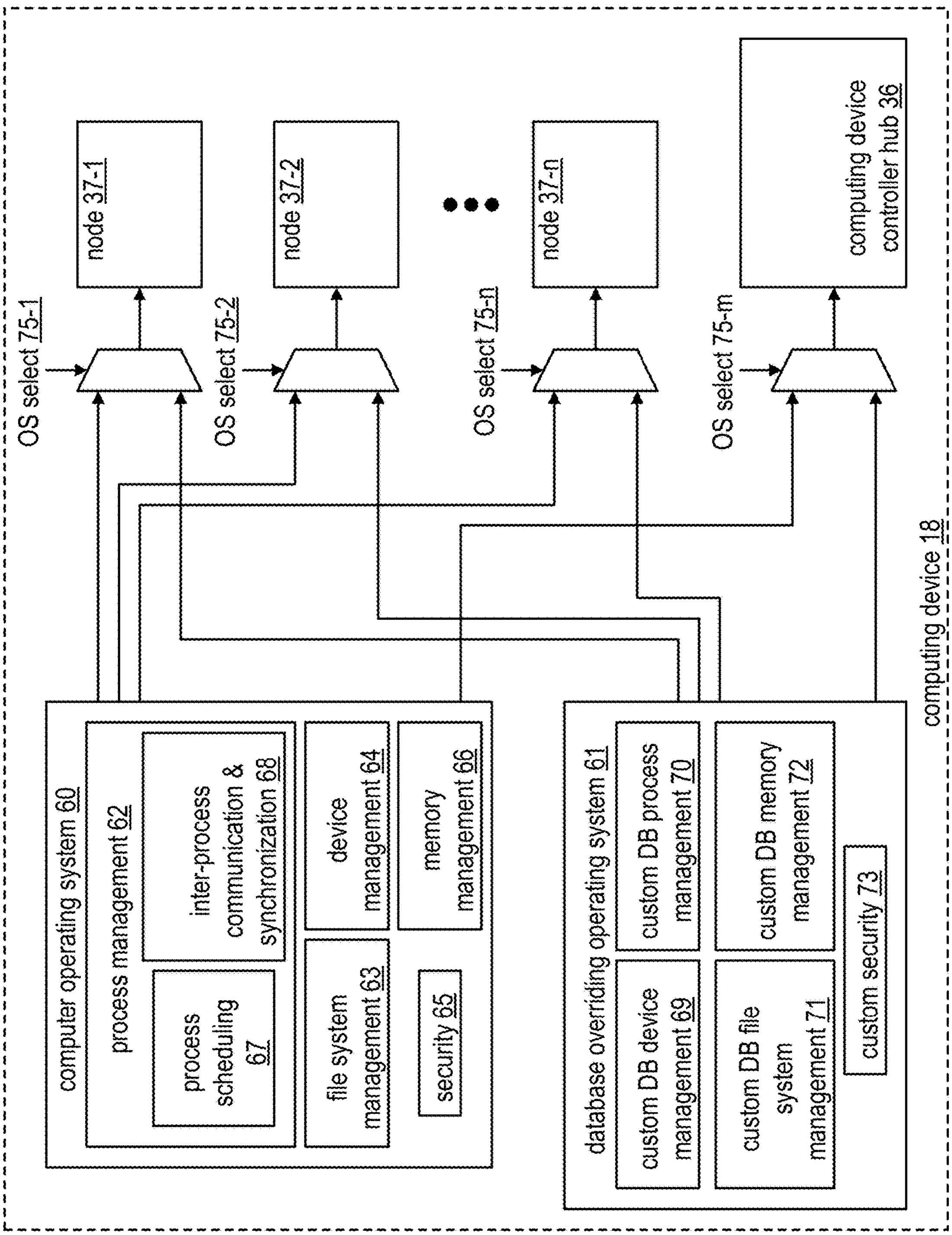
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61.

The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through **75-*n* when communicating with nodes 37-1 through 37-*n* and via OS select 75-*m* when communicating with the computing device controller hub 36**). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
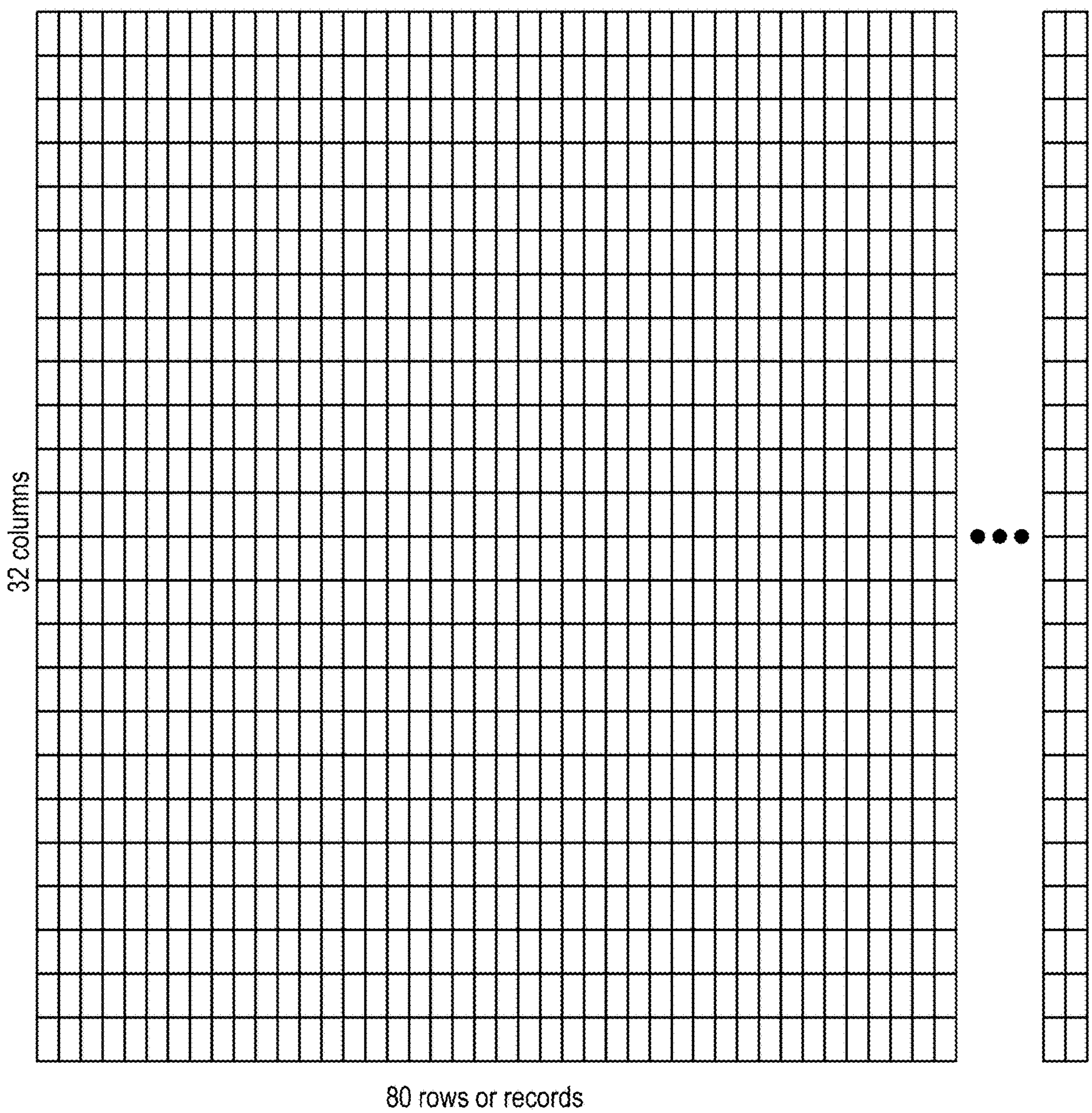
FIGS. 15-23 are schematic block diagrams of an example of processing a table or data set for storage in the database system in accordance with the present invention.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
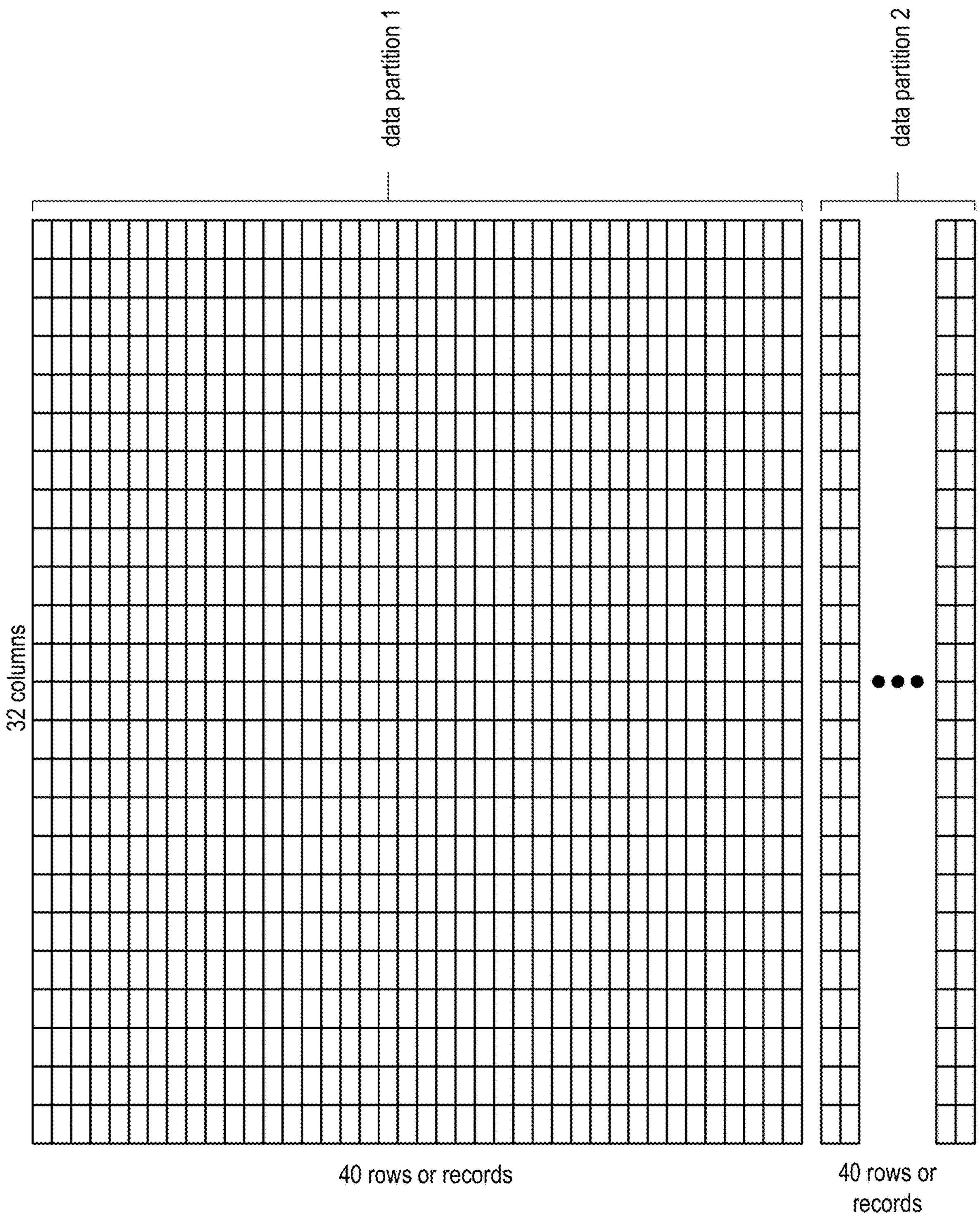

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
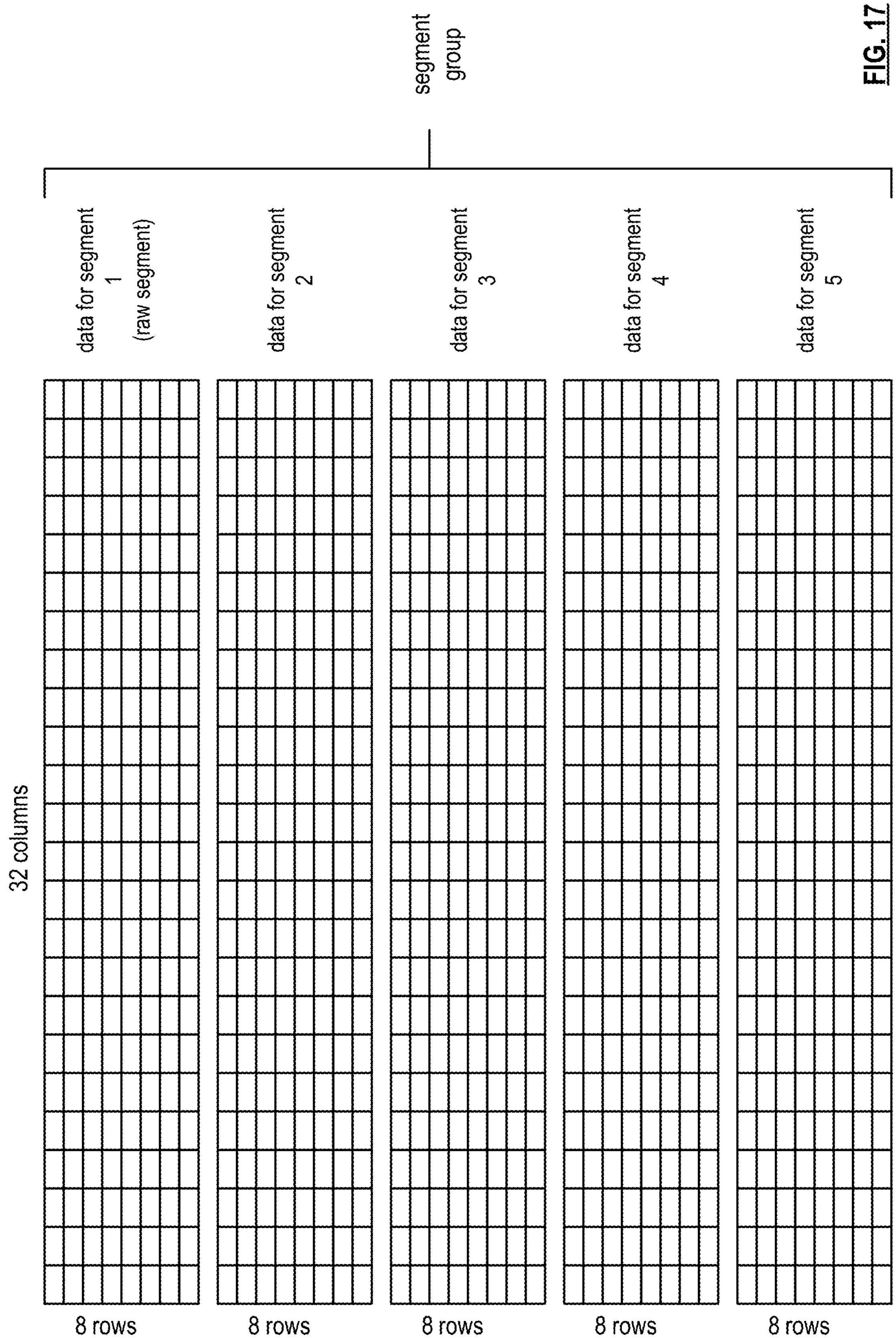

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figure 18:
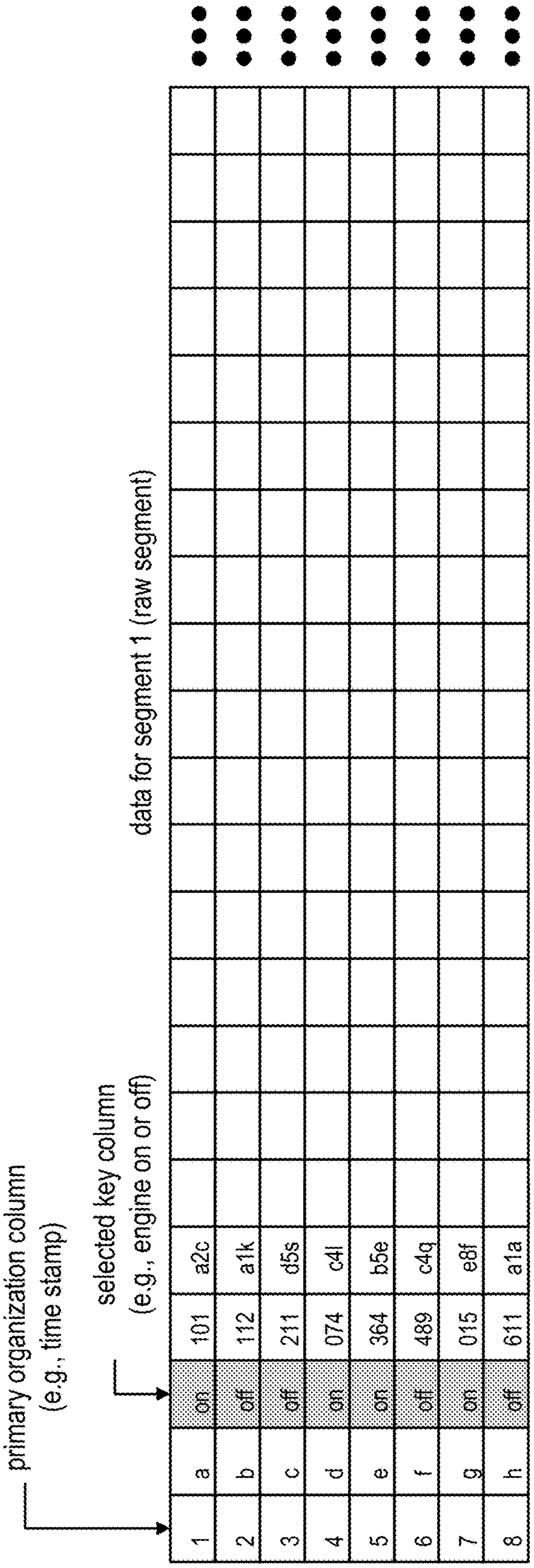

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

Figure 19:
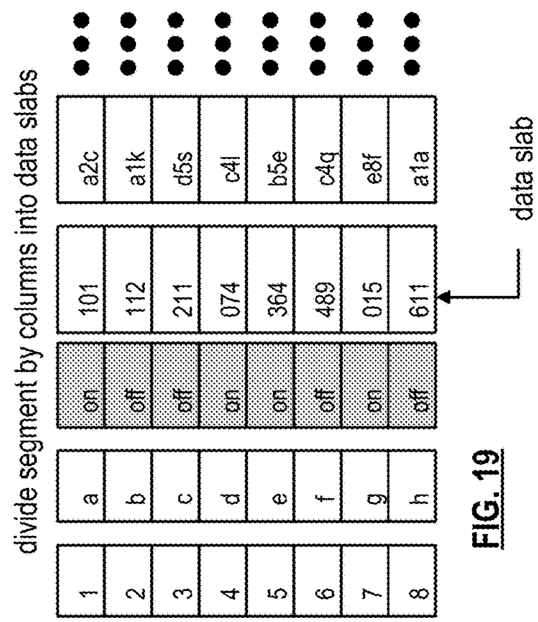

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

Figure 20:
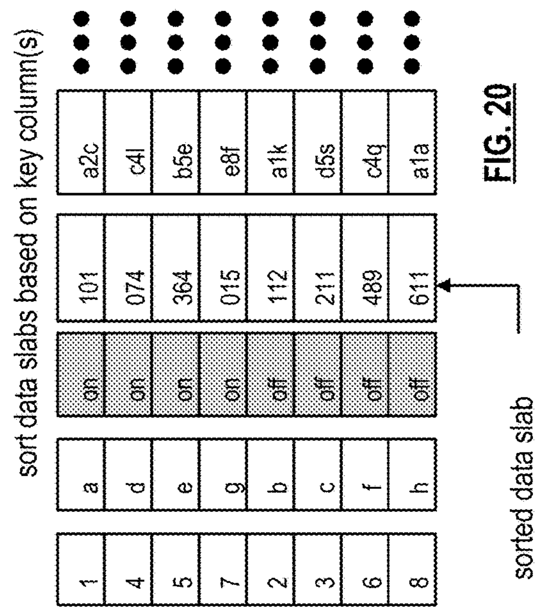

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
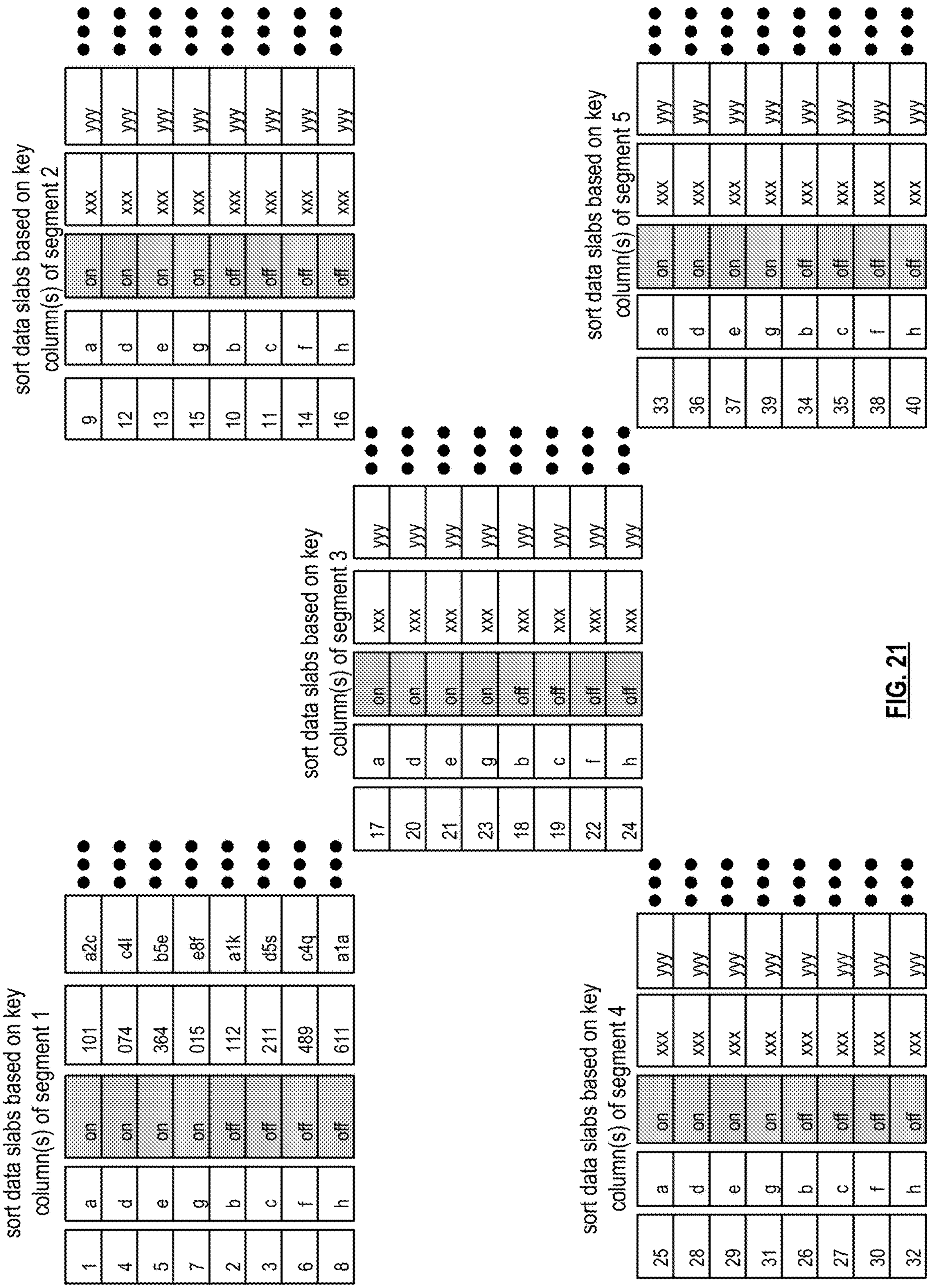

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
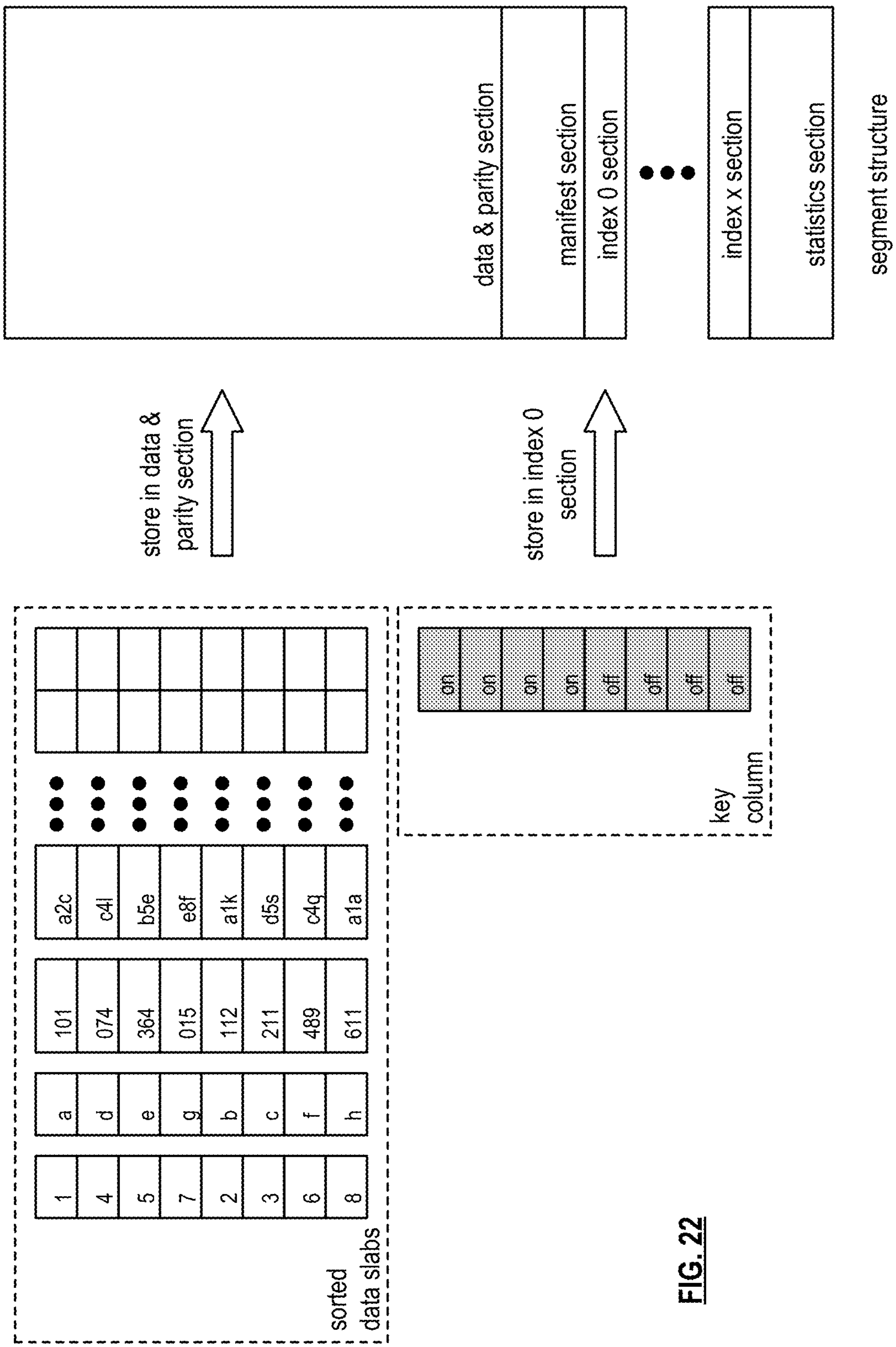

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
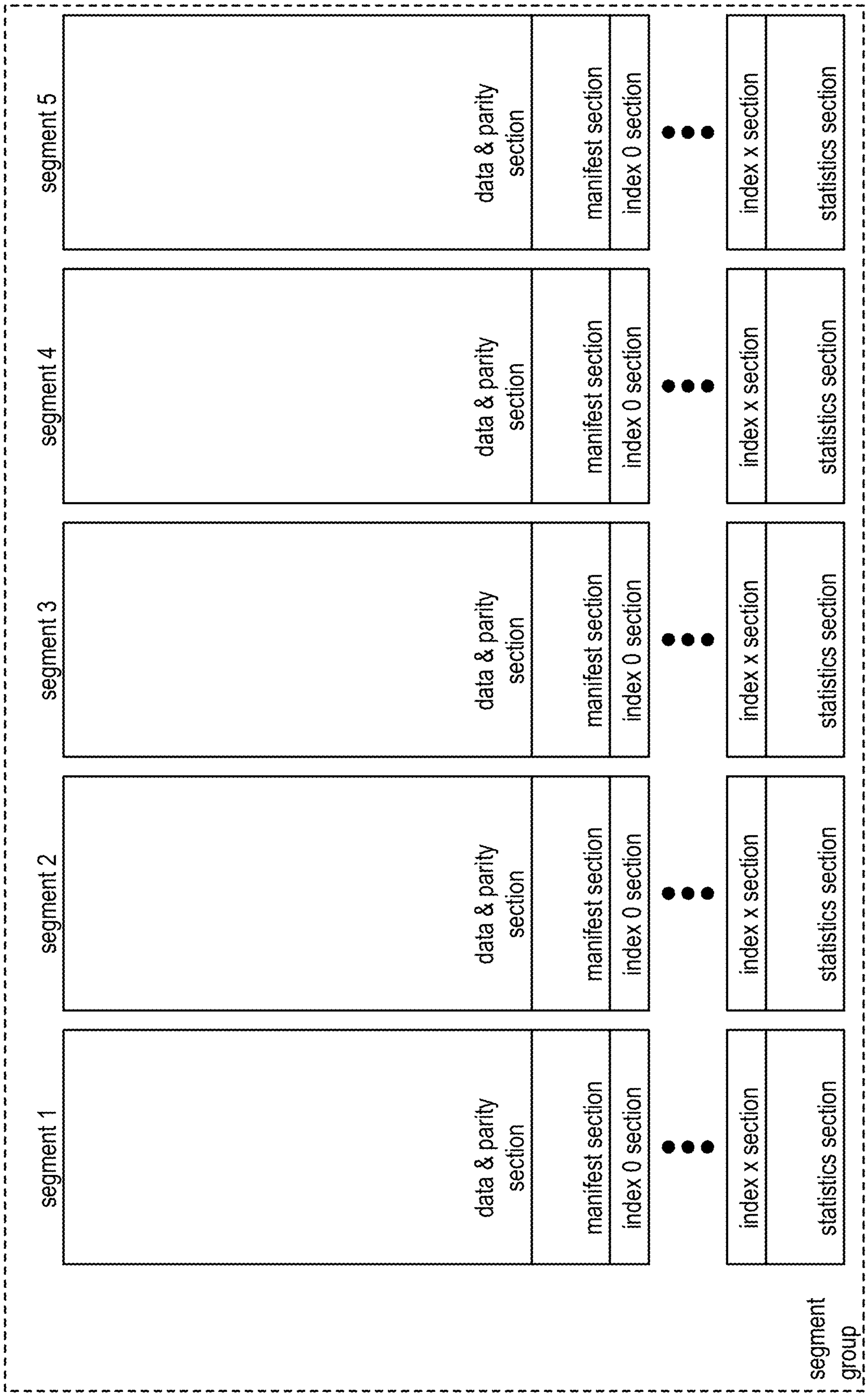

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
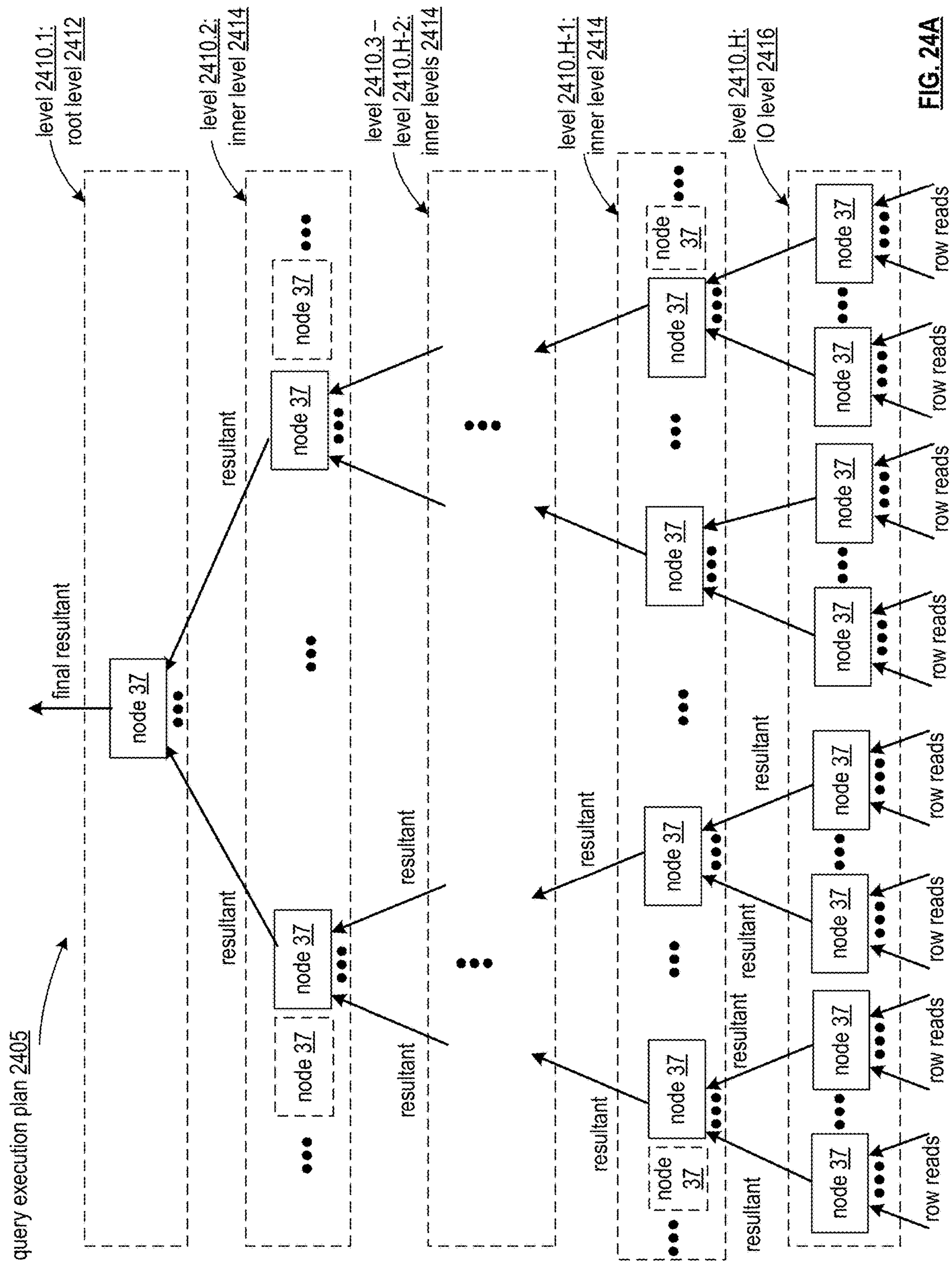
FIG. 24A is a schematic block diagram of a query execution plan in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
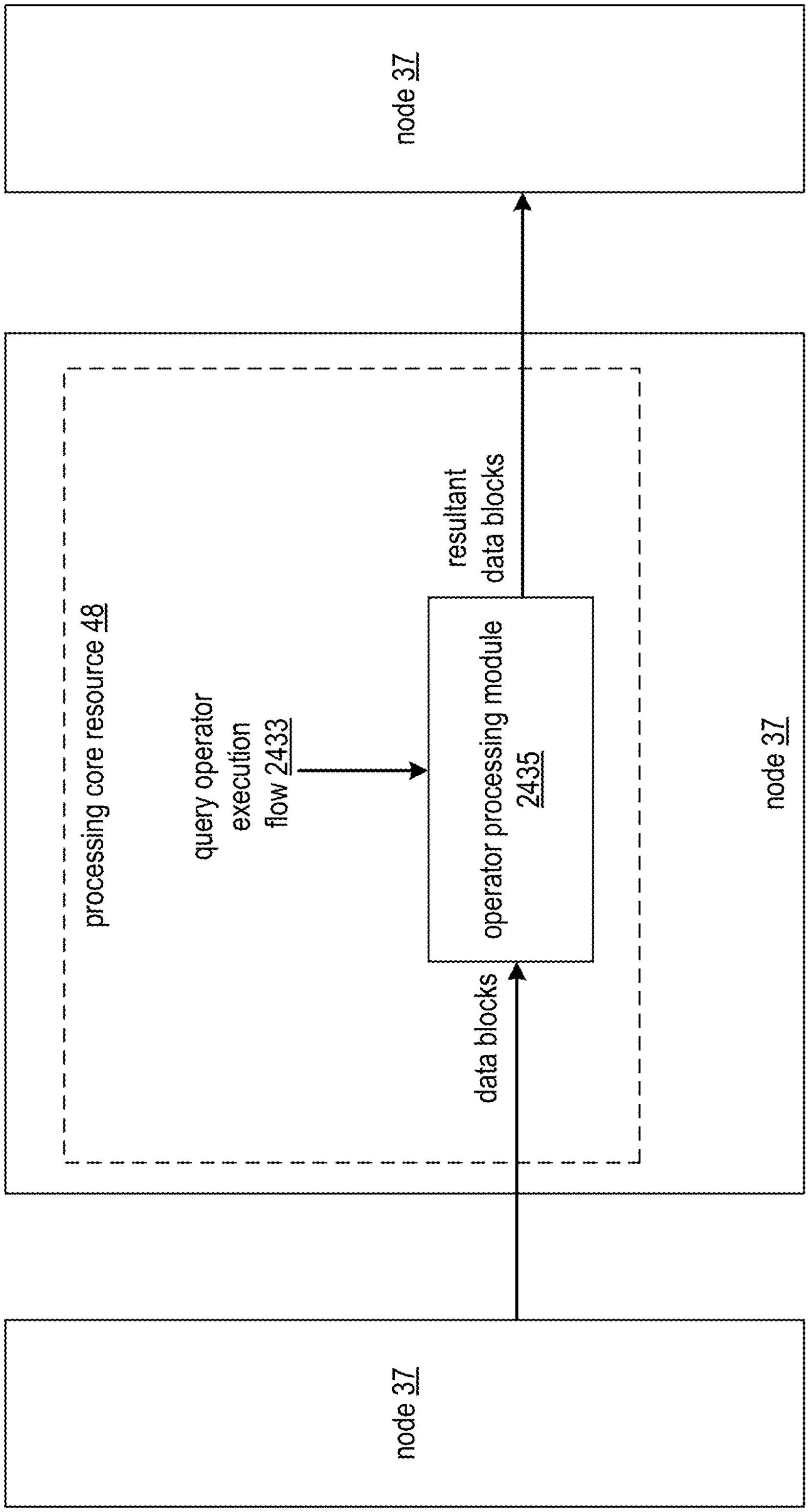
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing an operator processing module 2435. The operator processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes an operator processing module 2435 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2416 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2412 can be gathered into a final result of the query, for example, by the node 37 at root level 2412 if this inner level is the top-most inner level 2414 or the only inner level 2414. As another example, resultants generated by each of the plurality of nodes at this inner level 2412 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the operator processing module 2435 can be implemented by a single processing core resource 48 of the node 37, for example, by utilizing a corresponding processing module 44. In such embodiments, each one of the processing core resources 48-1-48-*n* of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query. Alternatively, the operator processing module 2435 can be implemented via multiple processing core resources 48 and/or via one or more other processing modules of the node 37.

Figure 24C:
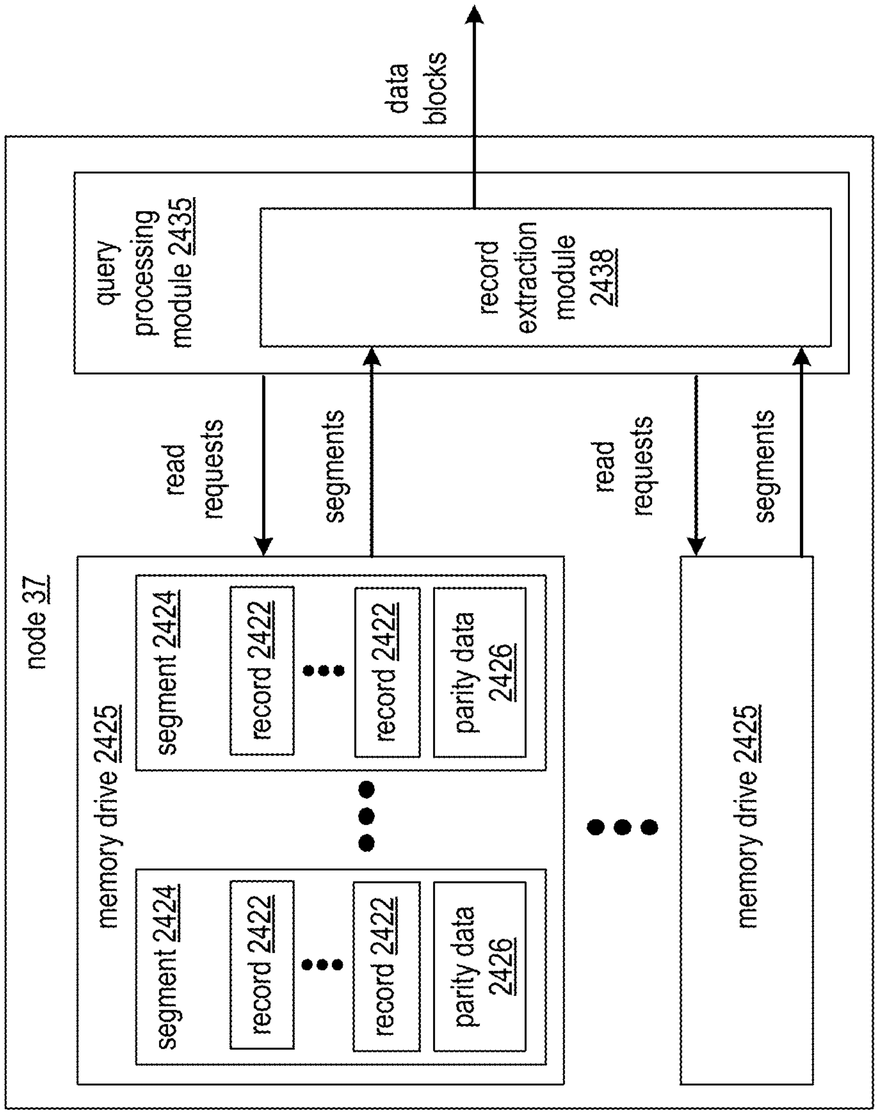

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-*n* of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24D:
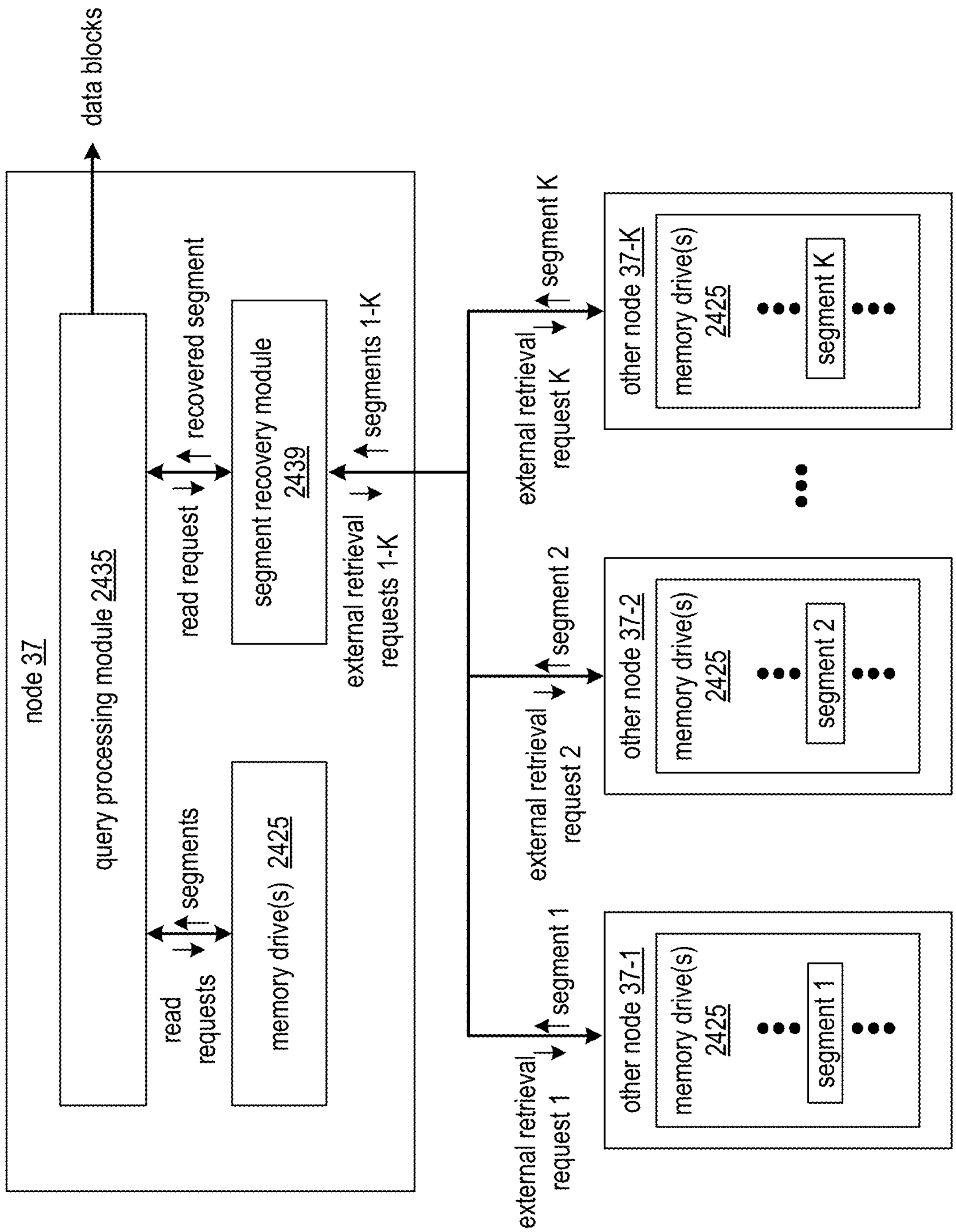

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
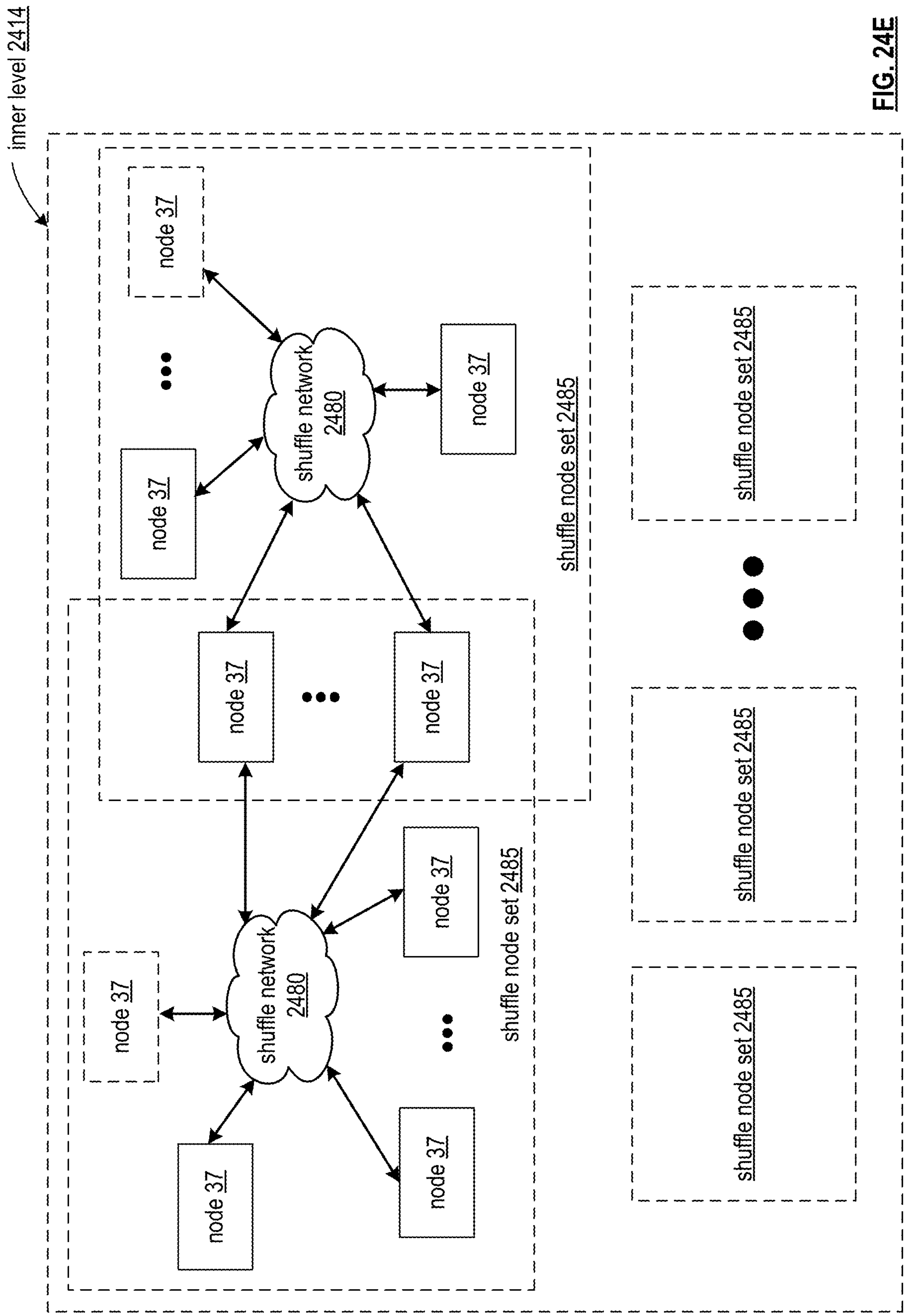
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child 10 nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 24F:
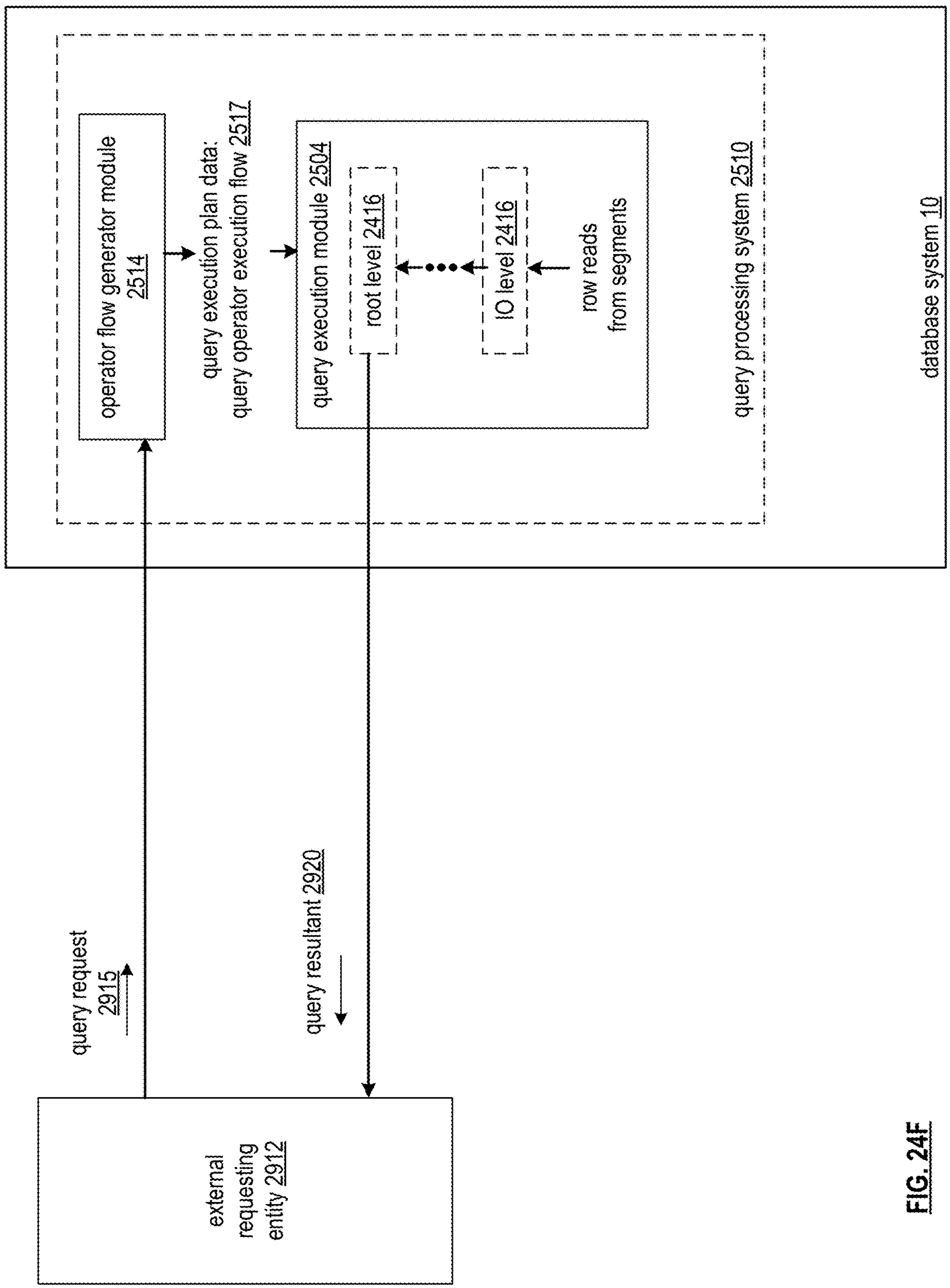
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2915. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2915 for execution via the database system 10, where the corresponding query resultant 2920 is transmitted back to the computing device, for example, for storage by the computing device and/or for display to the corresponding user via a display device.

Figure 24G:
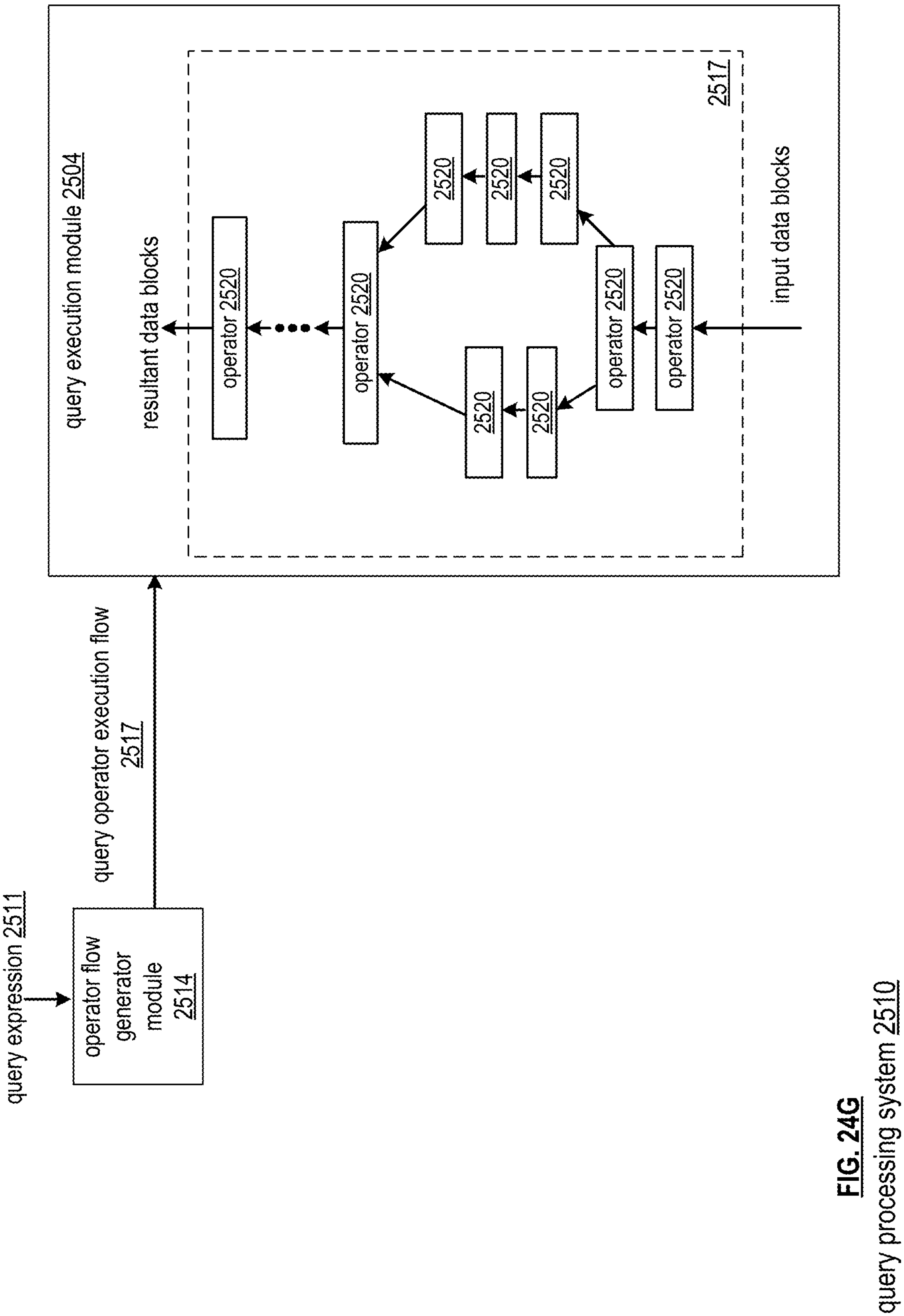
FIG. 24G is a schematic block diagram of a query processing system in accordance with various embodiments.

FIG. 24G illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 24G, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Figure 24H:
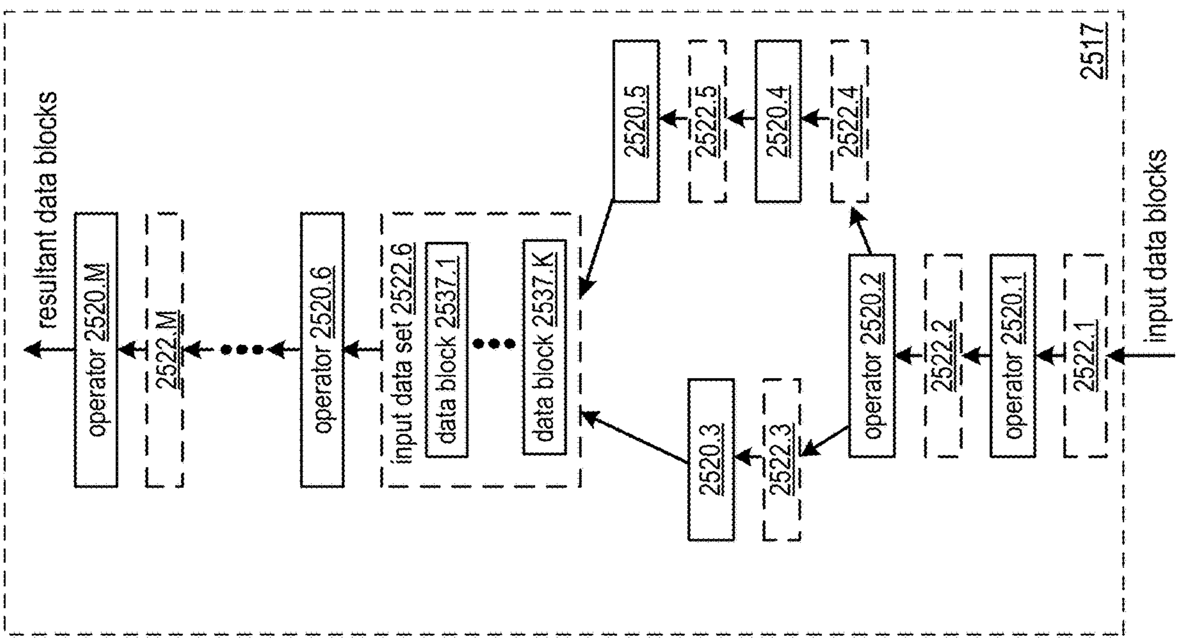
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator

2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in a same shuffle node set as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

Figure 24I:
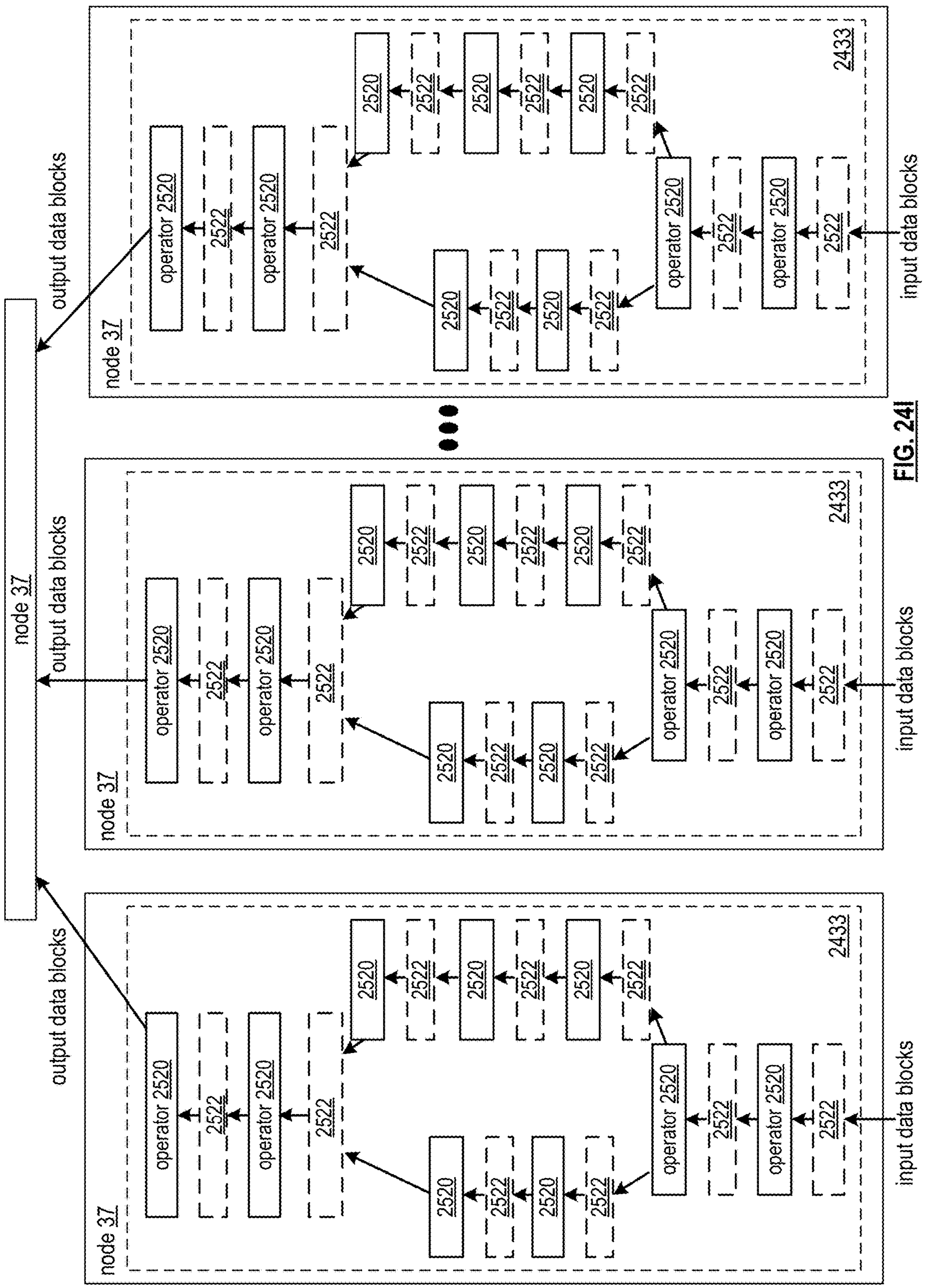
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Figure 24J:
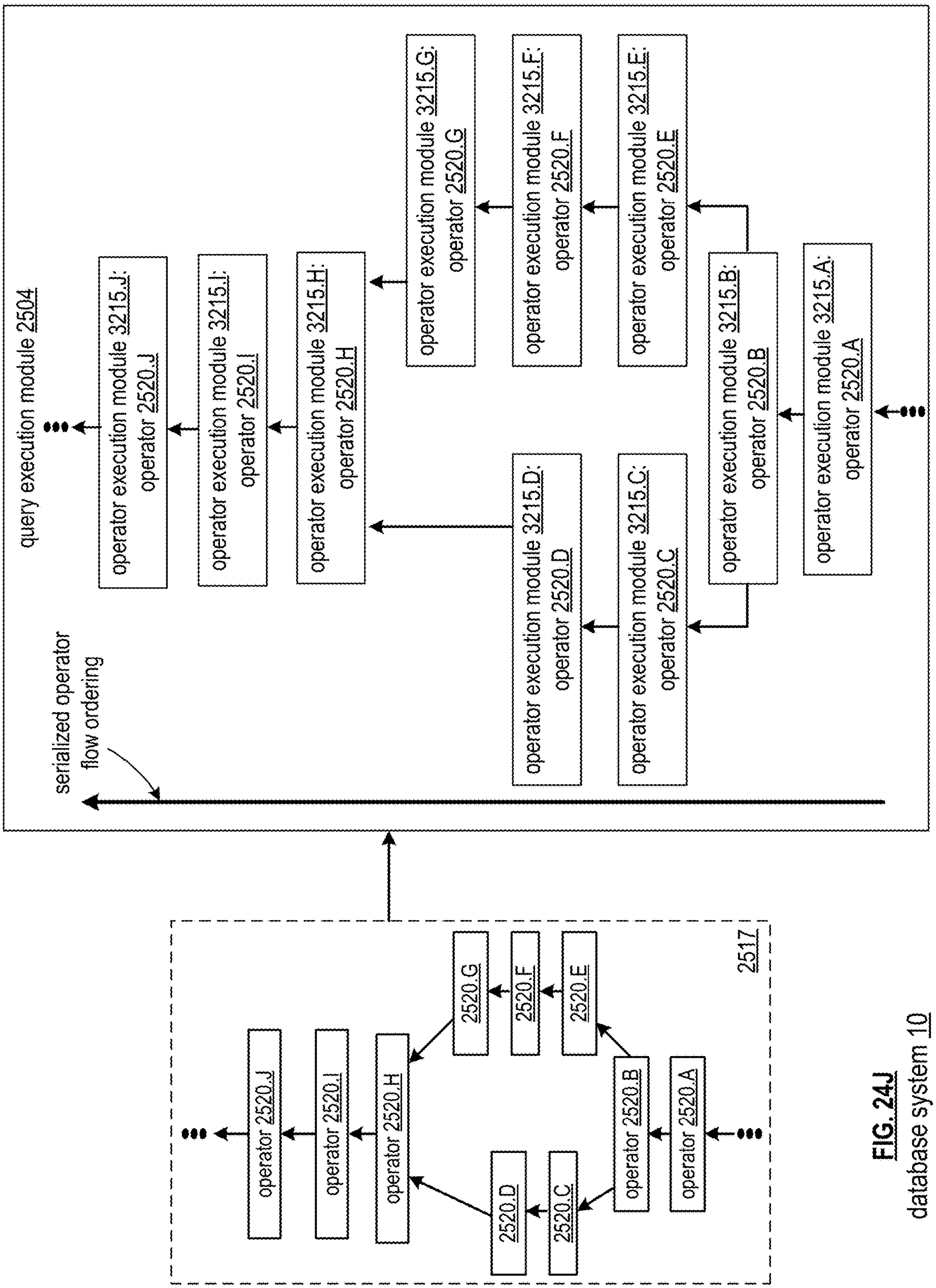
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
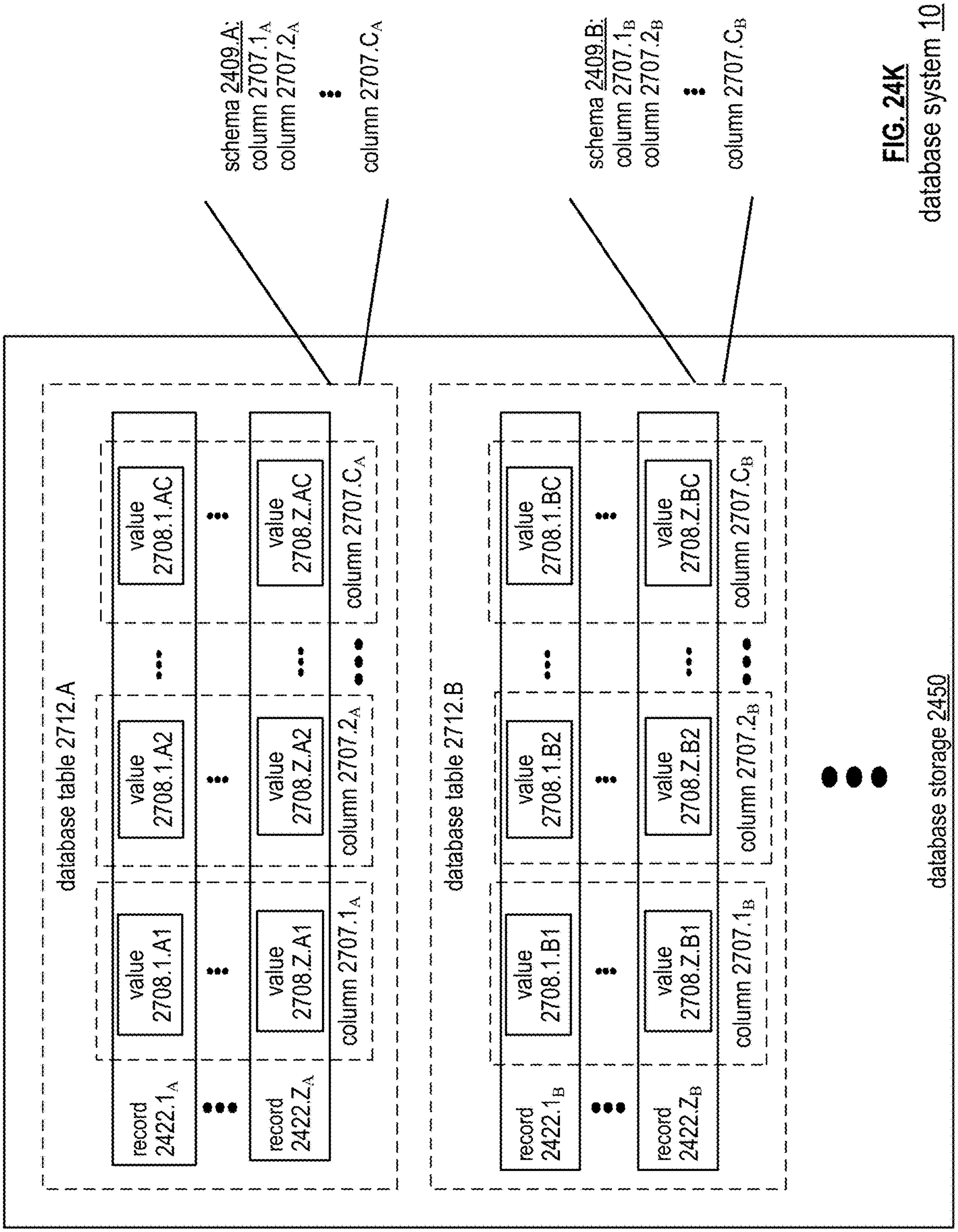
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns 2707.$1_A$-2707.$C_A$ of schema 2709.A for database table 2712.A can have a different number of columns than and/or can have different datatypes for some or all columns of the set of columns 2707.$1_B$-2707.$C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
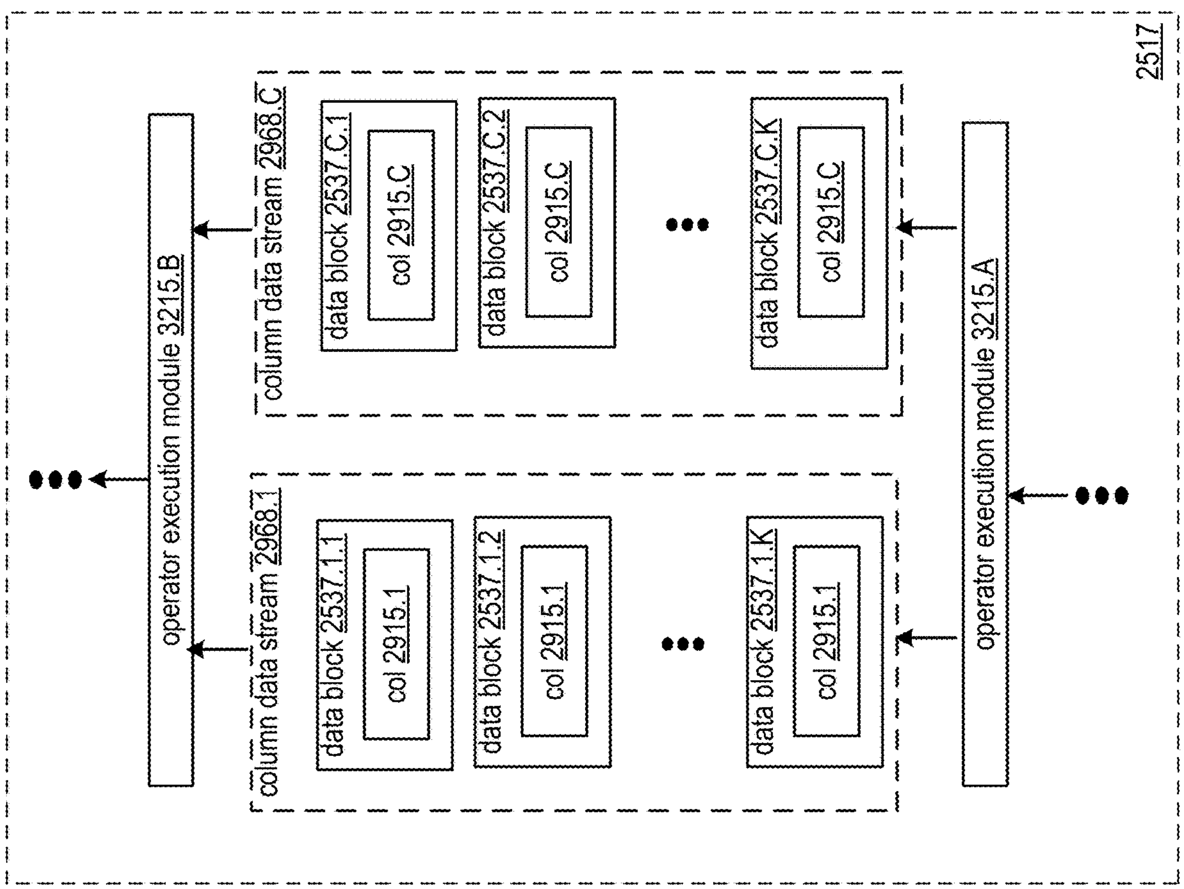
FIG. 24L is a schematic block diagram of a query execution module that implements a plurality of column data streams in accordance with various embodiments.
Figure 24M:
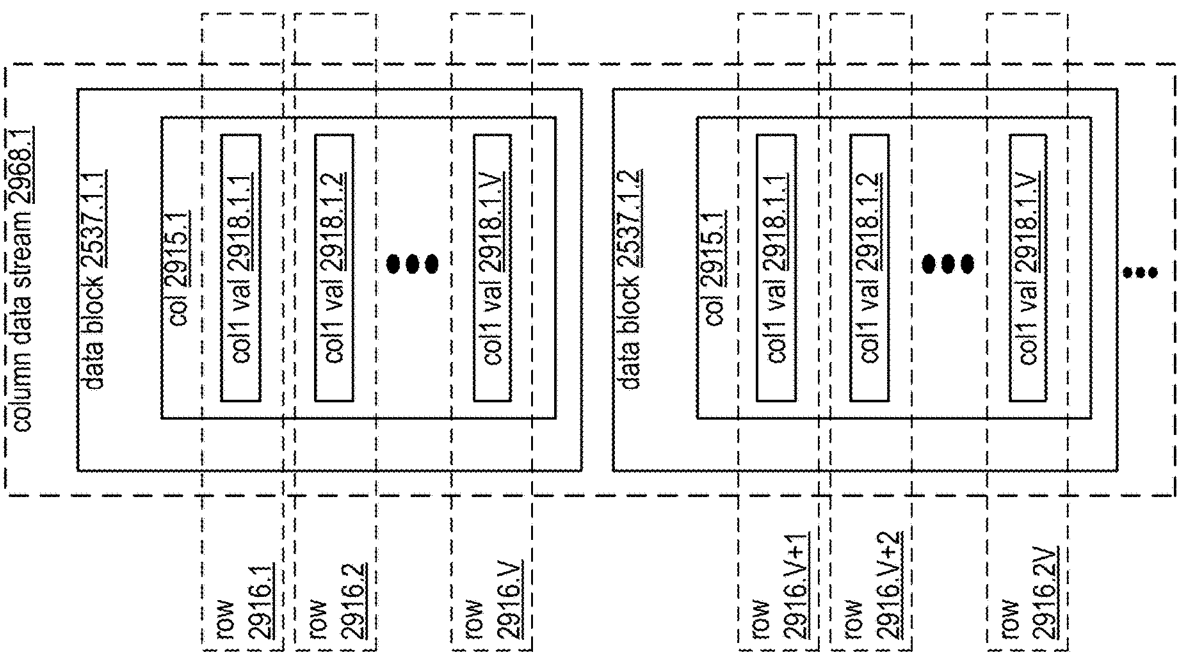
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.0 for columns 2915.1-2915.0 are included first in every respective column data stream, where a second row's values 2918.2.1-2918.2.0 for columns 2915.1-2915.0 are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same data stream.

Figure 24N:
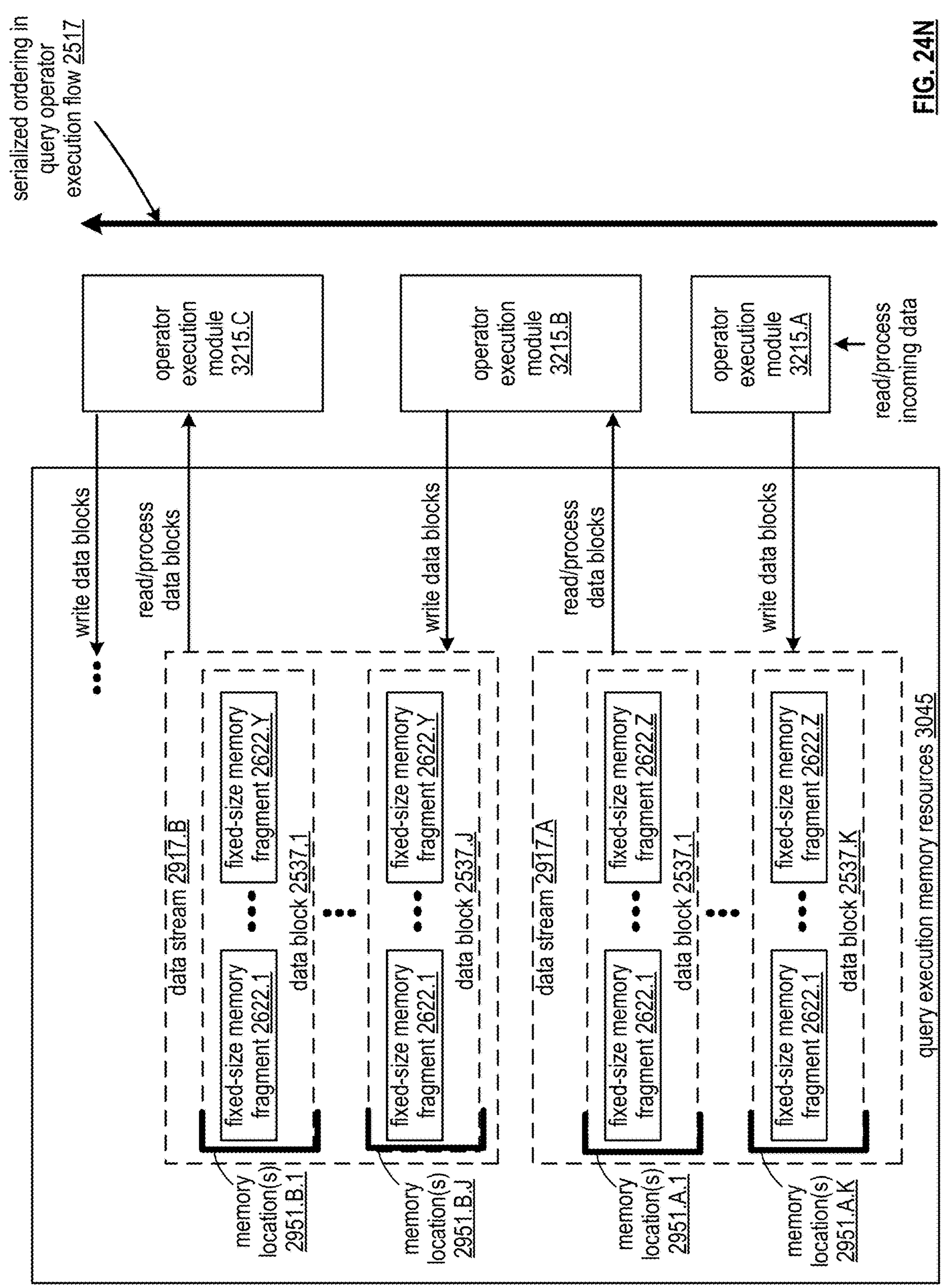
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

Figure 24O:
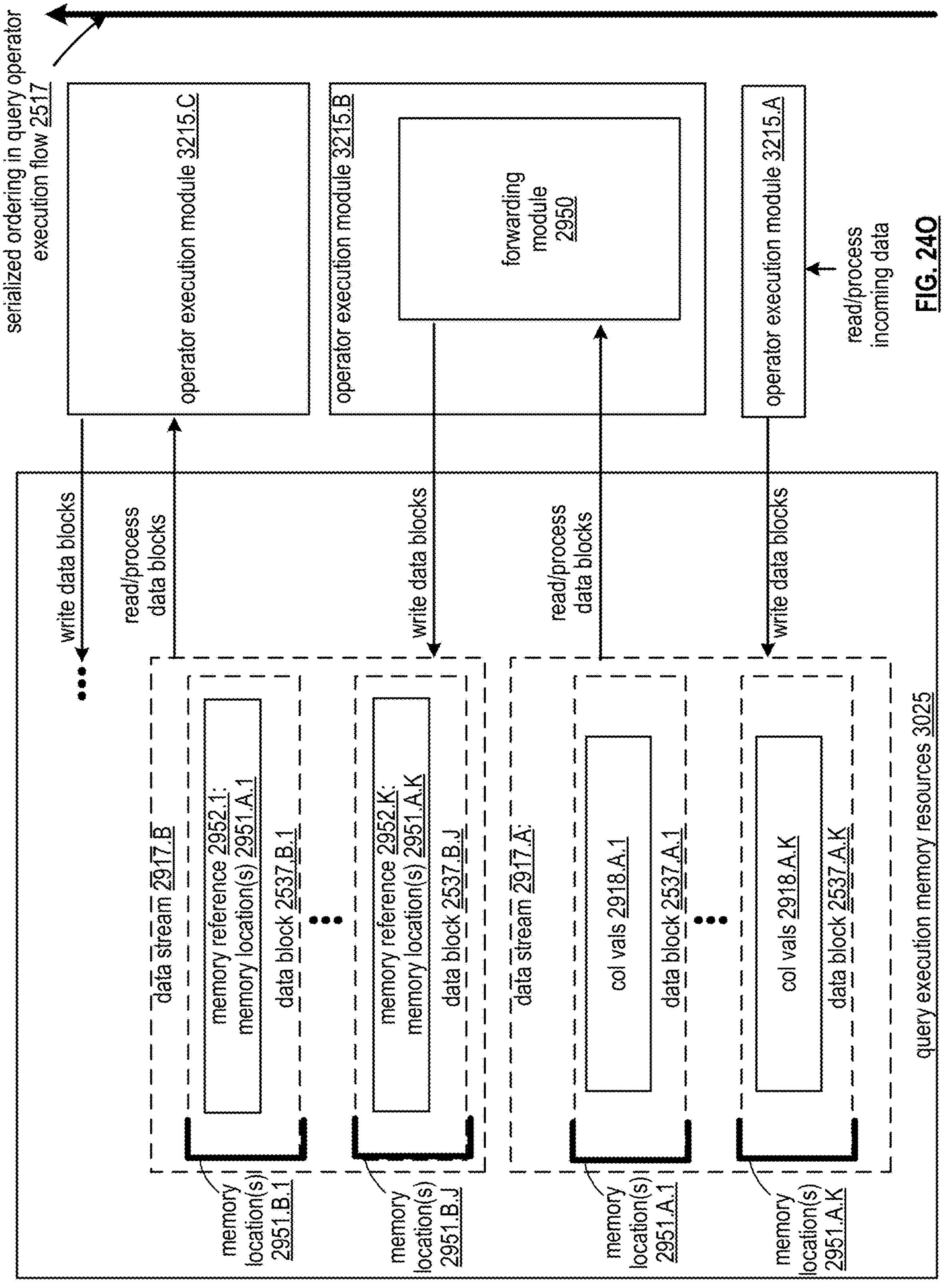
FIG. 24O is a schematic block diagram of a query execution module illustrating writing and processing of data blocks by an operator execution module that implements a forwarding module in accordance with various embodiments.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams. An example of such an embodiment is illustrated in FIG. 24O.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

FIG. 24O illustrates an example where a data stream 2910 generated by one operator execution module 3215 is forwarded by another operator execution module 3215 via a forwarding module 2950. The data stream 2917.A of FIG. 24O can be implemented as the data stream 2916.A of FIG. 24N and/or the data stream 2917.B of FIG. 24O can be implemented as the data stream 2916.B of FIG. 24N.

As illustrated in the example of FIG. 24O, data block 2537.1-2537.J are generated based on forwarding 2537.1-2537.K by a forwarding module 2950 based on writing data blocks 2537.1-2537.J to include a reference to a corresponding one of the set of memory locations 2951.A.1-2959.A.K, for example, where data block 2537.B.1 indicates memory location of memory locations 2951.A.1, where data block 2537.B.2 indicates memory location of memory locations 2951.A.2, etc. For example, the value of J is equal to the value of K. This can be favorable over reading and copying all of the values 2918, particularly if the values 2918 and/or corresponding set of rows remain unchanged in the operator execution. In other embodiments where data blocks are fixed size, the value of J is far fewer than K, where multiple memory references 2952 and/or corresponding memory reference 2954 are included in the same data block 2537 based on being significantly smaller than the referenced values themselves. Some or all forwarding of column values/column streams described herein can optionally implement some or all features and/or functionality of FIG. 24O.

Figure 25A:
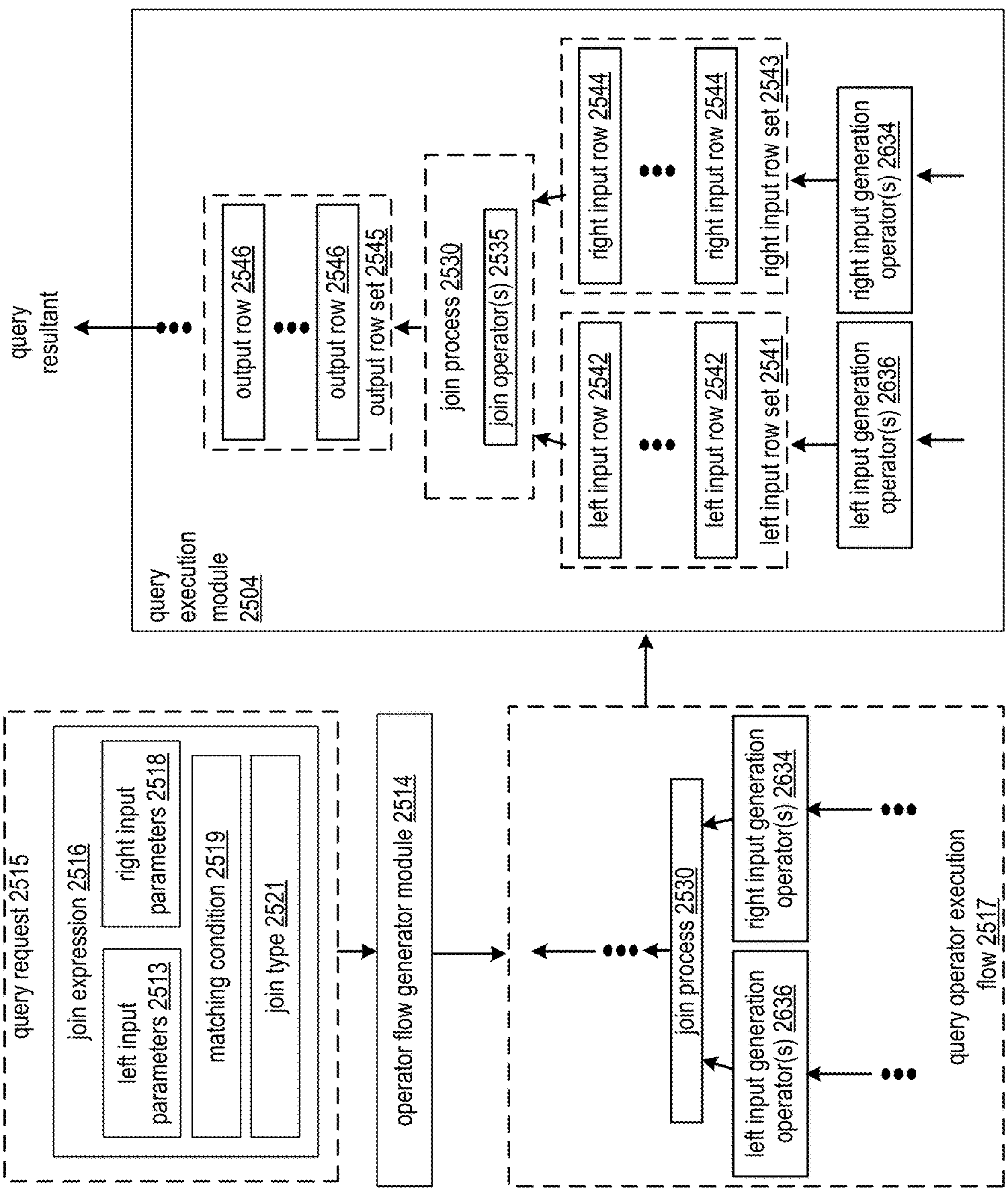
FIG. 25A is a schematic block diagram of a database system executing a join process based on a join expression of a query request in accordance with various embodiments.
Figure 25B:
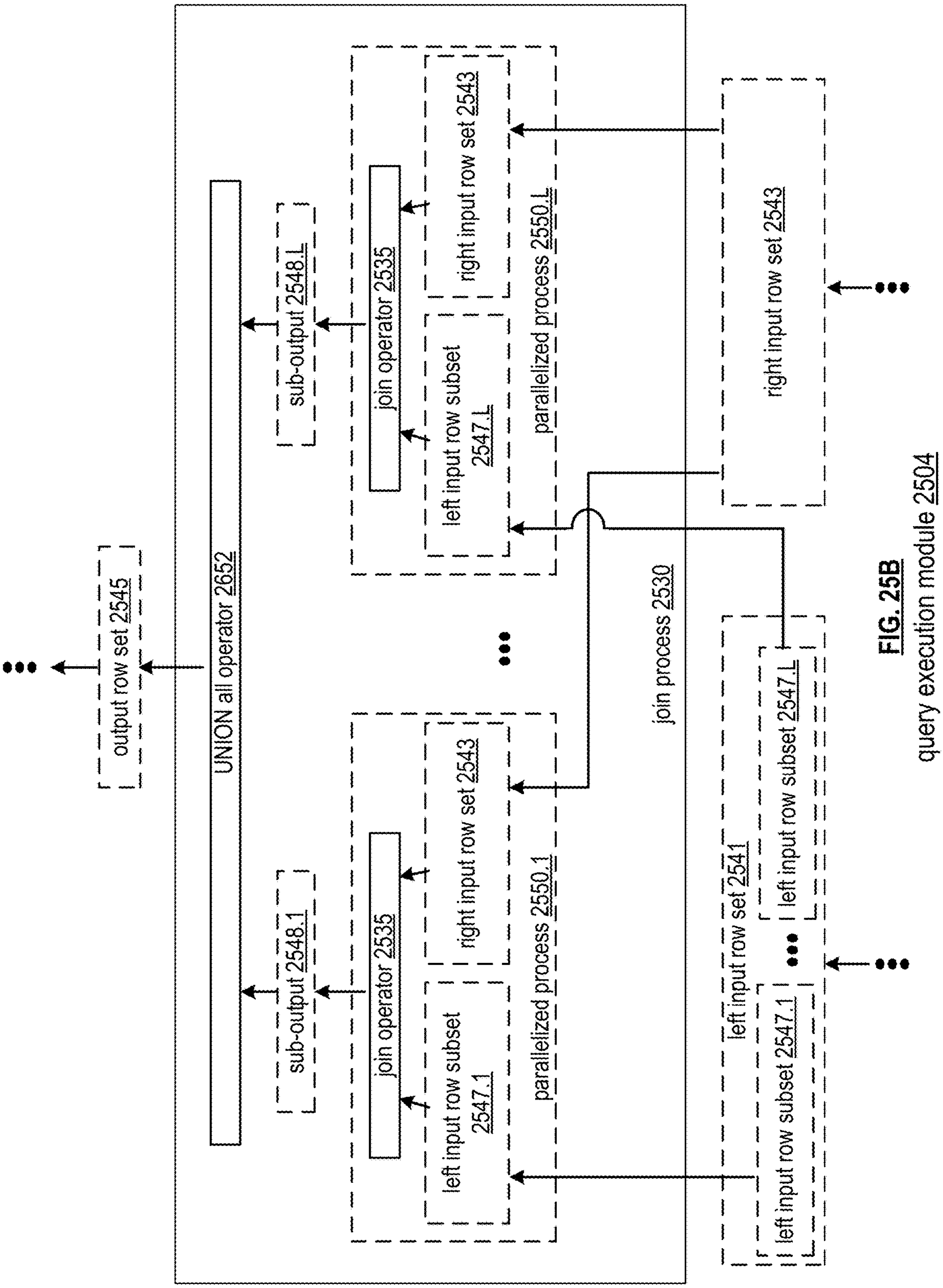
FIG. 25B is a schematic block diagram of a query execution module executing a join process via multiple parallel processes in accordance with various embodiments.
Figure 25C:
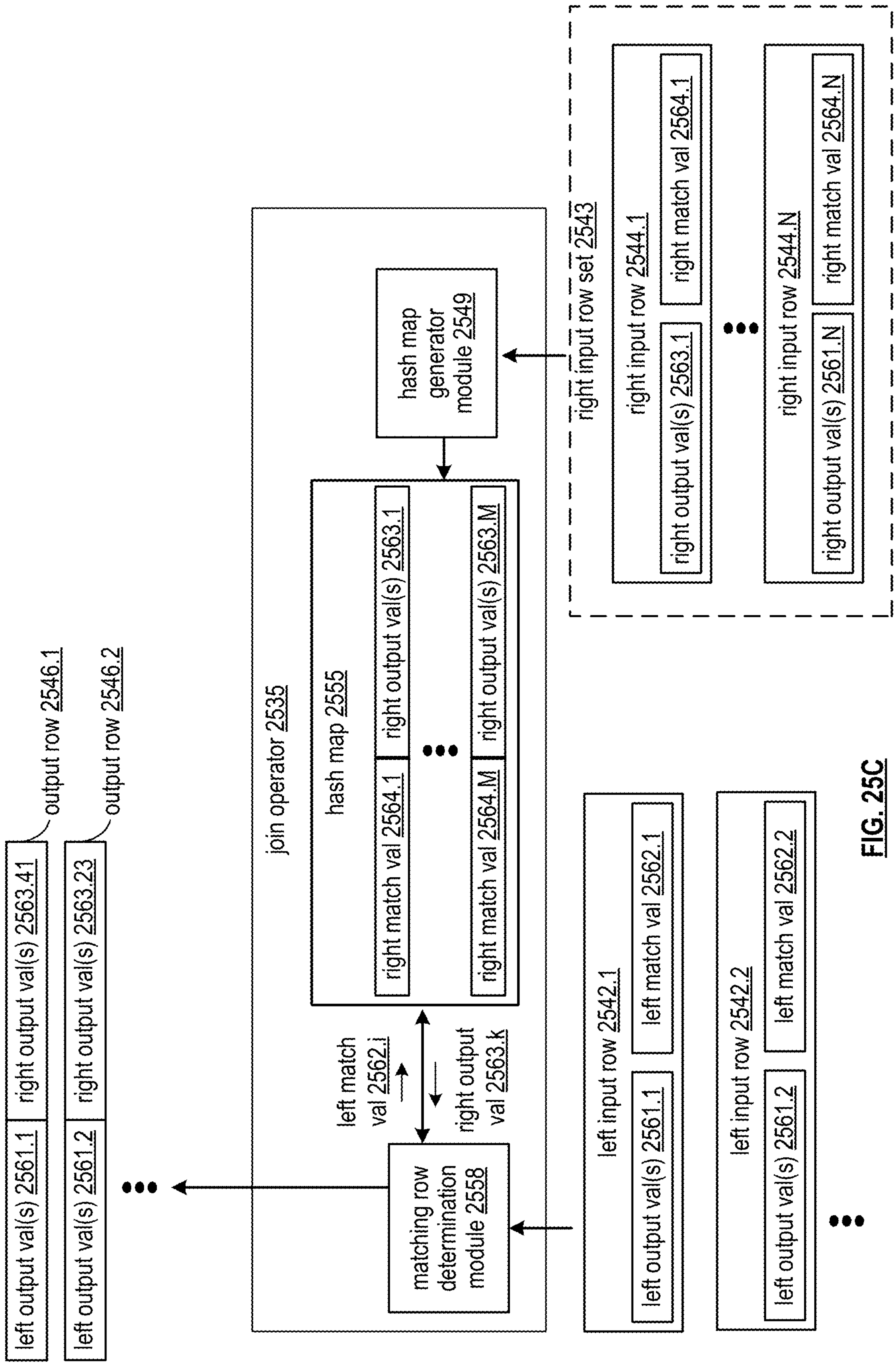
FIG. 25C is a schematic block diagram of a query execution module executing a join operator based on utilizing a hasp map generated from right input rows in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C can be utilized to implement the database system 10 of FIGS. 24A-24I when executing queries indicating join expressions. Some or all features and/or functionality of FIGS. 25A-25C can be utilized to implement any embodiment of the database system 10 described herein.

FIG. 25A illustrates an example of processing a query request 2515 that indicates a join expression 2516. The join expression 2516 can indicate that columns from one or more tables, for example, indicated by left input parameters 2513 and/or right input parameters 2518, be combined into a new table based on particular criteria, such as matching condition 2519 and/or a join type 2521 of the join operation. For example, the join expression 2516 can be implemented as a SQL JOIN clause, or any other type of join operation in any query language.

The join expression 2516 can indicate left input parameters 2513 and/or right input parameters 2518, denoting how the left input rows and/or right input rows be selected and/or generated for processing, such as which columns of which tables be selected. The left input and right input are optionally not distinguished as left and right, for example, where the join expression 2516 simply denotes input values for two input row sets. The join expression can optionally indicate performance of a join across three or more sets of rows, and/or multiple join expressions can be indicated to denote performance of joins across three or more sets of rows. In the case of a self-join, the join expression can optionally indicate performance of a join across a single set of input rows.

The join expression 2516 can indicate a matching condition 2519 denoting what condition constitutes a left input row being matched with a right input row in generating output of the join operation, which can be based on characteristics of the left input row and/or the right input row, such as a function of values of one or more columns of the left input row and/or the right input row. For example, the matching condition 2519 requires equality between a value of a first column value of the left input rows and a second column value of the right input rows. The matching condition 2519 can indicate any conditional expression between values of the left input rows and right input rows, which can require equality between values, inequality between values, one value being less than another value, one value being greater than another value, one value being less than or equal to another value, one value being greater than or equal to another value, one value being a substring of another value, one value being an array element of an array, or other criteria. In some embodiments, the matching condition 2519 indicates all left input rows be matched with all right input rows.

The join expression 2516 can indicate a join type 2521 indicating the type of join to be performed to produce the output rows. For example, the join type 2521 can indicate the join be performed as a one of: a full outer join, a left outer join, a right outer join, an inner join, a cross join, a cartesian product, a self-join, an equi-join, a natural join, a hash join, or any other type of join, such as any SQL join type and/or any relational algebra join operation.

The query request 2515 can further indicate other portions of a corresponding query expression indicating performance of other operators, for example, to define the left input rows and/or the right input rows, and/or to further process output of the join expression.

The operator flow generator module 2514 can generate the query operator execution flow 2517 to indicate performance of a join process 2530 via one or more corresponding operators. The operators of the join process 2530 can be configured based on the matching condition 2519 and/or the join type 2521. The join process can be implemented via one or more serialized operators and/or multiple parallelized branches of operators 2520 configured to execute the corresponding join expression.

The operator flow generator module 2514 can generate the query operator execution flow 2517 to indicate performance of the join process 2530 upon output data blocks generated via one or more left input generation operators 2636 and one or more right input generation operators 2634. For example, the left input generation operators 2636 include one or more serialized operators and/or multiple parallelized branches of operators 2520 utilized to retrieve a set of rows from memory, for example, to perform IO operations, to filter the set of rows, to manipulate and/or transform values of the set of rows to generate new values of a new set of rows for performing the join, or otherwise retrieve and/or generate the left input rows, in accordance with the left input parameters 2513. Similarly, the right input generation operators 2634 include one or more serialized operators and/or multiple parallelized branches of operators utilized to retrieve a set of rows from memory, for example, via IO operators, to filter the set of rows, to manipulate and/or transform values of the set of rows to generate new values of a new set of rows for performing the join, or otherwise retrieve and/or generate the right input rows, in accordance with the right input parameters 2518. The left input generation operators 2636 and right input generation operators 2634 can optionally be distinct and performed in parallel to generate respective left and right input row sets separately. Alternatively, one or more of the left input generation operators 2636 and right input generation operators 2634 can optionally be shared operators between left input generation operators 2636 and right input generation operators 2634 to aid in generating both the left and right input row sets.

The query execution module 2504 can be implemented to execute the query operator execution flow 2517 to facilitate performance of the corresponding join expression 2516. This can include executing the left input generation operators 2636 to generate a left input row set 2541 that includes a plurality of left input rows 2542 determined in accordance with the left input parameters 2513, and/or executing the right input generation operators 2634 to generate a right input row set 2543 that includes a plurality of right input rows 2544 determined in accordance with the right input parameters 2518. The plurality of left input rows 2542 of the left input row set 2541 can be generated via the left input generation operators 2636 as a stream of data blocks sent to the join process 2530 for processing, and/or the plurality of right input rows 2544 of the right input row set 2543 can be generated via the right input generation operators 2634 as a stream of data blocks sent to the join process 2530 for processing.

The join process 2530 can implement one or more join operators 2535 to process the left input row set 2541 and the right input row set 2543 to generate an output row set 2545 that includes a plurality of output rows 2546. The one or more join operators 2535 can be implemented as one or more operators 2520 configured to execute some or all of the corresponding join process. The output rows 2546 of the output row set 2545 can be generated via the join process 2530 as a stream of data blocks emitted as a query resultant of the query request 2515 and/or sent to other operators serially after the join process 2530 for further processing.

Each output rows 2546 can be generated based on matching a given left input row 2542 with a given right input row 2544 based on the matching condition 2519 and/or the join type 2521, where one or more particular columns of this left input row are combined with one or more particular columns of this given right input row 2544 as specified in the left input parameters 2513 and/or the right input parameters 2518 of the join expression 2516. A given left input row 2542 can be included in no output rows based on matching with no right input rows 2544. A given left input row 2542 can be included in one or more output rows based on matching with one or more right input rows 2544 and/or being padded with null values as the right column values. A given right input row 2544 can be included in no output rows based on matching with no left input rows 2542. A given right input row 2544 can be included in one or more output rows based on matching with one or more left input rows 2542 and/or being padded with null values as the left column values.

The query execution module 2504 can execute the query operator execution flow 2517 via a plurality of nodes 37 of a query execution plan 2405, for example, in accordance with nodes 37 participating across different levels of the plan. For example, the left input generation operators 2636 and/or the right input generation operators 2634 are implemented via nodes at a first one or more levels of the query execution plan 2405, such as an IO level and/or one or more inner levels directly above the IO level.

The left input generation operators 2636 and the right input generation operators 2634 can be implemented via a common set of nodes at these one or more levels. Alternatively some or all of the left input generation operators 2636 are processed via a first set of nodes of these one or more levels, and the right input generation operators 2634 are processed via a second set of nodes that have a non-null difference with and/or that are mutually exclusive with the first set of nodes.

The join process 2530 can be implemented via a nodes at a second one or more levels of the query execution plan 2405, such as one or more inner levels directly above the first one or more levels, and/or the root level. For example, one or more nodes at the second one or more levels implementing the join process 2530 receive left input rows 2542 and/or right input rows 2544 for processing from child nodes implementing the left input generation operators 2636 and/or child nodes implementing the right input generation operators 2634. The one or more nodes implementing the join process 2530 at the second one or more levels can optionally belong to a same shuffle node set 2485, and can laterally exchange left input rows and/or right input rows with each other via one or more shuffle operators and/or broadcast operators via a corresponding shuffle network 2480.

FIG. 25B illustrates an embodiment of a query execution module 2504 executing a join process 2530 via a plurality of parallelized processes 2550.1-2550.L. Some or all features and/or functionality of the query execution module 2504 can be utilized to implement the query execution module 2504 of FIG. 25A, and/or any other embodiment of the query execution module 2504 described herein. In other embodiments, the query execution module 2504 of FIG. 25A implements the join process 2530 via a single join operator of a single processes rather than the plurality of parallelized processes 2550.

In some embodiments, the plurality of parallelized processes 2550.1-2550.L are implemented via a corresponding plurality of nodes 37.1-37.L of a same level, such as a given inner level, of a query execution plan 2405 executing the given query. The plurality of parallelized processes 2550.1-2550.L can be implemented via any other set of parallelized and/or distinct memory and/or processing resources.

Each parallelized process 2550 can be responsible for generating its own sub-output 2548 based on processing a corresponding left input row subset 2547 of the left input row set 2541, and by further processing all of the right input row set. The full output row set 2545 can be generated by applying a UNION all operator 2652 implementing a union across all L sets of sub-output 2548, where all output rows 2546 of all sub-outputs 2548 are thus included in the output row set 2545. The output rows 2546 of a given sub-output 2548 can be generated via the join operator 2535 of the corresponding parallelized process 2555 as a stream of data blocks sent to the UNION all operator 2652.

In some embodiments, L different nodes and/or L different subsets of nodes that each include multiple nodes generate a corresponding left input row subset 2547 at a corresponding level of the query execution plan at a level below the level of nodes implementing the plurality of parallelized processes 2550.1-2550.L. For example, each parallelized process 2550 only receives the left input rows 2542 generated by its own one or more child nodes, where each of these child nodes only sends its output data blocks to one parent. The left input row set 2541 can otherwise be segregated into the set of left input row subsets 2547.1-2547.L, each designated for a corresponding one of the set of parallelized processes 2550.1-2550.L. The plurality of left input row subsets 2547.1-2547.L can be mutually exclusive and collectively exhaustive with respect to the left input row set 2541, where each left input row 2542 is received and processed by exactly one parallelized process 2550.

In some embodiments, the right input row set 2543 is generated via another set of nodes that is the same as, overlapping with, and/or distinct from the set of nodes that generate the left input row subsets 2547.1-2547.L. For example, similar to the nodes generating left input row subsets 2547, L different nodes and/or L different subsets of nodes that each include multiple nodes generate a corresponding subset of right input rows, where these subsets are mutually exclusive and collectively exhaustive with respect to the right input row set 2543. Unlike the left input rows, all right input rows 2544 can be received by all parallelized processes 2550.1, for example, based on each node of this other set of nodes sending its output data blocks to all L nodes implementing the L parallelized processes 2550, rather than a single parent. Alternatively, the right input rows 2544 generated by a given node can be sent by the node to one parent implementing a corresponding one of the plurality of parallelized processes 2550.1-2550.L, where the L nodes perform a shuffle and/or broadcast process to share received rows of the right input row set 2543 with one another via a shuffle network 2480 to facilitate all L nodes receiving all of the right input rows 2544. Each right input row 2544 is otherwise received and processed by every parallelized process 2550.

This mechanism can be employed for correctly implementing inner joins and/or left outer joins. In some embodiments, further adaptation of this join process 2530 is required to facilitate performance of full outer joins and/or right outer joins, as a given parallel process cannot ascertain whether a given right row matches with a left row of some or the left input row subset, or should be padded with nulls based on not matching with any left rows. An example adaptation for implementing right outer joins and/or full outer joins is discussed in further detail in conjunction with FIGS. 28A-28C.

In some embodiments, to implement a right outer join, the right and left input rows of a right outer join are designated in reverse, enabling the right outer join to be correctly generated based on instead segregating the right input rows of the right outer join across all parallelized processes 2550, and instead processing all left input rows of the right outer join by all parallelized processes 2550.

The left input row set that is segregated across all parallelized processes 2550 vs. the right input row set processed via every parallelized processes 2550 can be selected, for example, based on an optimization process performed when generating the query operator execution flow 2517. For example, for a join specified as being performed upon two sets of input rows, while the input row set segregated amongst different parallelized processes 2550 and the input row set processed via every parallelized processes 2550 could be interchangeably selected, an intelligent selection is employed to optimize processing via the parallelized processes. For example, the input row set that is estimated and/or known to require smaller memory space due to column value types and/or number of input rows meeting the respective parameters is optionally designated as the right input row set 2543, and the larger input row set that is estimated and/or known to require larger memory space is designated as the left input row set 2541, for example, to reduce the full set of right input rows required to be processed by a given parallelized process. In some cases, this optimization is performed even in the case of a left outer join or right outer join, where, if the right hand side designated in the query expression is in fact estimated to be larger than the left hand side, the "left" input row set 2541 that is segregated across all parallelized processes 2550 is selected to instead correspond to the right hand side designated by the query expression, and the "right" input row set 2543 that is segregated across all parallelized processes 2550 is selected to instead correspond to the left hand side designated by the query expression. In other embodiments, the vice versa scenario is applied, where the larger row set is designated as the right input row set 2543 processed by every parallelized process, and where the smaller row set is designated as the left input row set 2541 segregated into subsets each for processing by only one parallelized process.

FIG. 25C illustrates an embodiment of a query execution module 2504 executing a join operator 2535. The embodiment of implementing the join operator 2535 of FIG. 25C can be utilized to implement the join process 2530 of FIG. 25A and/or can be utilized to implement the join operator 2535 executed via each of a set of parallelized processes 2550 of FIG. 25B.

The join operator can process all right input rows 2544.1-2544.N of a right input row set 2543, and can process some or all left input rows 2542, such as only left input rows of a corresponding left input row subset 2547. The right input rows 2544 and/or left input rows can be received as one or more streams of data blocks.

A plurality of left input rows 2542 can have a respective plurality of columns each having its own column value. One or more of these column values can be implemented as left output values 2561, designated for output in output rows 2546, where these left output values 2561, if outputted, are padded with nulls or combined with corresponding right rows when matching condition 2519 is met. One or more of these column values can be implemented as left match values 2562, designated for use in determining whether the given row matches with one or more right input rows. These left match values 2562 can be distinct columns from the columns that include left output values 2561, where these columns are utilized to identify matches only as required by the matching condition 2519, but are not to be emitted as output in output rows 2546. Alternatively, some or all of these left match values 2562 can same columns as one or more columns that include left output values 2561, where these columns are utilized to not only identify matches as required by the matching condition 2519, but are further emitted as output in output rows 2546.

In some cases, the left input rows 2542 utilize a single column whose values implement both the left output values 2561 and the left match values 2562. In other cases, the left input rows 2542 can utilize multiple columns, where a first subset of these columns implement one or more left output values 2561, where a second subset of these columns implement one or more left match values 2562, and where the first subset and the second subset are optionally equivalent, optionally have a non-null intersection and/or a non-null difference, and/or optionally are mutually exclusive. Different columns of the left input rows can optionally be received and processed in different column streams, for example, via a distinct set of processes operating in parallel with or without coordination.

Similarly to the left input rows, the plurality of right input rows 2544 can have a respective plurality of columns each having its own column value. One or more of these column values can be implemented as right output values 2563, designated for output in output rows 2546, where these left output values 2561, if outputted, are padded with nulls or combined with corresponding left rows when matching condition 2519 is met. One or more of these column values can be implemented as left match values 2564, designated for use in determining whether the given row matches with one or more left input rows. These right match values 2564 can be distinct columns from the columns that include right output values 2563, where these columns are utilized to identify matches only as required by the matching condition 2519, but are not to be emitted as output in output rows 2546. Alternatively, some or all of these right match values 2564 can be implemented via same columns as one or more columns that include left output values 2561, where these columns are utilized to not only identify matches as required by the matching condition 2519, but are further emitted as output in output rows 2546.

In some cases, the right input rows 2544 utilize a single column whose values implement both the left output values 2561 and the left match values 2564. In other cases, the right input rows 2544 can utilize multiple columns, where a first subset of these columns implement one or more right output values 2563, where a second subset of these columns implement one or more right match values 2564, and where the first subset and the second subset are optionally equivalent, optionally have a non-null intersection and/or a non-null difference, and/or optionally are mutually exclusive. Different columns of the right input rows can optionally be received and processed in different column streams, for example, via a distinct set of processes operating in parallel with or without coordination.

Some or all of the set of columns of the left input rows can be the same as or distinct from some or all of the set of columns of the right input rows. For example, the left input rows and right input rows come from different tables, and include different columns of different tables. As another example, the left input rows and right input rows come from different tables each having a column with shared information, such as a particular type of data relating the different tables, where this column in a first table from which the left input rows are retrieved is used as the left match value 2562, and where this column in a second table from which the right input rows are retrieved is used as the right match value 2564. As another example, the left input rows and right input rows come from a same table, for example, where the left input row set 2541 and right input row set 2543 are optionally equivalent sets of rows upon which a self-join is performed.

The join operator 2535 can utilize a hash map 2555 generated from the right input row set 2543, mapping right match values 2564 to respective right output values 2536. For example, the raw right match values 2564 and/or other values generated from, hashed from, and/or determined based on the raw right match values 2564, are stored as keys of the hash map. In the case where the right match value 2564 for a given right input row includes multiple values of multiple columns, the key can optionally be generated from and/or can otherwise denote the given set of values.

In some embodiments, the join operator 2535 be implemented as a hash join, and/or the join operator 2535 can utilize the hash map 2555 generated from the right input row set 2543 based on being implemented as a hash join.

The number of entries M of the hash map 2555 is optionally strictly less than the number of right input rows N based on one or more right input rows 2544 having a same right match value 2564 and/or otherwise mapping to the same key generated from their right match values. These right match values 2564 can thus be mapped to multiple corresponding right output values 2563 of multiple corresponding right input rows 2544. The number of entries M of the hash map 2555 is optionally equal to N in other cases based on no pairs of right input rows 2544 sharing a same right match value 2564 and/or otherwise not mapping to the same key generated from their right match values.

The join operator 2535 can generate this hash map 2555 from the right input row set 2543 via a hash map generator module 2549. Alternatively, the join operator can receive this hash map and/or access this hash map in memory. In embodiments where multiple parallelized processes 2550 are employed, each parallelized processes 2550 optionally generates its own hash map 2555 from the full set of right input rows 2544 of right input row set 2543. Alternatively, as the hash map 2555 is equivalent for all parallelized processes 2550, the hash map 2555 is generated once, and is then sent to all parallelized processes and/or is then stored in memory accessible by all parallelized processes.

The join operator 2535 can implement a matching row determination module 2558 to utilize this hash map 2555 to determine whether a given left input row 2542 matches with a given right input row 2543 as defined by matching condition 2519. For example, the matching condition 2519 requires equality of the column that includes left match values 2562 with the column that includes right match values 2564, or indicates another required relation between one or more columns that includes one or more corresponding left match values 2562 with one or more columns that include one or more right match values 2564. For a given incoming left input row 2542.*i*, the matching row determination module 2558 can access hash map 2555 to determine whether this given left input row's left match value 2562 matches with any of the right match values 2564, for example, based on the left match value being equal to and/or hashing to a given key and/or otherwise being determined to match with this key as required by matching condition 2519. In the case where a match is identified as a right input row 2544.*k*, the right output value 2563 is retrieved and/or otherwise determined based on the hash map 2555, and the respective output row 2546 is generated to include the a new row generated to include both the one or more left output values 2561.*i* of the left input row 2542.*i*, as well as the right output values 2563.*k* of the identified matching right input row 2544.*k*.

In this example, a first output value includes left output value 2561.1 and right output value 2563.41 based on the left match value 2562.1 of left input row 2542.1 being determined to be equal to, or otherwise match with as defined by the matching condition 2519, the right match value 2564.41 of the right input row 2542.41. Similarly, a second output value includes left output value 2561.2 and right output value 2563.23 based on the left match value 2562.2 of left input row 2542.2 being determined to be equal to, or otherwise match with as defined by the matching condition 2519, the right match value 2564.23 of the right input row 2542.23.

While not illustrated, in some cases, one or left match values 2562 of one or more left input rows 2542 are determined match with no right match values 2564 of any right input rows 2544, for example, based on matching row determination module 2558 searching the hash map for these raw and/or processed left match values 2562 and determining no key is included in the hash map, or otherwise determining no right match value 2564 is equal to, or otherwise matches with as defined by the matching condition 2519, the given left match value 2562. The respective left output values of these left input rows 2542 can be padded with null values in output rows 2546, for example, in the case where the join type is a full outer join or a left outer join. Alternatively, the respective left output values of these left input rows 2542 are not emitted in respective output rows 2546, for example, in the case where the join type is an inner join or a right outer join.

While not illustrated, in some cases, one or left match values 2562 of one or more left input rows 2542 are determined match with right match values 2564 of multiple right input rows 2544, for example, based on matching row determination module 2558 searching the hash map for these raw and/or processed left match values 2562 and determining a key is included in the hash map 2555 that maps to multiple right output values 2563 of multiple right input rows 2544. The respective left output values of these left input rows 2542 can be emitted in multiple corresponding output rows 2546, where each of these multiple corresponding output rows 2546 includes the right output values 2563 of a given one of the multiple right input rows 2544. For example, if the left match values 2562 of a given left input rows 2542 matches with right match values 2564 of three right input rows 2544, the left match values 2562 is emitted in three output rows 2546, each including the respective one or more right output values of a given one of the three right input rows 2544.

While not illustrated, in some cases, after processing the left input rows, one or more or right match values 2562 of one or more right input rows 2544 are determined not to have matched with any left match values 2562 of any of the received left input rows 2542, for example, based on matching row determination module 2558 never accessing these entries having these keys in the hash map when identifying matches for the left input rows. For example, execution of the join operator 2535 implementing a full outer join or a right join includes tracking the right input rows 2544 having matches, and all other remaining rows of the hash map are determined to not have had matches, and thus never had their output values 2563 emitted. In the case of a full outer join or a right join, the output values 2563 of these remaining, unmatched rows can be emitted as output rows 2546 padded with null values. An example of implementing this functionality is discussed in further detail in conjunction with FIGS. 26C-26D. Another example of handling this functionality for parallelized processes implementing their own join operators to ensure these unmatched rows are not duplicated and/or to ensure the unmatched rows are only padded with nulls in output when these rows don't match left input rows processed via other parallelized processes is discussed in further detail in conjunction with FIGS. 28A-28C.

FIGS. 26A-26F illustrate embodiments of a database system 10 operable to execute queries indicating join expressions based on executing left join operators via forwarding of left input rows. Some or all features and/or functionality of FIGS. 26A-26F can be utilized to implement the join processes of FIGS. 25A-25C and/or can be utilized to implement database system 10 of FIGS. 24A-24I when executing queries indicating join expressions. Some or all features and/or functionality of FIGS. 26A-26F can be utilized to implement any embodiment of the database system 10 described herein.

In some embodiments, whenever a process operator can forward some of its input column streams to its parent without mutating them, performance can be improved because the operator doesn't have to write copies of every row it receives. The features and functionality presented in conjunction with FIGS. 26A-26F utilize this means of improving performance by forwarding left input rows of a given left join. This processing of join expressions via forwarding left input rows as presented in conjunction with FIGS. 26A-26F can improve the technology of database systems by improving efficiency of query executions that require performance of join expression.

In particular, the nature of left joins can be leveraged: for left joins, every single left input row a join operator receives will be output at least once, either padded with nulls for the right columns or with a matching right row. Thus, a join operator 2535 processing a left join can forwards the columns it receives from its left child, and then looks for a matching row in the hash map 2555 it built from right rows. If it finds a match, it can copy the matching right row to the output, and if it doesn't find a match, it can write null values for the right columns.

Because there are cases where a left row can have multiple matching right rows that need to be outputted multiple times, the join operator 2535 can use 2 output partitions, for example, by implementing two in-progress output data blocks at a time. The first data block can have its left columns forwarded and can utilize standard output column streams for the right columns. The second data block optionally does not use any column forwarding. For example, the second data block is only used when a left row matches with multiple right rows. In some embodiments, run-length encoding can be employed in data blocks to avoid needing the second output data block, meaning copies would never need to be made of the incoming left rows.

This mechanism of improving performance of left joins can be further employed to implement other types of joins. For example, full outer joins can be performed by first performing a left join while keeping track of which hash map entries match, and by then "finishing the right join" to implement the full outer join by outputting the unmatched right rows. For these full outer joins, input forwarding can be employed during the left join phase. Example embodiments of implementing a full outer join are discussed in conjunction with FIGS. 26C-26D.

As another example, inner joins can be performed by adapting this left join. Although there is no guarantee that every input row will be output by an inner join, in practice, many inner joins are 1 to 1 mappings and can benefit from input forwarding. For that reason, when processing an inner join, the join operator can attempt to forward incoming left rows in the same way as for a left join. However, as soon as the join operator detects a left row does not have a match, the input forwarding is abandoned, and the join operator can resort to writing copies for the output. Example embodiments of implementing an inner join are discussed in conjunction with FIGS. 26E-26F.

As another example, right joins can be performed by adapting this left join. In particular, this adapted inner join can be performed, and then the right join can be completed by finishing the right join. During the inner join phase of a right join, the attempt to forward inputs described in conjunction with FIGS. 26E-26F can be employed.

Figure 26A:
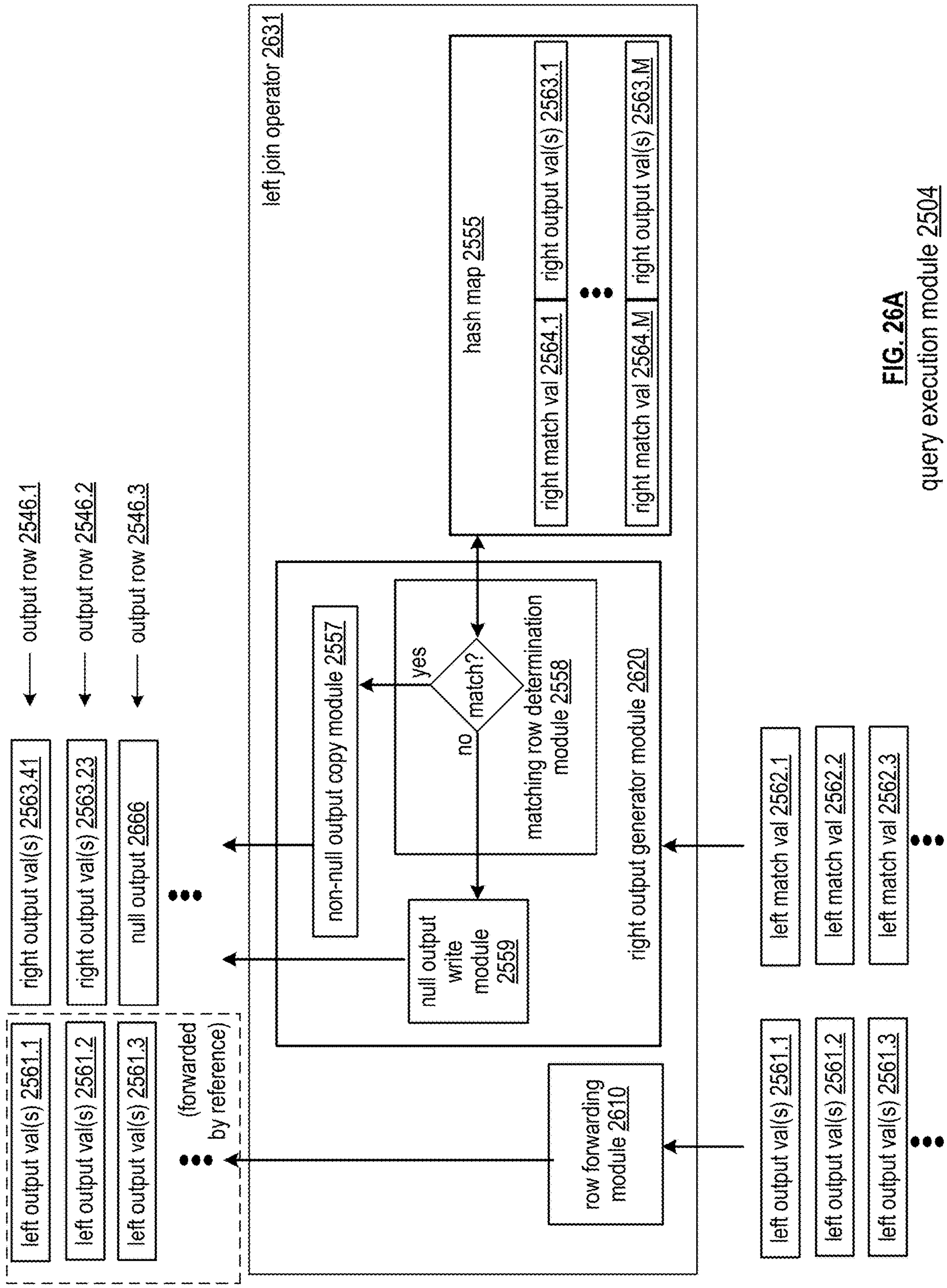
FIG. 26A is a schematic block diagram of a query execution module executing a left join operator based on forwarding left output values of left input rows in accordance with various embodiments.

FIG. 26A illustrates an embodiment of a query execution module that executes a left join operator 2631 that implements a row forwarding module 2610 to forward left output values 2561 of incoming rows in output rows 2546, based on all left output values being guaranteed to be included in output due to the join being implemented as a left outer join. The left join operator 2631 can be implemented via some or all features and/or functionality of join operator 2631, and can be specific to executing left outer joins. Some or all features and/or functionality of the implementation of the left join operator 2631 of FIG. 26A can be utilized to implement the join operator 2535 of FIG. 25C, and/or to implement any other embodiment of join operator 2535 and/or join process 2530 described herein.

The row forwarding module 2610 can forward left output values 2561 of incoming rows, for example, based on forwarding the values by reference rather than copying and emitting the respective left input values. The stream of left output values can simply be forwarded, for example, in conjunction with preserving same ordering as they are received, for example, in one or more corresponding output columns. For example, as each incoming left input row is received, its left output value is emitted by reference to the respective left input value. This can include emitting the left output values 2561 as memory references or other identifiers indicating the location of/otherwise identifying the respective left input values. As discussed previously, this simple forwarding can be ideal over storing, copying, and/or rewriting these values.

In cases where these left output values are not left match values 2562, these forward values require no processing and are simply forwarded by reference. In cases where these left output values are left match values 2562, these forward values are still forwarded by reference, and are also processed separately to identify matches.

In some cases, rather than the respective values having already been forwarded in data blocks to the join operator, the respective values are retrieved separately after the join, and the left output values are optionally forwarded as memory references and/or row identifiers indicating which row's respective output columns be included in the given output.

As left output values are forwarded, their respective right output for each left output values 2561 can be determined via a right output generator module 2620, where the left output values 2561 of each output row is combined with either matching right output values 2563 in the case where a match is identified in the hash map 2555, or is combined with null output, such as one or more null values for the corresponding one or more columns of the right output values designated for inclusion in the output rows 2546. In particular, the matching row determination module 2558 can be implemented to identify matches as discussed in conjunction with FIG. 25C, where a left row's given matching right row 2544, if applicable, has its one or more right output values 2563 copied as output in conjunction with the given left output values 2561 in a same or different column stream via a non-null output copy module 2557. When the matching row determination module 2558 determines no match is identified, null values 2666 are outputted in conjunction with the given left output values 2561 in this same or different column stream via a null output write module 2559. Thus, output rows 2546 are emitted based on the left output columns being seamlessly padded with null values or appended with the appropriate right output values, as applicable, as the respective left output values are directly forwarded via row forwarding module 2610.

In this example, right output value 2563.41 is copied from hash map 2555 and/or other storage location indicated by the respective key 2564.41 in from hash map 2555 via non-null output copy module 2557 for output in conjunction with forwarded one or more left output values 2561.1 for inclusion in a same output row 2546.1 as the forwarded one or more left output values 2561.1.

Similarly, in this example, right output value 2563.23 is copied from hash map 2555 and/or other storage location indicated by the respective key 2564.23 in from hash map 2555 via non-null copy module 2557 for output in conjunction with forwarded one or more left output values 2561.2 for inclusion in a same output row 2546.2 as the forwarded one or more left output values 2561.2.

Furthermore, in this example, a null output 2666 is written for output in conjunction with forwarded one or more left output values 2561.3, rather than writing of copied right output values, based on the left match value 2563.3 having no match in hash map 2555.

In some embodiments, some or all of this forwarding of left output values can be performed before some or all right input rows have been received, and/or before building of hash map 2555 is complete. For example, the corresponding right output values are emitted later in a separate one or more column streams in the correct ordering as the forwarded left rows, and/or otherwise denote the appropriate left rows to enable matching of the output with correct rows later. In other embodiments, the forwarding of left output values and processing of respective left match values is performed only after the building of hash map 2555 to enable appending of right output values and/or null output with these forwarded values.

In the case where a given left output column is also implemented as the column denoted by matching condition to check for matching with right input rows, the left output values 2561 can be forwarded via row forwarding module 2610, and can further be processed by the right output generator module 2620 to identify respective matches. The row forwarding of these rows can still be implemented without copying these rows, despite the processing by the right output generator module 2620, as all incoming left rows are outputted for the left join regardless of whether they have identified right row matches.

The row forwarding module 2610 can implement some or all features and/or functionality of the forwarding module 2950 of FIG. 24O, for example, where the corresponding left input values of incoming rows are forwarded by reference as the left output values 2561. While FIG. 26A depicts the output of row forwarding module 2610 as left output values 2561 for purposes of illustrating the corresponding mapping with match values or null values, these left output values 2561 are optionally emitted by reference rather than being copied and emitted directly as the corresponding values (e.g. rather than these left output values 2561 being written to the respective one or more output data blocks). For example, the column values of the left input values are stored in at least one data block of a corresponding column stream in at least one corresponding memory location 2951, and rather than copying these values into data blocks as output, the row forwarding module emits (e.g. writes to a corresponding one or more data blocks) memory references 2952 indicating this at least one corresponding memory location 2951 in a corresponding column stream. Similarly, in FIGS. 26B-26E, while left output values 2561 are depicted as output of row forwarding module 2610 for purposes of illustration, these left output values 2561 are optionally similarly emitted by reference (e.g. indicated via at least one memory reference to the location of the respective left input values), rather than being copied and emitted directly.

Figure 26B:
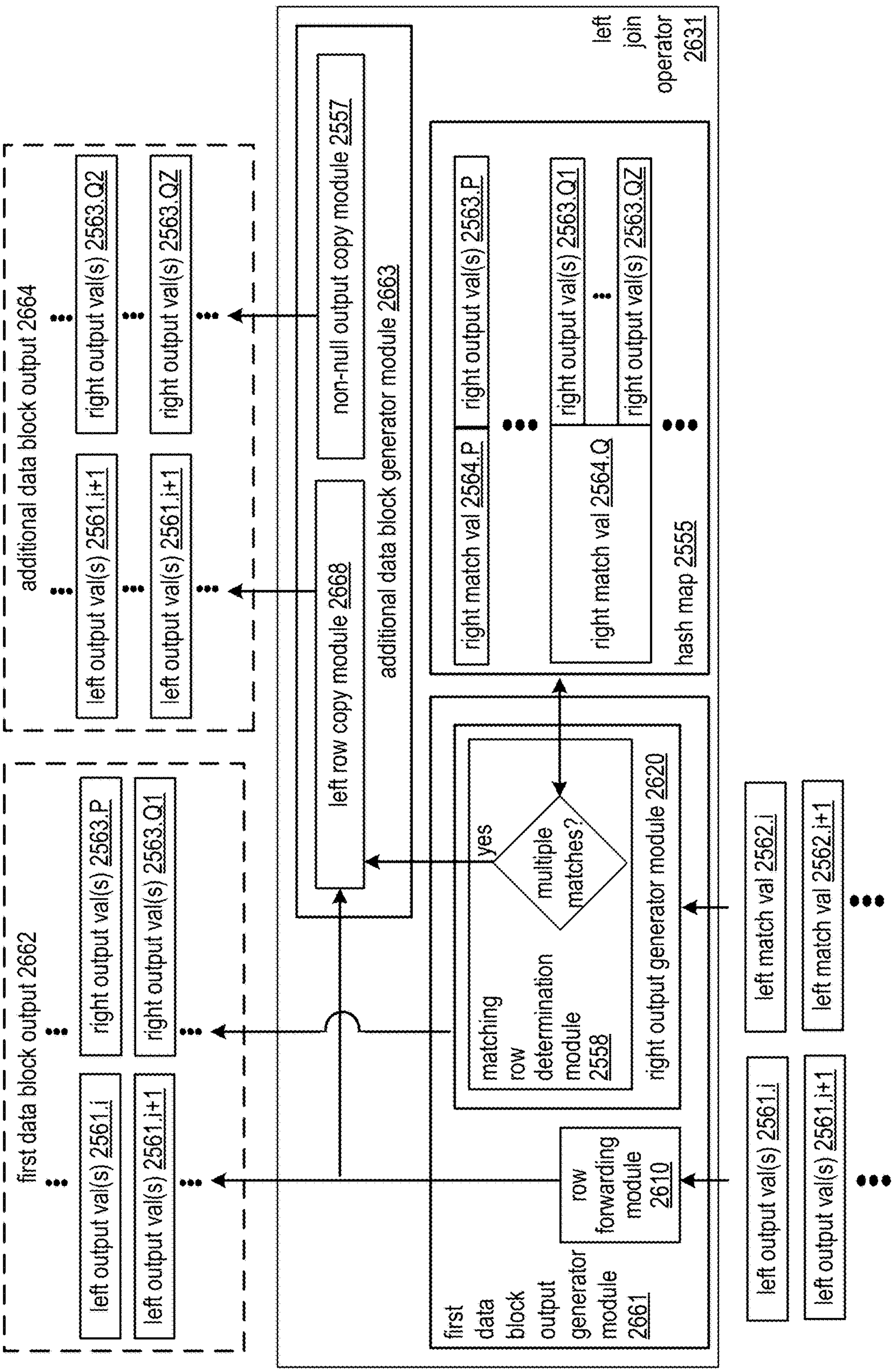
FIG. 26B is a schematic block diagram of a query execution module executing a left join operator based on generating additional data block output when a left input row has multiple matches in accordance with various embodiments.

FIG. 26B illustrates the case where a given left input row has multiple matching right rows. Some or all features and/or functionality of executing the left join operator 2631 can be utilized to implement the left join operator 2631 of FIG. 26B, and/or any other embodiment of the left join operator 2631, any other join operator 2535, and/or any join process 2530 described herein.

Execution of left join operator 2631 can include generating one or more data blocks in tandem for each incoming row. The first data block is always generated, via a first data block output generator module 2661, via the row forwarding module 2610 and right output generator module 2620 as discussed in conjunction with FIG. 26A, based on all left input rows being included in at least one output row for a left outer join as discussed previously. While not depicted, the right output generator module 2620 can implement the non-null output copy module 2557 and the null output write module 2559 of FIG. 26A. The data blocks that include the output rows 2546 with the forwarded left values and corresponding right output generated via the right output generator module 2620 of FIG. 26A can thus be included in first data block output 2662.

To handle the fact that some incoming left input rows must be included in multiple output rows 2546 due to matching multiple right input rows, an additional data block generator module 2663 can be implemented to generate one or more additional data blocks of additional data block output 2664, in addition to the first data blocks 2662 generated to include the forwarded left output values of incoming left rows. For example, two or more data blocks are built and emitted from a given incoming left input row 2542 in tandem, but are only necessary in the cases where the given incoming left input row has multiple matches. The matching row determination module 2558, when identifying whether matches exist, can further determine whether a matching key maps to right output values for multiple right input rows, where the additional data block generator module 2663 is implemented when matching row determination module 2558 determines the given left match value maps to right output values for multiple right input rows.

The additional data block generator module 2663 can implement a left row copy module 2668 and/or the non-null output copy module 2557. The left row copy module 2668 can copy the forwarded output into an additional data block for output. Thus, left output values 2561 are only copied when needed for inclusion in data blocks of an additional output row beyond the data blocks of a first output row due to the corresponding left input row having multiple matches. The non-null output copy module 2557 can copy the value of a respective right output value of the multiple matching right output rows not already copied in the first data block or other data blocks for given left output value, based on accessing the hash map 2555. The non-null output copy module 2557 of the additional data block generator module 2663 can be implemented in a same or similar fashion as the non-null output copy module 2557 of the right output generator module 2620 of the first data block output generator 2661 as discussed in conjunction with FIG. 26A.

In this example, left input rows 2542.*i* and 2542.*i*+1 of the incoming left input rows are processed. This example can continue from the example of FIG. 26A, where left input rows 2542.*i* and 2542.*i*+1 are processed after left input rows 2542.1-2542.3 of FIG. 26A, where the output rows 2546.1-2546.3 of FIG. 26A are all emitted as first data block output 2662 based on the left output values having been forwarded via row forwarding module 2610.

As indicated by hash map 2555 in this example, a right match value 2564.P, or the corresponding key, maps to the right match value 2564 for only one right input row 2544, and has the one or more right output values 2563.P for this respective row. Incoming left match value 2562.*i* is identified to match with this right match value 2564.P, and the first data block output generator module 2661 generates the first output data block as having forwarded left output values 2561.*i* appended with right output value 2563.P. As this is the only matching row for left input row 2542.*i*, the additional data blocks are not necessary, and additional data block generator module 2663 is not employed for left input row 2542.*i*.

Furthermore, as indicated by hash map 2555 in this example, a right match value 2564.Q, or the corresponding key, maps to the right match value 2564 for Z different right input rows 2544.Q1-2544.QZ, where the value of Z is greater than or equal to two. Incoming left match value 2562.*i*+1 is identified to match with this right match value 2564.Q, and the first data block output generator module 2661 generates the first output data block as having forwarded left output values 2561.*i* appended with right output value 2563.Q1 for only one of the respective matches.

In other embodiments, rather than all Z matches for left input row 2542.*i*+1 being mapped to a same key of hash map 2555, some or all of the Z matches for left input row 2542.*i*+1 can be mapped to different keys, where the multiple different keys are determined to match with the given match value 2562.*i*+1, for example, in the case where the matching condition 2519 is not equality based, but instead utilized another logical operator where multiple keys and/or multiple different corresponding right match values 2564 could be valid matches for a given left match value 2562 as defined by the matching condition 2519.

In either case, Z−1 additional data blocks beyond the first data block can thus be generated for the given left input row 2542.*i*+1 via the additional data block generator module to include Z−1 corresponding additional output rows 2546 based on multiple matches being identified for right match value 2564 to include. The left row copy module 2668 copies the given left output value 2561.*i*+1 for each of these Z−1 additional output rows via the row copy module 2668, and copies respective different ones of the remaining Z−1 right output values 2563.Q1-2563.QZ for each of these Z−1 additional output rows.

Figure 26C:
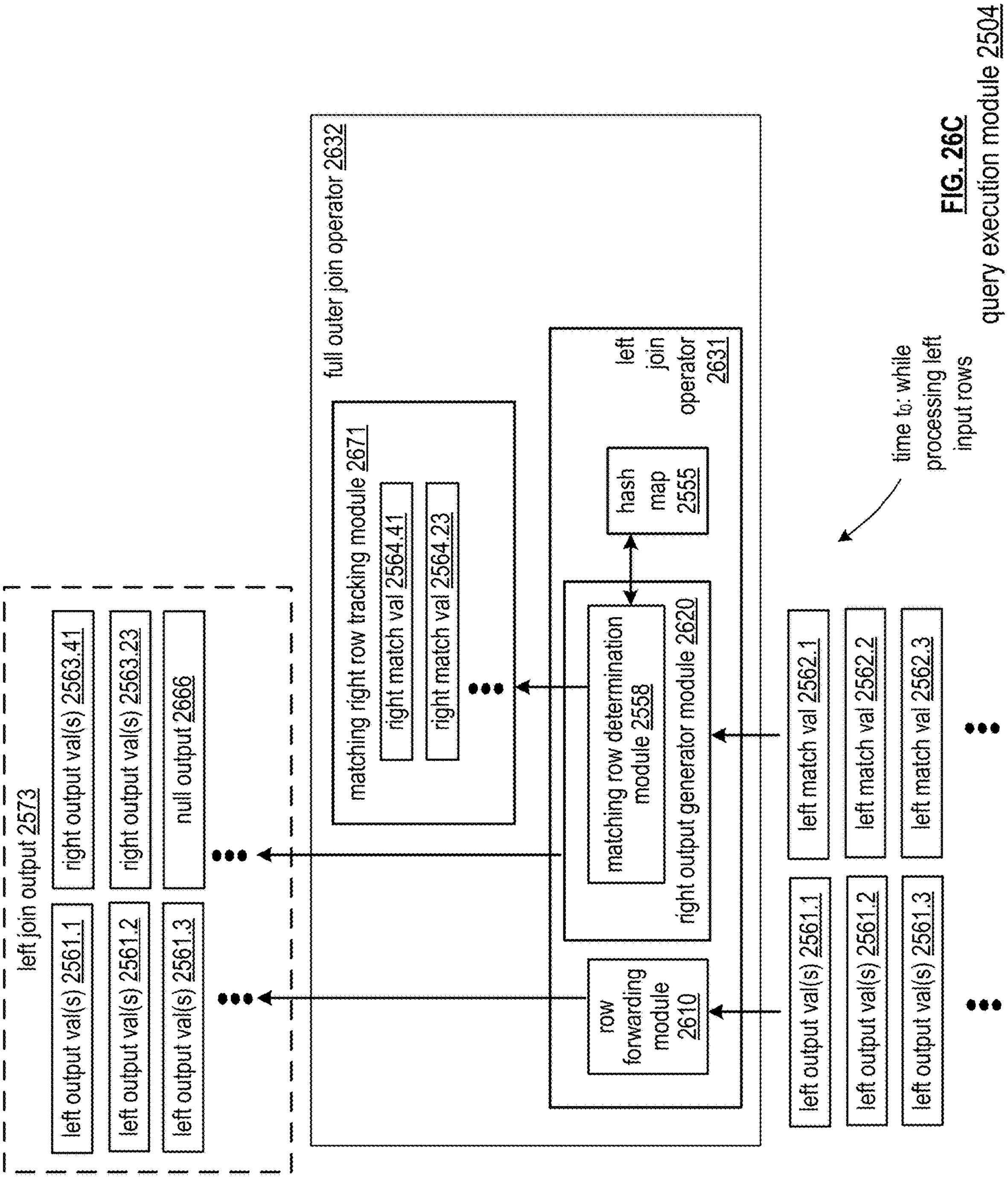
FIGS. 26C-26D are schematic block diagrams of a query execution module executing an outer join operator based on implementing a left join operator and tracking matching right rows to determine remaining right rows for output in accordance with various embodiments.
Figure 26D:
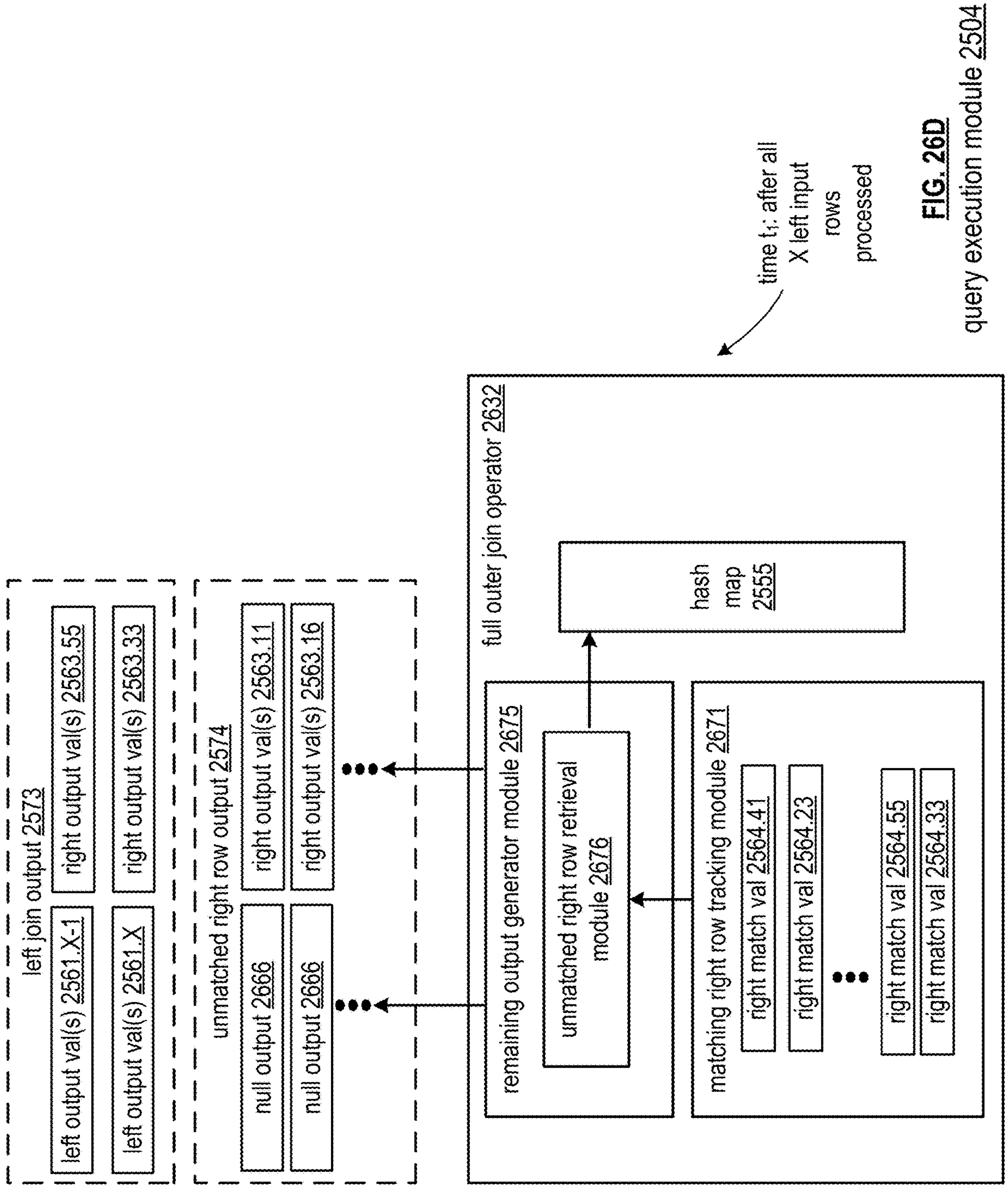

FIGS. 26C-26D illustrate embodiments of executing a full outer join operator 2632. Some or all features and/or functionality of executing the full outer join operator 2632 can be utilized to implement the join operator 2535 of FIG. 25C, and/or any other embodiment of the join operator 2535 and/or any join process 2530 described herein.

As illustrated in FIGS. 26C and 26D, the full outer join operator 2632 can be implemented by adapting a left join operator 2631, which can be implemented via some or all features and/or functionality of the left join operator 2631 of FIGS. 26A and/or 26B. For example, alternatively or in addition to implementing left join operators 2631 for executing respective join processes for join expressions denoting only a left join be performed, left join operators 2631 can be further implemented when executing respective join processes for join expressions denoting a full outer join be performed.

As illustrated in FIG. 26C, at time $t_0$, while processing incoming left input rows, left output values 2561 and corresponding right output values 2563 of left join output 2573 can be emitted as output data blocks that include corresponding output rows 2546. In particular, as output of a full outer join includes all output of a left outer join, a portion of the output row set 2545 of the respective join process can include the output rows 2546 of left join output 2573 generated by first executing left outer join operator 2631, for example, as discussed in conjunction with FIGS. 26A and/or 26B.

Furthermore, as illustrated in FIG. 26C, a matching right row tracking module 2671 can be implemented to track right input rows that have been matched. This can include storing respective information in memory for access later in the execution of the full left outer join operator. For example, the key values for these right input rows of the hash map 2555, such as the raw and/or processed right match values, are stored. Continuing with the example of FIG. 26A, where the respective left join operator is implemented as part of implementing a full outer join operator 2632, the right row tracking module 2671 stores the right match values 2564.41 and 2564.23 based on having matched with left input rows 2542.1 and 2542.2 and being reflected in output rows of left join output 2573. No right row is tracked for left input rows 2542.3 based on this left input row having no matching right row. Further right input rows that matched with left input rows are tracked over time as further left input rows are received and processed.

As illustrated in FIG. 26D, at time $t_1$ after $t_0$, after processing all X incoming left input rows is completed, the full outer join operator 2632 begins to emit output rows 2546 of unmatched right row output 2574, which includes the right output values of unmatched right rows padded with null output 2666.

For example, all of the left join output 2573 has already been generated and emitted accordingly, and the remainder of the output for the full outer join operator is generated and emitted at this time as further output data blocks of unmatched right row output 2574 emitted strictly after all of the left join output 2573. This additional output optionally does not begin until all processing of all X incoming left input rows is completed, and/or after receiving a notification or otherwise confirming all incoming left input rows for processing have been received and processed. The X incoming left input rows can include all rows of the full left input row set 2541, and/or only the X rows of a corresponding left input row subset 2547 designated for processing by the given join operator 2535. Embodiments where the full outer join operators are implemented to track unmatched right rows via multiple parallel processes are discussed in further detail in conjunction with FIGS. 28A-28C.

The matching right row tracking module 2671 can indicate all right match values 2564 that matched with left rows and had their respective right output values 2563 emitted. A remaining output generator module 2675 can access this information stored by matching right row tracking module 2671 to identify the right match values 2564 of the hash map 2555 that were not included in the set of right rows tracked by matching right row tracking module 2671, and can emit the respective right output values 2563 in unmatched right row output 2574 padded with null output 2666 accordingly. In this example, right output values 2563.11 and 2563.16 are included in output rows 2546 of unmatched right row output 2574 based on not having matched with any left match values of any of the X left match values 2562, and thus not having their respective right output values included in any output rows 2546 of the left join output 2573. For example, the remaining output generator module 2675 implements an unmatched right row retrieval module 2676 to retrieve all right output values 2563 mapped to right match values 2664 not indicated in the set of matching right rows tracked by matching right row tracking module 2671.

The set of right input rows having right output values included in the unmatched right row output 2574 can be equivalent to a set difference between the full set of right input rows and the subset of right input rows with right match values tracked via matching right row tracking module 2671, where this set difference can be further equivalent to the set difference between the full set of right input rows and the subset of right input rows with right output values included in left join output 2573.

The unmatched right row output 2574 can be guaranteed include all such right output values with unmatched right match values exactly once, padded with nulls. As these right output values appear for the first time in the unmatched right row output 2574, the full set of output emitted by the full outer join operator set can be guaranteed include all such right output values with unmatched right match values exactly once, padded with nulls. The unmatched right row output 2574 can be further guaranteed to include no right output values previously included in the left join output 2573. As these right output values appear in the left join output 2573, the full set of output emitted by the full outer join operator set can be guaranteed include all right output values of all right input rows at least once. Note that some right output values matching with more than one left input row may appear in the output more than once, where all of these multiple appearances of given right output values can be guaranteed to be included in output rows of the left join output 2573.

Figure 26E:
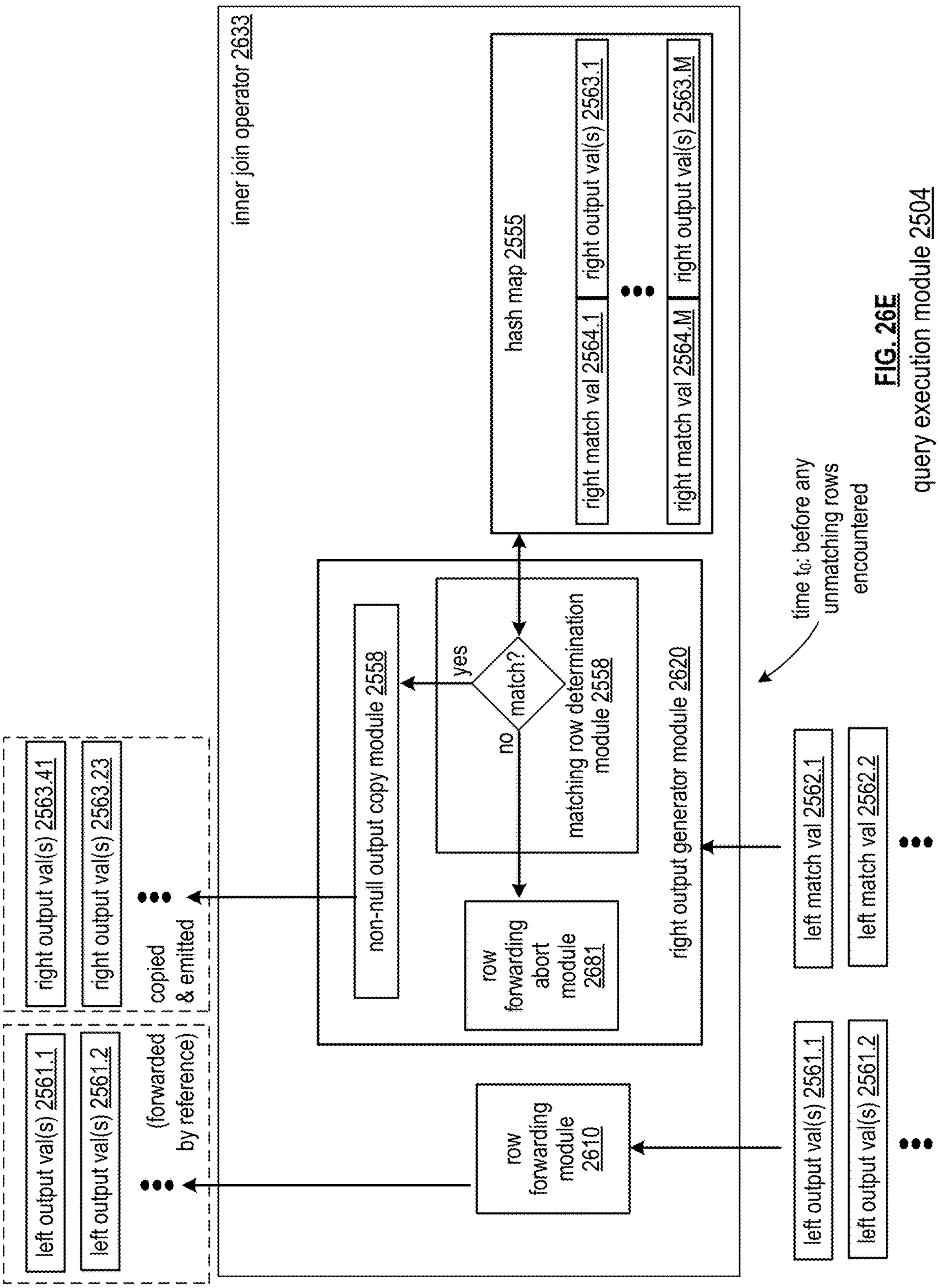
FIGS. 26E-26F are schematic block diagrams of a query execution module executing an inner join operator based on implementing left row forwarding until an unmatched left row is identified in accordance with various embodiments.
Figure 26F:
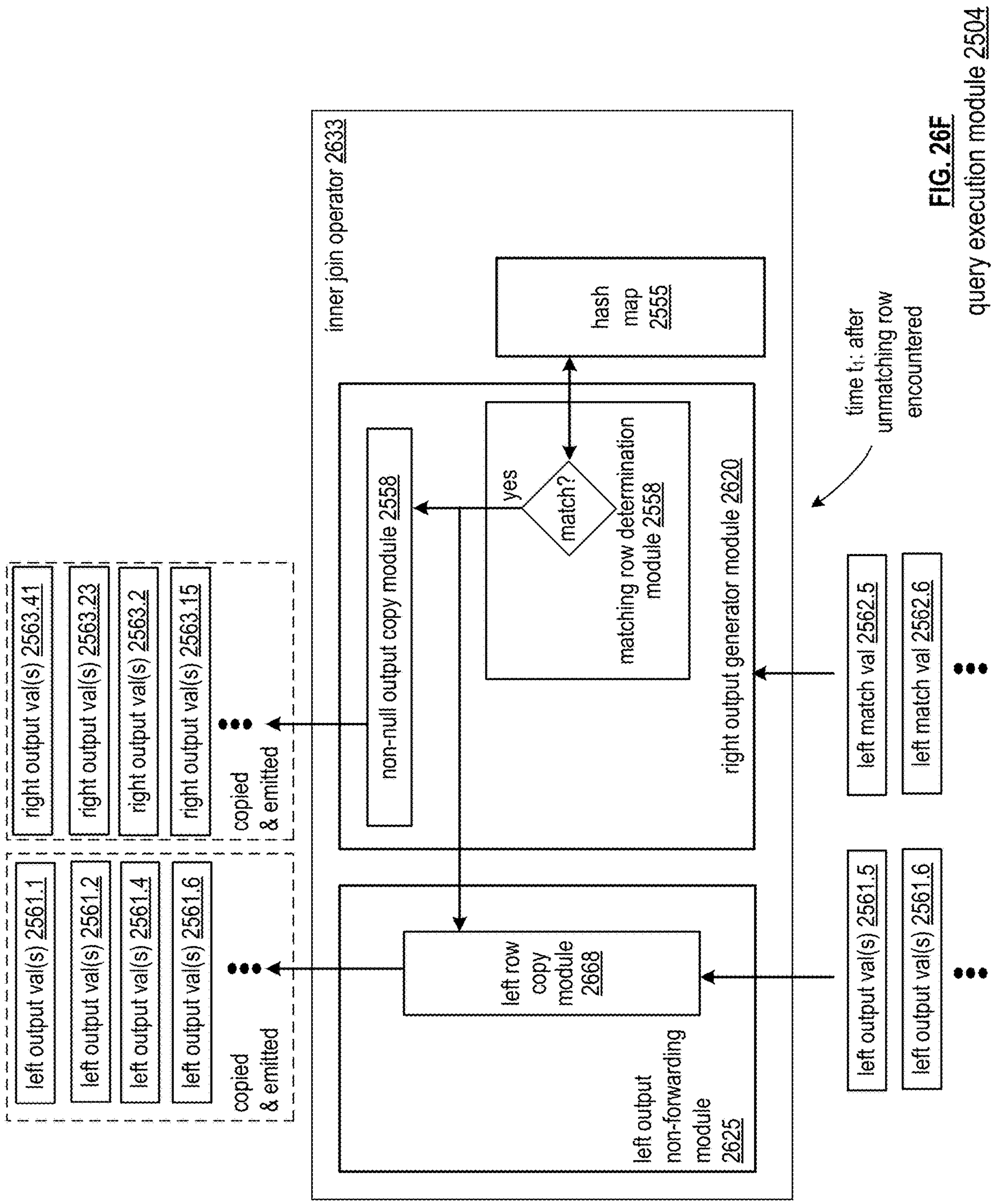

FIGS. 26E-26F illustrate embodiments of executing an inner join operator 2633. Some or all features and/or functionality of executing the inner join operator 2633 can be utilized to implement the join operator 2535 of FIG. 25C, and/or any other embodiment of the join operator 2535 and/or any join process 2530 described herein.

As illustrated in FIGS. 26E and 26F, the inner join operator 2633 can be implemented by adapting a left join operator 2631, which can be implemented via some or all features and/or functionality of the left join operator 2631 of FIGS. 26A and/or 26B. For example, alternatively or in addition to implementing left join operators 2631 for executing respective join processes for join expressions denoting only a left join be performed, left join operators 2631 can be further implemented when executing respective join processes for join expressions denoting an inner join be performed.

In particular, the inner join operator can be initially performed by implementing the left row forwarding of the left join operator 2631 discussed in conjunction with FIGS. 26A and 26B, with the hopes that a one-to-one mapping of left input rows to right input rows exists, and/or with the hopes that every left input row otherwise matches with at least one right input row, even if some right input rows are unmatched. For example, the output of the inner join expression is equivalent to the output of the outer left join expression in these cases, and this relationship can be leveraged to attempt processing of the inner join via the improved efficiency achieved via the row forwarding of left input rows discussed in conjunction with FIGS. 26A and 26B. If a left input row is encountered that does not have any match, the row forwarding is abandoned, and the remainder of the execution of the inner join operator is implemented by instead copying the incoming left output values for inclusion in output rows only when they have a matching right row.

As illustrated in FIG. 26E at time $t_0$, while processing incoming left input rows before any unmatched rows are encountered, left output values 2561 are forwarded via row forwarding module 2610, where the respective matching right output values are determined and copied, for example, as discussed in conjunction with FIGS. 26A and/or 26B. Continuing with the example of FIG. 26A, this row forwarding is implemented for generating the first two output rows 2546.1 and 2546.2 from left output values 2561.1 and 2561.2, respectively, appended with right output values 2564.41 and 2563.23, respectively.

The right output generator module 2620 can implement a row forwarding abort module 2681 that aborts this row forwarding by row forwarding module 2610 when an unmatched left row is encountered. Continuing with the example of FIG. 26A, left match value 2562.3 has no match value, and instead of being padded with null values, is not emitted due to the join operator being implemented as an inner join operator 2633. Furthermore, the row forwarding abort module 2681 is triggered to abort row forwarding once such an unmatching left row, such as left match value 2562.3 in this example, is encountered.

As illustrated in FIG. 26F, at time $t_1$ after $t_0$, after an unmatched row is encountered, such as left input row 2542.3 in this example, the inner join operator 2633 foregoes the forwarding of the left input rows, and instead implements a left output non-forwarding module 2625 for the remainder of processing. The left output non-forwarding module 2625 can implement left row copy module 2668, for example, in a same or similar fashion as the left row copy module 2668 of FIG. 26B, where the left output values are copied rather than being directly forwarded. For example, these values are locally stored, and are only emitted in output rows when a matching right row is identified via hash map 2555. In this example, the left output values 2561.4, and 2561.6, are copied and emitted with respective right output values 2563.2 and 2563.15, respectively. Meanwhile, left output values 2561.3 and 2561.5 of left input rows 2542.3 and 2542.5 are not emitted based on their respective left match values not having any matches with right match values in hash map 2555.

In other embodiments, the entirety of the inner join is performed via the forwarding module 2610, based on all left input rows matching with right input rows, where all output rows 2546 include non-null right output values matching with the given left input row identified via and/or copied from hash map 2555, and/or where all output rows 2546 include all left output values 2561 of all left input rows, where these left output values 2561 were forwarded via row forwarding module 2610 due to this forwarding never being aborted via the row forwarding abort module 2681.

Figure 26G:
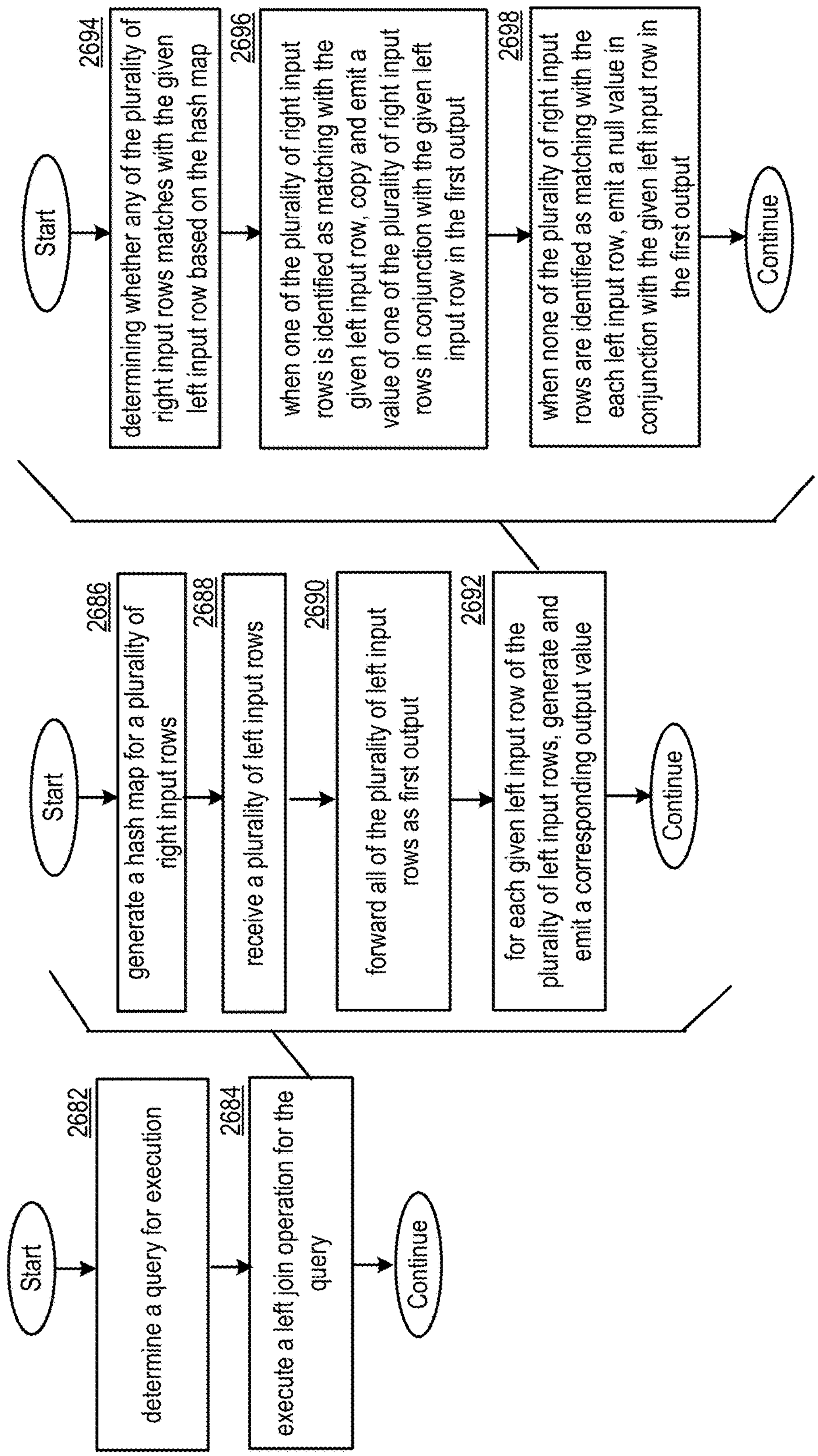
FIG. 26G is a logic diagram illustrating a method for execution in accordance with various embodiments.

FIG. 26G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26G. In particular, a node 37 can utilize the query processing module 2435 to execute some or all of the steps of FIG. 26G, where multiple nodes 37 implement their own query processing modules 2435 to independently execute the steps of FIG. 26G for example, to facilitate execution of a query as participants in a query execution plan 2405. Some or all of the method of FIG. 26G can be performed by the query processing system 2510, for example, by utilizing an operator flow generator module 2514 and/or a query execution module 2504. In particular, some or all of the method of FIG. 26G can be performed via one or more operator executions of one or more join operators 2535, such as a left join operator 2631, an outer join operator 2632, or an inner join operator 2633, of at least one join process 2530. Some or all of the steps of FIG. 26G can optionally be performed by any other processing module of the database system 10. Some or all of the steps of FIG. 26G can be performed to implement some or all of the functionality of the database system 10 as described in conjunction with FIGS. 26A-26F, for example, by implementing some or all of the functionality of the query processing system 2510 as described in conjunction with FIGS. 25A-25C. Some or all of the steps of FIG. 26G can be performed to implement some or all of the functionality regarding execution of a query via the plurality of nodes in the query execution plan 2405 as described in conjunction with some or all of FIGS. 24A-24I. Some or all steps of FIG. 26G can be performed by database system 10 in accordance with other embodiments of the database system 10 and/or nodes 37 discussed herein. Some or all steps of FIG. 26G can be performed in conjunction with one or more steps of any other method described herein.

Step 2682 includes determining a query for execution. Step 2684 includes executing a left join operation for the query.

Performing step 2684 can include performing one or more of steps 2686, 2688, 2690 and/or 2692. Step 2686 includes generating a hash map for a plurality of right input rows. Step 2688 includes receiving a plurality of left input rows. Step 2690 includes forwarding all of the plurality of left input rows as first output. Step 2692 includes, for each given left input row of the plurality of left input rows, generating and emitting a corresponding output value.

Performing step 2692 can include, for each given left input row of the plurality of left input rows, performing one or more of steps 2694, 2696, and/or 2898. Step 2694 includes determining whether any of the plurality of right input rows matches with the given left input row based on the hash map. Step 2696 includes, when one of the plurality of right input rows is identified as matching with the given left input row, copying and emitting a value of one of the plurality of right input rows in conjunction with the given left input row in the first output. Step 2698 includes, when none of the plurality of right input rows are identified as matching with the each left input row, emitting a null value in conjunction with the given left input row in the first output.

In various examples, the first output includes a plurality of data blocks each including one of the plurality of left input rows and one of: exactly one of the plurality of right input rows matching with the one of the plurality of left input rows, or a null value.

In various examples, a subset of the plurality of left input rows are determined to match with multiple ones of the plurality of right input rows. For each of the subset of the plurality of left input rows, the first output indicates the exactly one of the plurality of rows as one of the multiple ones of the plurality of right input rows matching with the each of the subset of the plurality of left input rows. The method can further include emitting second output that includes a second plurality of data blocks indicating, for the each of the subset of the plurality of left input rows, all additional ones of the plurality of right input rows matching with the each of the subset of the plurality of left input rows.

In various examples, each of the second plurality of data blocks further include a copy of the each of the subset of the plurality of left input rows.

In various examples, the method further includes maintaining two output data blocks at a time to processing the each left input row of the plurality of left input rows, where a first one of the two output data blocks is included in the first output, and/or where a second one of the two output data blocks is included in the second output.

In various examples, the second one of the two output data blocks is only utilized when a corresponding left input row of the plurality of left input rows matches with multiple right input rows.

In various examples, a plurality of data blocks utilizes a set of output column streams for a set of column values of a set of columns of the plurality of right input rows.

In various examples, the left join operation is performed based on a JOIN expression indicated by the query, where the join expression indicates a conditional statement relating the plurality of left input rows to the plurality of right input rows, and/or where the each left input row is determined to match with the one of the plurality of right input rows based on the conditional statement.

In various examples, the conditional statement indicates a given column of the plurality of right input rows and further indicates another given column of the plurality of left input rows. In various examples, the method further includes generating the hash map based on utilizing column values of the given column for each of the plurality of right input rows as keys of the hash map; and/or identifying the one of the plurality of right input rows as matching with the each left input row based on determining a value of the another given column of the each left input matches with a corresponding key of the hash map mapping to the one of the plurality of right input rows.

In various examples, the conditional statement indicates one of a set of relational operators that includes at least one of: an equality operator, an inequality operator, a less than operator, a greater than operator, a less than or equal to operator, or a greater than or equal to operator. In various examples, identifying the one of the plurality of right input rows as matching with the each left input row is based on determining the corresponding key and the value of the another given column of the each left input meet a condition defined by the relational operator.

In various examples, the left join operation for the query is executed as part of executing a full outer join. In various examples, the method further includes determining a subset of the plurality of right input rows of the hash map not matching with any of the plurality of left input rows based on tracking ones of the plurality of right input rows in the hash map matching ones of the plurality of left input rows. In various examples, the method further includes outputting the subset of the plurality of right input rows.

In various examples, the method further includes determining a second query for execution. In various examples, the method further includes executing an inner join operation for the second query by: generating a second hash map from a second plurality of right input rows;

- receiving a second plurality of left input rows; and/or initiating forwarding the all of the second plurality of left input rows as other first output. In various examples, when forwarding each left input row of the second plurality of left input rows, the method further includes, determining whether any of the second plurality of right input rows matches with the each left input row based on the hash map; when one of the second plurality of right input rows is identified as matching with the each left input row, copying a value of one of the second plurality of right input rows in conjunction with the each left input row in the other first output; and/or when none of the plurality of right input rows are identified as matching with the each left input row, foregoing forwarding of the second plurality of left input rows by, for remaining ones of the second plurality of left input rows, generating the other first output by writing copies of ones of the second plurality of left input rows identified to match with ones of the second plurality of right input rows in conjunction with copying of values of the ones of the second plurality of right input rows.

In various examples, all of the second plurality of left input rows are forwarded based on each of the second plurality of left input rows matching with at least one of the second plurality of right input row.

In various examples, the each of the second plurality of left input rows matches with at least one of the second plurality of right input rows based on corresponding sets of rows having a one to one mapping.

In various examples, the inner join operation is executed as a portion of executing a right join operation for the second query. In various examples, the method further includes determining a subset of the plurality of right input rows of the hash map not matching with any of the plurality of left input rows based on tracking ones of the plurality of right input rows in the hash map matching ones of the plurality of left input rows; and/or outputting the subset of the plurality of right input rows.

In various examples, the left join operation for the query is executed by a plurality of nodes in parallel. In various examples, the parallel execution of left join operation for the query is based on each of the plurality of nodes generating the hash map for all of the plurality of right input rows; based on each of the plurality of nodes receiving a corresponding proper subset of a plurality of proper subsets of the plurality of left input rows, where the plurality of proper subsets of the plurality of left input rows are mutually exclusive and collectively exhaustive with respect to the plurality of left input rows; based on each of the plurality of nodes forwarding all of the corresponding proper subset of the plurality of left input rows as a corresponding first output of a plurality of first output generated across the plurality of nodes; and/or based on each of the plurality of nodes, for each left input row of the corresponding proper subset of the plurality of left input rows: determining whether any of the plurality of right input rows matches with the each left input row based on the hash map; when one of the plurality of right input rows is identified as matching with the each left input row, copying a value of one of the plurality of right input rows in conjunction with the each left input row in the first output; and/or when none of the plurality of right input rows are identified as matching with the each left input row, forward a null value in conjunction with the each left input row in the first output.

In various examples, the plurality of nodes execute their portions of the query in a same level of a query execution plan for the query. In various examples, a parent node at a higher level of the query execution plan receives the plurality of first output generated across the plurality of nodes based on the plurality of nodes being child nodes of the parent node. In various examples, the parent node emits output based on applying a union to the plurality of first output.

In various examples, the method is executed by a node of a query execution plan collectively executing the query, and/or the plurality of left input rows are received from at least one child node of the node.

In various examples, the at least one child node read the plurality of left input rows from at least one segment stored in at least one memory drive accessible by the at least one child node.

In various examples, a hash map for a plurality of right input rows is generated based on a shuffle operation between the node and a plurality of other nodes in a same level as the node in a query execution plan. In various examples, each of the plurality of other nodes have a least one other child node that is distinct from the at least one child node of the node.

In various embodiments, any one of more of the various examples listed above are implemented in conjunction with performing some or all steps of FIG. 26G. In various embodiments, any set of the various examples listed above can be implemented in tandem, for example, in conjunction with performing some or all steps of FIG. 26G.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26G, for example, in conjunction with further implementing any one or more of the various examples described above.

In various embodiments, the operational instructions, when executed by the at least one processor, cause the database system to: determine a query for execution; and/or execute an inner join operation for the query. The database system can execute an inner join operation by: generating a hash map from a plurality of right input rows; receiving a plurality of left input rows; and/or forwarding all of the plurality of left input rows as first output. The database system can further execute the inner join operation by, for each left input row of the plurality of left input rows: determining whether any of the plurality of right input rows matches with the each left input row based on the hash map; when one of the plurality of right input rows is identified as matching with the each left input row, copying and emitting a value of one of the plurality of right input rows in conjunction with the each left input row in the first output; and/or when none of the plurality of right input rows are identified as matching with the each left input row, emitting a null value in conjunction with the each left input row in the first output.

FIGS. 27A-27E illustrate embodiments of a database system 10 operable to execute queries indicating join expressions and row output maximum limits based on executing limit-adapted join processes to generate limit-based output row sets. Some or all features and/or functionality of FIGS. 27A-27E can be utilized to implement the join processes of FIGS. 25A-25C and/or can be utilized to implement database system 10 of FIGS. 24A-24I when executing queries indicating join expressions. Some or all features and/or functionality of FIGS. 27A-27E can be utilized to implement any embodiment of the database system 10 described herein.

Hash joins, such as execution of join operators 2535 utilizing hash map 2555, can require that the right hand side, such as the right input row set 2543, must EOF or otherwise all be received before the join operator emits any output rows. For example, as the join requires emitting values matching left input rows using the hash map, the building of the hash map 2555 must be complete to guarantee all respective matches for a given left input row are identified and reflected in respective output. This induced limitation by nature of implementing a hash join can create a bottleneck in query execution and/or can render the corresponding join operator as not pipelining well.

Some queries processed by database system 10 can be implemented as limit queries and/or can otherwise impose a maximum limit on the number of output rows that are emitted. Once this maximum limit number of output rows is reached, the query can terminate.

Without adapting a join process based on such a limit, for such limit queries involving a join, such as a SQL query expression that includes "SELECT*FROM massiveTableA INNER JOIN massiveTableB ON . . . LIMIT 10" where a massiveTableA and massiveTableB are thus implemented as left input row set 2541 and right input row set 2543, lot of "extra" work can be required (e.g. building a hash map 2555 for all of massiveTableB) to ultimately output a tiny number of rows.

When a limit is implemented, for example, with a small limit value that is lower than a threshold limit value and/or smaller than a threshold percentage of the known and/or expected number of rows in the right input row set and/or the left input row set, a transformation can be applied to split a corresponding join into two separate joins that together will produce the same results as the original join. One join can be implemented to do significantly less work than the original join and can be expected to therefore output results much quicker, hopefully triggering the top limit quickly and allowing the query to finish. This processing of query expression by implementing a limit-adapted join process as presented in conjunction with FIGS. 27A-27E can improve the technology of database systems by improving efficiency of query executions that require performance of query expressions that include join expressions and impose an output maximum row limit.

Figure 27A:
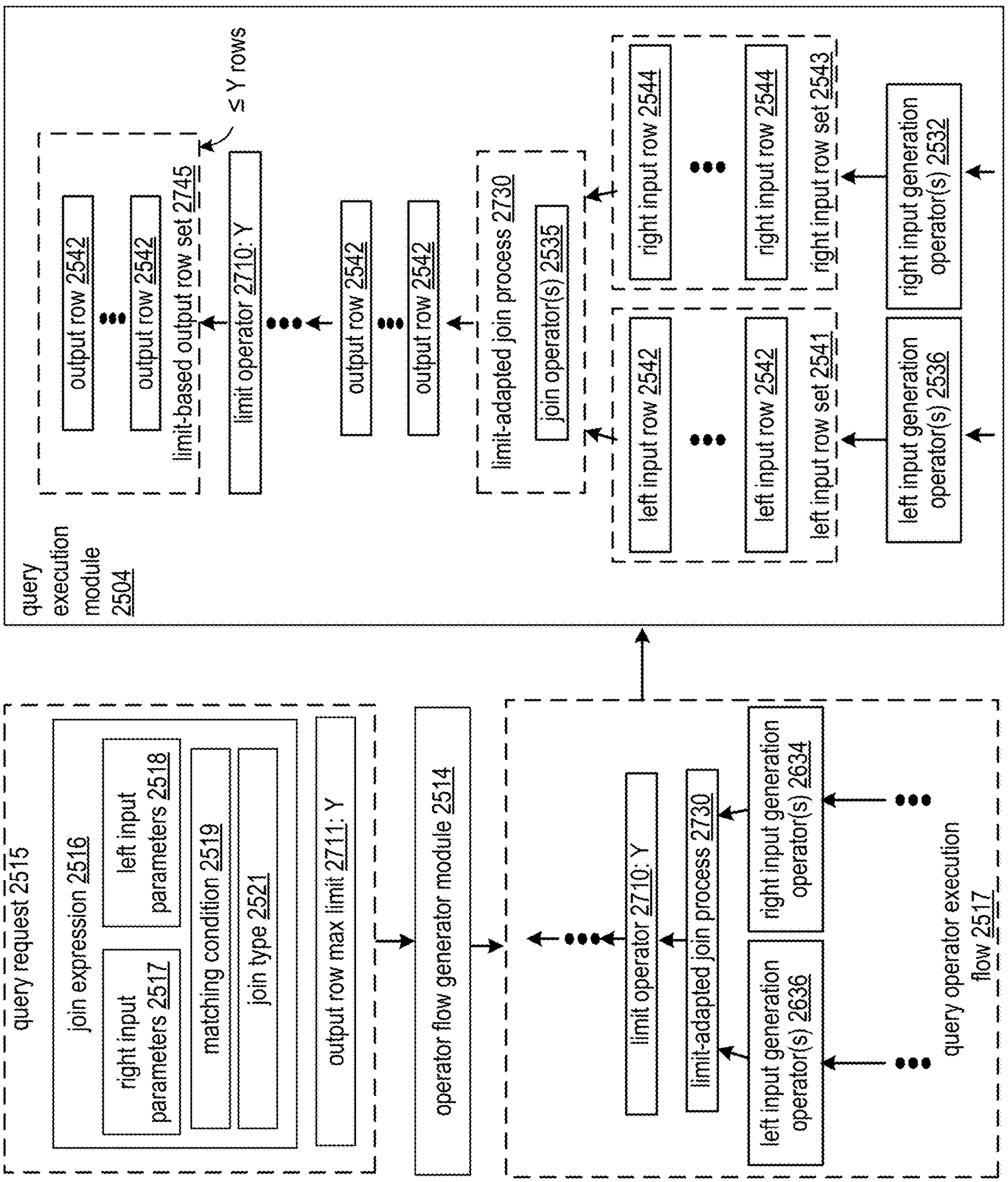
FIG. 27A is a schematic block diagram of a database system executing a limit-adapted join process based on a limit applied to a join expression of a query request in accordance with various embodiments.

FIG. 27A illustrates an embodiment of executing a query that indicates performance of a join expression 2516 and further indicates an output row maximum limit 2711, having a value of Y in this example. Some or all features and/or functionality of the implementation of the left join operator 2631 of FIG. 26A can be utilized to implement the join operator 2535 of FIG. 25C, and/or to implement any other embodiment of join operator 2535 and/or join process 2530 described herein.

The query operator execution flow 2517 can indicate performance of a limit-adapted join process 2730, which can be adapted from any embodiment of join process 2530 described herein. The output of the limit-adapted join process 2730 can be processed by a limit operator 2710.

Executing the query operator execution flow 2517 can include performing the limit-adapted join process 2730 via execution of one or more join operators 2535. The output rows 2546 emitted by the limit-adapted join process 2730 can be processed by limit operator 2710, which can emit these output rows 2546 accordingly until the output row max limit 2711 is reached, or until all output rows are generated and emitted by the limit-adapted join process 2730. For example, the limit operator 2710 emits a limit-based output row set 2745, which can be guaranteed to include less than or equal to Y rows. The limit-based output row set 2745 only includes less than Y rows when full execution of the limit-adapted join process 2730 emits less than Y rows, or when additional operators such as subsequent filtering limits the output rows to less than Y rows. Once the limit operator 2710 emits Y rows, no further rows are emitted, and/or the query execution can automatically terminate, even if limit-adapted join process 2730 has not finished processing and/or outputting all rows.

Figure 27B:
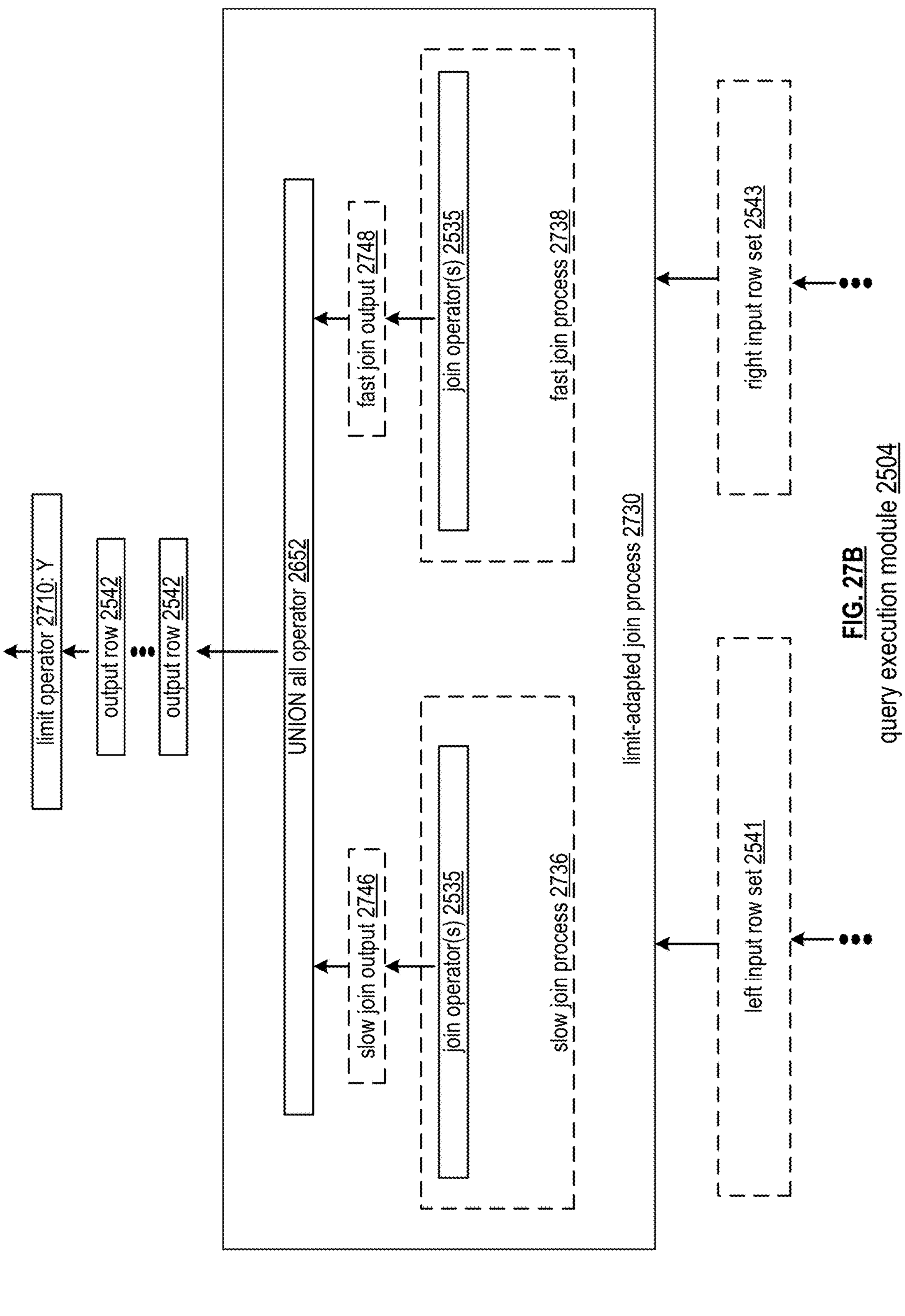
FIG. 27B is a schematic block diagram of a query execution module executing a limit-adapted join process that includes a slow join process executed in parallel with a fast join process in accordance with various embodiments.

FIG. 27B illustrates an embodiment of a limit-adapted join process 2730 that implements a corresponding join operation via a slow join process 2736 and a fast join process 2738 that each implement at least one join operator 2535. Some or all features and/or functionality of the limit-adapted join process 2730 can be utilized to implement the limit-adapted join process 2730 of FIG. 27A, any other embodiment of the limit-adapted join process described herein, and/or any embodiment of join process 2530 and/or join operator 2535 described herein. Slow join process 2736 and/or fast join process 2738 can be implemented via any features and/or functionality of a join process 2530 and/or of execution of one or more join operators 2535 described herein.

The fast join process can be implemented to emit some or all of its output rows of fast join output 2748 output more quickly than the slow join process emits output rows of its slow join output 2746. A UNION all operator 2652 can be applied to the slow join output 2746 and the fast join output 2748 to emit the corresponding output of the join process. In other embodiments, more than two join processes are implemented, for example, configured to generate output at three or more different respective speeds.

In particular, the slow join process 2736 and fast join process 2738 can be configured such that the union of the respective fast join output and the slow join output, if completed, is equivalent to that of a corresponding join process being implemented, despite the given join process being split into two processes. The union of the output of slow join process 2736 and fast join process 2738 can otherwise be configured and/or guaranteed to be semantically equivalent to the join expression 2516 of the given query.

In some embodiments, the slow join process 2736 is implemented via a first set of processing resources and the fast join process 2738 is implemented via a second set of processing resources distinct from the first set of processing resources. For example, the slow join process 2736 is implemented via a first set of one or more nodes 37 and/or a first set of parallel processes 2550, and the fast join process 2738 is implemented via a second set of one or more nodes 37 and/or a second set of parallel processes 2550, where the first set of one or more nodes 37 and second set of one or more nodes 37 are mutually exclusive, or where the first set of parallel processes 2550 and second set of parallel processes 2550 are mutually exclusive. Alternatively, some or all of the slow join process 2736 and the fast join process 2738 is implemented via shared resources, such as a same one or more nodes 37 and/or a same one or more parallelized processes 2550.

In some embodiments, the limit-adapted join process 2730 of FIG. 27B implements a given join operator 2535 executed via a given parallelized process 2550 and/or executed via a given node 37. For example, a given parallelized process 2550 implements the slow join process 2736, the fast join process 2738, and/or the UNION all operator 2652 upon its respective input, where the emitted output rows across multiple parallelized processes 2550 each implementing this limit-adapted join process for their respective input undergo a further UNION all operator 2652 as discussed in conjunction with FIG. 27B.

In some embodiments, placing the fast join process on the right hand side of the UNION all can be favorable based on a scheduler implemented by the query execution module 2504 generally avoid running operators for the "slow join" until the "fast join" finishes.

Figure 27C:
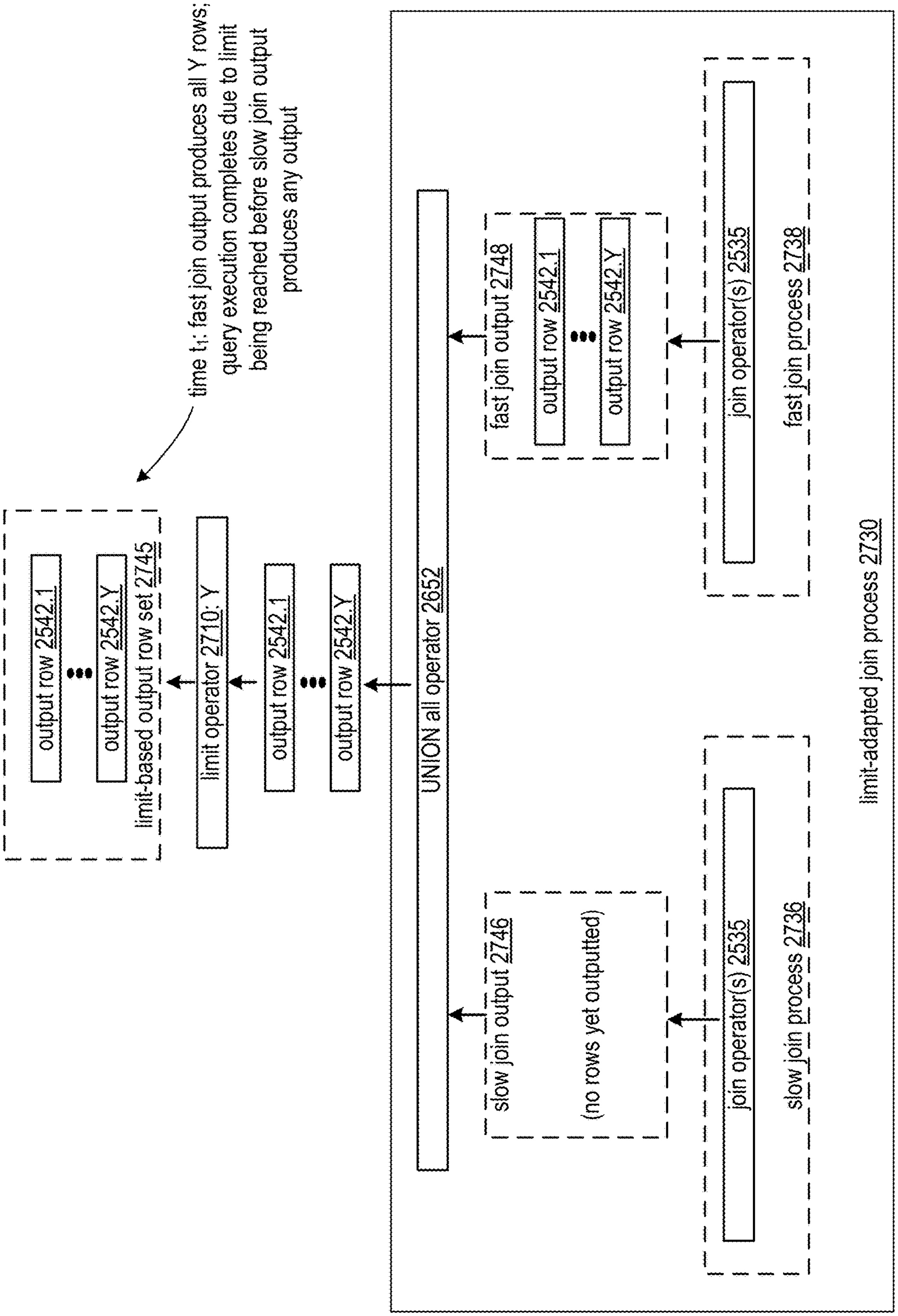
FIG. 27C is a schematic block diagram of a query execution module executing a limit-adapted join process where all of a limit-based output row set is produced via a fast join process in accordance with various embodiments.

FIG. 27C illustrates an example embodiment of executing a limit-adapted join process of FIG. 27B where the limit operator 2710 emits limit-based output row set 2745 to include output emitted by only the fast join process 2738. Some or all features and/or functionality of the limit-adapted join process 2730 of FIG. 27C can be utilized to implement any other embodiment of the limit-adapted join process 2730, join process 2530, and/or join operator 2535 described herein.

In this example, the fast join process 2738 generates and emits at least Y output rows 2546 of the fast join output 2748 in a stream of data blocks before slow join process 2736 emits any output rows of slow join output 2746. Upon emitting the first Y output rows it receives 2542.1-2542.Y by the limit operator 2710 at a time $t_1$ after some time to that the limit-adapted join process 2730 was initiated, completion of the query is triggered, where all output rows of the limit-based output row set 2745 were emitted by the fast join process. This example illustrates how the query can be completed faster than if no limit-adapted join process 2730 were implemented, particular where performing a corresponding single join process would be as slow as, or slower than, the slow join process 2736.

In other cases, at least some of the limit-based output row set 2745 includes output rows of slow join output 2746, for example, based on the slow join process 2736 ultimately beginning to emit rows before the limit Y is reached. In such cases, the limit-based output row set 2745 can include more rows from the fast join output than from the slow join output, such as substantially more rows from the fast join output, based on the fast join output beginning to emit its output slower than the slow join process.

Figure 27D:
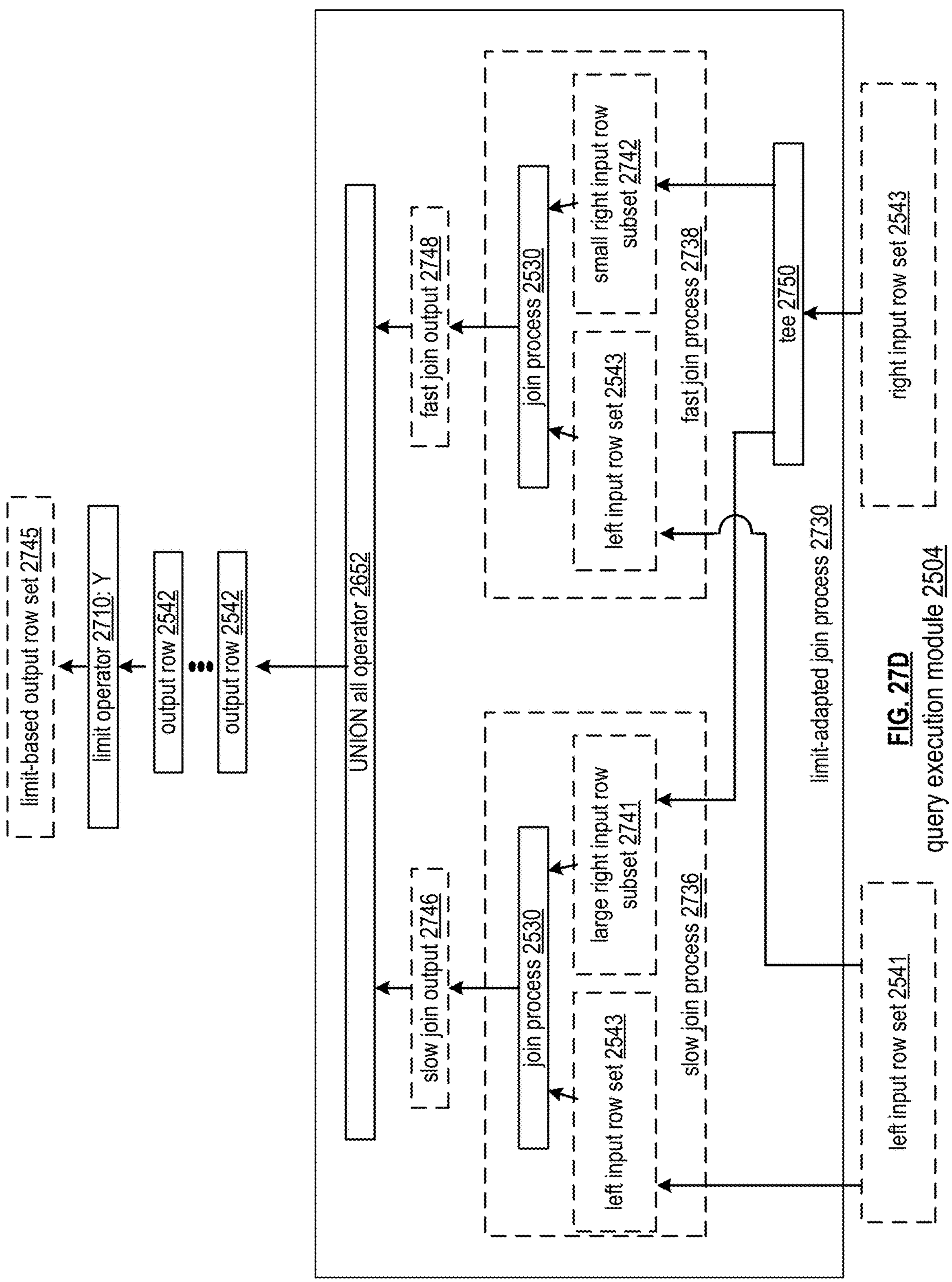
FIG. 27D is a schematic block diagram of a query execution module executing a limit-adapted join process that includes a slow join process performed upon a large right input row subset and a fast join process performed upon a small right input row subset in accordance with various embodiments.

FIG. 27D illustrates an example embodiment of implementing limit-adapted join process 2730. Some or all features and/or functionality of the limit-adapted join process 2730 of FIG. 27D can be utilized to implement the limit-adapted join process 2730 of FIG. 27B and/or any other embodiment of the limit-adapted join process 2730, join process 2530, and/or join operator 2535 described herein.

The limit-adapted join process 2730 can implement a tee 2750 to divide the right input row set 2543 into a small right input row subset 2742 and a large right input row subset 2741. The small right input row subset 2742 and the large right input row subset 2741 can be mutually exclusive and collectively exhaustive with respect to the right input row set 2543. A number and/or proportion of rows designated for the small right input row subset 2742 and a large right input row subset 2741 can be predetermined, selected as a function of Y, selected as a function of a known and/or expected size of the right input row set, selected as a function of a known and/or expected processing time for building a hash map 2555 from a given set of rows, and/or can be based on other factors. A number and/or proportion of rows designated for the small right input row subset 2742 and a large right input row subset 2741 can be the same or different for different queries and/or for different limit values.

The fast join process 2738 can perform its respective join process utilizing the small right input row subset 2742 and the full left input row set 2541. The slow join process 2736 can perform its respective join process utilizing the large right input row subset 2741 and this same full left input row set 2541. For example, the tee 2750 sends right input rows of large right input row subset 2741 for processing via the slow join process 2738, and/or the tee 2750 sends right input rows of small right input row subset 2742 for processing via the fast join process 2738. The left input row set 2541 can be sent for processing via both the slow join process 2738 and the fast join process 2738, for example, based on first being duplicated, for example, instead of utilizing a tee operator.

The fast join process 2738 can begin emitting output rows before the slow join process based on the small right input row subset 2742 including fewer rows than the large right input row subset 2741. For example, the fast join process 2738 can begin emitting output rows before the slow join process based on a first hash map 2555 being built from the small right input row subset 2742 being completed prior to a second hash map 2555 being built from the large right input row subset 2741, due to the small right input row subset 2742 including fewer rows than the large right input row subset 2741. In particular, fast join process 2738 can begin emitting output rows only once the building of the first hash map 2555 from the small right input row subset 2742 is completed, which can occur at a time before completion of building of the second hash map 2555 from the large right input row subset 2741, where the slow join process 2736 only begins emitting output rows once the building of this second hash map 2555 is completed, and thus begins emitting output rows after the fast join process 2738 begins emitting output rows.

In some embodiments, if the left input row set 2541 is non-deterministic, such as including an unknown number of rows, the operator flow generator module 2514 does not denote use of this limit-adapted join process 2730, and optionally instead denotes use of a single corresponding join process 2530.

Figure 27E:
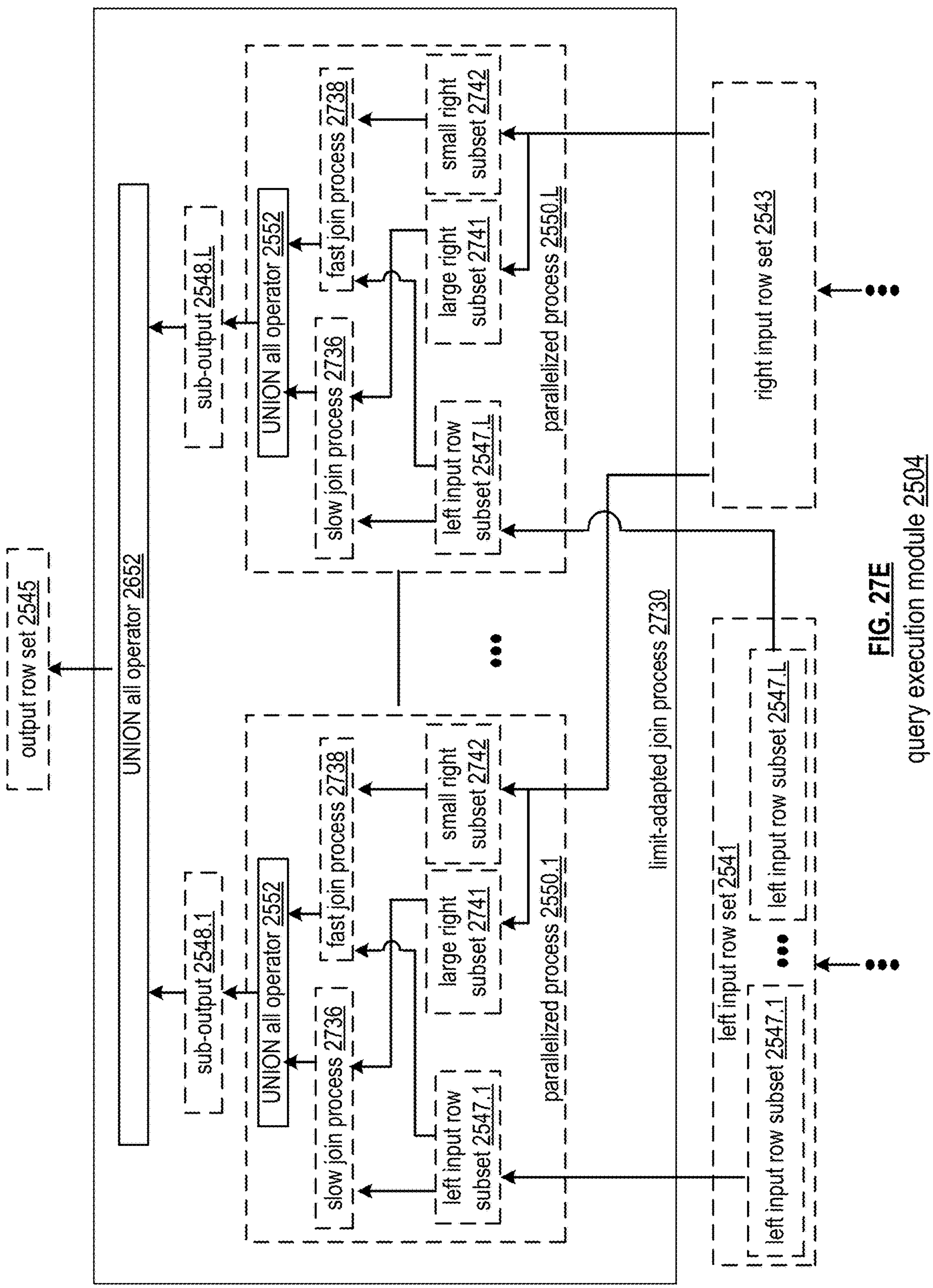
FIG. 27E is a schematic block diagram of a query execution module executing a limit-adapted join process via a plurality of parallelized processes in accordance with various embodiments.

FIG. 27E illustrates an embodiment where the limit-adapted join process 2730 is implemented via a plurality of parallelized processes 2550.1-2550.L. Some or all of the features and/or functionality of the parallelized processes 2550.1-2550.L of FIG. 27E can implement the parallelized processes 2550.1-2550.L of FIG. 25B. Some or all features and/or functionality of the limit-adapted join process 2730 of FIGS. 27B-27D can be implemented via a corresponding parallelized processes 2550, for example, utilizing its given left input row subset 2547 as discussed previously.

In other embodiments, rather than each parallelized processes 2550 implementing both the fast join process 2738 and the slow join process 2736 themselves, a first subset of the set of parallelized processes 2550 collectively implement the slow join process 2736 by each processing only the large right input row set 2741, and a second subset of the set of parallelized processes 2550 collectively implement the fast join process 2738 by each processing only the small right input row set 2742. The first subset of the set of parallelized processes can be configured to be larger than, smaller than, similar in size to, and or a same size as the second subset of the set of parallelized processes, for example, where relative sizes are configured to further optimize processing time of the query. Left input row subsets designated for parallel processes of the first subset of the set of parallelized processes can be configured to be larger than, smaller than, similar in size to, and or a same size as other left input row subsets designated for the second subset of the set of parallelized processes, for example, where relative sizes are configured to further optimize processing time of the query.

Figure 27F:
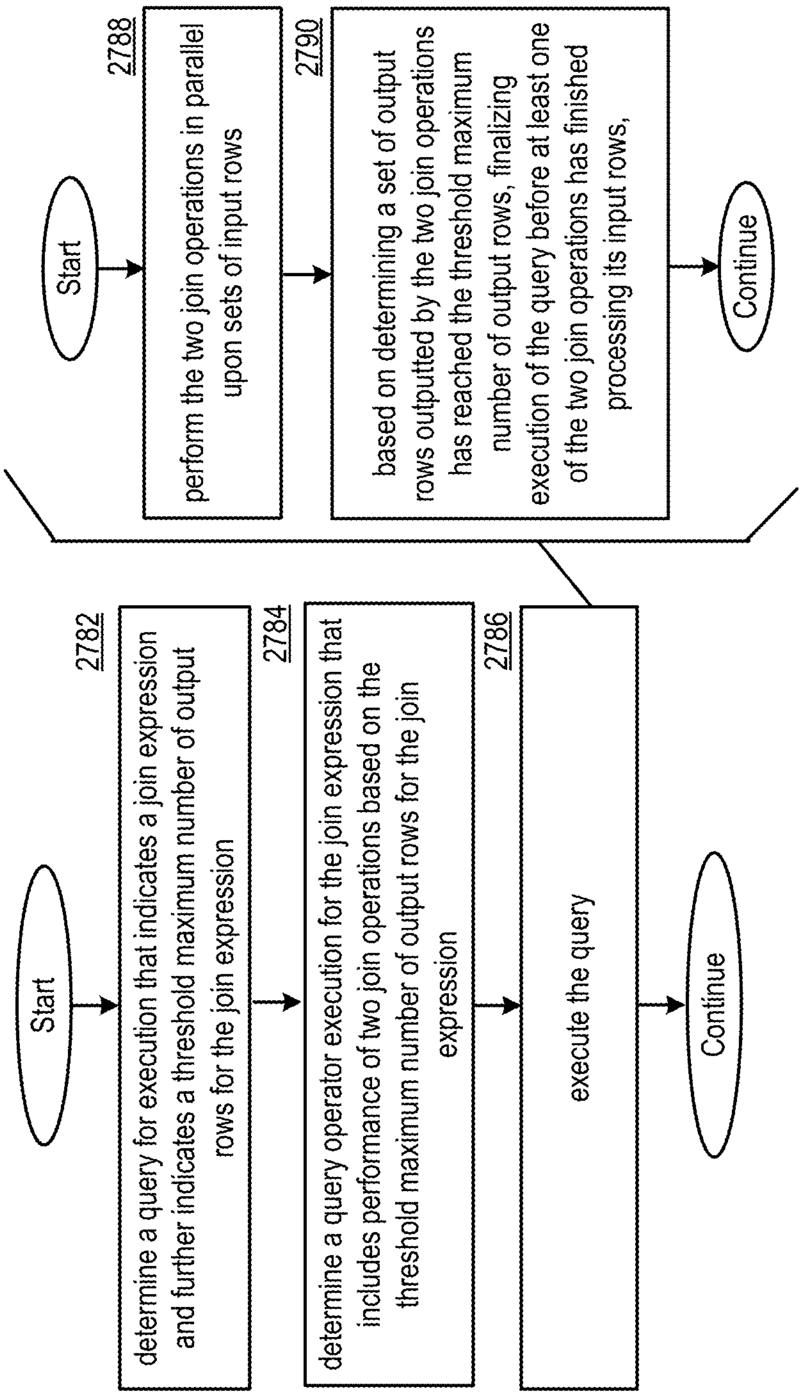
FIG. 27F is a logic diagram illustrating a method for execution in accordance with various embodiments.

FIG. 27F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27F. In particular, a node 37 can utilize the query processing module 2435 to execute some or all of the steps of FIG. 27F, where multiple nodes 37 implement their own query processing modules 2435 to independently execute the steps of FIG. 27F, for example, to facilitate execution of a query as participants in a query execution plan 2405. Some or all of the method of FIG. 27F can be performed by the query processing system 2510, for example, by utilizing an operator flow generator module 2514 and/or a query execution module 2504. In particular, some or all of the method of FIG. 27F can be performed via one or more operator executions of one or more limit operators 2710 and/or one or more join operators 2535 of at least one join process 2530, such as a limit-adapted join process 2730 and/or a fast join process 2738 and a slow join process 2736. Some or all of the steps of FIG. 27F can optionally be performed by any other processing module of the database system 10. Some or all of the steps of FIG. 27F can be performed to implement some or all of the functionality of the database system 10 as described in conjunction with FIGS. 27A-27E, for example, by implementing some or all of the functionality of the query processing system 2510 as described in conjunction with FIGS. 25A-26F. Some or all of the steps of FIG. 27F can be performed to implement some or all of the functionality regarding execution of a query via the plurality of nodes in the query execution plan 2405 as described in conjunction with some or all of FIGS. 24A-24I. Some or all steps of FIG. 27F can be performed by database system 10 in accordance with other embodiments of the database system 10 and/or nodes 37 discussed herein. Some or all steps of FIG. 27F can be performed in conjunction with one or more steps of FIG. 26G, and/or of any other method described herein.

Step 2782 includes determining a query for execution that indicates a join expression and further indicates a threshold maximum number of output rows, such as an output row max limit 2711, for the join expression. Step 2784 includes determining a query operator execution for the join expression that includes performance of two join operations based on the threshold maximum number of output rows for the join expression. Step 2786 includes executing the query.

Performing step 2786 can include performing one or more of steps 2788 and/or 2790. Step 2788 includes performing the two join operations in parallel upon sets of input rows. Step 2790 includes finalizing execution of the query before at least one of the two join operations has finished processing its input rows, for example, based on determining a set of output rows outputted by the two join operations has reached the threshold maximum number of output rows.

In various examples, finalizing execution of the query includes outputting a query resultant that includes the determined set of output rows.

In various examples, a second one of the two join operations is configured to emit output rows faster than a first one of the two join operations, and/or where all of the set of output rows are outputted by the second one of the two join operations based on the first one of the two join operations not yet outputting any rows when the execution of the query is finalized.

In various examples, the method includes sending all of a plurality of left input rows for the join expression to both of the two join operations for processing; sending a first proper subset of a plurality of right input rows of the join expression to the first one of the two join operations for processing in conjunction with all of the plurality of left input rows; and/or sending a second proper subset of the plurality of right input rows of the join expression to the second one of the two join operations for processing in conjunction with all of the plurality of left input rows. In various examples, the first proper subset and the second proper subset rows are mutually exclusive and collectively exhaustive with respect to the plurality of right input rows, and/or the second one of the two join operations is configured to emit output rows faster than the first one of the two join operations based on the first proper subset including a greater number of right input rows than the second proper subset. In various examples, a number of rows included in the second proper subset rows is based on the threshold maximum number of output rows indicated by the query.

In various examples, performance of the first one of the two join operations includes generating a first hash map from the first proper subset of the plurality of right input rows. In various examples, performance of the first one of the two join operations further includes, for each left input row of the plurality of left input rows processed by the first one of the two join operations: determining whether any of the first proper subset of the plurality of right input rows matches with the each left input row based on the first hash map. In various examples, when one of the first proper subset of the plurality of right input rows is identified as matching with the each left input row, the method can further include emitting a value of the one of the first proper subset of the plurality of right input rows in conjunction emitting the each left input row. In various examples, performance of the second one of the two join operations includes generating a second hash map from the second proper subset of the plurality of right input rows. In various examples, the method can further include, for each left input row of the plurality of left input rows processed by the second one of the two join operations, determining whether any of the second proper subset of the plurality of right input rows matches with the each left input row based on the second hash map; and/or, when one of the second proper subset of the plurality of right input rows is identified as matching with the each left input row, emitting a value of the one of the second proper subset of the plurality of right input rows in conjunction emitting the each left input row.

In various examples one node of a plurality of nodes of a query execution plan executes the join expression by performing both of the two join operations in parallel upon sets of input rows. In various examples, a same or different node of the plurality of nodes performs a limit operator to determine a set of output rows generated by performing the two join operations in parallel reaches the threshold maximum number of rows.

In various examples, a plurality of nodes of a query execution plan execute the query based on each performing at least one of the two join operations.

In various examples, a plurality of nodes of a query execution plan execute the query. In various examples, a first proper subset of the plurality of nodes perform the first one of the two join operations. In various examples, a second proper subset of the plurality of nodes perform the second one of the two join operations. In various examples, the first proper subset of the plurality of nodes and the second proper subset of the plurality of nodes are mutually exclusive. In various examples, the first proper subset of the plurality of nodes generate a first hash map for the first proper subset of the plurality of right input rows via a first shuffle operation amongst the first proper subset of the plurality of nodes. In various examples, the second proper subset of the plurality of nodes generate a second hash map for the second proper subset of the plurality of right input rows via a second shuffle operation amongst the second proper subset of the plurality of nodes.

In various examples, the threshold maximum number of output rows for the join expression is indicated by a limit expression for the join expression.

In various examples, the query operator execution flow for the join expression is generated to includes performance of two join operations based on determining a number of rows in a plurality of left input rows for the join expression is deterministic. In various examples, the method further includes determining a second query for execution that indicates a second join expression and further indicates another threshold maximum number of output rows for the second join expression; and/or determining a second query operator execution for the second join expression that includes performance of a single join operation instead of the two join operations based on the determining a number of rows in another plurality of left input rows for the second join expression is non-deterministic.

In various embodiments, any one of more of the various examples listed above are implemented in conjunction with performing some or all steps of FIG. 27F. In various embodiments, any set of the various examples listed above can implemented in tandem, for example, in conjunction with performing some or all steps of FIG. 27F.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27F, for example, in conjunction with further implementing any one or more of the various examples described above.

In various embodiments, the operational instructions, when executed by the at least one processor, cause the database system to: determine a query for execution that indicates a join expression and further indicates a threshold maximum number of output rows for the join expression; determining a query operator execution for the join expression that includes performance of two join operations based on the threshold maximum number of output rows for the join expression, where a union of output of the two join operations is semantically equivalent to an output of the join expression; and/or executing the query. The database system can execute the query based on: performing the two join operations in parallel upon sets of input rows; and/or finalizing execution of the query before at least one of the two join operations has finished processing its input rows based on determining a set of output rows outputted by the two join operations has reached the threshold maximum number of output rows.

Figure 28A:
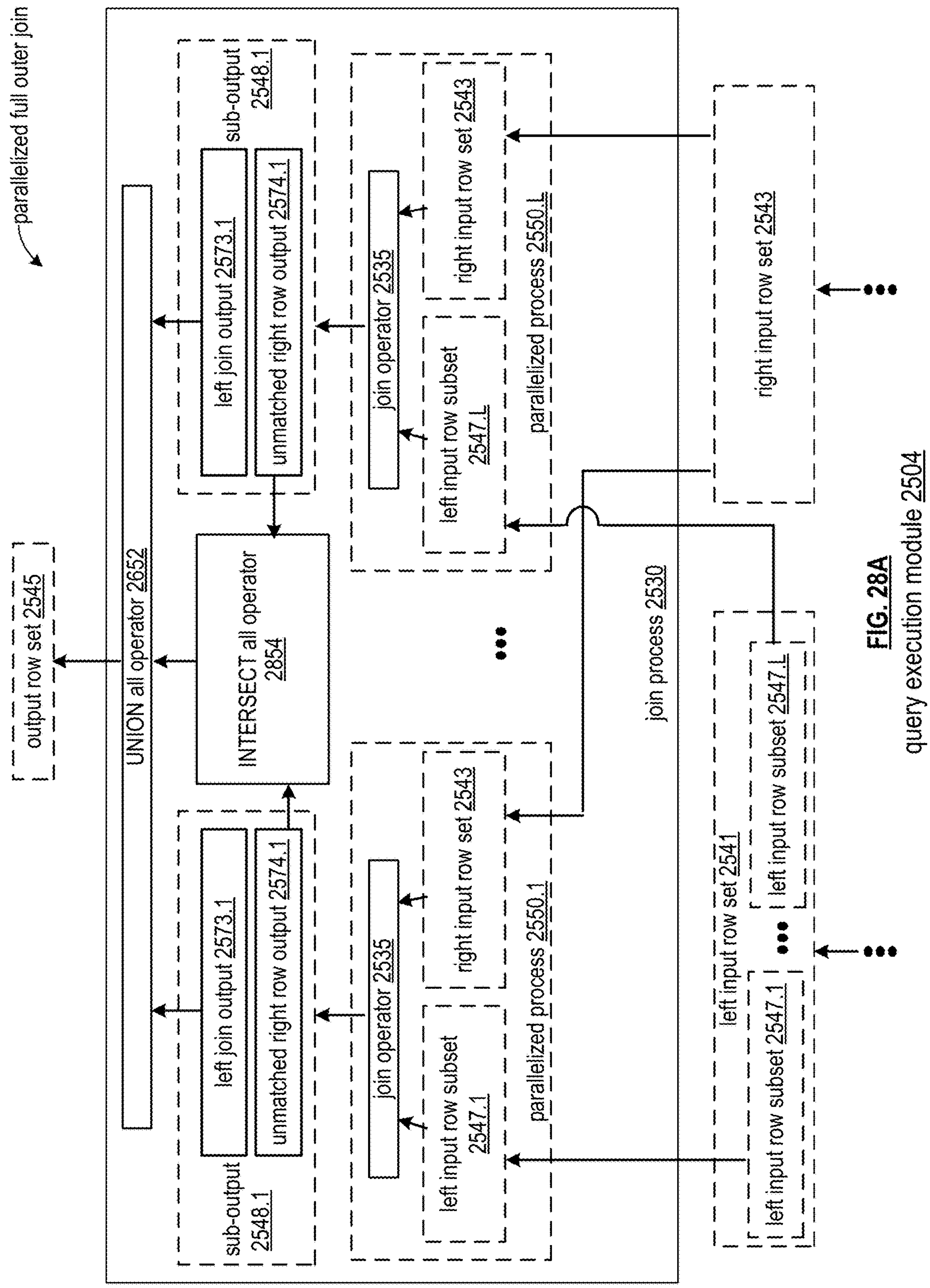
FIG. 28A is a schematic block diagram of a query execution module executing a join process implementing a full outer join via a plurality of parallelized processes in accordance with various embodiments.
Figure 28B:
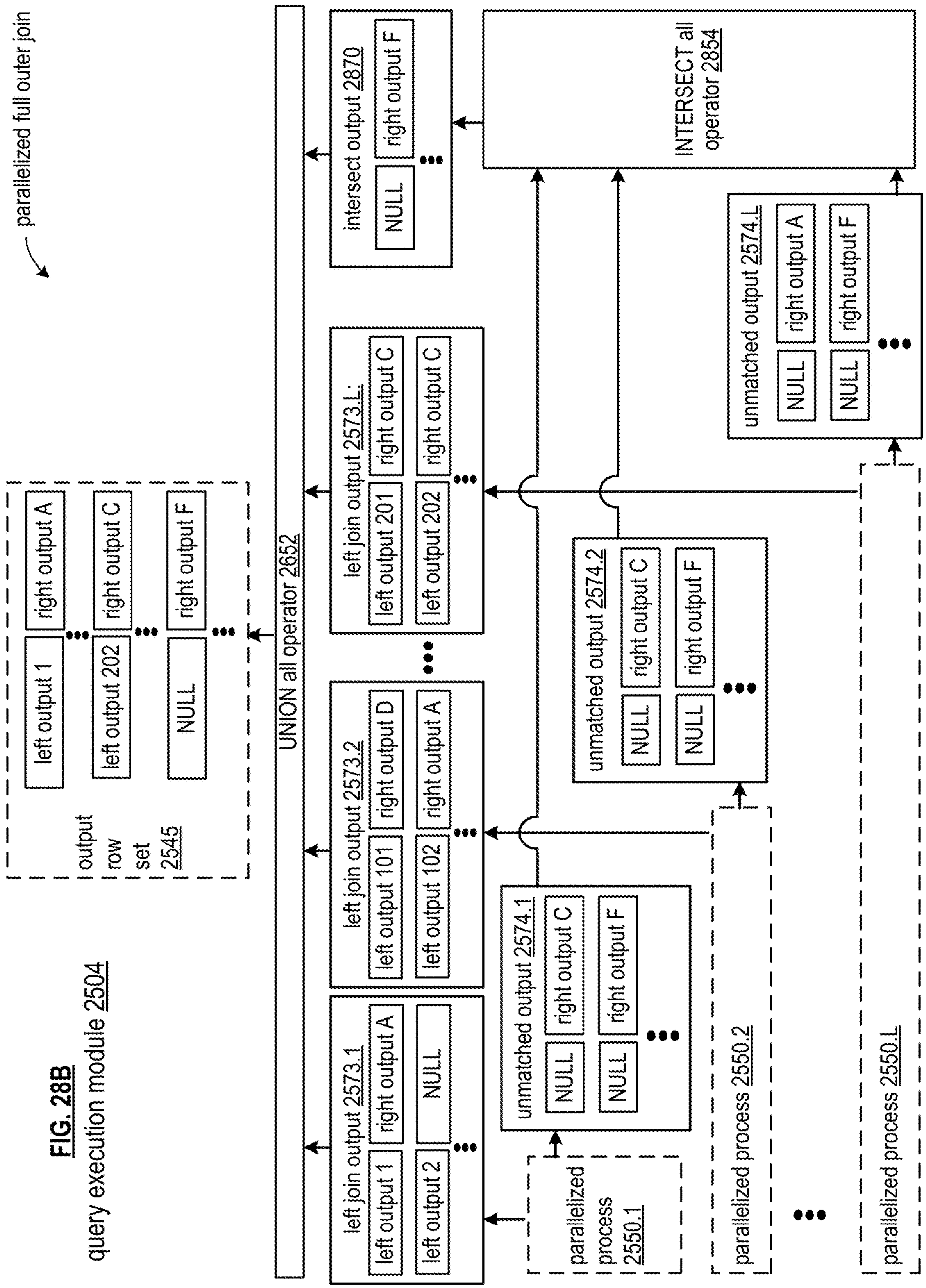
FIG. 28B is a schematic block diagram of a query execution module of an example execution of a join process implementing a full outer join via a plurality of parallelized processes in accordance with various embodiments.

FIGS. 28A-28B illustrate embodiments of a database system 10 operable to execute queries indicating join expressions implementing a parallelized full outer join via a plurality of parallelized processes. Some or all features and/or functionality of FIGS. 28A-28B can be utilized to implement the join processes of FIGS. 25A-25C and/or can be utilized to implement database system 10 of FIGS. 24A-24I when executing queries indicating join expressions. Some or all features and/or functionality of FIGS. 28A-28B can be utilized to implement any embodiment of the database system 10 described herein.

Product joins, inner joins, and/or non-full join can be run in parallel, for example, via a plurality of parallelized processes 2550, by providing every parallel product join instance the complete set of right rows and partitioning the left rows across the instances, for example, as discussed in conjunction with FIG. 25B. This is valid, because every left row gets compared with every right row and vice versa. For inner joins, this mechanism works correctly without further adaptation, because each instance only outputs "matches", and if a left and right row match each other, they will both be present at exactly one instance. For left joins, because left inputs that didn't match with anything are also outputted, the mechanism of FIG. 25B again works correctly without further adaptation, because each parallel instance has access to all of the right inputs, so if an instance sees that a left row doesn't match with anything on the right, it knows it's correct to output it.

For right joins, this process could lead to incorrect results if not further adapted. For example, If an instance sees a right row didn't match with any of its left inputs, it wouldn't know whether or not that is because the right row truly has no matches or if that right row will match with some of the left inputs not available to that instance. For right joins, this problem can be mitigated by simply partitioning the right inputs across instances and giving all the left inputs to every instance, where the right join is thus treated as a left join despite being expressed as a right join.

However, for full outer joins, such as full outer product joins, each instance must output both all the unmatched left rows and all the unmatched right rows. If partitioning on the right side, then an individual instance cannot know whether or not a left row is unmatched, and if partitioning on the left side, then an individual instance cannot know whether or not a right row is unmatched. One solution can include running full outer joins in one serial instance, with access to all the left rows and all the right rows.

In general, it can be advantageous to run operators in parallel than in serially, so a solution that enables parallelized processing of full outer joins can be ideal. This processing of query expression by implementing parallelized processing of full outer joins, while still guaranteeing query correctness, as presented in conjunction with FIGS. 28A-28B can improve the technology of database systems by improving efficiency of query execution via parallelized processing, while still ensuring correct results are outputted.

Performing full outer product joins in parallel can include some modifications to the join processes 2530 presented previously. Similarly to performing inner joins, the left input rows can be partitioned across instances, and the right inputs can be forwarded to all instances. Each instance can correctly output the "inner" and "left" parts of the join (i.e. matches of left and right rows, as well as unmatched left rows). These outputs can go directly to the standard parent of the full outer product join. For example, such functionality can be implemented as discussed in conjunction with some or all of FIGS. 25B-FIG. 26B.

When an instance has a right row that does not match, the corresponding parallelized process does not immediately know whether or not that row is correct to output. However, that row would be correct to output if and only if it has no matches at every parallel instance. If each parallel instance were considered the child of an intersect all operator and passed its right unmatched rows to it, the output of the intersect all operator would be exactly the correct rows to output for the right unmatched rows of the full outer join.

FIG. 28A illustrates an example of such an embodiment of performing a parallelized full outer join via a plurality of parallelized processes 2550.1-2550.L Some or all features and/or functionality of the plurality of parallelized processes 2550.1-2550.L FIG. 28A can implement the plurality of parallelized processes 2550.1-2550.L of FIG. 25B. The join process 2530 of FIG. 28A can implement any embodiment of join process 2530 described herein, performance of any full outer join described herein, and/or any execution of join operator 2535 described herein.

The sub-output 2548 emitted by a given parallelized process 2550 can include respective left join output and respective unmatched right row output 2574 generated for the given left input row subset 2547 and the right input row set 2543. For example, the join operator 2535 implemented by a given parallel process is implemented via some or all features and/or functionality of the full outer join operator 2632 of FIGS. 26C-26D.

To resolve any problems with inadvertently duplicating emitting of unmatched right rows with NULL padded output and/or to ensure that rows with NULL padded output indeed matched no left rows in other left input row subsets processed by other parallelized processes, an INTERSECT all operator 2854 can be implemented to process unmatched right row output 2574.1-2574.L generated by the set of parallelized processes 2550.1-2550.L. The INTERSECT all operator 2854 can be implemented to perform an intersection across all L sets, where only unmatched right rows appearing as output for all L parallelized processes 2550.1-2550.L are deemed to indeed match no left input rows, and are thus emitted in the output row set 2545.

Each parallelized instance of the full outer join operator can thus be considered children of the INTERSECT all operator 2854, appearing serially before the INTERSECT all operator 2854 in the query operator execution flow and/or sending unmatched right row output 2574 to the INTERSECT all operator 2854. Each parallelized instance of the full outer join operator can further be considered children of the UNION all operator 2652, appearing serially before the INTERSECT all operator 2854 in the query operator execution flow and/or sending left join output 2573 directly to the UNION all operator 2652. The INTERSECT all operator 2854 can further be considered a child of the UNION all operator 2652, appearing serially before the UNION all operator 2652 in the query operator execution flow and/or sending its output to the UNION all operator 2652.

FIG. 28B illustrates an example of executing the parallelized full outer join. Some or all features and/or functionality of the execution of the parallelized full outer join can implement the parallelized full outer join of the join process 2530 of FIG. 25A, any embodiment of join process 2530 described herein, performance of any full outer join described herein, and/or any execution of join operator 2535 described herein.

The various left outputs and right outputs of this example can be implemented as left output values 2561 and right output values 2563, respectively, of corresponding output rows 2546. Different numeric values of the left outputs depicted in FIG. 28B distinguish values of different corresponding left rows. Different alphabetic values of the right outputs depicted in FIG. 28B distinguish values of different corresponding right rows.

In this example, each parallelized process 2550 processes a corresponding left input row subset 2547 that includes a different set of 100 rows of the left input row set 2541, where left input rows 1-100 are processed via parallelized process 2550.1, where left input rows 101-200 are processed via parallelized process 2550.2, and where left input rows 201-300 are processed via parallelized process 2550.L.

In this example, parallelized process 2550.1 outputs left join output 2573.1 that indicates an output row that includes left output 1 matching with right output A, and another output row that includes left output 2 padded with NULL due to having no match. Parallelized process 2550.2 outputs left join output 2573.2 that indicates an output row that includes left output 101 matching with right output D, and another output row that includes left output 102 matching with right output A. Parallelized process 2550.L outputs left join output 2573.L that indicates an output row that includes left output 201 matching with right output C, and another output row that includes left output 202 matching with right output C. While not depicted, each left join output 2573 further includes one or more additional output rows are included for each of the 98 remaining left input rows of the respective left input row subset 2547.

In this example, parallelized process 2550.1 outputs unmatched right row output 2574.1 that indicates an output row that includes right output C padded with NULL, and another output row that includes right output F padded with NULL, due to right output C and right output F not matching with any of its left input rows 1-100 in left join output 2573.1. Parallelized process 2550.2 outputs unmatched right row output 2574.2 that indicates an output row that includes right output C padded with NULL, and another output row that includes right output F padded with NULL, due to right output C and right output F not matching with any of its left input rows 101-200 in left join output 2573.2. Parallelized process 2550.L outputs unmatched right row output 2574.L that indicates an output row that includes right output A padded with NULL, and another output row that includes right output C padded with NULL, due to right output A and right output F not matching with any of its left input rows 201-300 in left join output 2573.L.

The output rows that include right output A padded with NULL would be improper to include in the output row set 2545, as right output A matches with at least left row 1 and left row 102, and is thus included in at least left join output 2573.1 and 2573.2. Right output A padded with NULL therefore is not included in unmatched output 2574.1 and unmatched output 2574.2, and is thus not included in the intersect output 2870. Based on applying the INTERSECT all operator 2854 to the unmatched right row outputs 2574.1-2574.L, right output A padded with NULL is thus correctly not included in the output row set 2545.

The output rows that include right output C padded with NULL would also be improper to include in the output row set 2545, as right output C matches with at least left row 201 and left row 202, and is thus included in at least left join output 2573.L. Right output C padded with NULL therefore is not included in unmatched right row output 2574.L, and is thus not included in the intersect output 2870. Based on applying the INTERSECT all operator 2854 to the unmatched right row outputs 2574.1-2574.L, right output C padded with NULL is thus correctly not included in the output row set 2545.

The output rows that include right output F padded with NULL is proper to include in the output row set 2545, exactly once, assuming right output F matches with no left rows of any left input row subset 2547, and is thus not included in any of the left join outputs 2573.1-2573.L. Right output F padded with NULL therefore is included in every unmatched right row outputs 2574.1-2574.L, and is thus included in the intersect output 2870. Based on applying the INTERSECT all operator 2854 to the unmatched right row outputs 2574.1-2574.L, right output F padded with NULL is thus correctly included in the output row set 2545.

Figure 28C:
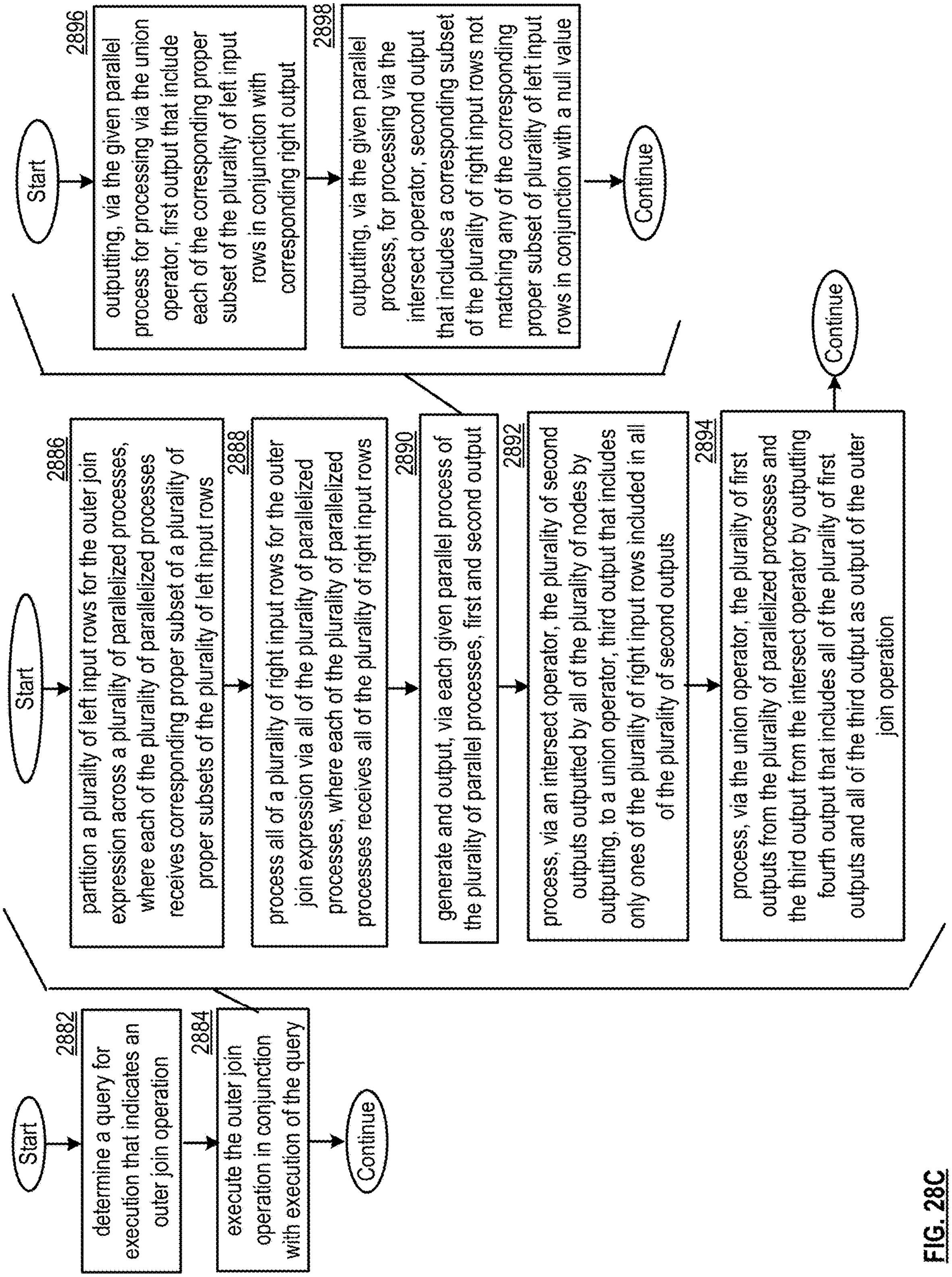
FIG. 28C is a logic diagram illustrating a method for execution in accordance with various embodiments.

FIG. 28C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28C. In particular, a node 37 can utilize the query processing module 2435 to execute some or all of the steps of FIG. 28C, where multiple nodes 37 implement their own query processing modules 2435 to independently execute the steps of FIG. 28C, for example, to facilitate execution of a query as participants in a query execution plan 2405. Some or all of the method of FIG. 28C can be performed by the query processing system 2510, for example, by utilizing an operator flow generator module 2514 and/or a query execution module 2504. In particular, some or all of the method of FIG. 28C can be performed via one or more operator executions of one or more join operators 2535 of at least one join process 2530, such as a plurality of parallelized processes 2550 of a join process 2530. Some or all of the steps of FIG. 28C can optionally be performed by any other processing module of the database system 10. Some or all of the steps of FIG. 28C can be performed to implement some or all of the functionality of the database system 10 as described in conjunction with FIGS. 28A-28B, for example, by implementing some or all of the functionality of the query processing system 2510 as described in conjunction with FIGS. 25A-27E. Some or all of the steps of FIG. 28C can be performed to implement some or all of the functionality regarding execution of a query via the plurality of nodes in the query execution plan 2405 as described in conjunction with some or all of FIGS. 24A-24I. Some or all steps of FIG. 28C can be performed by database system 10 in accordance with other embodiments of the database system 10 and/or nodes 37 discussed herein. Some or all steps of FIG. 28C can be performed in conjunction with one or more steps of FIG. 26G, one or more steps of FIG. 27F, and/or of any other method described herein.

Step 2882 includes determining a query for execution that indicates an outer join operation. Step 2884 includes executing the outer join operation in conjunction with execution of the query. Performing step 2884 can include performing one or more of steps 2886, 2888, 2890, 2892, and/or 2894.

Step 2886 includes partitioning a plurality of left input rows for the outer join expression across a plurality of parallelized processes, where each of the plurality of parallelized processes receives corresponding proper subset of a plurality of proper subsets of the plurality of left input rows. Step 2888 includes processing all of a plurality of right input rows for the outer join expression via all of the plurality of parallelized processes, where each of the plurality of parallelized processes receives all of the plurality of right input rows.

Step 2890 includes generating and output, via each given parallel process of the plurality of parallel processes, first and second output. Performing step 2890 can include performing one or more of step 2896 and/or step 2898. Step 2896 includes, for each given parallel process, outputting, via the given parallel process for processing via the union operator, first output that include each of the corresponding proper subset of the plurality of left input rows in conjunction with corresponding right output. Step 2898 includes outputting, via the given parallel process, for processing via the intersect operator, second output that includes a corresponding subset of the plurality of right input rows not matching any of the corresponding proper subset of plurality of left input rows in conjunction with a null value.

Step 2892 includes processing, via an intersect operator, the plurality of second outputs outputted by all of the plurality of nodes by outputting, to a union operator, third output that includes only ones of the plurality of right input rows included in all of the plurality of second outputs. Step 2894 includes processing, via the union operator, the plurality of first outputs from the plurality of parallelized processes and the third output from the intersect operator by outputting fourth output that includes all of the plurality of first outputs and all of the third output as output of the outer join operation.

In various examples, the each of the plurality of parallelized processes is implemented by a corresponding one of a plurality of nodes of a query execution plan. In various examples, the union operator is implemented by a first other node that is a parent node of the plurality of nodes, where the intersect operator is implemented by a second other node that is another parent node of the plurality of nodes, and where the a first other node is implemented is further implemented as parent node of the second other node.

In various examples, the method can further include generating the plurality of left input rows via a left input generation process based on a first plurality of row reads to segments stored in memory drives, and/or generating the plurality of right input rows via a right input generation process based on a second plurality of row reads to the segments stored in the memory drives.

In various examples, the left input generation process partitions the plurality of left input rows and sends each of the plurality of proper subsets of the plurality of left input rows to a corresponding one of the plurality of parallelized processes, and/or the right input generation process sends all of the plurality of right input rows to all of the plurality of parallelized processes.

In various embodiments, any one of more of the various examples listed above are implemented in conjunction with performing some or all steps of FIG. 28C. In various embodiments, any set of the various examples listed above can be implemented in tandem, for example, in conjunction with performing some or all steps of FIG. 28C.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28C, for example, in conjunction with further implementing any one or more of the various examples described above.

In various embodiments, the operational instructions, when executed by the at least one processor, cause the database system to: determine a query for execution that indicates an outer join operation; and/or execute the outer join operation in conjunction with execution of the query. The database system can execute the outer join operation in conjunction with execution of the query by: partitioning a plurality of left input rows for the outer join expression across a plurality of parallelized processes, where each of the plurality of parallelized processes receives corresponding proper subset of a plurality of proper subsets of the plurality of left input rows, and/or where the plurality of proper subsets are mutually exclusive and collectively exhaustive with respect to the plurality of left input rows; processing all of a plurality of right input rows for the outer join expression via all of the plurality of parallelized processes, where each of the plurality of parallelized processes receives all of the plurality of right input rows. The operational instructions, when executed by the at least one processor, can further cause the database system to, for each of the plurality of parallelized processes: output, for processing via a union operator, first output that include each of the corresponding proper subset of the plurality of left input rows in conjunction with at least one matching one of the plurality of right input rows or a null value based on the each of the plurality of left input rows not matching any of the plurality of right input rows; and/or outputting, for processing via an intersect operator, second output that includes a corresponding subset of the plurality of right input rows not matching any of the corresponding proper subset of plurality of left input rows in conjunction with a null value. The operational instructions, when executed by the at least one processor, can further cause the database system to process, via the intersect operator, a plurality of second outputs outputted by all of the plurality of nodes by outputting, to the union operator, third output that includes only ones of the plurality of right input rows included in all of the plurality of second outputs; and/or process, via the union operator, a plurality of first outputs from the plurality of parallelized processes and the third output from the intersect operator by outputting fourth output that includes all of the plurality of first outputs and all of the third output as output of the outer join operation.

FIGS. 29A-29G present embodiments of a query processing system 2510 that executes query expressions by delaying exceptions. Some or all features and/or functionality of the query processing system 2510 of FIGS. 29A-29G can be utilized to implement the query processing system 2510 of FIG. 24G and/or any other embodiment of the query processing system 2510 discussed herein.

Consider a query expression indicating an expression evaluation be performed upon only output of one or more filtering operators. When optimizing a corresponding operator execution flow of a query plan to execute this query expression, it may be ideal in to push this expression down before these filtering operators for performance prior to performance of these filtering operators, for example to optimize and/or improve processing, resource utilization, and/or execution time in executing of the query expression. In this case, the expression evaluation is then performed upon more rows than it should due to being performed prior to filtering out rows. If the expression evaluation can result in an exception being thrown these exceptions could be thrown for rows that would have been filtered out if these steps were performed in the original order denoted by the query expression. To ensure the query expression is executed correctly, its execution should query should only fail if exceptions are thrown for rows that would not be filtered out by the filtering operators, and should continue if exceptions are thrown only for rows that would have been filtered out by the filtering operators.

Enabling this delay in exception throwing improves the technology of database systems by allowing expressions to be evaluated before corresponding filtering while not changing the query result. Enabling this functionality introduces a broader range of possible operator execution flows that can be utilized to execute queries, enabling an optimizer of an operator flow generator module to better select an operator execution flow that renders the optimal query performance from a broader set of options. In particular, enabling selection and execution of an operator execution flow by pushing expressions down for evaluation before corresponding filtering operators improves the technology of database systems by significantly improving query runtime, while still adhering to the original query expression.

Figure 29A:
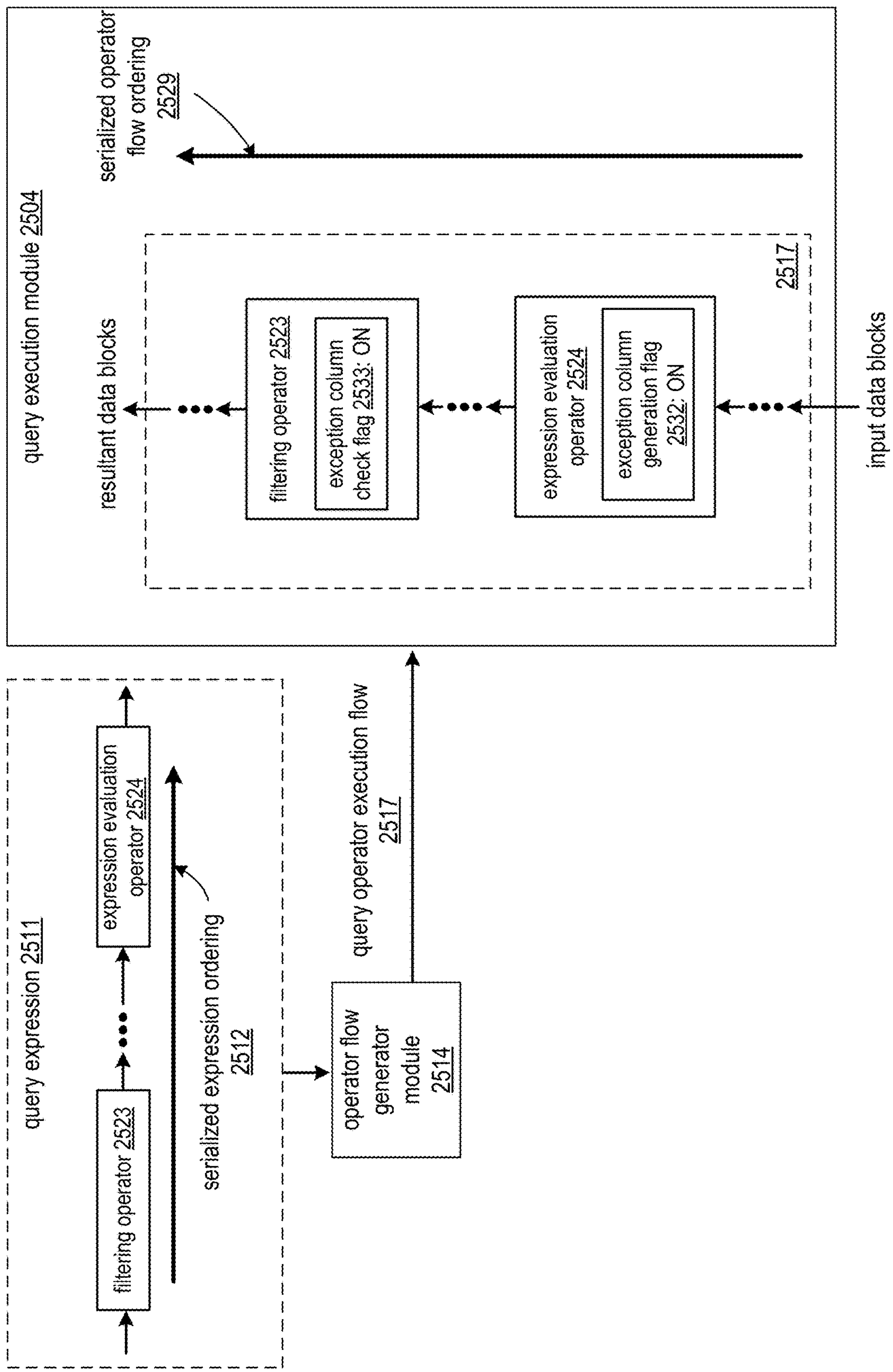
FIG. 29A is a schematic block diagram of a query processing system in accordance with various embodiments.

FIG. 29A presents an embodiments of a query processing module that enables queries to be executed in this fashion. The operator flow generator module 2517 can be operable to generate query operator execution flows 2517 for incoming query expression 2511 as discussed in conjunction with FIG. 24G.

The query expression 2511 can indicate a plurality of operations be performed in accordance with a serialized expression ordering 2512. For example, as illustrated in FIG. 29A, the serialized expression ordering 2512 of the query expression 2511 can indicate that a particular expression evaluation operator 2524 be performed upon output of a filtering operator 2523, where the expression evaluation operator 2524 is thus only performed upon rows that satisfy filtering parameters of the filtering operator 2523. The query expression can be written as a SQL query expression and/or a query expression written in accordance with a different query and/or programming language.

The filtering operator 2523 can be implemented as a join operator, limit operator, offset operator, select operator, set operator, and/or any other operator that can filters out rows from given set of rows based on filtering parameters to output a subset of the set of rows. The expression evaluation operator 2524 can correspond to a mathematical expression, a Boolean expression, and/or any other expression that can be performed upon individual rows. The expression evaluation operator 2524 can optionally be implemented as any scalar query operator. Alternatively or in addition, the expression evaluation operator 2524 can be implemented as a type of operator that generates one or more output columns for a set of rows by computing a value for each given row in the set of rows as a function of other column values of the given row. The expression evaluation operator 2524 can correspond to an operator that can induce errors and/or cause exceptions to be thrown during its execution upon one or more rows, such as an expression that includes dividing by a value determined for each row that can cause exception being thrown due to the expression attempting to divide by zero for a given row.

The operator flow generator module 2517 can optionally generate a query operator execution flows 2517 by pushing down an expression evaluation operator 2524 of the query expression before one or more filtering operators 2523 of the query expression, for example, based on determining the ordering of the resulting query operator execution flow 2517 is optimal and/or has more favorable processing, resource utilization, and/or execution time than an alternative ordering of the resulting query operator execution flow 2517 where the expression evaluation operator 2524 indicated for performance after one or more filtering operators 2523 of the query expression. As illustrated in FIG. 29A, the serialized operator flow ordering 2529 can thus result in the expression evaluation operator 2524 being performed before the filtering operator 2523, despite the query expression indicating the expression evaluation operator 2524 being performed upon output of the filtering operator 2523, which could ordinarily require that the expression evaluation operator 2524 be performed after the filtering operator 2523.

The expression evaluation operator 2524 and/or the filtering operator 2523 can be implemented as particular operators 2520 of the operator execution flow 2517 as discussed in conjunction with FIGS. 24G-24I, where the operator execution flow 2517 is executed via the query execution module 2504 as discussed in conjunction with FIGS. 24G-24I. While not illustrated in FIG. 29A, the operator execution flow 2517 can include one or more other types of operators 2520 necessary for execution of the query expression 2511. While not illustrated in FIG. 29A, the operator execution flow 2517 can optionally a plurality of parallelized branches of operators 2520.

However, rather than performing the expression evaluation operator 2524 and/or the filtering operator 2523 in a conventional fashion, the expression evaluation operator 2524 and/or the filtering operator 2523 can have their respective executions modified to enable delaying of exception throwing, accounting for the fact that the expression evaluation operator 2524 is intended for execution upon only rows included in the filtered output of the filtering operator 2523. The modified implementation of the expression evaluation operator 2524 and/or the filtering operator 2523 to delay enable delaying of exceptions can be indicated by the operator flow generator module 2514 in generating the query operator execution flow 2517.

For example, as illustrated in FIG. 29A, an exception column generation flag 2532 can be included and/or denote an ON and/or other binary value indicating an exception column should be generated in executing the expression evaluation operator 2524. In other embodiments, any other metadata and/or indication denoting whether the expression evaluation operator 2524 should generate an exception column can be indicated in the query operator execution flow 2517 generated by the operator flow generator module 2514. Operator executions of the expression evaluation operator 2524 in executing the corresponding query operator execution flow 2517 of FIG. 29A can be implemented to generate an exception column in accordance with the modified functionality of the expression evaluation operator 2524, for example, as discussed in conjunction with FIG. 29B, based on the exception column generation flag 2532 and/or other indication that the exception column be generated. Operator executions of other expression evaluation operators 2524 in executing the same or different query operator execution flow 2517 can be implemented to execute conventionally, without generating an exception column, based on not having the exception column generation flag 2532 and/or based on not having any indication that the exception column be generated. In particular, in some embodiments, an exception column is only generated for expression evaluation operators 2524 that are applied to output of one or more filtering operators 2523 in query expression 2511, and that were also pushed down before the corresponding one or more filtering operators 2523 for execution serially before these one or more filtering operators 2523 in the resulting query operator execution flow 2517 generated by the operator flow generator module 2514.

Similarly, as illustrated in FIG. 29A, an exception column check flag 2533 can be included and/or denote an ON and/or other binary value indicating an exception column should be checked in executing the filtering operator 2523. In other embodiments, any other metadata and/or indication denoting whether the filtering operator 2523 should check an exception column can be indicated in the query operator execution flow 2517 generated by the operator flow generator module 2514. Operator executions of the filtering operator 2523 in executing the corresponding query operator execution flow 2517 of FIG. 29A can be implemented to check an exception column in accordance with the modified functionality of the expression evaluation operator 2524, for example, as discussed in conjunction with FIG. 29C, based on the exception column check flag 2533 and/or other indication that the exception column be checked. Operator executions of other filtering operators 2523 in executing the same or different query operator execution flow 2517 can be implemented to execute conventionally, without checking an exception column, based on not having the exception column check flag 2533 and/or based on not having any indication that the exception column be checked. In particular, in some embodiments, an exception column is only checked for filtering operators 2523 where one or more expression evaluation operators 2524 is applied to output the filtering operators 2523 in query expression 2511, and where these one or more expression evaluation operators 2524 were pushed down before filtering operators 2523 for execution serially before these one or more filtering operators 2523 in the resulting query operator execution flow 2517 generated by the operator flow generator module 2514.

In some embodiments, an exception column is only checked by some or all filtering operators 2523 that are serially after an expression evaluation operators 2524 that generates the output column. In some embodiments, an exception column is only generated by some or all expression evaluation operators 2524 that are serially before one or more filtering operators 2523 that check this generated exception column.

Figure 29B:
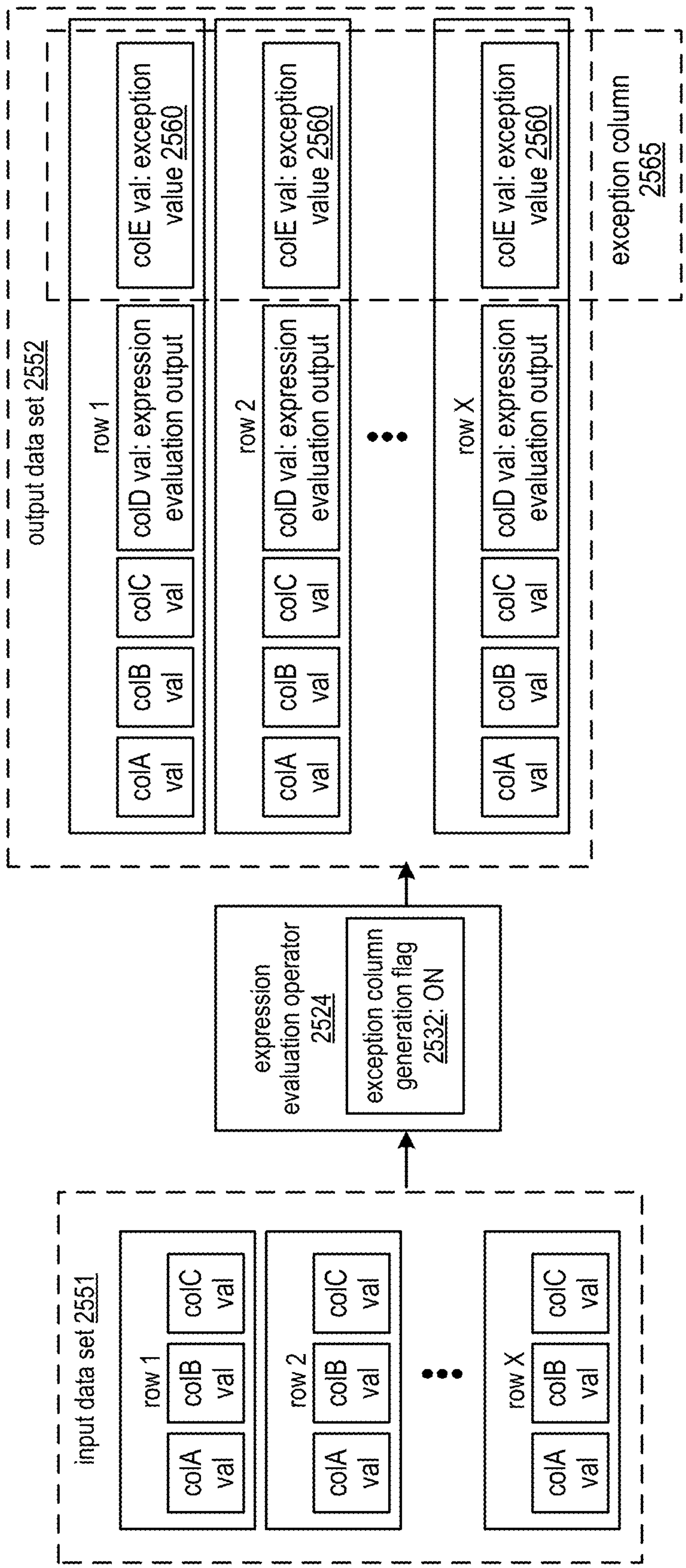
FIG. 29B illustrates a query execution module that executes an expression evaluation operator in accordance with various embodiments.

FIG. 29B illustrates an embodiment of a query execution module 2504 that performs execution of an expression evaluation operator 2524. Some or all features and/or functionality of the query execution module 2504 of FIG. 29B can be utilized to implement the query execution module 2504 of FIG. 29A and/or any other embodiment of the query execution module described herein. Some or all features and/or functionality of execution of the expression evaluation operator 2524 of FIG. 29B can be optionally by performed by the query processing module 2435 of one or more individual nodes 37, for example, in accordance with executing a query operator execution flow 2433 that includes the expression evaluation operator 2524 and/or that is derived from the query operator execution flow 2517.

Executing the expression evaluation operator 2524 can include generating an exception column 2565. For example, the exception column 2565 is generated based on the expression evaluation operator 2524 being denoted to generate the exception column in the query operator execution flow 2517 via exception column generation flag 2532 and/or via a different indication.

In this example, the expression evaluation operator 2524 is performed upon an input data set 2551 that includes a plurality of rows 1-X. The plurality of rows 1-X can be received all at once, and/or can be received in a stream. The expression evaluation operator 2524 can be performed upon each row 1-X one at a time and/or multiple ones of the rows 1-X can be evaluated simultaneously and/or in parallel. For example, the expression evaluation operator 2524 is executed as a plurality of operator executions as rows in the set of rows 1-X are received one at a time, in data block groups, and/or all at once. The expression evaluation operator 2524 can be executed upon the set of rows 1-X based on: the plurality of rows 1-X being read from one or more segments and/or being read from memory; the plurality of rows 1-X being filtered and/or outputted by prior operators serially before the in the expression evaluation operator 2524 in the operator execution flow 2517, and/or based on rows 1-X being included in an operator input data set 2522 of the expression evaluation operator 2524 as discussed in conjunction with FIG. 24H.

Execution of the expression evaluation operator 2524 upon the plurality of rows 1-X can render generation of an output data set 2552. The output data set 2552 can include one or more column values for all of the plurality of rows 1-X based on the expression evaluation operator 2524 not filtering the plurality of rows 1-X. The rows in output data set 2552 can be generated and sent to other operators for processing one at a time, in data block groups, and/or all at once.

A corresponding expression of the expression evaluation operator 2524 can be evaluated for each row, for example, as a function of one or more columns of each row. In this example, the expression evaluation operator 2524 can be evaluated for each row as a function of the value of colA, colB, and/or colC. Output for each row 1-X indicating the result and/or output of the expression evaluated for each row can be generated, for example, as a new output column of the output data set 2552. For example, output for each row 1-X is generated in accordance with a conventional execution of the expression evaluation operator 2524. The output for some or all rows 1-X can be included in the query resultant and/or can be utilized by other operators, for example, where the output is included in an operator input data set 2522 of an operator that is serially after the expression evaluation operator 2524 in the serialized operator flow ordering 2529.

As the corresponding expression of the expression evaluation operator 2524 is evaluated for each row, an exception value 2560 can also be generated to render an exception column 2565, for example, based on the exception column generation flag of the expression evaluation operator 2524 and/or the indication to generate the exception column. A name identifying the exception columns can also be generated by the expression evaluation operator 2524, and can be guaranteed to be unique from names of other columns.

The exception value 2560 of each given row can denote whether or not an error condition occurred in evaluating the expression for the given row via expression evaluation operator 2524. For example, the exception value 2560 is optionally implemented as a binary value denoting whether or not an error occurred.

The exception value 2560 can optionally indicate further information, such as which one of a set of possible error types occurred. For example, if no error occurred and/or no exception would be thrown in performing the expression evaluation operator 2524 for a given row, the exception value for the given row can be set as zero, or a first value denoting no error occurred. If an error occurred in performing the expression evaluation operator 2524 for a given row, the particular type of error that occurred can be identified, and the exception value 2560 for the given row is set as one of a set of other values that are different from the first value, such as one of a set of different negative integer values, based on identifying which one of the set of other values corresponds to the particular type of error that occurred. As a particular example, the exception column 2565 can hold the values of SQLCode of the expression evaluation for each row indicating whether an exception would be thrown and/or which of a set of different exception types occurred.

The output data set 2552 can thus include the expression evaluation output generated for each row 1-X, the exception value 2560 generated for each row 1-X, and/or the values of one or more existing and/or previously generated columns such as colA, colB, and/or colC. The output data set 2552 can be processed by at least one subsequent operator 2520 of the plurality of operators in the operator execution flow 2517, such as filtering operator 2523 and/or one or more operators serially between the expression evaluation operator 2524 and the filtering operator 2523 in the serialized operator flow ordering 2529. For example, rows 1-X of output data set 2552 are included in the operator input data set 2522 of at least one subsequent operator 2520 of the plurality of operators in the operator execution flow 2517, such as filtering operator 2523 and/or one or more operators serially between the expression evaluation operator 2524 and the filtering operator 2523 in the serialized operator flow ordering 2529. In embodiments where one or more individual nodes execute the expression evaluation operator 2524, these nodes 37 can optionally send exception values 2560 of the exception column 2565 and/or other portions of output data set 2552 as output data blocks to a different node 37 for processing in accordance with the query execution plan 2405.

Generating the exception column 2565 in this fashion enables exception throwing and/or query aborting to be delayed, and for query execution to continue despite exceptions and/or errors that may have occurred in execution of expression evaluation operator 2524. In particular, by storing the information regarding these errors as exception values 2560 in exception column 2565, these exceptions can be delayed until the filtering operator 2523 is performed. Therefore, in these cases where the expression evaluation operator 2524 is indicated to generate an exception column 2565 as part of its execution, expression evaluation failure does not immediately terminate the query, it instead stores the corresponding SQLCode and/or information regarding the error in the exception column and continues. In particular, rather than throwing an exception and/or aborting the query execution when an error condition occurs in performing expression evaluation operator 2524 for a given row, information regarding the error is simply stored as the exception value 2560 for the corresponding row. The query execution can thus continue even when the exception value 2560 for one or more rows 1-X indicates an error condition occurred and/or an exception to be thrown, where the expression evaluation operator 2524 generates output data set 2552 to include all rows 1-X, and/or where other operators are optionally executed upon output data set 2552 despite any exceptions and/or errors that occurred in performing expression evaluation operator 2524 for one or more of the rows 1-X.

Figure 29C:
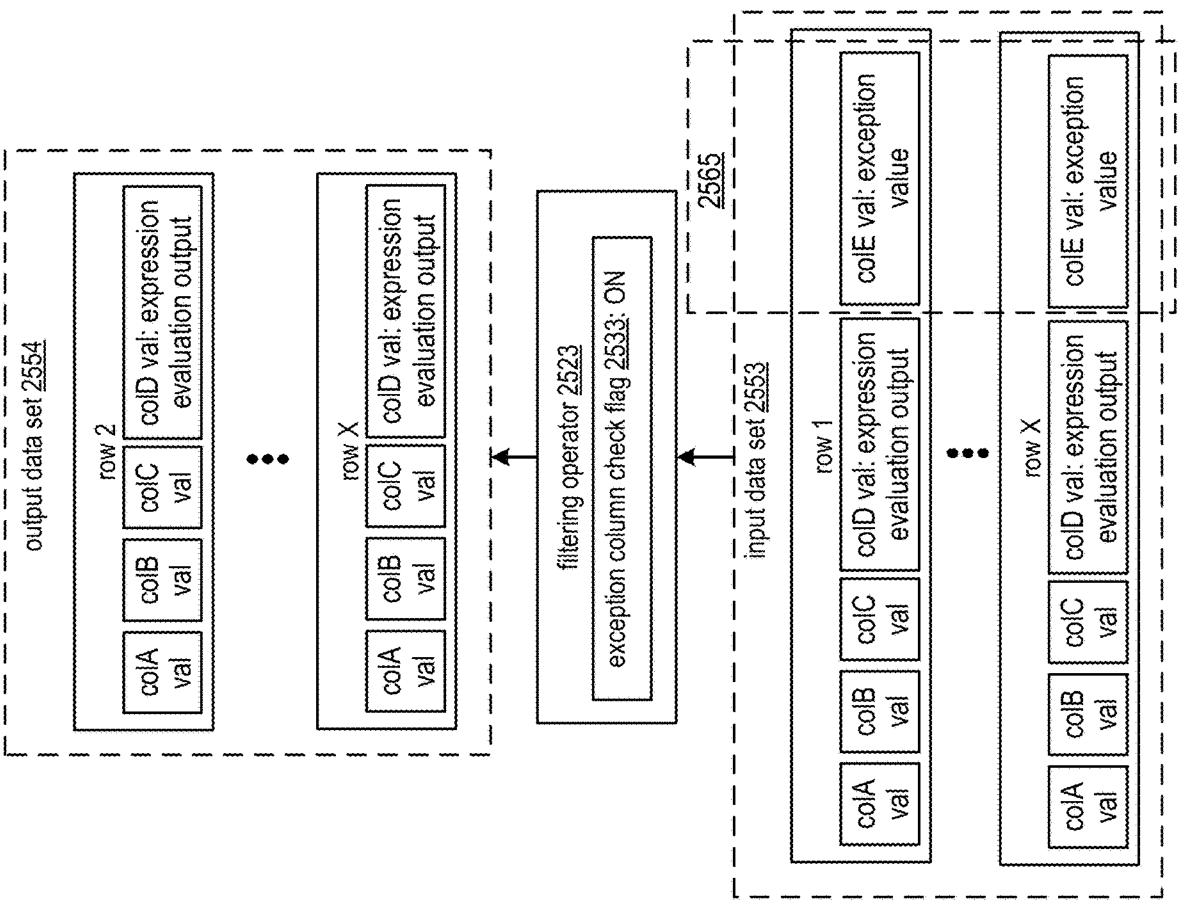
FIG. 29C illustrates a query execution module that executes a filtering operator in accordance with various embodiments.

FIG. 29C illustrates an embodiment of a query execution module 2504 that performs execution of a filtering operator 2523. Some or all features and/or functionality of the query execution module 2504 of FIG. 29C can be utilized to implement the query execution module 2504 of FIG. 29A and/or any other embodiment of the query execution module described herein.

Executing the filtering operator 2523 can include checking an exception column 2565. for example, the exception column 2565 is checked based on the filtering operator 2523 being denoted to check the exception column in the query operator execution flow 2517 via exception column check flag 2533 and/or via a different indication.

In this example, the filtering operator 2523 is performed upon an input data set 2553 that includes plurality of rows 1-X. The plurality of rows 1-X can be received all at once, and/or can be received in a stream. The plurality of rows 1-X include an exception column 2565 that includes a plurality of exception values 2560. In some embodiments, this exception column 2565 was generated as output of an expression evaluation operator 2524 included in the same query operator execution flow 2517, for example, as discussed in conjunction with FIG. 29B.

The filtering operator 2523 can be performed upon each row 1-X one at a time and/or multiple ones of the rows 1-X can be evaluated simultaneously and/or in parallel. For example, the filtering operator 2523 is executed as a plurality of operator executions as rows in the set of rows 1-X are received one at a time, in data block groups, and/or all at once. The filtering operator 2523 can be executed upon the set of rows 1-X based on: the plurality of rows 1-X being outputted by the expression evaluation operator 2524; the plurality of rows 1-X being filtered and/or outputted by prior operators serially before the filtering operator 2523 and serially after the in the expression evaluation operator 2524 in the operator execution flow 2517; and/or based on rows 1-X being included in an operator input data set 2522 of the filtering operator 2523 as discussed in conjunction with FIG. 24H.

Execution of filtering operator 2523 upon the plurality of rows 1-X can render generation of an output data set 2554. The output data set 2554 can include a subset of the plurality of rows, where one or more column values for only ones of the of the plurality of rows 1-X that meet and/or otherwise compare favorably to filtering parameters of the filtering operator 2523. For example, the filtering parameters denote whether each given one of the plurality of rows be included in the output data set 2554 as a function of column values of colA, colB, and/or colC. Note that in some embodiments, the filtering parameters are not a function of the output values of the expression evaluation operator 2524 based on the expression evaluation operator 2524 being expressed to be performed upon output of the filtering operator 2523 in the query expression 2511. Rows in output data set 2552 can be generated and sent as resultant data blocks and/or data block for processing via other operators for processing one at a time, in data block groups, and/or all at once.

In this example, the subset of the plurality of rows 1-X includes at least row 2 and row X based on row 2 and row X adhering to the filtering parameters. However, the subset of the plurality of rows 1-X in this example does not include row 1 based on row 1 not adhering to the filtering parameters.

Once a given rows of the set of rows 1-X is processed via filtering operator 2523 and determined to meet the filtering parameters, rather than being included in the output data set 2554 automatically, these adhering rows first have their exception value 2560 checked. For example, the exception value 2560 of each row determined to meet the filtering parameters can be checked based on the exception column check flag of the expression evaluation operator 2524 and/or the indication to generate the exception column. In some embodiments, the exception values of the exception column 2565 are checked based on a name of the exception column 2565 generated by the expression evaluation operator 2524 that is known and/or communicated to the filtering operator 2523, for example, in conjunction with denoting checking of the exception column via the exception column check flag.

Note that any rows that are not determined to meet the filtering parameters need not have their exception value 2560 checked, as these rows were never intended to be evaluated via the expression evaluation operator 2524 based on the query expression 2511 indicating the expression evaluation operator 2524 be applied only to the output of the filtering operator 2523. In this example, row 2 and row X have their exception value 2560 checked based on adhering to the filtering parameters, while row 1 does not have its exception value 2560 checked based on not adhering to the filtering parameters.

As the filtering operator 2523 writes and/or otherwise outputs rows at runtime, it must check the exception column and make sure the corresponding exception value 2560 is zero and/or otherwise indicates no error. If exception value 2560 of a given row being checked is non-zero and/or otherwise indicates an error condition occurred when the expression was evaluated for the given row via expression evaluation operator 2524, the query can be aborted.

In cases where the exception value 2560 indicates the code for a particular exception, the particular exception can be thrown based on being indicated in exception value 2560. For example, the correct exception is generated and thrown at that time, based on the SQLCode value or other unique value of the exception value 2560 identifying the exception. This can include transmitting the exception value 2560 indicating the error condition occurred to a client device for display via a display device. If the exception value 2560 indicates a particular error, the error code of exception value 2560 and/or corresponding descriptive text mapped to the particular error code can be transmitted to the client device for display via a display device. For example, this client device can correspond to a particular client device and/or end user from which the query expression was received. As another example, this client device can correspond to a user and/or administrator of the database system 10, such as a client device implemented as a computing device 18 of administrative subsystem 15 and/or another computing device communicating with the database system 10. The exception value 2560 and/or other corresponding information regarding the error can be transmitted via external network 17 and/or system communication resources 14.

In some embodiments, the query is aborted immediately in response to checking the exception value 2560 of row that adheres to the filtering parameters of filtering operator 2523, and determining this exception value 2560 indicates an error condition and/or an exception be thrown. In such cases, the query can be aborted before the filtering operator 2523 has processed all input rows 1-X, for example, based on: processing rows one at a time and/or as a plurality of separate data blocks; one or more rows still pending in operator input data set 2522 filtering operator 2523 at the time the exception value 2560 indicating the error condition is checked; and/or based on not all rows having yet having been received from a prior operator 2520 at the time the exception value 2560 indicating the error condition is checked. In such cases, continuing to process these additional rows via filtering operator 2523 and/or proceeding with processing output of the filtering operator 2523 is not necessary and thus not performed due to the error being identified and/or the exception being thrown.

In some cases, any remaining input rows 1-X are processed and also have their exception value 2560 checked, even if the exception value 2560 of at least one row that was already processed indicated an error condition requiring aborting of the query. This can be ideal to determine whether multiple errors occurred for multiple rows. For example, all exception values 2560 for all rows that adhere to the filtering requirements are checked regardless of whether one of these checked exception values 2560 is already identified as having an error. In some cases, all exception values 2560 for all rows that adhere to the filtering requirements, and/or a subset of the exception values 2560 for rows that adhere the filtering requirements that indicate one or more types of errors occurred, are transmitted to a client device for display via a display device, for example, in conjunction with textual information mapped to the types of errors denoting the set of multiple errors that occurred.

If exception value 2560 of every given row that is checked by the filtering operator 2523 indicates no error condition occurred when the expression was evaluated for each of these given rows via expression evaluation operator 2524, the query can continue. In particular, the query only continues when every one of the set of rows 1-X identified to adhere to the filtering parameters of the filtering operator 2523, and that thus are outputted as the subset of rows in output data set 2554, have exception values 2560 indicating no error and/or no exception thrown. The output data set 2554 is thus generated normally, and can be included in a query resultant and/or can be sent to another operator for processing, for example, via inclusion in an operator input data set 2522 of a subsequent operator sequentially after the filtering operator 2523 in the operator execution flow 2517. As illustrated in FIG. 29C, the exception column 2565 can be projected out, where the output data set 2554 does not include exception values 2560 for any of its rows, as these exception values 2560 are no longer necessary.

Note that the query continues even if one or more rows 1-X in the input data set 2553 have exception values 2560 indicating errors occurred, so long as all of these more rows 1-X in the input data set 2553 have exception values 2560 indicating errors occurred do not adhere to the filtering parameters of the filtering operator 2523. In particular, these errors are not relevant, as the corresponding rows were never intended to have the expression evaluation operator 2524 performed because they are not included in the output of the filtering operator 2523 and because the query expression indicated the expression evaluation operator 2524 be performed upon only some or all rows that were outputted by the filtering operator 2523.

Some or all features and/or functionality of execution of the filtering operator 2523 of FIG. 29C can be optionally by performed by the query processing module 2435 of one or more individual nodes 37, for example, in accordance with executing a query operator execution flow 2433 that includes the expression evaluation operator 2524 and/or that is derived from the query operator execution flow 2517. As a particular example, a first one or more nodes 37 executes the expression evaluation operator 2524 for a given operator execution flow 2517 based on being included in a first level of the query execution plan 2405 assigned to execute the expression evaluation operator 2524, and a second one or more nodes 37 executes the filtering operator 2523 for the given operator execution flow 2517 based on being included in a second level of the query execution plan 2405 assigned to execute the filtering operator 2523 that is above the first level. The first set of nodes 37 can each send their output, including the exception values 2560 of the exception column 2565 and/or other portions of output data set 2552, to an assigned one of the second one or more nodes 37 included in the second level of the query execution plan 2405. Each of the second one or more nodes 37 can execute the filtering operator 2523 by accessing and checking exception values 2560 of the exception column 2565 received from one or more child nodes in the first level, or another level between the first level and the second level.

Figure 29D:
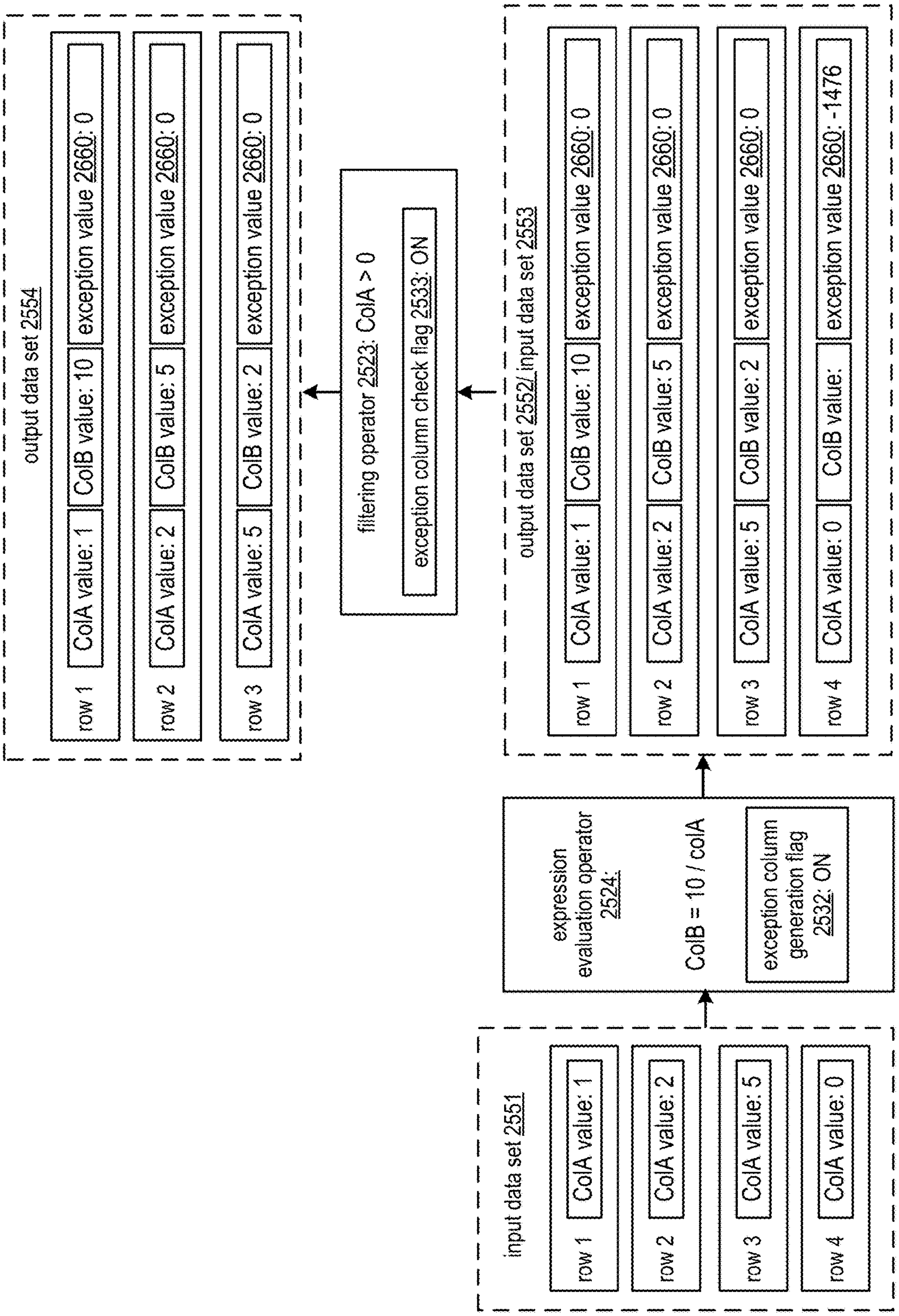
FIGS. 29D-29E illustrate query execution module that execute example query operator execution flows in accordance with various embodiments.
Figure 29E:
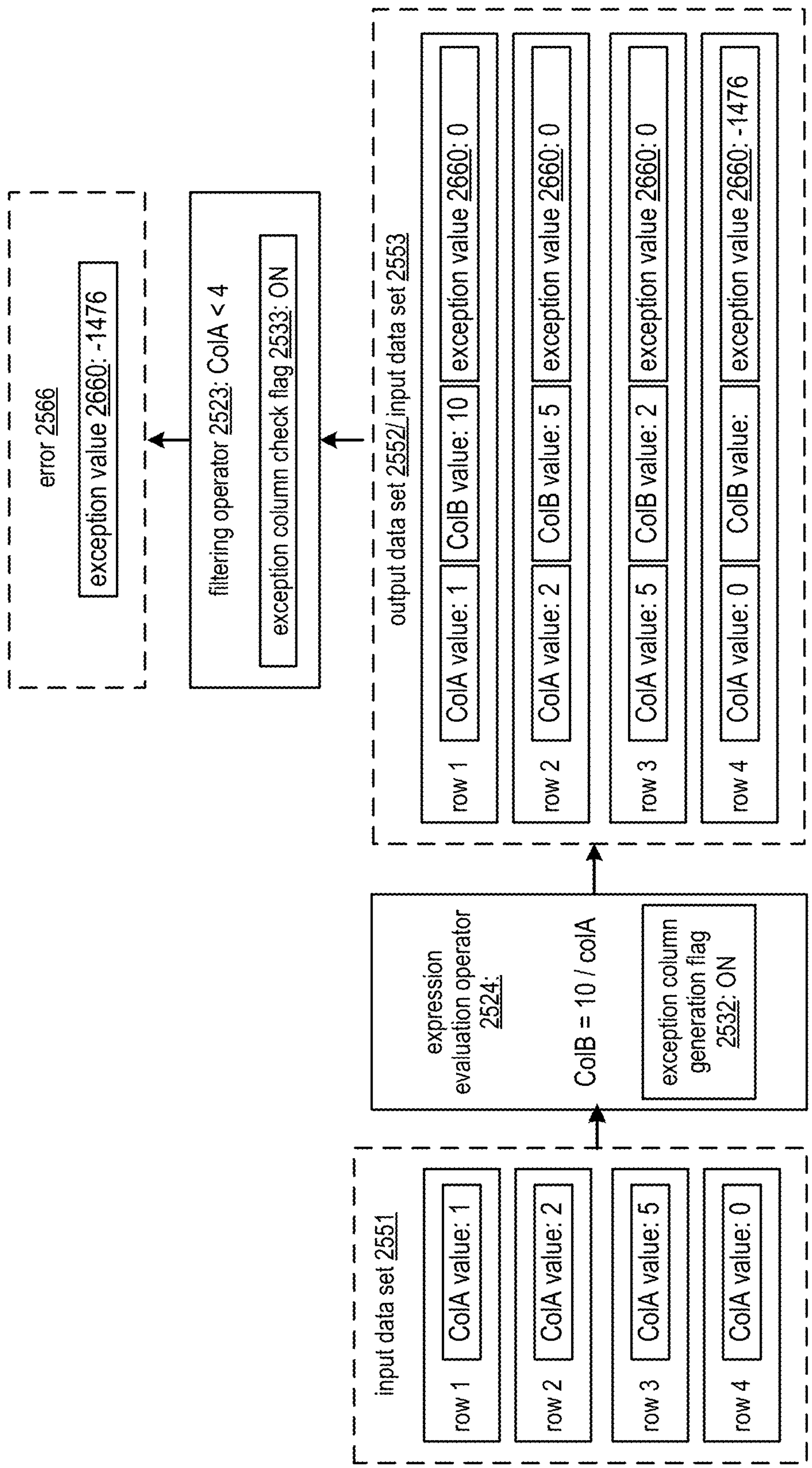

FIGS. 29D and 29E illustrate embodiments of a query execution module 2504 that executes example operator execution flows 2517 that include an expression evaluation operator 2524, and a filtering operator 2523 serially after the expression evaluation operator 2524. The expression evaluation operator 2524 of both FIG. 29D and FIG. 29E can have its exception column generation flag 2532 set to "ON" and/or can otherwise be denoted to generate the exception column as discussed in conjunction with FIG. 29B. The filtering operator 2523 of both FIG. 29D and FIG. 29E can have its exception column check flag 2533 set to "ON" and/or can otherwise be denoted to check the exception column as discussed in conjunction with FIG. 29C. Some or all features and/or functionality of the query execution module 2504 of FIG. 29D and/or FIG. 29E can be utilized to implement the query execution module 2504 of FIG. 29A and/or any other embodiment of the query execution module 2504 discussed herein.

FIG. 29D illustrates an example where the execution of the query continues and is not interrupted. In this example, the expression evaluation operator 2524 divides 10 by the value of colA of each row in the input data set 2551. In this example, row 4 thus renders an error in performing expression evaluation operator 2524 upon row 4 based on colA of row 4 having a value of zero. The exception value 2560 for row 4 can indicate an error occurred. In this example, the exception value 2560 for row 4 is set as −1476 to denote the SQLCode for the exception caused due to attempting to divide by zero.

In this example, the other rows 1, 2, and 3 render no errors when expression evaluation operator 2524 is performed upon these rows, and thus have exception values 2560 indicating no error occurred. In this the exception value 2560 for rows 1, 2, and 3 is set as 0 to denote the SQLCode indicating no exception.

These exception values 2560 are generated as output data set 2552 of expression evaluation operator 2524, which is utilized as input data set 2553 of filtering operator 2523. The filtering parameters of filtering operator 2523 in this example is colA>0. Only rows 1, 2, and 3 are identified to meet the filtering parameters of filtering operator 2523 and therefore, only the exception values 2560 of rows 1, 2, and 3 are checked. Because the exception values 2560 of all rows that pass the filtering parameters of filtering operator 2523 indicate no errors in this example, the execution continues with no errors. In particular, while row 4 has an exception value 2560 denoting an error, this exception value is not checked because row 4 does not meet the filtering parameters of filtering operator 2523 due to its value of colA being zero.

FIG. 29E illustrates a similar example where the execution of the query is aborted. In this example, the expression evaluation operator 2524 again divides 10 by the value of colA of each row in the input data set 2551. The same output data set 2552 as the example of FIG. 29D is therefore generated, where row 4 again renders an error in performing expression evaluation operator 2524 upon row 4 based on colA of row 4 having a value of zero, and where the other rows 1, 2, and 3 render no errors when expression evaluation operator 2524 is performed upon these rows.

In this example, the filtering parameters of filtering operator 2523 is colA>4. Therefore, rows 4 is identified to meet the filtering parameters of filtering operator 2523 and has its exception values 2560 checked. Because the exception values 2560 of row 4, which passes the filtering parameters of filtering operator 2523, indicates an error in this example, the execution aborts. In particular, an error 2566 can be generated and/or displayed, for example, as an exception that is thrown. In particular, the SQLCode for the exception caused due to attempting to divide by zero can be thrown and/or displayed to a user via a display device of a client device based on this type of error being mapped to row 4's exception values 2560 of −1476.

In some embodiments, one or more scalar functions can be designated to never throw exceptions and/or to never return an error, regardless of the input to these scalar functions. The corresponding expression evaluation operators 2524 are thus never designated to generate exception columns, and when these expression evaluation operators 2524 are pushed before one or more filtering operators 2523, none of the filtering operators 2523 need to perform exception column checks. The operator flow generator module 2514 can determine that the corresponding expression evaluation operators 2524 for one of these scalar functions that are identified to never throw exceptions and/or errors are not designated to generate exception columns in the resulting query operator execution flow, and/or can determine that any filtering operators 2523 after these expression evaluation operators 2524 not designated to check exception columns in the resulting query operator execution flow based on these expression evaluation operators 2524 never throwing errors.

In some embodiments, multiple expression evaluation operators 2524 are performed prior to a filtering operator, and all generate exception columns 2565. Thus, multiple exception columns 2565 can optionally be included in input data set 2553 of a filtering operator 2523 designated to perform an exception column check. This filtering operator 2523 can optionally check each of a plurality of exception values 2660 of each given row that meets the corresponding filtering parameters of the filtering operator 2523 based on the incoming rows having multiple exception values 2660 generated via performance of multiple expression evaluation operators 2524 upon these rows. If any of the plurality of exception values 2660 indicate an error for a given row that meets the filtering parameters, the query is aborted and/or the corresponding exception is thrown. The query continues only if all of the plurality of exception values 2660 for all row that meets the filtering parameters indicate no error.

In other embodiments, when multiple expression evaluation operators 2524 that generate exception columns are performed upon rows prior to a filtering operator 2523 designated to perform the exception column check, only one exception value ever persists for any given row, for example, to preserve memory resources as the query is executed. For example, if an expression evaluation operator 2524 is designated to generate an exception column 2565, and receives rows as input that already have an exception column 2565 generated via a prior expression evaluation operator 2524, the expression evaluation operator 2524 can generate its exception column 2565 by selecting the exception value for each given row as the lowest of: the exception value generated by evaluating the expression of the expression evaluation operator 2524, and the exception value already indicated in the row's exception column as input. The expression evaluation operator 2524 can then include only the exception values of this new exception column in its output, and project out or otherwise not include the previous exception values for the set of rows. This mechanism of only preserving the lowest exception value generated for each row can be guaranteed to preserve the instance of any errors in the corresponding rows when the errors are always indicated as negative exception values 2560 and when no error is always indicated an exception value 2560 of zero, while only requiring one exception column ever need be passed to the next operator.

Figure 29F:
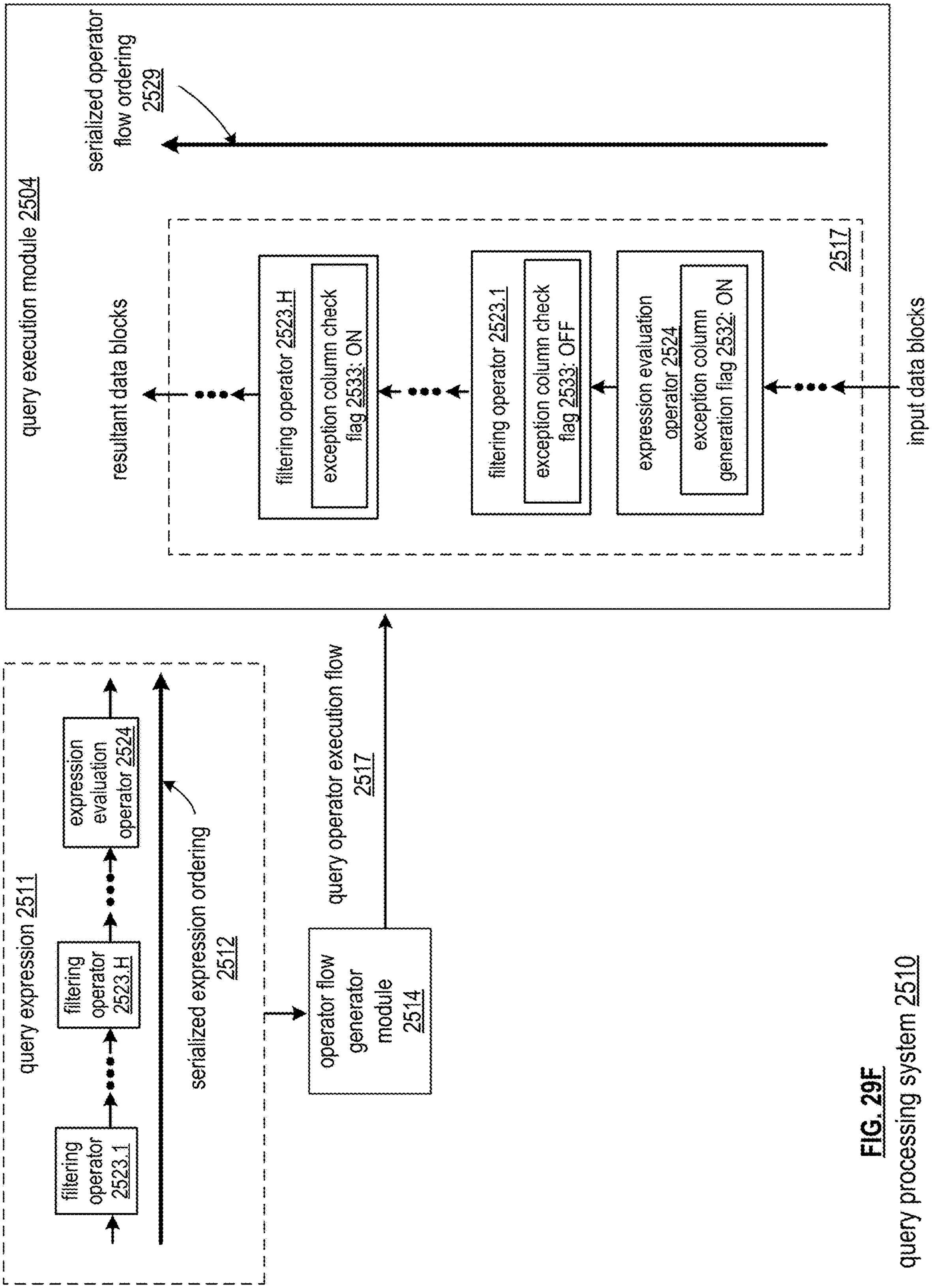
FIG. 29F illustrates a query processing system that executes a query operator execution flow with multiple filtering operators in accordance with various embodiments.

FIG. 29F illustrates an embodiment of a query processing system 2510 that selects and executes a query operator execution flow 2517 where an expression evaluation operator 2524 is pushed down before multiple filtering operators 2523.1-2523.H. Some or all features and/or functionality of the query processing system 2510 of FIG. 29F can be utilized to implement the query processing system 2510 of FIG. 24G and/or any other embodiment of the query processing system 2510 discussed herein.

As illustrated in FIG. 29F, a query expression 2511 can include an expression evaluation operator 2524 to be performed upon output of multiple filtering operators 2523.1-2523.H. The filtering operators 2523.1-2523.H can correspond to the same or different type of operator, for example, where one of the set of filtering operators 2523.1-2523.H is a SELECT operator and another one of the set of filtering operators 2523.1-2523.H is a JOIN operator. The operator flow generator module 2514 can determine to push the expression evaluation operator 2524 before some or all of this set of multiple filtering operators 2523.1-2523.H, for example, based on an optimizer of the operator flow generator module 2514 determining that performance of the expression evaluation operator 2524 before some or all of this set of multiple filtering operators 2523.1-2523.H renders optimal and/or improved execution compared to performance of the expression evaluation operator 2524 after this set of multiple filtering operators 2523.1-2523.H. While not illustrated in FIG. 29F, the operator flow generator module 2514 can also optionally rearrange the ordering of the filtering operators 2523.1-2523.H in the serialized operator flow ordering 2529 to be different from a specified ordering of the filtering operators 2523.1-2523.H in the serialized expression ordering 2512.

Rather than checking the exception column via every filtering operator 2523.1-2523.H, the operator flow generator module 2514 can denote that only a final one of the set of filtering operators 2523.1-2523.H in the serialized operator flow ordering 2529 checks the exception column. In FIG. 29F, this is illustrated as only filtering operator 2523.H having its exception column check flag 2533 set to ON, while all other filtering operators 2523.1-2523.H-1 have their exception column check flags 2533 set to OFF. Thus, despite the expression evaluation operator 2524 being pushed down before all of these filtering operators 2523.1-2523.H, only the final filtering operator 2523.H performs the exception column check as discussed in conjunction with FIG. 24I, while the other filtering operators 2523.1-2523.H are executed to perform their filtering conventionally and/or without checking the exception column. This still renders a correct query result, as the subset of rows outputted by the final filtering operators 2523.1-2523.H corresponds to the subset of rows rendered by applying all filtering operators 2523.1-2523.H, due to the other filtering operators 2523.1-2523.H-1 being applied before the final filtering operators 2523.1-2523.H to perform their own respective filtering. Performing the exception column check via only one of these filtering operators, rather than all of these filtering operators, further improves the technology of database systems by decreasing the number of exception column checks that are performed, which improves query execution efficiency while still guaranteeing that exceptions are thrown correctly.

Figure 29G:
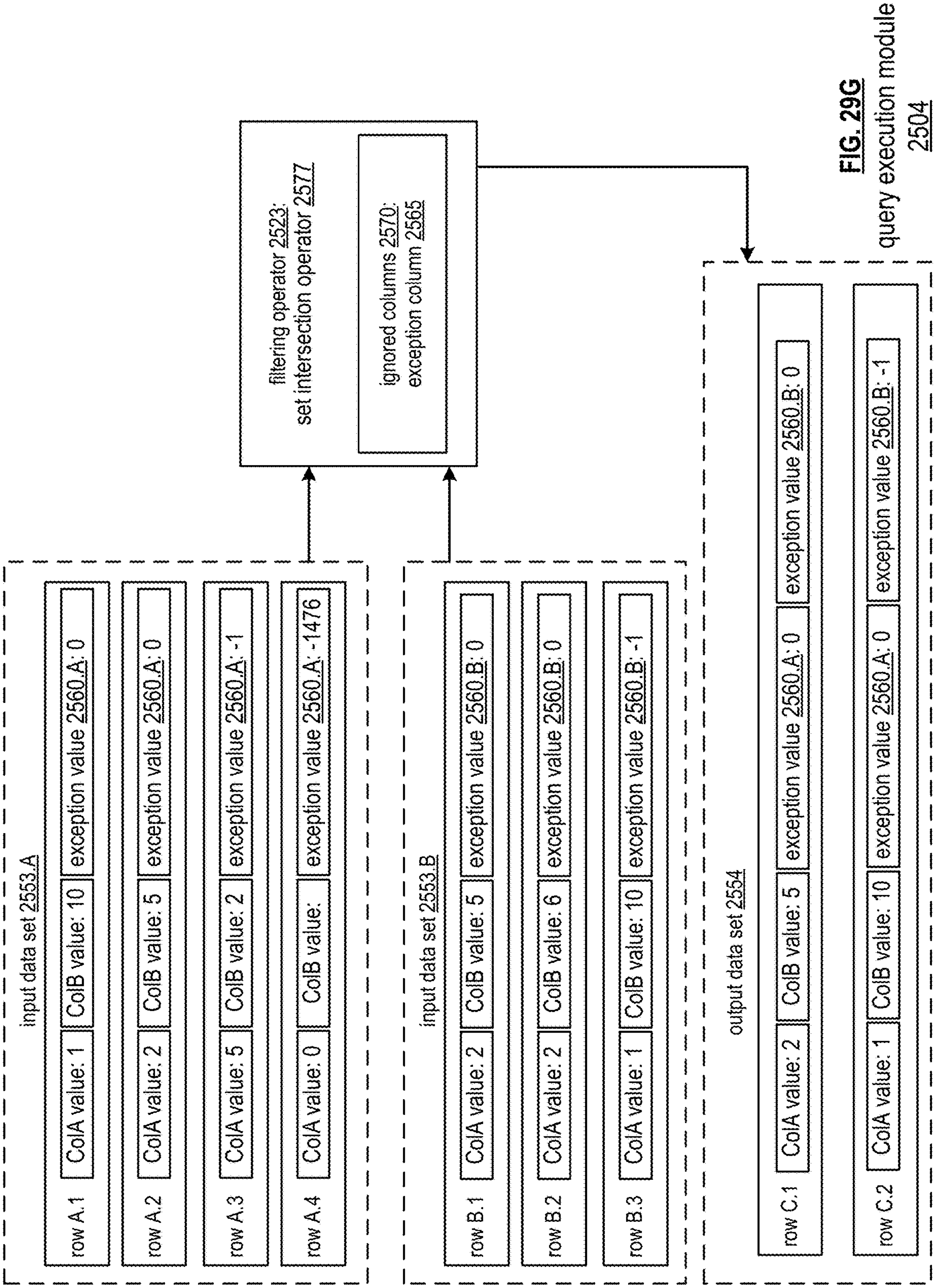
FIG. 29G illustrates a query execution module that executes an intersection operator in accordance with various embodiments.

FIG. 29G presents an embodiment of a query execution module 2504 illustrating execution of a filtering operator 2523 implemented as a set intersection operator 2577. Some or all features and/or functionality of query execution module 2504 of FIG. 29G can be utilized to implement the query processing system 2510 of FIG. 24G and/or any other embodiment of the query processing system 2510 discussed herein. The set intersection operator 2577 of FIG. 29G can implement the filtering operator 2523 of FIG. 29A and/or can implement any one of the filtering operators 2523.1-2523.H of FIG. 29F. The set intersection operator 2577 can be implemented in a same or similar fashion as the INTERSECT all operator of FIGS. 28A and/or 28B.

In particular, the set intersection operator 2577 of FIG. 29G is operable to handle exception columns 2565 generated by an expression evaluation operator 2524 that was pushed down before the set intersection operator in generating of the query operator execution flow. In this example, the set intersection operator 2577 of FIG. 29G does not check the exception columns 2565, for example, based on not having an exception column check flag 2533 turned ON and/or based on being performed before another filtering operator 2523 that is designated to perform the exception column check as discussed in conjunction with FIG. 29F. While not illustrated in FIG. 29G, the set intersection operator 2577 of FIG. 29G can be further operable to check and/or project out the exception columns 2560 as discussed in FIG. 29C, for example, when the set intersection operator is a final filtering operator of a set of filtering operators 2523.1-2523.H and/or is otherwise designated to perform the exception column check.

Whether the set intersection operator 2577 is performing the exception column check or not, the set intersection operator must be modified from its conventional execution to handle the exception column received as input. In particular, as the exception column 2565 is not an actual column of the corresponding rows and is only generated for the purposes of delaying exceptions, the exception values in these columns should not influence the output of the set intersection operator 2577, as doing so could render an incorrect query resultant.

This can be achieved via a denoted set of one or more ignored columns 2570. Any columns in the input data sets 2553.A and 2553.B to the set intersection operator 2577 that are denoted as ignored columns 2570 for the set intersection operator 2577 are thus ignored by the set intersection operator when determining output data set 2554 as the set interaction of input data sets 2553.A and 2553.B. In particular, rather than operating conventionally by using every column in the input data sets 2553.A and 2553.B to perform a hash computation to check for duplicates where these duplicates correspond to rows to of the set intersection of these input data sets to be included in the output, the set intersection operator 2577 can perform modified functionality by not utilizing the one or more ignored columns 2570 when performing this hash computation to check for duplicates. In some embodiments, other types of set operators that perform hash computations upon all column values of one or more input sets of rows can similarly be modified to not perform these hash computations upon a denoted one or more ignored columns 2570.

The ignored columns 2570 for one or more set intersection operators 2577 and/or one or more other operators 2520 optionally can be determined by the operator flow generator module 2514 and/or can be indicated as metadata or other information in the resulting operator execution flow 2517. The ignored columns 2570 can be denoted based on names of the corresponding columns or other identifiers of the corresponding columns.

In this case, the ignored columns 2570 denotes the exception column 2565. For example, the name of the exception column 2565 and/or other information identifying the exception column 2565 can be utilized by the set intersection operator 2577 and/or can be included in a set of ignored columns 2570 communicated to the set intersection operator 2577 and/or indicated in metadata of the query operator execution flow 2517. In particular, to ensure that all necessary exception values are preserved and eventually checked, the operator flow generator module 2514 can determine and exception column 2565 be indicated as ignored columns 2570 for one or more set intersection operators 2577 of the query operator execution flow 2517 based on these one or more set intersection operators 2577 being serially after one or more corresponding expression evaluation operators 2524 that generate exception columns, and based on these one or more set intersection operators 2577 being serially before a final filtering operator designated to check these exception columns.

Based on the ignored columns 2570 of the set intersection operator 2577 indicating the exception column 2565, the exception column is thus not utilized by the set intersection operator 2577 in generating its output data set 2554 as the set intersection of input data sets 2553.A and 2553.B. In the example illustrated in FIG. 29G, input data set 2553.A includes row A.1 with a colA value of 1, a colB value of 10, and an exception value 2560 of 0. Input data set 2553.B includes row B.3 with a colA value of 1, a colB value of 10, and an exception value 2560 of −1. If the set intersection operator 2577 was performed conventionally, these rows would not render an intersection between input data set 2553.A and 2553.B based on having different exception values, and thus not having all columns with equal values. However, by ignoring the exception column 2565 of each of these input data sets 2553 based on the exception column 2565 being indicated as an ignored column 2570, only colA and colB values are evaluated, and the intersection is thus generated to include a row with a colA of value 1 and a colB value of 10. Note that other rows with equal column values, including equal exception values 2560, are also included in the set intersection, even though their exception values 2560 were ignored and did not influence their inclusion in the set intersection.

As illustrated in FIG. 29G, the set intersection operator 2577 can further preserve the exception columns 2565 of one or both input data sets in the output, despite these exception columns 2565 being ignored by the set intersection operator 2577. This can be important when these exception columns 2565 still need to be checked by a filtering operator 2523 that is serially after the set intersection operator 2577 in the operator execution flow 2517.

In the example illustrated in FIG. 29G, both exception values 2560 for each duplicate pair of rows are included in output data set 2554. The output data set 2554 can thus include two exception columns and/or a single exception column with an exception value expressed as a tuple indicating both exception values 2560. In such embodiments, a subsequently performed filtering operator 2523 that is designated to check the exception column can check all exception values 2560 indicated for every row, such as both exception values 2560 indicated in output data set 2554, to ensure that any error in performing the corresponding expression evaluation operator 2524 is checked.

In some cases, only the lowest of the two exception values of a pair of rows rendering intersection is included in output data set 2554. This renders a single exception column in the intersection operator's output data set 2554, where each row still has only one exception value 2560. This mechanism can be guaranteed to preserve the instance of any errors in the corresponding rows of either input data set 2553.A and 2553.B when the errors are always indicated as negative exception values 2560 and when no error is always indicated an exception value 2560 of zero, while only requiring one exception column be passed to the next operator.

In some cases, only one of the input data sets 2553.A or 2553.B has an exception column. For example, input data sets 2553.A includes an exception column and input data set 2553.B does not include an exception column based on an expression evaluation operator 2524 denoted to generate an exception column being performed in a first parallelized track of the query operator execution flow 2517 that renders generation of input data sets 2553.A, and based on no expression evaluation operator 2524 denoted to generate an exception column being performed in a second parallelized track of the query operator execution flow 2517 that renders generation of input data sets 2553.B. In such cases, the exception column of input data sets 2553.A is ignored, and is not ignored for input data sets 2553.B based on input data set 2553.B not having the exception column.

In various embodiments, a query processing system includes at least one processor and a memory that stores operational instruction. The operational instructions, when executed by the at least one processor, cause the query processing system to receive a query expression for execution indicating a filtering operator and further indicating an expression evaluation for performance upon output of the filtering operator. An operator execution flow for the query expression that includes a serialized ordering of a plurality of operators indicating performance of the filtering operator serially after performance of the expression evaluation is generated, and execution of this operator execution flow is facilitated. Facilitating execution of the operator execution flow can include generating an exception column indicating an exception value generated for each of a set of rows based on performing the expression evaluation upon the each of the set of rows, and/or applying the filtering operator of the operator execution flow. Applying the filtering operator of the operator execution flow can include identifying a subset of the set of rows that meet filtering parameters of the filtering operator. When the exception value of at least one of the subset of the set of rows indicates an error condition in performing the expression evaluation, execution of the operator execution flow can be aborted. When the exception value of every one of the subset of the set of rows indicates no error in performing the expression evaluation, the subset of the set of rows can be outputted and execution of the operator execution flow can continue.

Figure 29J:
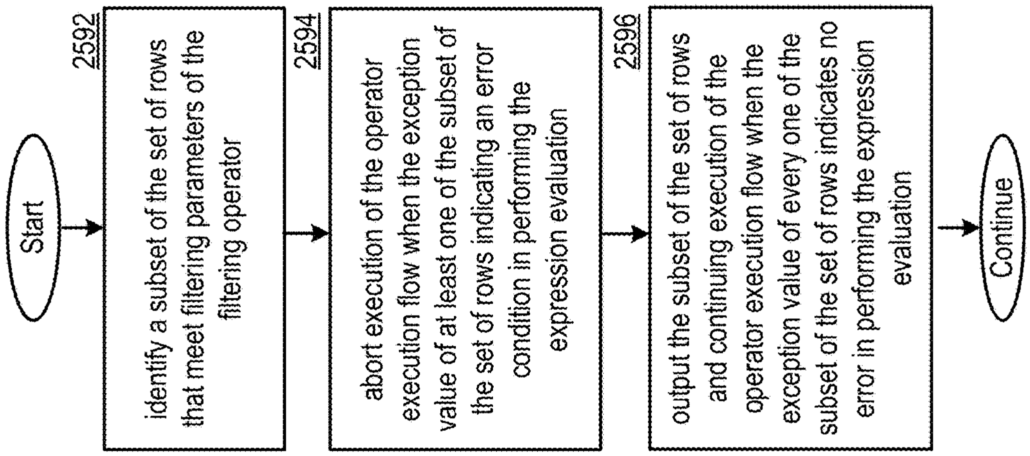
FIGS. 29H-29J are logic diagrams illustrating a method for execution in accordance with various embodiments.
Figure 29I:
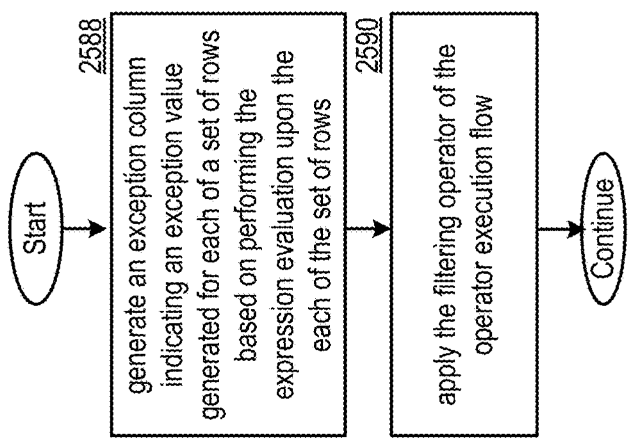
Figure 29H:
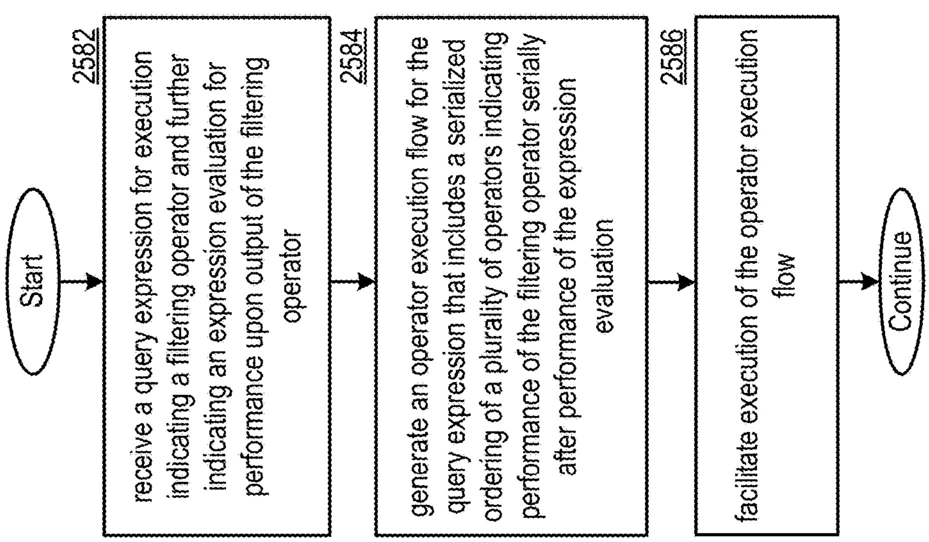

FIGS. 29H, 29I, and 29J illustrate methods for execution by at least one processing module of a database system. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIGS. 29H, 29I, and/or 29J. In particular, a node 37 can utilize the query processing module 2435 to execute some or all of the steps of FIGS. 29H, 29I, and/or 29J, where multiple nodes 37 implement their own query processing modules 2435 to independently execute the steps of FIGS. 29H, 29I, and/or 29J, for example, to facilitate execution of a query as participants in a query execution plan 2405. Some or all of the method of FIGS. 29H, 29I, and/or 29J can be performed by the query processing system 2510, for example, by utilizing an operator flow generator module 2514 and/or a query execution module 2504. In particular, some or all of the method of FIGS. 29H, 29I, and/or 29J can be performed via one or more operator executions of an expression evaluation operator 2524 and/or a filtering operator 2523. Some or all of the steps of FIGS. 29H, 29I, and/or 29J can optionally be performed by any other processing module of the database system 10. Some or all of the steps of FIGS. 29H, 29I, and/or 29J can be performed to implement some or all of the functionality of the query processing system 2510 as described in conjunction with FIGS. 29A-29G. Some or all of the steps of FIGS. 29H, 29I, and/or 29J can be performed to implement some or all of the functionality regarding execution of a query via the plurality of nodes in the query execution plan 2405 as described in conjunction with some or all of FIGS. 24A-24I. Some or all steps of FIGS. 29H, 29I, and/or 29J can be performed by database system 10 in accordance with other embodiments of the database system 10 and/or nodes 37 discussed herein.

Step 2582 includes receiving a query expression, such as query expression 2511, for execution indicating a filtering operator, such as filtering operator 2523, and further indicating an expression evaluation, such as expression evaluation operator 2524, for performance upon output of the filtering operator. The query expression can be received from a client device, can be generated via user input, and/or can otherwise be determined. The query expression can be in accordance with a query language such as the Structured Query Language (SQL) and/or another query language.

Step 2584 includes generating an operator execution flow, such as query operator execution flow 2517, for the query expression, for example, by utilizing the operator flow generator module 2514. The operator execution flow can include a serialized and/or parallelized ordering of a plurality of operators. This serialized ordering can indicate performance of the filtering operator serially after performance of the expression evaluation.

Step 2586 includes facilitating execution of the operator execution flow, for example, via query execution module 2504 and/or via a plurality of nodes 37 of a query execution plan 2405. Executing step 2586 of FIG. 29H can include executing some or all of the steps of FIG. 29I.

FIG. 29I presents a method of executing an operator execution flow that indicates performance of a filtering operator serially after performance of an expression evaluation. Step 2588 includes generating an exception column indicating an exception value generated for each of a set of rows based on performing the expression evaluation upon the each of the set of rows. For example, one or more exception values in the exception column can indicate an exception and/or other error in performing the expression evaluation upon a corresponding one of the set of rows. The method can include not throwing an exception and/or not aborting the query due to the exception and/or other error when identified via performance of the expression evaluation, where the exception and/or other error is only indicated in the exception column at this point in time. Step 2590 includes applying the filtering operator of the operator execution flow. Executing step 2590 of FIG. 29I can include executing some or all of the steps of FIG. 29J.

FIG. 29J presents a method of executing a filtering operator of the operator execution flow upon a set of rows after executing an exception value for each of the set of rows via execution of an expression evaluation operator. Step 2592 includes identifying a subset of the set of rows that meet filtering parameters of the filtering operator.

Step 2594 includes aborting execution of the operator execution flow when the exception value of at least one of the subset of the set of rows indicating an error condition in performing the expression evaluation. In various embodiments, aborting execution of the operator execution flow includes throwing an exception based on the exception value of the at least one of the subset of the set of rows. In various embodiments, the method further includes facilitating display, via a display device of a client device, of the exception value of the at least one of the subset of the set of rows based on aborting execution of the operator execution flow.

Step 2596 includes outputting the subset of the set of rows and continuing execution of the operator execution flow when the exception value of every one of the subset of the set of rows indicates no error in performing the expression evaluation. In various embodiments, continuing execution of the operator execution flow includes projecting out the exception column, where the subset of the set of rows does not include the exception column based on projecting out the exception column. For example, the query resultant does not include the exception column and/or the exception column is not utilized by any other operators that are serially after the filtering operator in the operator execution flow.

In various embodiments, execution of the operator execution flow is immediately aborted in response to identifying one of the set of rows that meets the filtering parameters of the filtering operator and that further has a corresponding exception value in the exception column indicating the error condition, and the execution of the operator execution flow is aborted prior to identifying all rows of the set of rows that the meet filtering parameters of the filtering operator as the subset of the set of rows. For example, the method includes determining whether the exception value of any rows in the subset of the set of rows indicates an error in performing the expression evaluation, where the query only continues via step 2596 when all rows in the subset of the set of rows indicate no error, and where the query is aborted if any of the rows in the subset of the set of rows indicates an error. In some cases, this determination is performed as incoming rows to the filtering operator are identified for inclusion in the subset of the set of rows, for example, one row at a time. For example, prior to evaluating all incoming rows outputted from a prior operator in the operator execution flow, the query is aborted based on the filtering operator identifying one of the rows for inclusion in the subset of the set of rows and further based on determining this identified row has a corresponding expression value indicating an error in performing the expression evaluation.

In various embodiments, generating the operator execution flow for the query expression includes indicating performance of an exception value check via the filtering operator, for example, via exception column check flag 2533. Applying the filtering operator of the operator execution flow can include determining whether the exception value of each one of the subset of the set of rows indicates the error condition based on the operator execution flow indicating performance of this exception value check via the filtering operator.

In various embodiments, generating the operator execution flow for the query expression includes indicating performance of the exception value check via the filtering operator is based on the query expression indicating the expression evaluation be performed upon output of the filtering operator and further based on the serialized ordering of the plurality of operators indicating performance of the filtering operator serially after performance of the expression evaluation.

In various embodiments, the operator execution flow includes a plurality of filtering operators, and the operator execution flow indicates performance of the exception value check via the filtering operator for only a proper subset of the plurality of filtering operators that includes the filtering operator. In various embodiments, the filtering operator is included in a proper subset of the plurality of filtering operators based on being identified as final one of the plurality of filtering operators in the serialized ordering of the plurality of filtering operators. In various embodiments, a second filtering operator is serially after the expression evaluation in the serialized ordering of the operator execution flow, and the second filtering operator is not included in the proper subset based on the second filtering operator being serially before the filtering operator in the serialized ordering of the operator execution flow.

In various embodiments, generating the operator execution flow for the query expression includes indicating generation of the exception column, for example, via exception column generation flag 2532. Facilitating execution of the operator execution flow can include generating the exception column based on the operator execution flow indicating generation of the exception column.

In various embodiments, the operator execution flow for the query expression includes a plurality of expression evaluations. The operator execution flow indicates generation of the exception column for a proper subset of the plurality of expression evaluations that includes the expression evaluation. The proper subset can be determined based on differences between an ordering of the plurality of evaluation expressions relative to one or more filtering operators in the query expression, and the ordering of the plurality of evaluation expressions relative to the one or more filtering operators in the operator execution flow.

In various embodiments, generating the operator execution flow for the query expression includes indicating generation of the exception column is based on the query expression indicating the expression evaluation be performed upon output of the filtering operator, and further based on the serialized ordering of the plurality of operators indicating performance of the filtering operator serially after performance of the expression evaluation.

In various embodiments, the exception value generated for at least one other row of the set of rows indicates the error condition based on performing the expression evaluation for the at least one other row. The subset of the set of rows can be outputted and execution of the operator execution flow can continue based on the at least one other row of the set of rows being included in a set difference between the set of rows and the subset of the set of rows.

In various embodiments, the filtering operator is a join operator, a limit operator, an offset operator, a select operator, and/or a set operator. In various embodiments, the expression evaluation includes a mathematical expression, Boolean expression, and/or other expression evaluated upon values in one or more columns of each row in the set of rows, for example, to render an output column for the set of rows whose values are outputted in the query resultant and/or whose values are utilized in one or more further operators of the query expression that are sequentially after the expression evaluation in the operator execution flow. In various embodiments, the expression evaluation is a type of expression that, when evaluated, can render an error and/or can render throwing of an exception.

In various embodiments, the filtering operator is a set intersection operator. Applying the filtering operator of the operator execution flow can include identifying at least one ignored column of the set intersection operator that includes the exception column, and/or can further include identifying the subset of the set of rows based on performing comparisons of a subset of columns of the set of rows that does not include the at least one ignored column.

In various embodiments, the exception value indicates a value of zero for ones of the set of rows where the error condition did not occur in performing the expression evaluation. The exception value indicates a non-zero value for ones of the set of rows where the error condition did occur in performing the expression evaluation. In various embodiments, the error condition includes at least one of a plurality of possible error condition types, and the exception value of the at least one of the subset of the set of rows indicates the at least one of the plurality of possible error condition types.

For example, the exception value indicates a negative integer value for ones of the set of rows where the error condition did occur in performing the expression evaluation, where the value of the negative integer denotes a corresponding one of the plurality of possible error condition types. As a particular example, the exception value can indicate the value of a SQLCODE for the corresponding exception and/or another predetermined value that corresponds to the at least one of the plurality of possible error condition types, for example, in accordance with the corresponding query language and/or the database system 10.

In various embodiments, a first one of the at least one of the subset of the set of rows has a first exception value indicating a first one of the plurality of possible error condition types, and second one of the at least one of the subset of the set of rows has a second exception value that is different from the first exception value and that indicates a second one of the plurality of possible error condition types. In various embodiments, the plurality of possible error condition types can include one or more user-defined error types, such as one or more user-defined exceptions for the expression evaluation, where one of the at least one of the subset of the set of rows has an exception value indicating a user-defined error type.

In various embodiments, a non-transitory computer readable storage medium includes at least one memory section that stores operational instructions. The operational instructions, when executed by a processing module that includes a processor and a memory, cause the processing module to: receive a query expression for execution indicating a filtering operator and further indicating an expression evaluation for performance upon output of the filtering operator; generate an operator execution flow for the query expression that includes a serialized ordering of a plurality of operators indicating performance of the filtering operator serially after performance of the expression evaluation; and/or facilitate execution of the operator execution flow. Facilitating execution of the operator execution flow can include generating an exception column indicating an exception value generated for each of a set of rows based on performing the expression evaluation upon the each of the set of rows; and/or applying the filtering operator of the operator execution flow. Applying the filtering operator of the operator execution flow can include identifying a subset of the set of rows that meet filtering parameters of the filtering operator; aborting execution of the operator execution flow when the exception value of at least one of the subset of the set of rows indicating an error condition in performing the expression evaluation; and/or outputting the subset of the set of rows and continuing execution of the operator execution flow when the exception value of every one of the subset of the set of rows indicates no error in performing the expression evaluation.

FIGS. 30A-30G illustrate embodiments of a database system 10 that is operable to perform extend operations to form new columns from existing columns, where exceptions can be delayed based on separately performing a check operator. Some or all features and/or functionality of FIGS. 30A-30G can implement any embodiment of the database system 10 described herein. Some or all features and/or functionality of delaying exception throwing discussed in conjunction with FIGS. 30A-30G can be implemented using some or all features and/or functionality of implementing delayed exception throwing presented in conjunction with FIGS. 29A-29J and/or some or all features and/or functionality of implementing delayed exception throwing presented in conjunction with FIGS. 31A-31H.

Database system 10, for example, when implementing a SQL database, can satisfy a single query with a large amount of possible query operator execution flows for execution in query execution plans, each returning identical results. A given query operator execution flow 2517 can selected to lower memory usage and/or lower runtime of executing the query, for example, where the given query operator execution flow 2517 is selected to induce a known and/or expected lowest memory usage, a known and/or expected and/or lowest runtime of executing the query, and/or known and/or expected favorable performance. For example, the operator execution flow generator module 2514 can implement at least one optimization process to select, for a given query expression, a given serialized and/or parallelized ordering of operators from the possible options as the given query operator execution flow 2517 for execution. One way to identify and/or select alternative query plans can include changing the order of execution of operations in the query operator execution flows, for example, from an initial ordering and/or from an ordering indicated by the query expression.

Extend operations can be implemented as operators 2520 within a query operator execution flow 2517 that create a new column row-by-row based off of an expression composed of data from existing columns and/or literal values. This can include performing an expression evaluation upon the existing columns and/or literal values in a same or similar fashion as discussed in conjunction with FIGS. 29A-29J, where an extend operation is implemented to include a corresponding expression evaluation in generating the value for a corresponding column. To create further query operator execution flow options for execution that could be more optimal in terms of runtime or memory usage and/or that could otherwise further optimize execution of a given query, it can be favorable execute extend operations earlier in the plan. Executing extend operations earlier can mean executing them on new rows, and those new rows can create new failures. To ensure query correctness in throwing exceptions, the query execution module should fail the query only on failures the initial plan would encounter, and not fail the query on failures only an alternative, optimized plan would encounter.

The embodiments presented in conjunction with FIGS. 30A-30G present means of avoiding creating plans that will use the row data from a failed row extension, but still must aim to create optimal plans by enabling movement of extend operations earlier in the query operator execution flow. This can improve the technology of database systems based on allowing further optimization of query operator execution flows, enabling corresponding queries to execute faster and/or utilize less processing and/or memory resources.

In particular, when extend operations are moved before an operation that discards rows, such as a filtering operator, the system can mark and/or indicate that the extend will no longer immediately throw exceptions it encounters while creating rows. This can include placing a "checking operation" in the query operator execution flow where the extend operation initially existed in the query plan. This checking operation can be implemented as a checking operator 3025, which can be separated from a corresponding extend operator 3024 for given extend expression by checking a corresponding expression evaluation performed when executing the extend expression for failure. This checking operator can be implemented to throw an exception and/or fail the query if any of the rows inputted to it encountered an exception during its creation. This can effectively separate failure evaluation apart from the onset of failure, so the position of either of these now-separate operations can be optimized independently where they couldn't before.

The separated 'checking' operation can further be independently within the query operator execution flow, which can enable the exploration of further query plans that would otherwise be impossible to create. For example, the checking operator can have its serialized position shifted for execution after another operation in the query operator execution flow if that other operation does not use row values from the column it checks. Alternatively or in addition, the checking operator can have its serialized position shifted for execution before another operation if that other operation does not discard rows.

Implementing such functionality, for example, as discussed in conjunction with FIGS. 30A-30H, can improve the technology of database system based on allowing the operator flow generator module 2514 to search more plans during plan optimization, which can result in a more optimal query operator execution flow ultimately being selected and/or can otherwise facilitate running of to run better query plans. In particular, the extend operator can be moved down in ways it couldn't without implementing this solution. Furthermore, separating the action of throwing exceptions from their creation at extend-time means we can also optimize further via having more freedom to change when the throwing happens as well, providing even more plans to explore. Runtime can assume that the data it must access is valid (i.e. was successfully calculated at extend time) because plan creation guarantees it. This can avoid a performance loss and code complexity associated with having to check for row validity at runtime. For example, only the checking operator is implemented to check for invalid data in some embodiments.

Figure 30A:
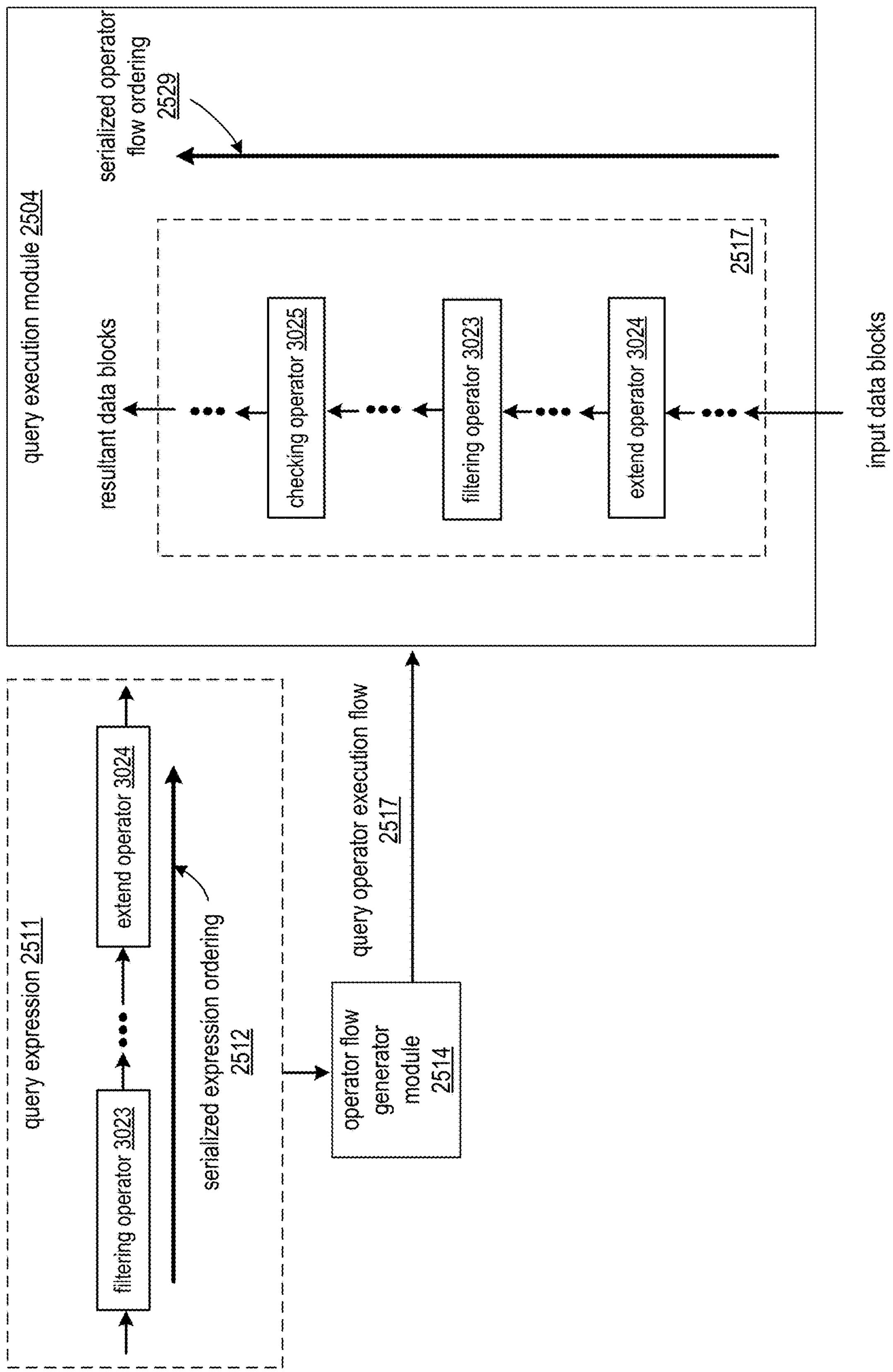
FIG. 30A is a schematic block diagram of a query processing system that processes an extend operator in accordance with various embodiments.

FIG. 30A presents an embodiment of a database system 10 that executes a query based on a query expression that includes an extend operator. Some or all features and/or functionality of the operator execution flow generator module 2514 of FIG. 30A can implement the operator execution flow generator module 2514 of FIG. 24F and/or any other embodiment of the operator execution flow generator module 2514 described herein. Some or all features and/or functionality of the query execution module 2504 of FIG. 30A can implement the query execution module 2504 of FIG. 24F and/or any other embodiment of the operator execution flow generator module 2514 described herein.

The operator flow generator module 2514 can generate a query operator execution flow with an extend operator 3024 prior to a filtering operator 3023, and a checking operator 3025 for the extend operator 3024 serially after the filtering operator 3023. In particular, the extend operator 3024 can be moved before the filtering operator 3023 for execution, despite being denoted for execution after the filtering operator is applied in a serialized expression ordering 2512 of the corresponding query expression 2511.

The extend operator 3024, filtering operator 3023, and/or the checking operator 3025 can be implemented as operators 2520 that are executed in a query operator execution flow 2517 as discussed in conjunction with FIGS. 24G-24I, for example, based on each processing input rows in incoming data blocks to emit output rows in outgoing data blocks in accordance with their respective functionality.

The extend operator 3024 can optionally be implemented utilizing some or all features and/or functionality of the expression evaluation operator 2524 of FIGS. 29A-29G. The filtering operator 3023 and/or the checking operator 3025 can each optionally be implemented utilizing some or all features and/or functionality of the filtering operator 2523 of FIGS. 29A-29G. For example, the filtering operator 3023 and the checking operator 3025 collectively implement some or all features and/or functionality of the filtering operator 2523 of FIGS. 29A-29G, while further enabling additional optimization by being able to be moved to different positions within the query operator execution flow as two different operators.

Figure 30B:
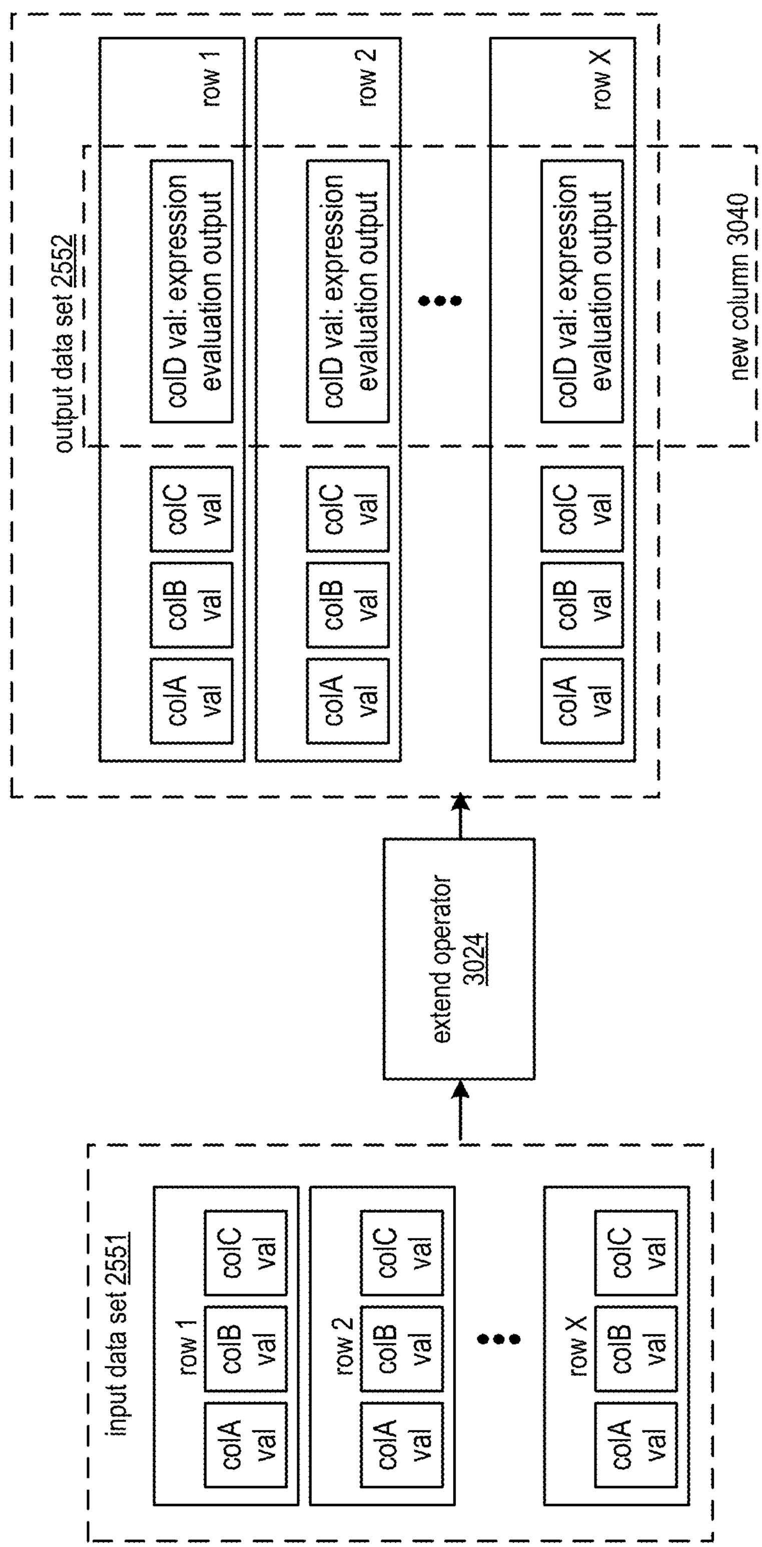
FIG. 30B illustrates a query execution module that executes an extend operator in accordance with various embodiments.

FIG. 30B illustrates an embodiment of a query execution module 2504 executing an extend operator 3024. Some or all features and/or functionality of executing the extend operator 3024 as presented in FIG. 30B can implement the extend operator of FIG. 30A and/or any other embodiment of the extend operator described herein.

The extend operator 3024 can be implemented to generate new columns for an incoming set of rows, for example, based on evaluating an expression denoting the value of the new column as a function of other columns and/or literals. In particular, the extend operator can perform an expression evaluation to generate a new column 3040 storing output values of the expression evaluation performed upon each given row.

The extend operator 3024 is implemented in a same or similar fashion as expression evaluation operator 2524 of FIGS. 29A-29G. For example, the extend operator 3024 can generate expression evaluation output for each incoming row can be stored in a new column as discussed in conjunction with FIG. 29B. In some embodiments, unlike execution of the expression evaluation operator 2524 of FIG. 29B that further generates an exception column 2565 storing exception values 2560 generated for each row when performing the expression evaluation in creating the new column storing the expression evaluation output, the extend operator 3024 of FIGS. 30A-30G optionally does not generate exception values 2560 for the rows when evaluating an expression to generate the new column, and/or optionally does not store exception values 2560 in an exception column.

Figure 30C:
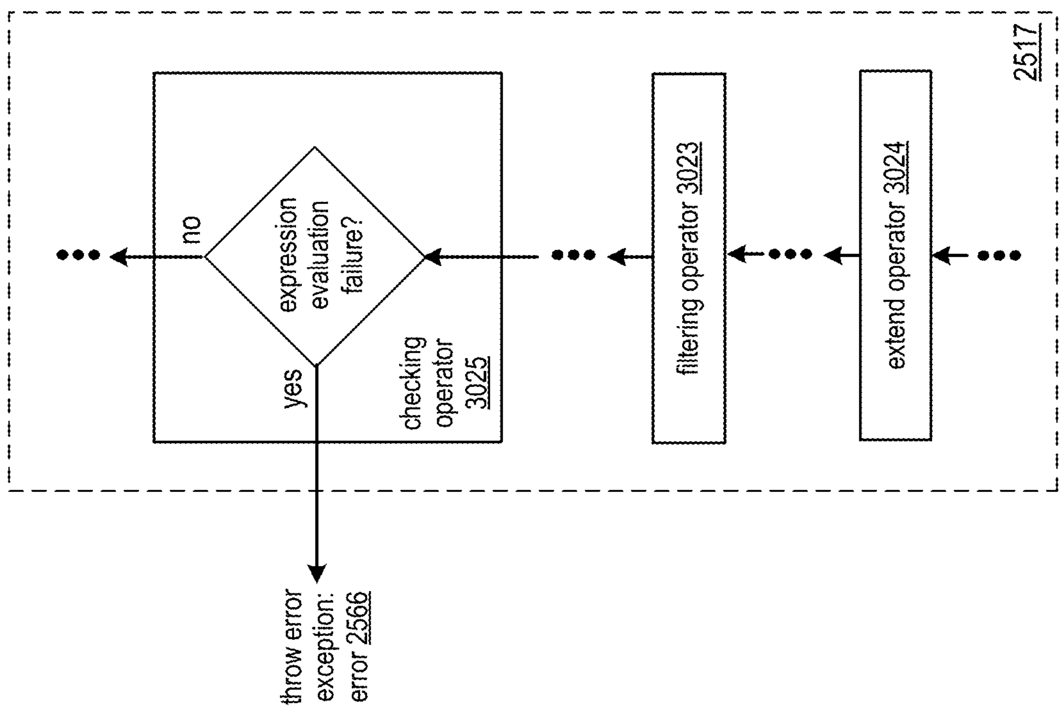
FIG. 30C is a schematic block diagram of a query processing system executing a check operator and an extend operator in accordance with various embodiments.

FIG. 30C illustrates an embodiment of a query execution module 2504 executing a query operator execution flow 2517 that includes a checking operator 3025 in a different serialized position from a corresponding extend operator 3024. Some or all features and/or functionality of executing the query operator execution flow 2517 as presented in Figure can implement the execution of the query operator execution flow 2517 of FIG. 30A and/or any other embodiment of the query operator execution flow 2517 described herein.

The checking operator 3025 can be implemented to delay exception throwing based on checking for expression failure of the extend operator 3024 for the filtered set of rows, resulting in the intended identification of errors as defined by the corresponding query expression 2511 to render correct execution of the query expression 2511, with potential improvement in query execution performance based on applying the extend operator 3024 prior to the filtering operator 3023. Errors 2566 corresponding to generation of the corresponding new column 3040 by performing a corresponding expression evaluation are only thrown for corresponding exceptions identified in rows outputted by the filtering operator 3023.

The checking operator 3025 can be optionally implemented in a same or similar fashion as the filtering operator 2523 that throws exceptions when an exception column check flag 2533 is indicated, where the checking operator 3025 is configured to check for exceptions for the corresponding expression evaluation performed in generating new columns by the extend operator, and where the corresponding exception column check flag 2533 is optionally not necessary.

In some embodiments, the extend operator 3024 generates an exception column 2565 of exception values 2560 as discussed in conjunction with FIGS. 29A-29I, where identification of exceptions by the checking operator 3025 is based on checking the exception values 2560 in the exception column 2565 for the incoming set of rows after filtering is performed via the filtering operator in a same or similar fashion as performed by the filtering operator 2523 of FIGS. 29A-29I when the exception column check flag 2533 is on.

In other embodiments, the exception values 2560 are generated upon generation of the expression evaluation output in the new column via execution of the extend operator 3024 as discussed in conjunction with the extend operator, but these exception values 2560 are not stored in an exception column. For example, these exception values 2560 are instead mapped to the rows elsewhere, for example, via a map structure as discussed in conjunction with FIGS. 31A-31G. Identification of exceptions by the checking operator 3025 can be based on checking the exception values 2560 for the incoming set of rows after filtering is performed via the filtering operator via other means than checking an exception column 2565, for example, based on instead accessing the map structure as discussed in conjunction with FIGS. 31A-31G.

In other embodiments, the extend operator 3024 does not generate any exception column 2565 of exception values 2560. For example, checking operator 3025 generates the exception values 2560 for the first time when performing a corresponding check and/or performs other means of failure checking to identify appropriate exception values, to otherwise identify corresponding errors, and/or to throw corresponding exceptions and/or fail the query as appropriate.

Figure 30D:
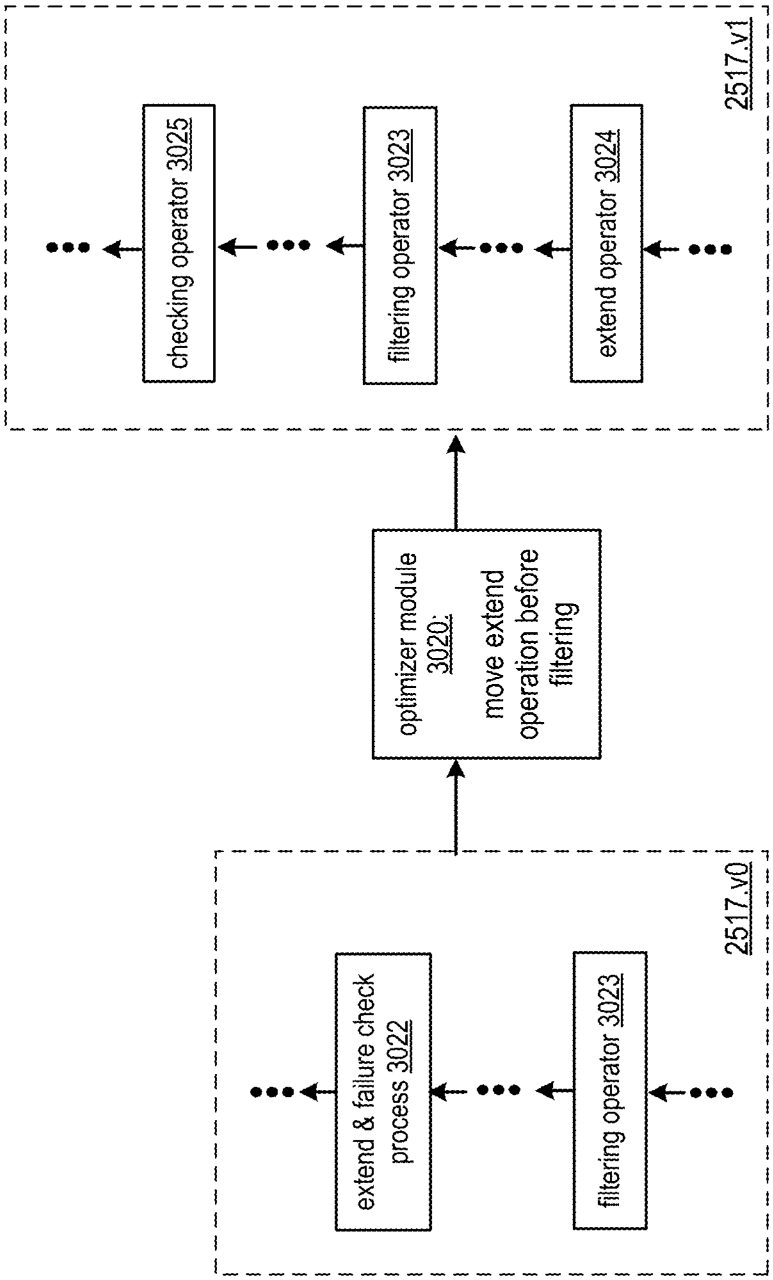
FIG. 30D is a schematic block diagram of an operator flow generator module that implements an optimizer module to determine the position of an extend operator in accordance with various embodiments.

FIG. 30D illustrates an embodiment of an operator flow generator module 2514 that generates a query operator execution flow 2517 based on moving an extend operator 3024 from being after a filtering operator 3023 to being before this filtering operator 3023 via an optimizer module 3020. Some or all features and/or functionality of the operator flow generator module 2514 of FIG. 30D can implement the operator flow generator module 2514 of FIG. 30A and/or any other embodiment of the operator flow generator module 2514 described herein.

The optimizer module 3020 can be implemented to select a query operator execution flow 2517 from a plurality of identified and/or otherwise possible query operator execution flow 2517, for example, that are all semantically equivalent and/or otherwise render identical, correct query output for the given query. This can include generating a set of possible query operator execution flow 2517 and selecting the given query operator execution flow 2517 to be executed from this set, for example, based on being known and/or expected to render the best performance in speed, resource consumption, or other factors, and/or to render other favorable performance in speed, resource consumption, or other factors. This can alternatively or additionally include generating an initial query operator execution flow 2517 and improving upon this initial query operator execution flow 2517 over one or more iterative improvements, for example, where each improved version is generated based on moving and/or swapping operation positions in the serialized operator execution flow. While not illustrated, some or all of this functionality of optimizer module 3020 can be implemented via any other embodiment of the operator execution flow generator module 2514 described herein in generating corresponding query operator execution flow 2517.

In the case of handling extend operators that are designated for performance after filtering operators, an initial query operator execution flow 2517.*v*0 can be generated to indicate performance of a corresponding extend and failure check process 3022, for example, that collectively implements both the extend operator 3024 and the checking operator 3025, after the filtering operator 3023 is performed, for example, based on a corresponding ordering being indicated by a corresponding query expression and/or corresponding abstract syntax tree generated from the query expression.

The optimizer module 3020 can be implemented to move the extend operation of the extend and failure check process 3022 prior to the filtering operator 3023, for example, based on determining that this would render more optimal processing speed and/or more optimal consumption of memory and/or processing resources when the corresponding query is executed. In some cases, other queries denoting extend expressions be performed after filtering do not have the extend operator moved before the filtering operator in this fashion, based on the optimizer module 3020 determining that this shift does not improve performance for these other queries.

The resulting updated query operator execution flow 2517.*v*1 can be generated from the initial operator execution flow 2517.*v*0 accordingly, where updated query operator execution flow 2517.*v*1 is executed and/or is further optimized via subsequent iterations. This updated query operator execution flow 2517.*v*1 can implement the query operator execution flow 2517 executed in FIG. 30A.

This query operator execution flow 2517.*v*1 can alternatively or additionally correspond to a selected query operator execution flow selected from a set of multiple options, for example, where this set of options was generated from query operator execution flow 2517.*v*0, and/or where this set of options was generated from one or more iterative improvements to query operator execution flow 2517.*v*0. In some embodiments, this set of options was generated to include query operator execution flow 2517.*v*0, where query operator execution flow 2517.*v*1 was optionally not generated as an improvement of query operator execution flow 2517.*v*0, but where both query operator execution flow 2517.*v*1 and query operator execution flow 2517.*v*0 are instead generated as different ones of the set of options, for example, generated in parallel and/or independently based on the query expression. Query operator execution flow 2517.*v*1 can be selected rather than query operator execution flow 2517.*v*0 for execution based on query operator execution flow 2517.*v*1 being expected and/or known to be more efficient in processing time and/or resource efficiency than query operator execution flow 2517.*v*0.

Multiple different query operator execution flow 2517.*v*1 can be explored as possible options, for example, with the extend operator in different positions withing the serialized ordering and/or one or more parallelized branches. For example, a set of other operators 2520 are serially before the filtering operator, and different options for the query operator execution flow 2517.*v*1 can include the extend operator 2520 between different ones of these operators 2520, and/or otherwise in different possible positions before the filtering operator or other one or more operators that remove rows. The ultimate selection of position can be based on being the most efficient, being sufficiently efficient, and being guaranteed to be semantically equivalent to and/or to produce identical results to the original query expression and/or the query operator execution flow 2517.*v*0.

Figure 30E:
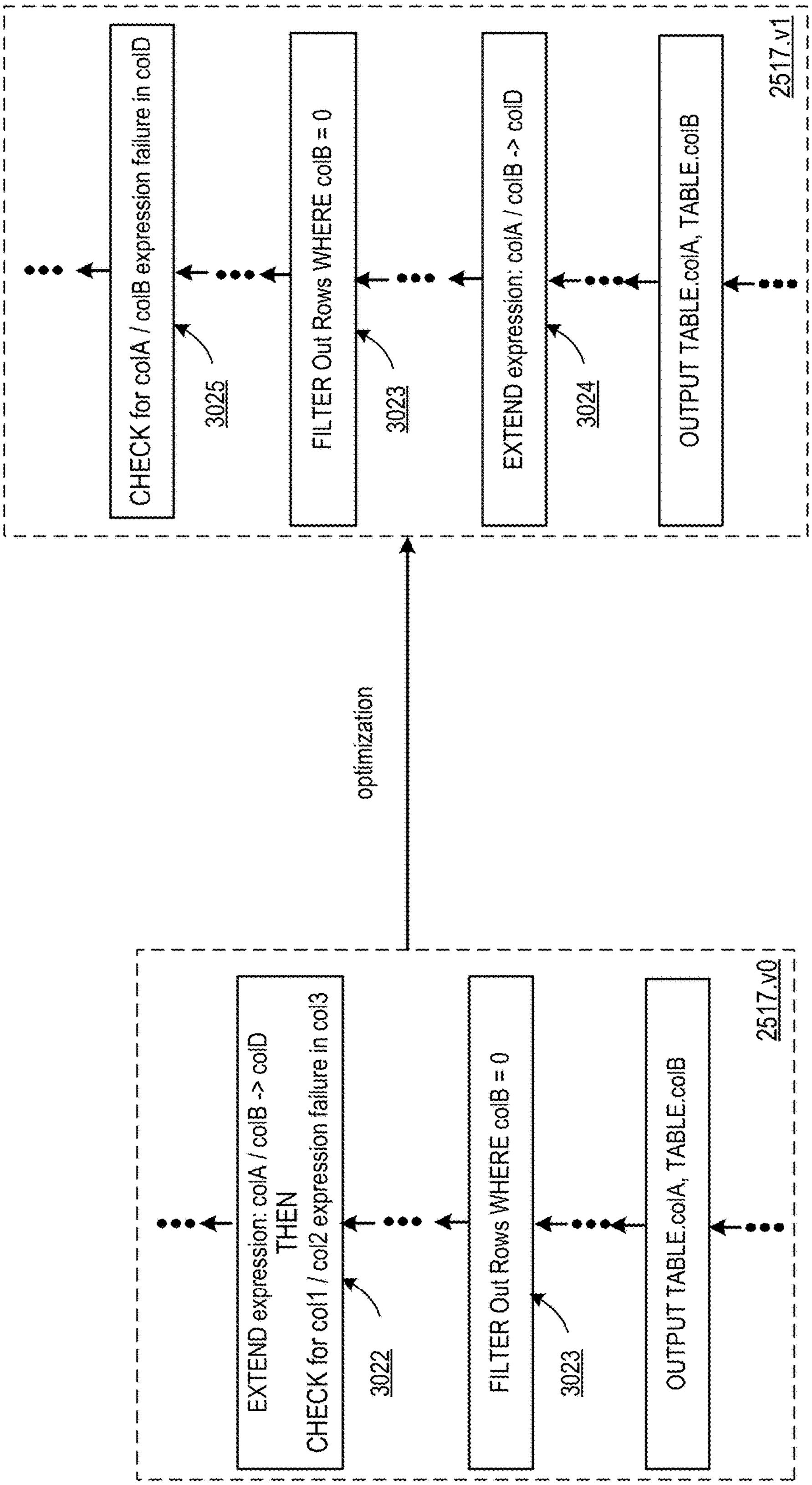
FIG. 30E illustrates an example query operator execution flow that implements and extend operator a check operator in accordance with various embodiments.

FIG. 30E illustrates an example embodiment of an operator flow generator module that generates a query operator execution flow 2517 based on moving an extend operator 3024 from being after a filtering operator 3023 to being before this filtering operator 3023 via an optimizer module 3020. Some or all features and/or functionality of the operator flow generator module 2514 of FIG. 30E can implement the operator flow generator module 2514 of FIG. 30D and/or any other embodiment of the operator flow generator module 2514 described herein.

In this example, the expression evaluated in the extend expression includes dividing a first column colA by a second column colB of a given table, such as the table illustrated in FIG. 30E. Columns colA and colB of FIG. 30E can optionally implement the columns colA and colB of FIG. 30B.

In this example, division by zero would result in an error and/or a corresponding exception being thrown. However, because this expression is denoted as performed after rows having values of 0 for colB are filtered out via filtering operator 3023 in the original query expression, performing the extend operator in the query operator execution flow 2517.*v*1 of FIG. 30E should not throw any errors, as these rows have not yet been filtered out. The checking operator 3025 can check whether any other errors occurs for only the rows in the filtered set (e.g. an unfiltered row of colB has a NULL value and the extend expression was performed to generate the colD value by dividing by a NULL value), ensuring the query is executing as intended without throwing errors based on dividing by colB with a value of zero. This means of delaying exceptions to handle the case of dividing by zero, where these rows are intended to be filtered out prior to the extend expression being performed, can be handled and/or motivated in a same and/or similar fashion as the examples presented in conjunction with FIGS. 29D-29G.

Figure 30F:
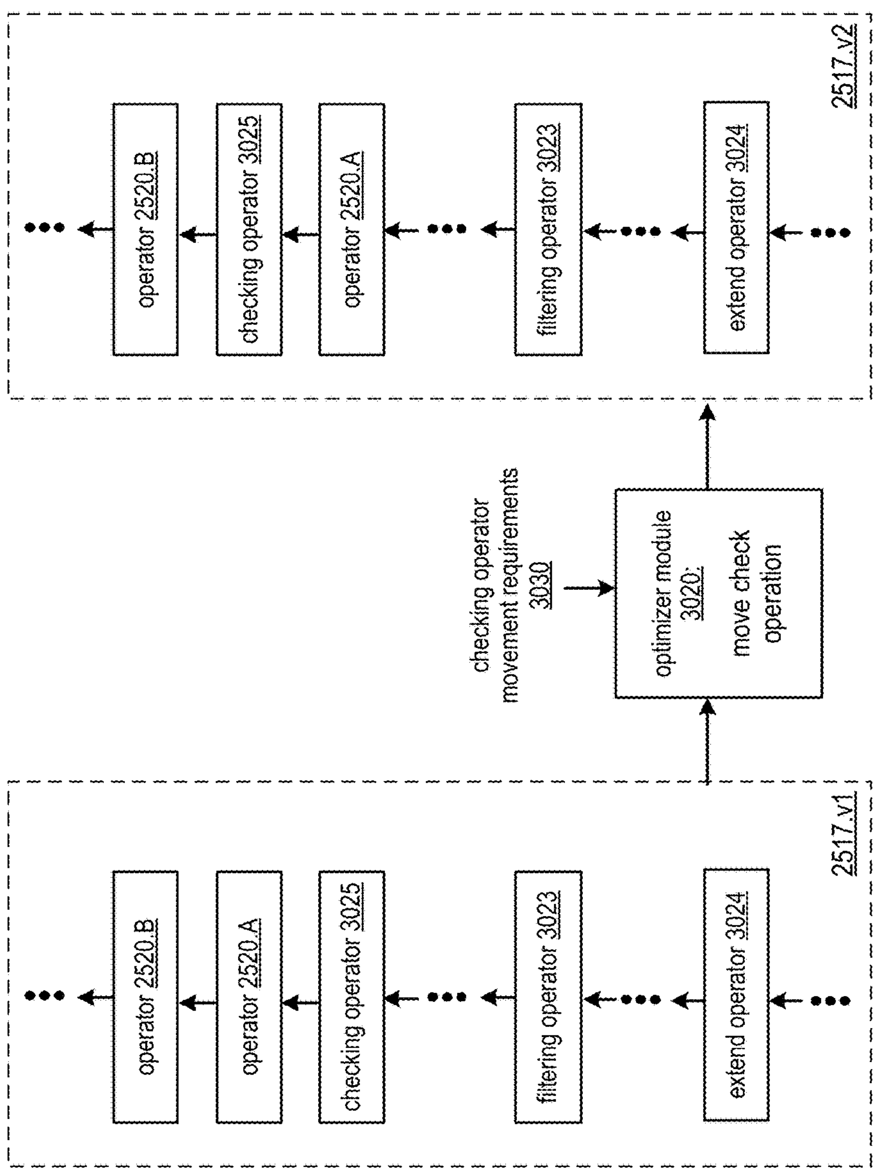
FIGS. 30F-30G are schematic block diagrams of an operator flow generator modules that implement an optimizer module to determine the position of a check operator in accordance with various embodiments.
Figure 30G:
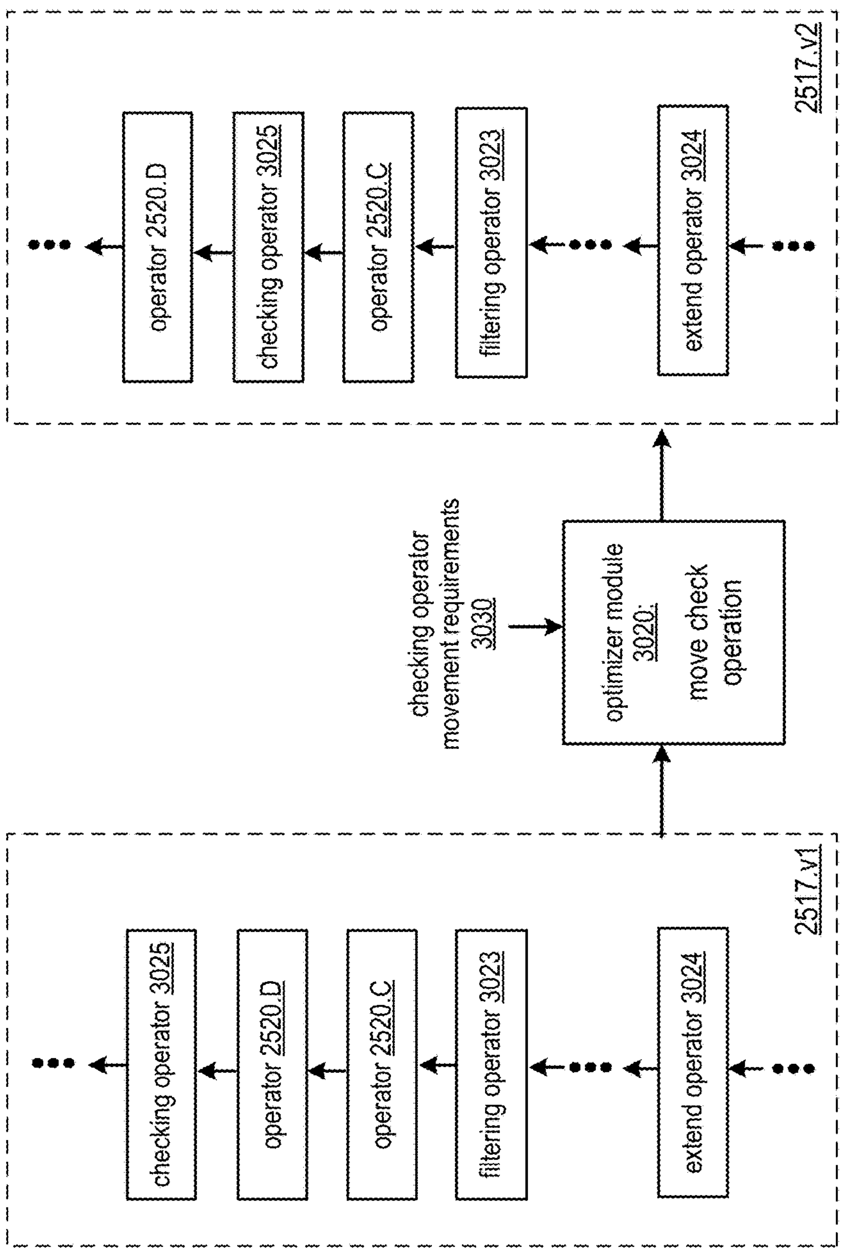

FIGS. 30F and 30G illustrate embodiments of an operator flow generator module 2514 that generates a query operator execution flow 2517 based on further moving a checking operator from its original position of the original extend expression. Some or all features and/or functionality of the operator flow generator module 2514 of FIGS. 30F and 30G can implement the operator flow generator module 2514 of FIG. 30A and/or any other embodiment of the operator flow generator module 2514 described herein.

In the case of handling extend operators that are designated for performance after filtering operators, a query operator execution flow 2517.*v*1 can be generated to position an extend operation of an extend and failure check process 3022 prior to a filtering operator 3023, while maintaining a corresponding checking operator 3025 at the original location of this extend and failure check process 3022 in the serialized ordering. In some cases, it can be further optimal to further move the checking operator 3025 to a different position within the query operator execution flow.

In the examples of FIGS. 30F and 30G, the check operator is moved in a subsequent iteration of updating the query operator execution flow 2517 from query operator execution flow 2517.*v*1 generated as discussed in conjunction with FIG. 25D to further updated query operator execution flow 2517.*v*2, where further updated query operator execution flow 2517.*v*2 is executed and/or is further optimized via subsequent iterations. This updated query operator execution flow 2517.*v*2 can implement the query operator execution flow 2517 executed in FIG. 30A.

This query operator execution flow 2517.*v*2 can alternatively or additionally correspond to a selected query operator execution flow selected from a set of multiple options, for example, where this set of options was generated from updated query operator execution flow 2517.*v*1, where this set of options was generated from the initial query operator execution flow 2517.*v*0, and/or where this set of options was generated from one or more iterative improvements to query operator execution flow 2517.*v*0 and/or 2517.*v*1. In some embodiments, this set of options was generated to include query operator execution flow 2517.*v*0 and/or 2517.*v*1, where query operator execution flow 2517.*v*2 was optionally not generated as an improvement of query operator execution flow 2517.*v*0 and/or 2517.*v*1, but where query operator execution flow 2517.*v*2 and query operator execution flow 2517.*v*0 and/or 2517.*v*1 are instead generated as different ones of the set of options, for example, generated in parallel and/or independently based on the query expression. Query operator execution flow 2517.*v*2 can be selected rather than query operator execution flow 2517.*v*0 and/or 2517.*v*1 for execution based on query operator execution flow 2517.*v*2 being expected and/or known to be more efficient in processing time and/or resource efficiency than query operator execution flow 2517.*v*0 and/or 2517.*v*1.

The examples of query operator execution flow 2517.*v*2 of FIGS. 30F and 30G can correspond to different examples of generating a query operator execution flow 2517.*v*2, for example, from query operator execution flow 2517.*v*0 and/or 2517.*v*1. Alternatively, the query operator execution flow 2517.*v*2 of FIG. 30G is iteratively generated from the query operator execution flow 2517.*v*2 generated in FIG. 30F, or vice versa, for example, based on the corresponding update being known and/or expected to further improve efficiency of the corresponding query execution. Alternatively or in addition, the query operator execution flows 2517.*v*2 of FIGS. 30F and 30G are both generated as options for execution, where one of these set of options is ultimately selected, for example, based on being known and/or expected to be more efficient than the other.

The movement of checking operator 3025 from the original position of the extend and failure check process 3022 can be restricted by checking operator movement requirements 3030. The checking operator movement requirements 3030 can correspond to requirements that, when followed, ensure that the correctness of the query output is not foregone in the corresponding movement of the checking operator 3025 to ensure semantic equivalence with the original query expression and/or with the original query operator execution flow 2517.*v*0 is maintained. For example, the checking operator movement requirements 3030 can indicate that the checking operator can be moved to a position after another operation if that other operation does not use row values from the column it checks, and/or that the checking operator can be moved to a position before another operation if that other operation does not discard rows.

In the example of FIG. 30F, the checking operator 3025 is moved from being before operator 2520.A to being after operator 2520.A. The checking operator 3025 can be moved to this position serially after operator 2520.A based on this movement being determined to adhere to the checking operator movement requirements 3030, for example, based on the operator 2520.A being an operator that does not uses row values from the column checked by checking operator 3025, such as new column 3040 generated via the corresponding extend operator 3024.

In this example, the checking operator 3025 is not moved after operator 2520.B, for example, based on this further movement being less optimal than being before operator 2520.B, and/or based on movement of the checking operator 3025 after operator 2520.B being determined to not adhere to the checking operator movement requirements 3030, for example, based on based on the operator 2520.B being an operator that uses row values from the column checked by checking operator 3025, such as new column 3040 generated via the corresponding extend operator 3024.

In the example of FIG. 30G, the checking operator 3025 is moved from being after operator 2520.D to being before operator 2520.D. The checking operator 3025 can be moved to this position serially before operator 2520.D based on this movement being determined to adhere to the checking operator movement requirements 3030, for example, based on the operator 2520.D not being a filtering operator and/or not being an operator that does not discard rows.

In this example, the checking operator 3025 is not moved before operator 2520.C, for example, based on this further movement being less optimal than being after operator 2520.C, and/or based on movement of the checking operator 3025 before operator 2520.0 being determined to not adhere to the checking operator movement requirements 3030, for example, based on based on the operator 2520.0 being a filtering operator and/or being an operator that discards rows.

Figure 30H:
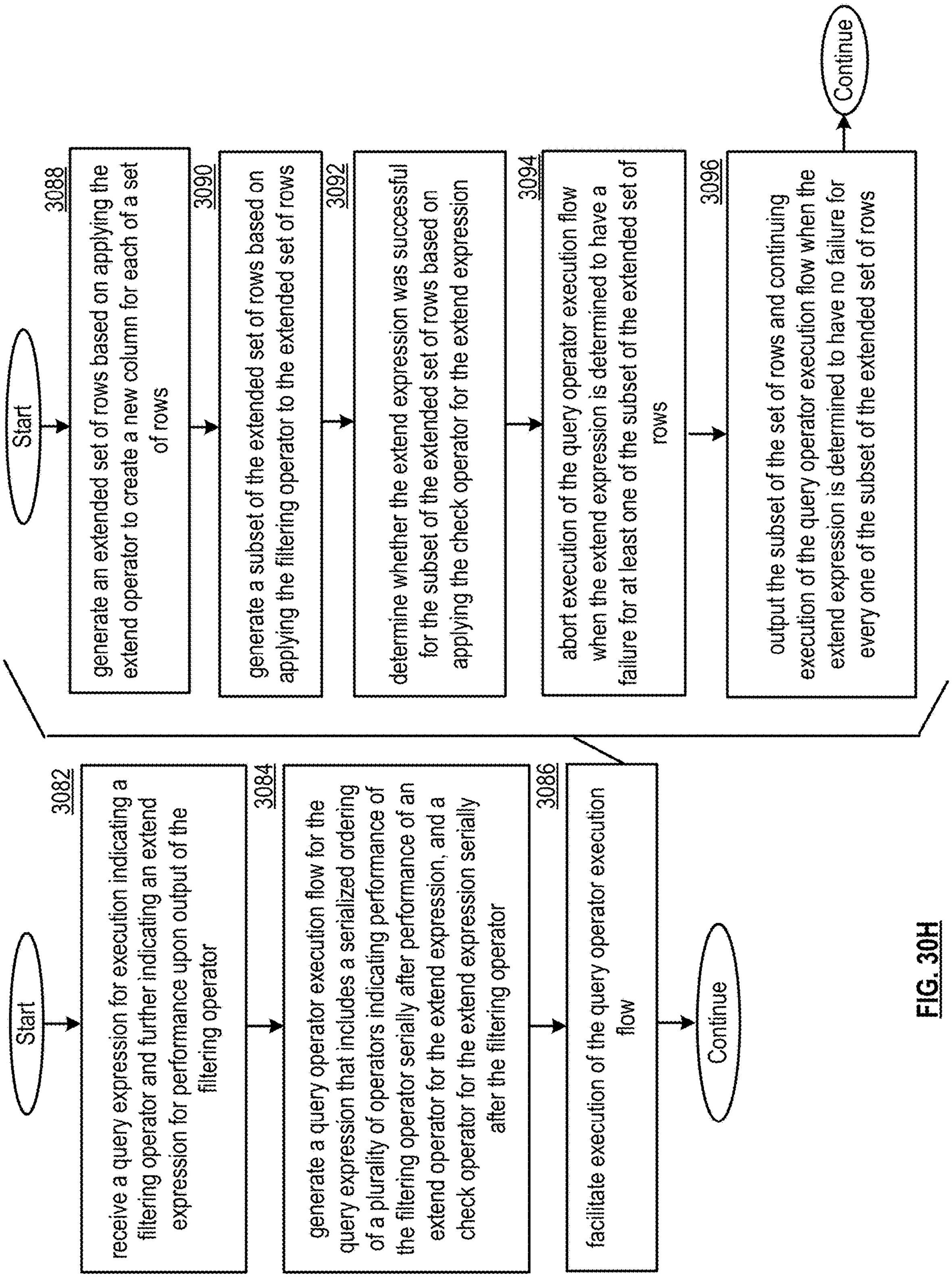
FIG. 30H is a logic diagram illustrating a method for execution in accordance with various embodiments.

FIG. 30H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30H. In particular, a node 37 can utilize the query processing module 2435 to execute some or all of the steps of FIG. 30H, where multiple nodes 37 implement their own query processing modules 2435 to independently execute the steps of FIG. 30H, for example, to facilitate execution of a query as participants in a query execution plan 2405. Some or all of the method of FIG. 30H can be performed by the query processing system 2510, for example, by utilizing an operator flow generator module 2514 and/or a query execution module 2504. In particular, some or all of the method of FIG. 30H can be performed via the operator flow generator module 2514 and/or the query execution module 2504, for example, in conjunction with executing an extend operator 3024, a filtering operator 3023, and/or a checking operator 3025. Some or all of the steps of FIG. 30H can optionally be performed by any other processing module of the database system 10. Some or all of the steps of FIG. 30H can be performed to implement some or all of the functionality of the database system 10 as described in conjunction with FIGS. 30A-30G, for example, by implementing some or all of the functionality of the query processing system 2510 as described in conjunction with FIGS. 25A-29G. Some or all of the steps of FIG. 30H can be performed to implement some or all of the functionality regarding execution of a query via the plurality of nodes in the query execution plan 2405 as described in conjunction with some or all of FIGS. 24A-24I. Some or all steps of FIG. 30H can be performed by database system 10 in accordance with other embodiments of the database system 10 and/or nodes 37 discussed herein. Some or all steps of FIG. 30H can be performed in conjunction with one or more steps of FIG. 26G, one or more steps of FIG. 27F, one or more steps of FIG. 28C, one or more steps of FIGS. 29H-29J, and/or one or more steps of any other method described herein.

Step 3082 includes receiving a query expression for execution indicating a filtering operator and further indicating an extend expression for performance upon output of the filtering operator. Step 3084 includes generating an operator execution flow for the query expression that includes a serialized ordering of a plurality of operators indicating performance of the filtering operator serially after performance of an extend operator for the extend expression, and/or a check operator for the extend expression serially after the filtering operator. Step 3086 includes facilitating execution of the query operator execution flow.

Performing step 3086 can include performing one or more of steps 3088, 3090, 3092, 3094, and/or 3096. Step 3088 includes generating an extended set of rows based on applying the extend operator to create a new column for each of a set of rows. Step 3090 includes generating a subset of the extended set of rows based on applying the filtering operator to the extended set of rows. Step 3092 includes determining whether the extend expression was successful for the subset of the extended set of rows based on applying the check operator for the extend expression. Determining whether the extend expression was successful can include determining the extend expression is successful when the extend expression is determined to have no failure for any of the subset of the extended set of rows, and/or can include determining the extend expression is not successful when the extend expression is determined to have a failure for at least one of the subset of the extended set of rows. Step 3094 includes abort execution of the query operator execution flow when the extend expression is determined to have a failure for at least one of the subset of the extended set of rows, and/or another indication that the extend expression was not successful. Step 3096 includes outputting the subset of the set of rows and continuing execution of the query operator execution flow when the extend expression is determined to have no failure for every one of the subset of the extended set of rows, and/or another indication that the extend expression was successful.

In various examples, applying the extend operator includes performing the extend expression upon at least one existing column of each row of the set of rows to generate a corresponding column value of the new column for the each row of the set of rows.

In various examples, at least one other row of the set of rows not included in the subset of the set of rows induces failure for the extend expression, where the query operator execution flow continues after applying the extend expression via the extend operator, and/or where execution of the query operator execution flow continues after applying the check operator based the at least one other row being filtered out by the filtering operator.

In various examples, aborting execution of the query operator execution flow includes throwing an exception.

In various examples, generating the query operator execution flow includes performing an optimization. In various examples, the serialized ordering of the plurality of operators indicates performance of the filtering operator serially after performance of an extend operator for the extend expression based on performance of the optimization rendering moving of the filtering operator serially after performance of the extend operator.

In various embodiments, the serialized ordering of a plurality of operators indicates performance of the check operator for the extend expression serially after performance of the filtering operator based on the moving of the filtering operator serially after performance of the extend operator in the performance of the optimization.

In various embodiments, any one of more of the various examples listed above are implemented in conjunction with performing some or all steps of FIG. 30H. In various embodiments, any set of the various examples listed above can implemented in tandem, for example, in conjunction with performing some or all steps of FIG. 30H.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30H, for example, in conjunction with further implementing any one or more of the various examples described above.

In various embodiments, the operational instructions, when executed by the at least one processor, cause the database system to: receive a query expression for execution indicating a filtering operator and further indicating an extend expression for performance upon output of the filtering operator; generate a query operator execution flow for the query expression that includes a serialized ordering of a plurality of operators indicating performance of the filtering operator serially after performance of an extend operator for the extend expression, and a check operator for the extend expression serially after the filtering operator; and/or facilitate execution of the query operator execution flow. The database system can facilitate execution of the query operator execution flow by: generating an extended set of rows based on applying the extend operator to create a new column for each of a set of rows; generating a subset of the extended set of rows based on applying the filtering operator to the extended set of rows; determining whether the extend expression was successful for the subset of the extended set of rows based on applying the check operator for the extend expression; aborting execution of the query operator execution flow when the extend expression is determined to have a failure for at least one of the subset of the extended set of rows; and/or outputting the subset of the set of rows and continuing execution of the query operator execution flow when the extend expression is determined to have not no failure for every one of the subset of the extended set of rows.

FIGS. 31A-31G illustrate embodiments of a database system 10 that is operable to implement an exception map structure 3150 storing exception data for later access, for example, in throwing delayed exceptions. Some or all features and/or functionality of FIGS. 31A-31G can implement any embodiment of the database system 10 described herein.

Some or all features and/or functionality of delaying exception throwing discussed in conjunction with FIGS. 31A-31G can be implemented using some or all features and/or functionality of implementing delayed exception throwing presented in conjunction with FIGS. 29A-29J and/or some or all features and/or functionality of implementing delayed exception throwing presented in conjunction with FIGS. 30A-30H.

As discussed previously, rather than an expression evaluation of a row, for example, of extend operation, throwing an exception causing a query to fail immediately, exceptions encountered while evaluating rows can be configured to be thrown later only be thrown later. Storing and processing exceptions that won't be thrown immediately can present challenges. In particular, saving space in every row to mark if a row has encountered an exception, for example, similarly to how NULL values are stored in columns, can add complexity and/or memory usage.

Delayed exceptions can instead be stored as an exception map structure, such as a lookup table. In some embodiments, some or all column streams for some or all output columns have their own exception map structure denoting exceptions for the given column, for example, where the given column was generated via an expression evaluation operator 2524 such as an extend operator 3024.

In some embodiments, the exception map structure only stores entries denoting exception values indicating an error, where exception values indicating no error, such as exception values of zero, need not be stored in the exception map structure. This can be ideal as, in many cases, the distribution of exception values over a given column is sparse. For example, most exception code values per row will indicate no error, such as having an exception value of zero, and thus have no place in the corresponding map. It can also be common for only a few rows in a given column to have errors while every other row has no errors. Use of an exception map structure to store exception data can improve the technology of database systems by enabling delayed exceptions to improve query efficiency as discussed previously, while further reducing memory capacity required to track the exceptions that, when applicable, need be thrown later.

In some embodiments, every time data is appended to a column, the corresponding exception is appended with it, if non-zero, if indicating an error, and/or if otherwise applicable. In some embodiments, a corresponding exception map structure can be stored in memory, such in huge page memory blocks or other memory, for example, as a serialized lookup table, until the column stream is finalized. The corresponding serialized entries of the exception map structure can then be written to disk. If the system does not have enough memory, such as enough huge page memory blocks, to store the serialized exceptions, the overflow can be written in a separate heap backed stream. Waiting until the column finalization, such as after all rows are processed via a corresponding expression evaluation operator 2524, to write all the exceptions can further improve the technology of database systems by minimizes the number of disk accesses and/or by allowing the corresponding lookup table to be stored continuously, which can improve memory and/or processing efficiency during query execution.

In particular, rather than storing exceptions as a separate column stream, such as via an exception column 2556 as discussed in conjunction with FIGS. 29A-29I, which allows set operators to work by ignoring exception columns when they take a hash and/or compare rows while still storing every column in the row, the delayed exceptions can instead be stored as a separate object, such as the exception map structure and/or corresponding map entries. To implement this embodiment, each set operator's set of rows can further contain a map of column to delayed exception. When the operator is ready to emit a row, this map can be read, and if there are any values, they can be thrown, induce a query failure, and/or can be simply transferred to the corresponding column stream.

The use of an exception map structure, for example, as presented in conjunction with FIGS. 31A-31G presents various improvements to the technology of database systems. For example, at runtime, queries that do not encounter extend-related exceptions can be minimally affected by the memory and processing costs associated with handling delayed exceptions, which can improve overall memory and processing efficiency in query execution. Furthermore, because exceptions have such a sparse distribution within a single column, the exceptions it as a map can lower memory usage. Additionally, time spent processing the exception data can be saved when utilizing an exception map structure rather than storing the exception value in each row directly. Furthermore, it can be quick and conceptually simple to discover which rows in a column stream encountered errors during creation and what the error is based on accessing the exception map structure. Finally, it can also be quick and simple to see if a column has experienced any failure at all (that is, check if the map has any values and return the first value), which can be enough to fail and abort early an entire query at checking time, for example, if exceptions for any rows with entries stored in the exception map structure are valid for throwing errors and/or rendering query aborting.

Figure 31A:
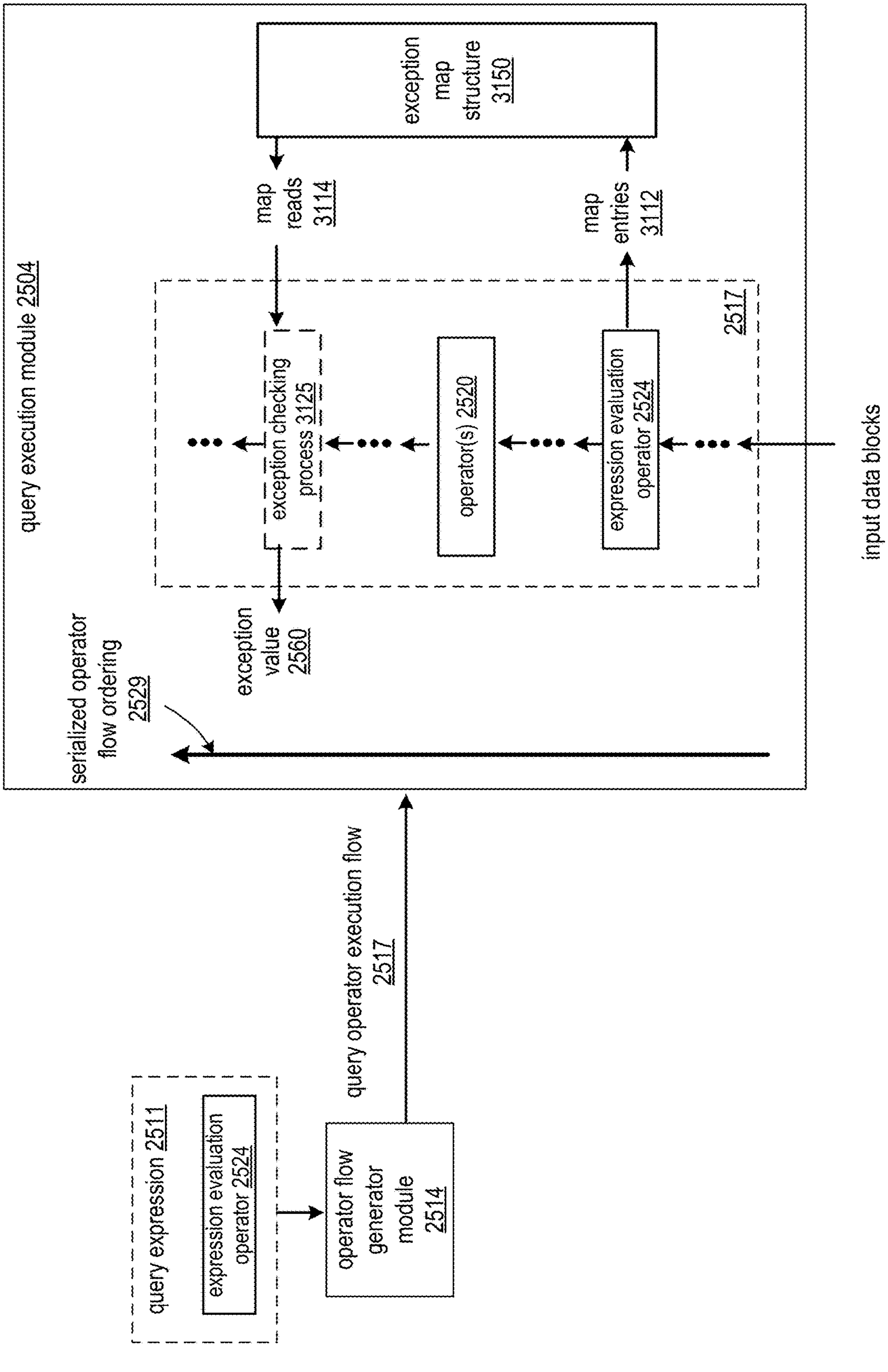
FIG. 31A is a schematic block diagram of a query processing system that implements an expression map structure in accordance with various embodiments.

FIG. 31A presents an embodiment of implementing an exception map structure 3150 via a query execution module when executing a query based on a query expression 2511 that indicates an expression evaluation operator 2524. The expression evaluation operator 2524 of FIG. 25A can be implemented via some or all features and/or functionality of the expression evaluation operator 2524 of FIGS. 29A-29I and/or via some or all features and/or functionality of the extend operator 3024 of FIGS. 30A-30H.

When implementing delayed exception checking for an expression evaluation operator 2524, such as delayed exception throwing for generating a new value of a corresponding new column for each given row as discussed previously, the expression evaluation operator 2524 can generate map entries 3112 for storage in an exception map structure 3150, such as a lookup table or other structure. For example, the expression evaluation operator 2524 generates the map entries 3112 for storage in the exception map structure 3150, during a first temporal period as corresponding data blocks are processed by the expression evaluation operator 2524 to generate output data blocks. For a given row, a corresponding map entry 3112 can indicate whether an error was encountered when performing the expression evaluation operator for the given row, and/or can indicate the error exception value 2560 indicating the particular type of error from a set of possible errors. The corresponding map entry 3112 can optionally further indicate an identifier or other indication of the corresponding given row, and/or can otherwise map the corresponding error to the given row.

An exception checking process 3125 can be implemented later in the query operator execution flow 2517, after one or more other operators such as filtering operator 3023 or other operators 2520. For example, some or all of these operators 2520 are indicated to be performed before the expression evaluation operator 2524 in the query expression, where the operator flow generator module 2514 generates the query operator execution flow 2517 to indicate performance of the expression evaluation operator 2524 before these operators, for example, in applying an optimization process, where the exception checking process 3125 is applied after these operators to throw exceptions correctly as discussed previously. For example, the exception checking process 3125 is implemented via some or all features and/or functionality of the checking operator 3025, the filtering operator 2523 when operatable to check exception values for incoming rows, or other process of determining exceptions and/or errors of the corresponding expression evaluation of the expression evaluation operator 2524, for example, for only incoming rows outputted by the prior other operators 2520 following the expression evaluation operator 2524. As a particular example, at least one row outputted by the expression evaluation operator 2524 is filtered out via a filtering operator and/or other discarding of rows by one or more of these operators 2520, where corresponding exceptions for these filtered out rows are thus not checked by the exception checking process 3125.

The exception checking process 3125 can be implemented based on accessing the exception map structure 3150. For example, the exception checking process 3125 is performed in a second temporal period strictly after the first temporal period where the expression evaluation operator 2524 generated the map entries 3112 for storage in the exception map structure 3150 and/or otherwise after the exception map structure 3150 is otherwise generated and stored based on processing of all incoming rows processed by the expression evaluation operator 2524. The exception checking process 3125 can emit at least one corresponding error exception value 2560 identified via map reads 3114 to the exception map structure 3150, for example, as output for processing via further operators, to trigger aborting of the corresponding query, for display to a requesting entity that generated the query request, and/or other use. The exception checking process 3125 optionally emits no error exception values 2560, for example, based on the map reads 3114 indicating no error values were encountered for corresponding rows processed by the exception checking process 3125.

The exception checking process 3125 can optionally be implemented in a similar fashion as the filtering operator 2523 applying the exception value check for the exception column, where exception values are instead read from map entries for the incoming rows via map reads 3114 to the exception map structure rather than being read from the corresponding new column and/or corresponding column stream for the incoming rows.

Figure 31B:
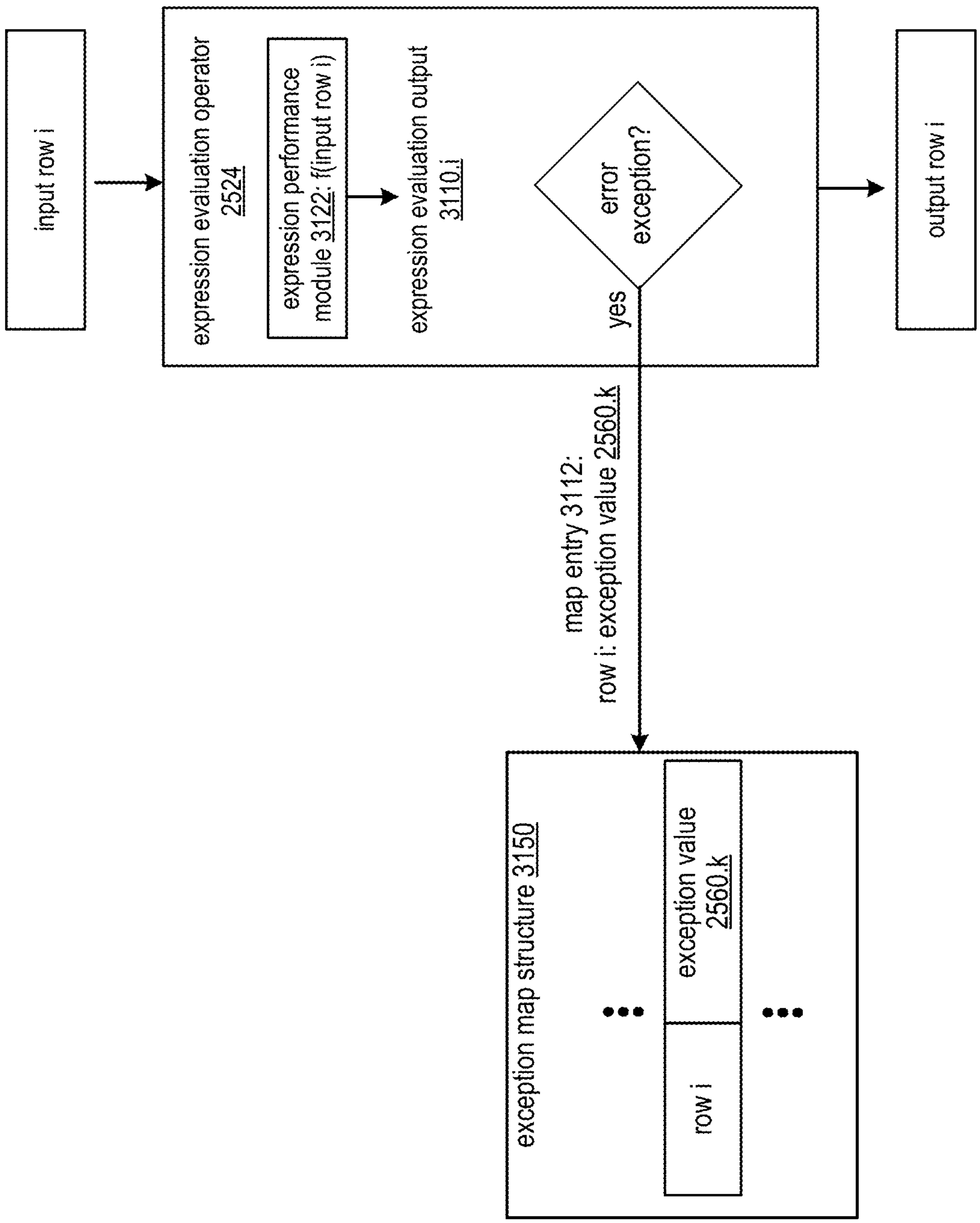
FIG. 31B is a schematic block diagram of a query execution module that executes an expression evaluation operator by generating a map entry for an exception map structure in accordance with various embodiments.

FIG. 31B illustrates an example embodiment of execution of an expression evaluation operator 2524 that writes map entries 3112 to an exception map structure 3150. Some or all features and/or functionality of the expression evaluation operator 2524 and/or exception map structure 3150 of FIG. 31B can implement the expression evaluation operator 2524 and/or exception map structure 3150 of FIG. 31A, and/or any other embodiment of the expression evaluation operator 2524 and/or exception map structure 3150 described herein.

For a given incoming row i in a stream of incoming rows, expression evaluation operator 2524 can implement an expression performance module 3122 to generate corresponding expression evaluation output 3110.*i* for the incoming row, for example, by performing a corresponding function of column values of the given row and/or literal values. For example, the expression evaluation output 3110 is generated as the new column value for a corresponding new column 3040 generated by the expression evaluation operator 2524 being implemented as an extend operator 3024.

An exception value 2560 can be generated for some or all incoming rows, indicating whether an error was encountered and/or the type of error encountered. A map entry 3112 can be generated for the corresponding row i indicating a mapping of the row i to corresponding exception value 2560.*k* for the row. For example, exception value 2560.*k* is one of a plurality of possible exception values for a corresponding plurality of error types or other exception types. Alternatively, exception value 2560 can simply be implemented as a binary value and/or flag denoting whether or not an error was encountered.

In some embodiments, map entries 3112 denoting a given exception value 2560 for a given row is only generated and/or stored in exception map structure 3150 only when the corresponding exception value 2560 denotes an error. For example, map entries 3112 are not generated and/or stored for incoming rows having an exception value 2560 of zero or other value denoting no error, and/or otherwise encountering no errors when generating the expression evaluation output 3110. For example, the map entry 3112 is stored for row i based on the exception value 2560.*k* being non-zero and/or indicating a corresponding error and/or exception occurred in generating expression evaluation output 3110.*i*. Such storage of map entries for only rows encountering errors can be ideal in reducing memory resources required by the map structure 3150, particularly in cases where only a small proportion of rows encounter errors, where the number of entries in the exception map structure 3150 is thus substantially smaller than the number of incoming rows that were processed. In other embodiments, the given exception value 2560 row is generated and/or stored in exception map structure 3150 for every row with the corresponding exception value 2560, regardless of whether or not the row denotes an error.

In some embodiments, multiple exceptions can be thrown for a given row based on multiple different types of errors being encountered. Multiple corresponding exception values 2560 can optionally be mapped to a given row in the exception map structure 3150 accordingly, in a same entry or a corresponding plurality of entries.

Figure 31C:
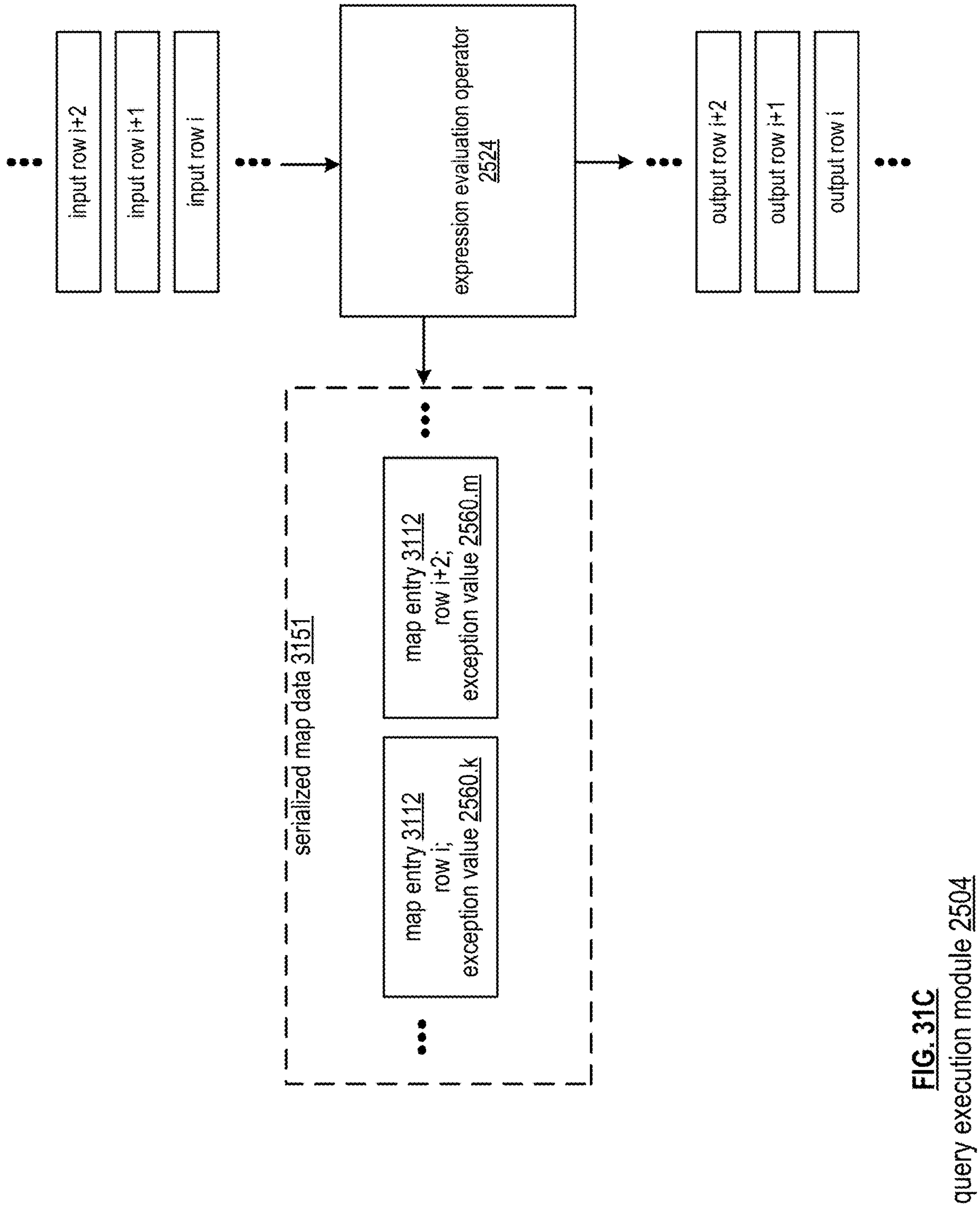
FIG. 31C is a schematic block diagram of a query execution module that executes an expression evaluation operator on a stream of input rows by generating a stream of map entries for an exception map structure in accordance with various embodiments.

FIG. 31C illustrates an example embodiment of execution of an expression evaluation operator 2524 that generates map entries 3112 in a stream as a corresponding plurality of incoming rows are received and processed. Some or all features and/or functionality of the execution of expression evaluation operator 2524 of FIG. 31C can implement the execution of expression evaluation operator 2524 of FIG. 31B and/or any other embodiment of the expression evaluation operator 2524 described herein.

Map entries 3112 can be emitted as a stream of serialized map data 3151 for storage in exception map structure 3150. These map entries 3112 are emitted in the order in which the rows are processed in the corresponding incoming stream of data blocks.

In this example, map entries 3112 are generated for row i and row i+2 based on these rows having corresponding exceptions denoting a corresponding error and/or exception was encountered, such as non-zero exceptions. The exception value 2560.*m* for row i+2 can be different from the exception value 2560.*k* for row i. In this example, no map entry 3112 is generated for row i+1 based on this rows having an exception value of zero and/or having no corresponding error and/or exception encountered.

Figure 31D:
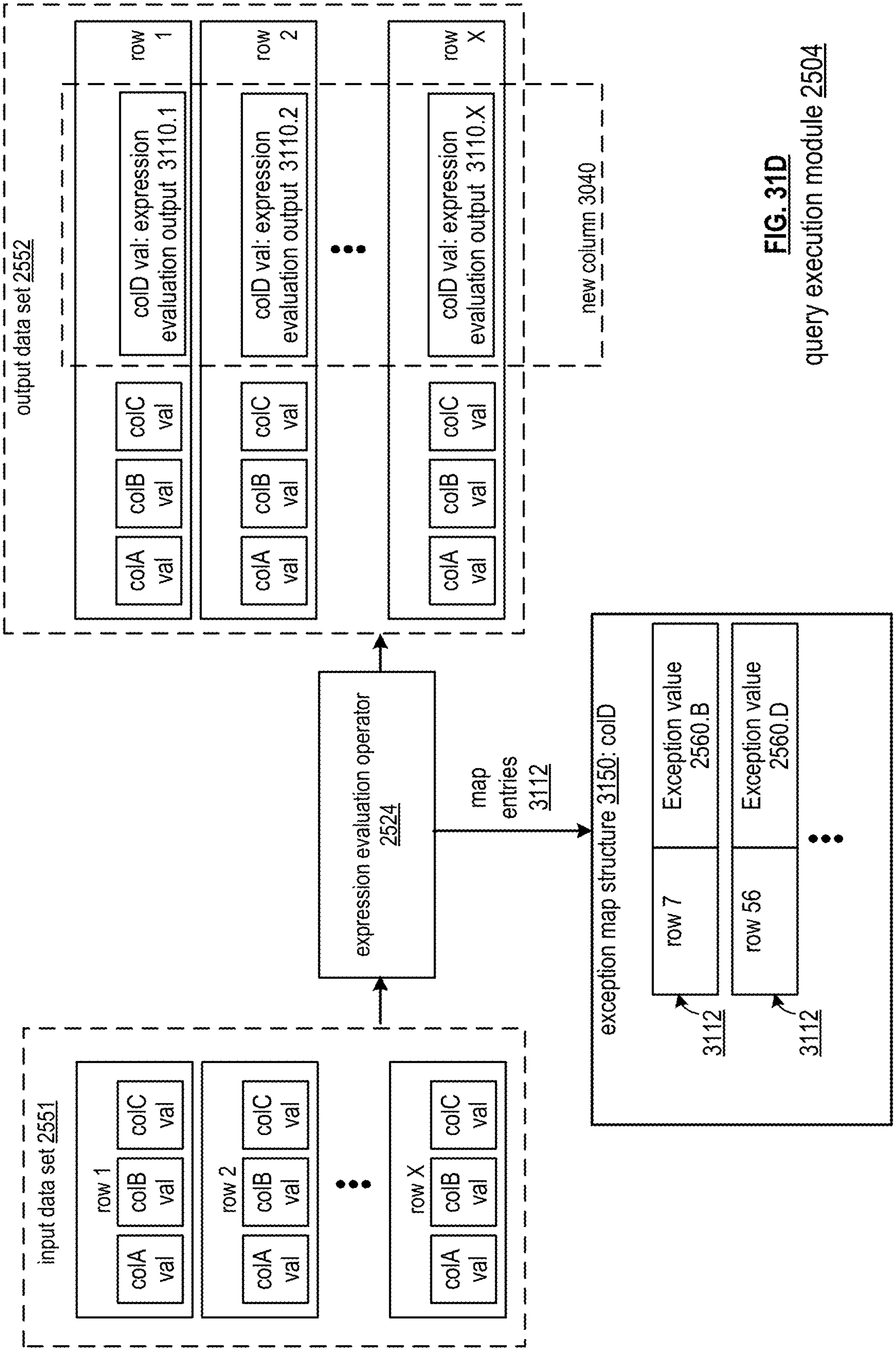
FIG. 31D is a schematic block diagram of a query execution module that executes an expression evaluation operator on an example input data set to generate an example expression map structure for an example new column in accordance with various embodiments.

FIG. 31D illustrates an example embodiment of execution of an expression evaluation operator 2524 that generates map entries 3112 of an exception map structure 3150. Some or all features and/or functionality of the execution of expression evaluation operator 2524 of FIG. 31D can implement the execution of expression evaluation operator 2524 of FIG. 31A and/or any other embodiment of the expression evaluation operator 2524 described herein.

As illustrated in this example, the exception map structure 3150 can be generated for a given column colD, For example, this given column is a new column 3040 generated to include the expression evaluation output 3110 for each given row in generating an output data set 2552, for example, emitted as a stream of output data blocks denoting corresponding output rows, from an input data set 2551, for example, received as a stream of input data blocks denoting corresponding input rows. The output data set 2552 generated from input data set 2551 of FIG. 31D can be implemented via the output data set 2552 generated from input data set 2551 of FIG. 30B and/or the output data set 2552 generated from input data set 2551 of FIGS. 29B-29G where no exception column 2565 is generated based on exception values being instead indicated in map entries 3112 of exception map structure 3150. The exception map structure 3150 is sparsely populated in this example, where map entries 3112 for row 7 and row 56 have corresponding exception values denoting the same or different errors, and where rows 1-6 and 8-55 have map entries 3112 based on no error being encountered. As a particular example, the expression evaluation operator 2524 generates expression evaluation output by dividing by a column value such as the value of colB, for example, prior to filtering out of column values with values of zero, where map entries 3112 for row 7 and row 56 are generated to both denote that a divide by zero error occurred based on the corresponding value of colB being equal to zero, and where rows 1-6 and 8-55 encounter no errors based on including non-zero values for colB.

In some embodiments, multiple exception map structures 3150 can be generated for a given query expression, where each exception map structures 3150 corresponds to exceptions for different columns, and/or can be stored in and/or can correspond to different corresponding column streams generated and processed by query execution module 2504. For example, multiple new columns are generated as expression evaluation output of multiple expression evaluation operators 2524, for example, of one or more extend operators 3024. This can enable accessing of different exception map structures for different columns by one or more corresponding exception checking processes 3125 of the query operator execution flow 2517. Alternatively or in addition, the exception values for different columns are stored in the same exception map structures 3150, where the exception values 2560 are further mapped by column alternatively or in addition to being mapped by row.

Figure 31E:
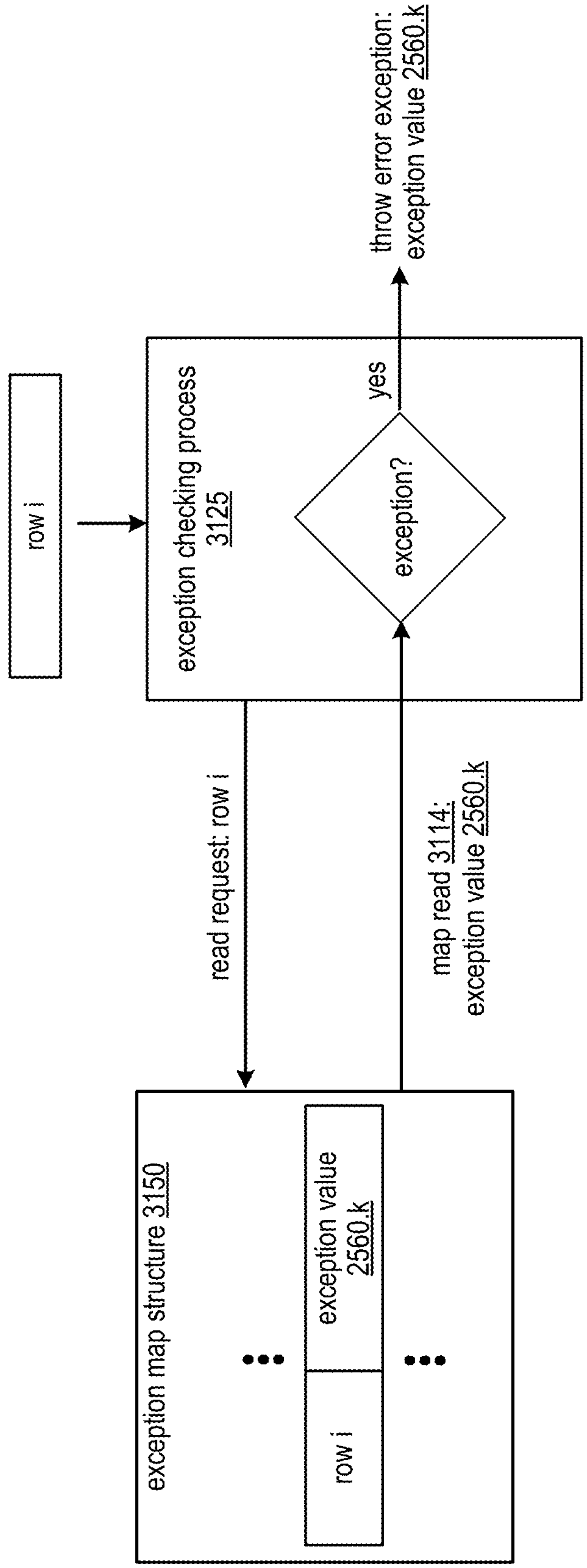
FIG. 31E is a schematic block diagram of a query execution module that executes an exception checking process based on accessing an exception map structure in accordance with various embodiments.

FIG. 31E illustrates an example embodiment of an exception checking process 3125. Some or all features and/or functionality of the exception checking process 3125 of FIG. 31E can implement the exception checking process 3125 of FIG. 31A and/or any embodiment of the exception checking process 3125, exception operator 3024, and/or filtering operator 2523 described herein.

The exception checking process 3125 can access the map structure for given incoming rows, for example, via a corresponding read request. For example, a corresponding value of one or more column and/or other identifier of the row is utilized to access the corresponding exception value mapped to the row in the exception map structure, if applicable. The value of one or more columns and/or other identifier of the row can be implemented as a key of the corresponding exception map structure 3150, where the exception value 2560 for each entry is implemented as the corresponding value mapped to the key.

In this example, the exception checking process 3125 can reads the exception value 2560.*k* for row i based on denoting row i in the read. Because row i has an entry in the exception map structure indicating exception value 2560.*k*, the corresponding exception value 2560.*k* is read in map read 3114. This corresponding exception value 2560.*k* can be thrown, for example, based on the exception checking process 3125 being implemented to delay throwing of exceptions. For example, the corresponding query execution is failed and/or otherwise aborted based on the corresponding exception value 2560.*k* denoting an error and/or failure type that requires aborting of the query. As another example, the corresponding exception value 2560.*k* is emitted in conjunction with emitting the given row in output data blocks, for example, in a corresponding column stream. As another example, the corresponding exception value 2560.*k* is stored and/or delivered to a requesting entity for display.

While not illustrated, the exception checking process 3125 optionally emits some or all incoming rows. For example, the exception checking process 3125 emits only incoming rows determined not to have corresponding exception values in the exception map structure indicating errors. As another example, the exception checking process 3125 emits all incoming rows, a row is emitted in conjunction with a corresponding exception values if this row has a corresponding exception values stored in the map structure 3150.

For example, as an incoming rows such as row i+1 of FIG. 31C and/or rows 1-6 of FIG. 31D are processed via exception checking process 3125 with no entries in exception map structure 3150, the map read 3114 to the map structure returns no exception value 2560 based on these rows not having entries and/or not being mapped to exception values denoting errors. In such cases, no exception is thrown, the query continues based on not being aborted, and/or the exception checking process simply emits these rows as output.

As a particular example, the exception checking process 3125 receives a stream of rows that includes rows 1-7 of FIG. 31D. Rows 1-6 are emitted by the exception checking process 3125 to proceed with query execution based on not being mapped to errors in the exception map structure. However, when row 7 is received and processed by the exception checking process 3125, the query is aborted and/or the corresponding exception value is thrown at this time based on row 7 being mapped to an exception value in the exception map structure 3150.

As another particular example, the exception checking process 3125 receives a stream of rows that includes rows 1-5, and 10-60 of FIG. 31D. For example, rows 6-10 were filtered out based on filtering operators being executed as operators 2524 after the expression evaluation operator 2524 is performed and before the exception checking process 3125 is performed. Rows 1-5 and 10-55 are emitted by the exception checking process 3125 to proceed with query execution based on not being mapped to errors in the exception map structure. However, when row 56 is received and processed by the exception checking process 3125, the query is aborted and/or the corresponding exception value is thrown at this time based on row 56 being mapped to an exception value in the exception map structure 3150. The exception checking process 3125 optionally does not proceed with further processing rows 57-60 based on the query having been aborted. Alternatively, these rows are processed and outputted after the exception value for row 56 is emitted.

Figure 31F:
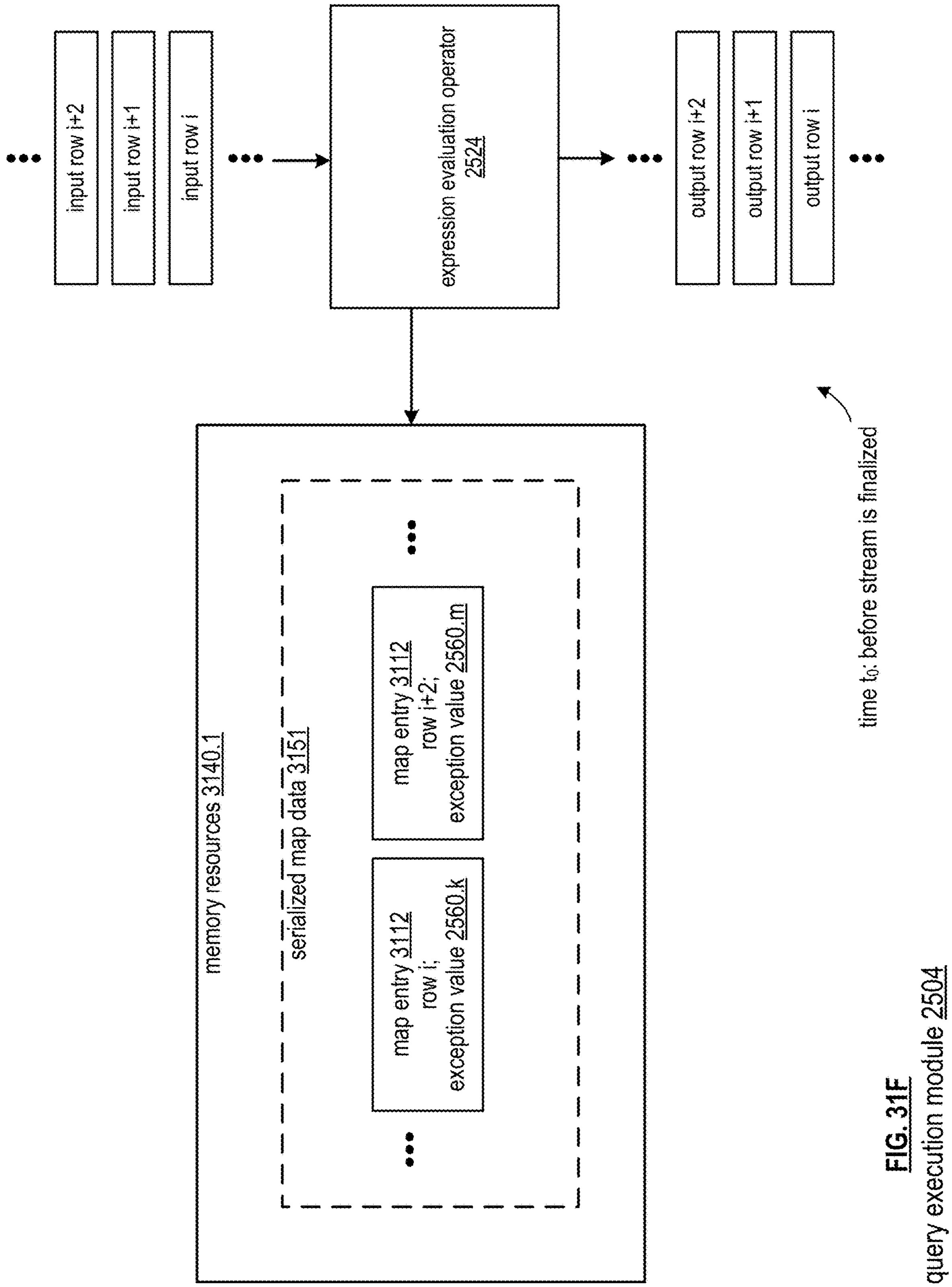
FIG. 31F is a schematic block diagram of a query execution module that executes an executes an expression evaluation operator to generate serialized map data stored in first memory resources in accordance with various embodiments.
Figure 31G:
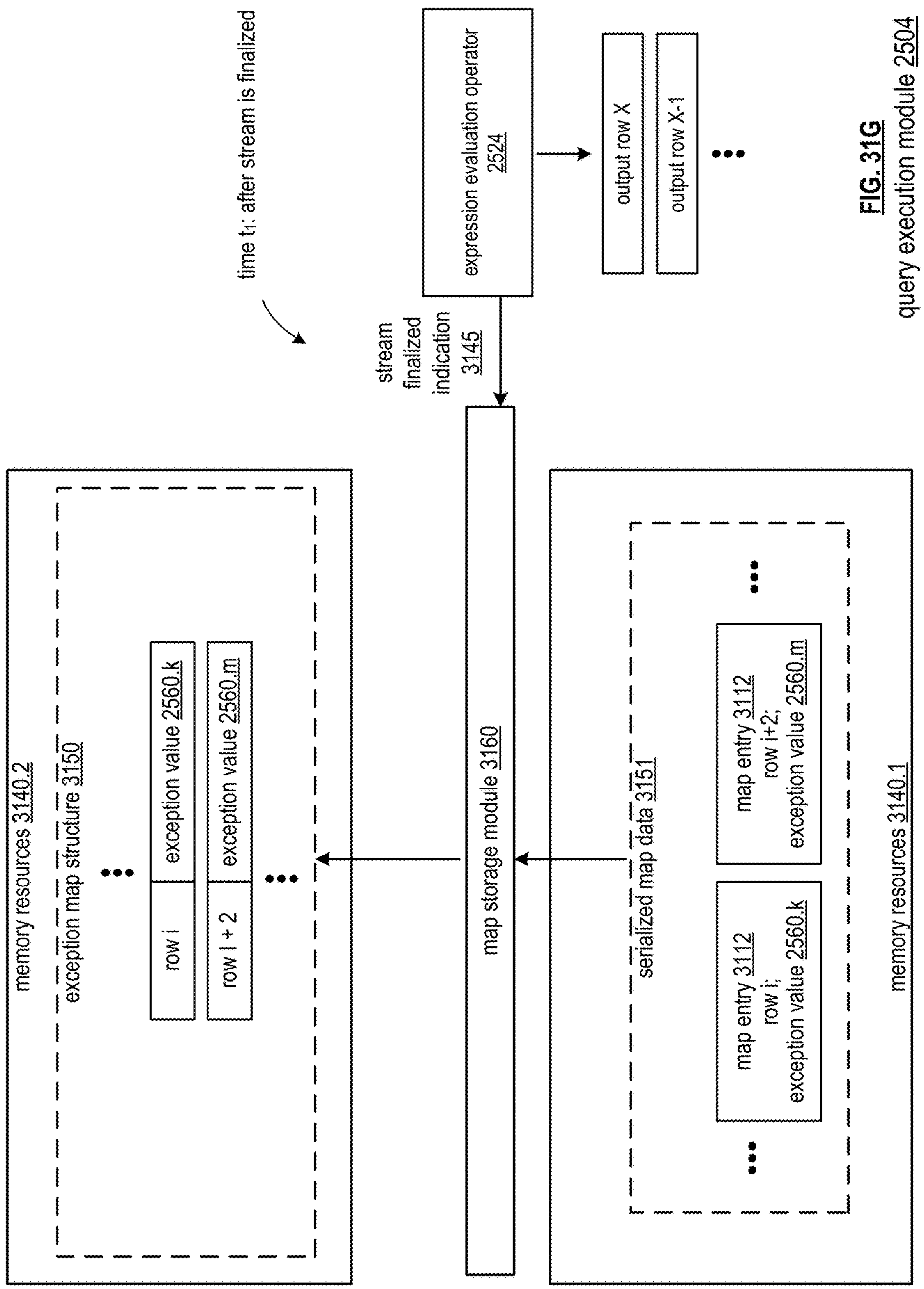
FIG. 31G is a schematic block diagram of a map storage module that stores serialized map data from first memory resources as an exception map structure in second memory resources in accordance with various embodiments.

FIGS. 31F and 31G illustrate embodiments of generating and storing map entries 3112 of the exception map structure 3150 as the expression evaluation operator 2524 processes rows. Some or all features and/or functionality of the exception map structure 3150 and/or expression evaluation operator 2524 of FIGS. 31F and/or 31G can be utilized to implement the exception map structure 3150 and/or expression evaluation operator 2524 of FIG. 31A, FIG. 31C, and/or any other embodiments of the exception map structure 3150 and/or expression evaluation operator 2524 described herein.

As illustrated in FIG. 31F, during time $t_0$, as serialized map data 3151 is generated as a stream of map entries 3112 via processing of input rows, the serialized map data 3151 can be stored in memory resources 3140.1. For example, memory resources 3140.1 are local to the query execution module 2504.

Some or all memory resources 3140.1 can optionally be implemented as huge page memory blocks, for example, of huge page memory, such as a huge page implemented as a memory page that is larger than 4 KiB, that is equal to 2 MiB and/or that is equal to 1 GiB. The huge page memory resources can optionally be implemented as one or more huge pages, such as Linux HugePages, superpages, Large Pages, or other types of huge pages. Memory resources 3140.1 can be implemented via any other type of memory. In some embodiments, if not enough huge page memory blocks or other memory blocks of memory resources 3140.1 are available to the query execution module 2504 overflow is written in a separate heap backed stream, or other separate memory resources from memory resources 3140.1.

As illustrated in FIG. 31G, during time $t_1$ after time $t_0$, after all serialized map data 3151 is generated as a stream of map entries 3112 via processing of all input rows, the serialized map data 3151 is written to memory resources 3140.2, for example, via a map storage module 3160. The map storage module 3160 can determine to write the map entries 3112 of serialized map data 3151 in memory resources 3140.2 based on determining the corresponding stream is finalized, for example, via a stream finalized indication 3145 generated by the expression evaluation module 2524 and/or other resources of query execution module. For example, the map entries 3112 of serialized map data 3151 is stored in memory resources 3140.2 once the corresponding column stream is finalized, once all processing of all input rows has completed, and/or once all corresponding output rows, for example, that include corresponding expression evaluation output 3110, has been generated. This finalization can be determined based on an end of file indication or other determination that all input rows have been received and/or that all output rows have been generated and emitted.

Memory resources 3140.2 can be of a different type and/or in a different location from memory resources 3140.1. For example, memory resources 3140.2 are implemented as disk memory and memory resources 3140.1 are implemented as non-disk memory, such as huge memory data blocks of huge page memory distinct from the disk memory. Waiting until the end of processing of input rows, for example, as indicated by the stream finalized indication 3145, can minimize the number of disk accesses and allow the corresponding exception map structure to be stored continuously, for example, as a lookup table.

The map storage module 3160 can optionally delete and/or write over the serialized map data 3151 in memory resources 3140.1 once all entries 3112 are confirmed to be stored in memory resources 3140.2, for example, enabling these memory resources 3140.1 to be utilized in other operator executions for the same or different query.

In some embodiments, the expression evaluation operator 2524 writes its map entries 3112 as serialized map data 3151 stored in in memory resources 3140.1, and/or otherwise does not access memory resources 3140.2 when generating map entries 3112 for storage. Alternatively or in addition, in some embodiments, the exception checking process 3125 performs its map reads 3114 based on accessing the exception map structure 3150 in memory resources 3140.2, and/or otherwise does not access memory resources 3140.1 when accessing map structure 3150 in processing incoming rows.

In some embodiments, a plurality of nodes 37 each implement the expression evaluation operator 2524 on their own stream of incoming rows, and can generate their own respective serialized map data 3151. The serialized map data 3151 of each node can be stored in respective memory resources 3140.1 of the given node, where different nodes use each use their own memory resources 3140.1 for the serialized map data. The serialized map data 3151 of each node can be written to a common exception map structure 3150, for example, for access by a parent node of this plurality of nodes when implementing the exception checking process 3125, where a same set of memory resources 3140.2 ultimately stores the exception map structure 3150 with all map entries 3112 from the all of the different serialized map data 3151 generated by the different nodes in this set of nodes.

Figure 31H:
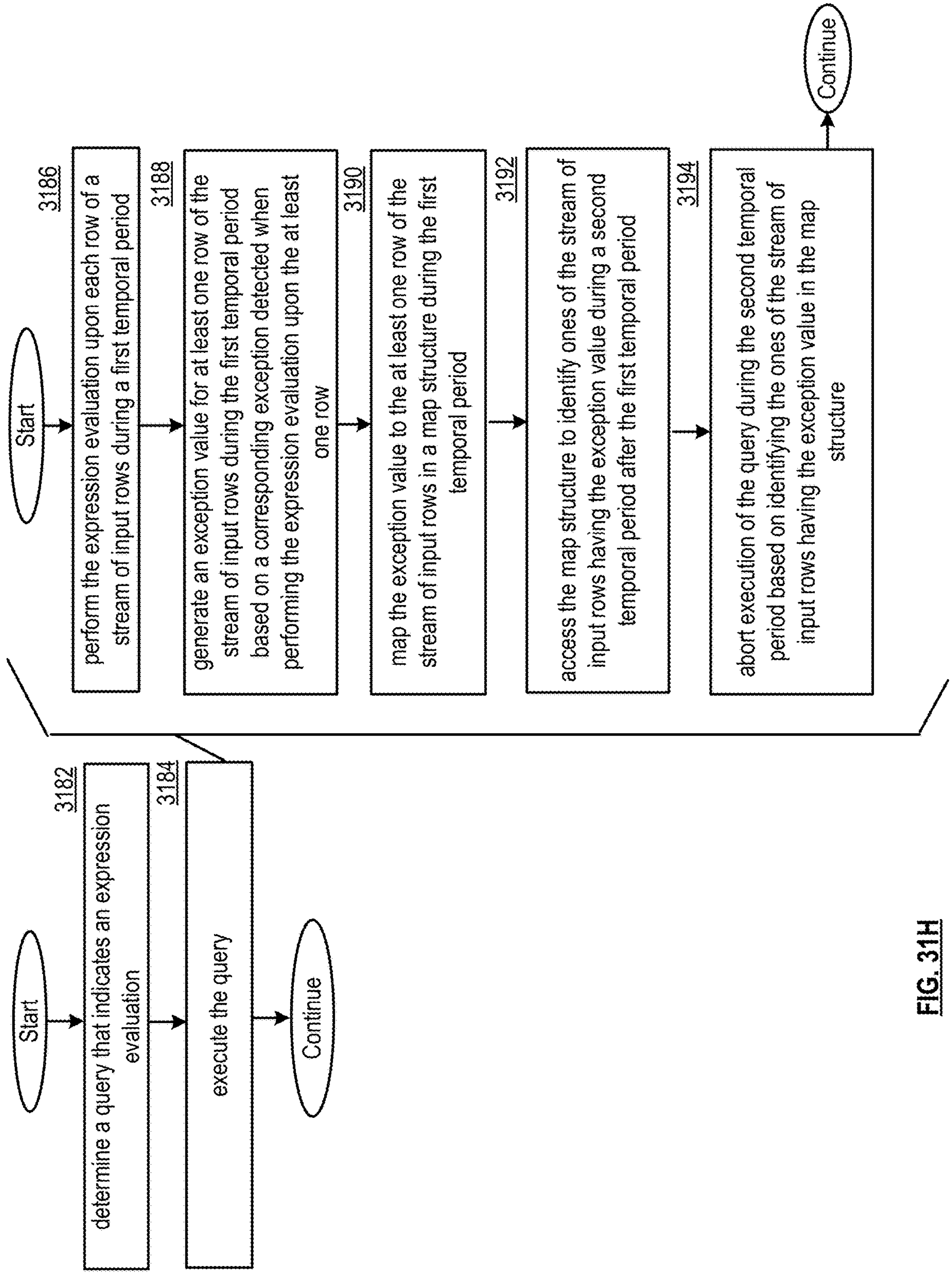
FIG. 31H is a logic diagram illustrating a method for execution in accordance with various embodiments.

FIG. 31H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31H. In particular, a node 37 can utilize the query processing module 2435 to execute some or all of the steps of FIG. 31H, where multiple nodes 37 implement their own query processing modules 2435 to independently execute the steps of FIG. 31H, for example, to facilitate execution of a query as participants in a query execution plan 2405. Some or all of the method of FIG. 31H can be performed by the query processing system 2510, for example, by utilizing an operator flow generator module 2514 and/or a query execution module 2504. In particular, some or all of the method of FIG. 31H can be performed via execution of an expression evaluation operator 2524 that generates map entries 3112 for storage in an exception map structure 3150, and/or via later execution of an exception checking process 3125, serially after the expression evaluation operator 2524 in a query operator execution flow 2517, that performs map reads 3114 to the exception map structure 3150 to emit exception values and/or abort queries. Some or all of the steps of FIG. 31H can optionally be performed by any other processing module of the database system 10. Some or all of the steps of FIG. 31H can be performed to implement some or all of the functionality of the database system 10 as described in conjunction with FIGS. 31A-31G, for example, by implementing some or all of the functionality of the query processing system 2510 as described in conjunction with FIGS. 25A-31G. Some or all of the steps of FIG. 31H can be performed to implement some or all of the functionality regarding execution of a query via the plurality of nodes in the query execution plan 2405 as described in conjunction with some or all of FIGS. 24A-24I. Some or all steps of FIG. 31H can be performed by database system 10 in accordance with other embodiments of the database system 10 and/or nodes 37 discussed herein. Some or all steps of FIG. 31H can be performed in conjunction with one or more steps of FIG. 26G, one or more steps of FIG. 27F, one or more steps of FIG. 28C, one or more steps of FIGS. 29H-29J, one or more steps of FIG. 30H, and/or one or more steps of any other method described herein.

Step 3182 includes determining a query that indicates an expression evaluation. Step 3184 includes executing the query.

Performing step 3184 can include performing one or more of step 3186, step 3188, step 3190, step 3192, and/or step 3194, Step 3186 includes performing the expression evaluation upon each row of a stream of input rows during a first temporal period. Step 3188 generating an exception value for at least one row of the stream of input rows during the first temporal period based on a corresponding exception detected when performing the expression evaluation upon the at least one row. Step 3190 includes mapping the exception value to the at least one row of the stream of input rows in a map structure, such as an exception map structure 3150, during the first temporal period. Step 3192 includes accessing the map structure to identify ones of the stream of input rows having the exception value during a second temporal period after the first temporal period. Step 3194 includes aborting execution of the query during the second temporal period based on identifying the ones of the stream of input rows having the exception value in the map structure. Alternatively or in addition to step 3194, the method includes throwing a corresponding exception based on the exception value identified in the map structure. Alternatively or in addition to step 3194, the method includes emitting the exception value identified in the map structure for display, transmission, and/or further processing by the query execution module 2504.

In various examples, the expression evaluation is performed upon rows of the stream of input rows over the first temporal period. In various examples, the expression evaluation is performed upon a first row of the stream of input rows in a first time window within the first temporal period. In various examples, the expression evaluation is performed upon a last row of the stream of input rows in a second time window within the first temporal period strictly after the first time window. In various examples, the first temporal period ends when the expression evaluation has been performed upon all rows of the stream of input rows.

In various examples, no corresponding exception is detected when performing the expression evaluation upon a remaining subset of rows of the stream of input rows. In various examples, the remaining subset of rows and the at least one row are mutually exclusive and collectively exhaustive with respect to the stream of input rows.

In various examples, no exception value is mapped to any rows of the remaining subset of rows in the mapping structure based on the no corresponding exception being detected when performing the expression evaluation upon the remaining subset of rows.

In various examples, the mapping structure maps a set of columns of the stream of input rows to exception values. In various examples, the exception value is mapped to a given column of the set of columns based on the expression evaluation being performed for the given column.

In various examples, the method further includes, during the second temporal period, emitting the exception values in a column stream corresponding to the given column in conjunction with emitting column values of the given column for corresponding rows of the stream of input rows. In various examples, the execution of the query is aborted based on emitting the exception values.

In various examples, a first exception value is generated for a first row of the at least one row. In various examples, a second exception value is generated for a second row of the at least one row. In various examples, the first exception value is different from the second exception value based on the a first type of exception detected when performing the expression evaluation upon the first row being different from a second type of exception detected when performing the expression evaluation upon the second row.

In various examples, the map structure is stored in first memory during the first temporal period. In various examples, the method further includes writing the map structure to a second memory after the first temporal period elapses. In various examples, the map structure is accessed in the second memory during the second temporal period.

In various examples, the first memory is implemented via a plurality of huge page memory blocks. In various examples, the second memory is implemented via disk memory.

In various examples, the at least one row of the stream of input rows includes a plurality of rows in the stream of input rows. In various examples, the expression evaluation is performed upon different ones of plurality of rows in a plurality of different time windows of the first temporal period based on an ordering of the stream of input rows. In various examples, the exception value is mapped for each of the plurality of rows in the mapping structure over a corresponding plurality of different times based on an ordering of the plurality of different time windows.

In various examples, the mapping structure is implemented as a serialized lookup table implemented based on the exception value being mapped for each of the plurality of rows in the mapping structure over the corresponding plurality of different times.

In various examples, the method further includes writing a first portion of the serialized lookup table to a plurality of memory blocks during a first time frame; determining the serialized lookup table exceeds capacity of the plurality of memory blocks; and/or writing an overflow portion of the serialized lookup table to a separate heap backed stream in a second time frame after the first time frame based on determining the serialized lookup table exceeds capacity of the plurality of memory blocks.

In various examples, the method further includes generating a query operator execution flow based on a query expression indicating the query. In various examples, the query is executed based on executing the query operator execution flow.

In various examples, the query expression indicates the expression evaluation in conjunction with an extend expression. In various examples, performing the expression evaluation upon each row of the stream of input rows includes generating a column value of a new column for each row of the stream of input rows as output of the extend expression.

In various examples, the query operator execution flow implements a delayed exception handing scheme based on at least one of: the query expression, or an optimization performed to generate the query operator execution flow. In various examples, the exception value is mapped to the at least one row of the stream of input rows in the map structure based on the delayed exception handing scheme being implemented in the query operator execution flow. In various examples, the map structure is accessed in the second temporal period after the first temporal period based on the delayed exception handing scheme being implemented in the query operator execution flow.

In various examples, the query operator execution flow includes a serialized ordering of a plurality of operators, In various examples, the query operator execution flow implements the delayed exception handing scheme based on indicating performance of a filtering operator serially after performance of an extend operator for an extend expression, and/or based on further indicating performance of a check operator for the extend expression serially after the filtering operator. In various embodiments, the extend operator for an extend expression implements the expression evaluation based on the extend expression indicating the expression evaluation.

In various examples, the query operator execution flow implements the delayed exception handing scheme by indicating performance of the filtering operator serially after performance of the extend operator for the extend expression and/or the check operator for the extend expression serially after the filtering operator based on the query expression indicating the filtering operator and further indicating the extend expression for performance upon output of the filtering operator.

In various examples, executing the query includes executing the extend operator during the first temporal period. In various examples, the expression evaluation is performed upon each row of the stream of input rows based on the execution of the extend operator, and where the exception value is mapped for the at least one row of the stream of input rows in the map structure based on executing the extend operator. In various examples, executing the query includes executing the filter operator after the first temporal period and prior to the second temporal period to identify a proper subset of rows from the stream of rows. In various examples, executing the query includes executing the check operator during the second temporal period. In various examples, the map structure is accessed for only rows in the proper subset of rows based on the execution of the check operator. In various examples, the query is aborted based on the ones of the stream of input rows identified as having the exception value in the map structure being included in the proper subset of rows.

In various embodiments, any one of more of the various examples listed above are implemented in conjunction with performing some or all steps of FIG. 31H. In various embodiments, any set of the various examples listed above can implemented in tandem, for example, in conjunction with performing some or all steps of FIG. 31H.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 31H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 31H, for example, in conjunction with further implementing any one or more of the various examples described above.

In various embodiments, the operational instructions, when executed by the at least one processor, cause the database system to: determine a query that indicates an expression evaluation; and/or execute of the query. The database system can execute the query based on, during a first temporal period: performing the expression evaluation upon each row of a stream of input rows; generating an exception value for at least one row of the stream of input rows based on a corresponding exception detected when performing the expression evaluation upon the at least one row; and/or mapping the exception value to the at least one row of the stream of input rows in a map structure. The database system can execute the query based on, during a second temporal period after the first temporal period: accessing the map structure to identify ones of the stream of input rows having the exception value; and/or aborting execution of the query based on identifying the ones of the stream of input rows having the exception value in the map structure.

FIGS. 32A-32H illustrate embodiments of a database system 10 that is operable to facilitate finalization of operators of a query operator execution flow in any order, which can be different from their serialized ordering in the query operator execution. Some or all features and/or functionality of FIGS. 32A-32H can implement execution of a query operator execution flow 2517 via a query execution module 2504 as discussed in conjunction with FIGS. 24G-24I, any other embodiments of executing of query operator execution flows in executing corresponding queries, and/or any other embodiment of the database system 10 described herein.

As discussed previously, a query for execution can be represented as query operator execution flow 2517, which can be implemented as a tree of operator instances, such as a tree of operators 2520. The operators 2520 of the query operator execution flow 2517 via a query execution module 2504. Operators 2520 can execute by processing respective input data blocks to generate output data blocks. When a given operator is done with its work, it can release all its resources and/or destroy itself via an operator finalization process. When a query finishes, it should finalize and destroy all the operator instances and leave no trace in system.

In some cases, conditions can arise such that certain operators are not finalized by query execution module 2504 even after the completion of the query. These hanging operators can potentially be using expensive system resources like memory and CPU cycles. This in turn, can cause other queries being executed by the query execution module 2504 to starve and/or overall system performance can be degraded. Thus, it is favorable to ensure that all operators of a given query execution perform the finalization process to release resources and/or destroy themselves appropriately.

In some embodiments of executing a plurality of operators of a query operator execution flow 2517 in conjunction with query execution via one or more nodes 37 of a query execution module 2504, operators finalized from bottom to top. However, restricting finalization from bottom to top can present problems that render not all operators finalizing properly. For example, in such embodiments, an operator does not finalize until all its downstream operators are finalized. If one of the bottom operators failed to finalize, for whatever reason, it prevents all the above operators in the query tree from finalizing itself.

Alternatively or in addition, in some embodiments of executing a plurality of operators of a query operator execution flow 2517 in conjunction with query execution via one or more nodes 37 of a query execution module 2504, operators do not finalize until the completion of its asynchronous operations, if any. However, restricting finalization to be performed until asynchronous operations are completed can present problems that render not all operators finalizing properly. For example, if an async operation fails to send a response, then the operators waits indefinitely, and doesn't finalize.

Alternatively or in addition, in some embodiments of executing a plurality of operators of a query operator execution flow 2517 in conjunction with query execution via one or more nodes 37 of a query execution module 2504, a scheduler of the query execution module 2504 uses a polling mechanism for operator finalization. However, using polling mechanism for operator finalization can present problems that impact system performance. For example, if there are large number of un-finalized operators in the system, a corresponding scheduler could use lot of CPU cycles in an attempt to finalize hanging operators, which can severely impact system performance.

FIGS. 32A-32H present embodiments of a database system 10 that enables operator finalization immediately, in any order, for example, optionally not waiting for asynchronous operations to complete. This can improve the technology of database systems by helping ensure that all operators finalize, mitigating problems imposed by hanging operators described above, and thus enabling resources to be utilized in query executions more effectively. Furthermore, rather than implementing polling via a scheduler, the embodiments of a database system 10 presented in FIGS. 32A-32H implement an event/message driven approach with corresponding control signaling logic, for example, that resolves system ambiguity and/or enables the out-of-order operator finalization to enable release of all system resources appropriately when a query finalizes as a whole.

This mechanism enabling out-of-order operator finalization can be implemented via communication of abort signals. For example, when an operator encounters an error, it can send an abort signal to all its upstream operators and/or network peers. For example, lateral network operators (such as SHUFFLE and/or BROADCAST operators) sends the signal to its lateral network peers, such as to other operators of other nodes in a same shuffle node set 2485, for example, via a corresponding shuffle network 2480 as discussed in conjunction with FIG. 24E.

This mechanism enabling out-of-order operator finalization can alternatively or additionally be implemented via communication of finalize signals. When an operator finishes its work and is ready to finalize, it can send a FINALIZE signal to all its downstream operators. An operator can enter into a ready-to-finalize state when one of the following scenarios occurs: normal EOF processing, for example, where all incoming data blocks are determined to have been received and processed and/or where all corresponding output data blocks have been emitted based on normal, successful execution of the operator upon all incoming data blocks; an error being encountered by the operator during data processing, such as during processing of one or more of its input data blocks, for example, based on an exception, such as a delayed exception as discussed previously, being thrown or any error otherwise occurring that induces finalization of the operator; receiving a finalize signal from an upstream parent operator; and/or receiving an abort signal from a downstream child operator.

This mechanism enabling out-of-order operator finalization can alternatively or additionally be implemented via communication of no data needed signals. For example, when a lateral network operator like SHUFFLE and/or BROADCAST receives a finalize message (for example, with no corresponding error code) from its upstream parent and prior to EOF processing, it can send a no data needed signal to all it lateral peers.

For example, this can occur during execution of a limit query, such as the queries adapted for processing limits for join operators as discussed in conjunction with FIGS. 27A-27F, and/or other queries that include limit operators 2710, where corresponding query execution is finalized once the maximum number of rows has been emitted. In such cases, one lateral network operators, such a child and/or other descendent of the limit operator, receives a finalize message from its parent based on the limit being reached, it can send a no data needed signal to its lateral network operators, such as other children and/or other descendent of the limit operator, as they can finalize processing due to the limit operator not requiring further data blocks. As a particular example, a join operator 2535 of the fast join process of FIGS. 27A-27F receives a finalize message from the union all operator based on the limit operator sending a finalize message to its children due to all required data blocks being outputted, and the this join operator 2535 of the fast join process sends the data needed signal to other join operators 2535 of the fast join process, such as other join operators of other parallelized processes, and/or sends the sends the data needed signal to one or more join operators 2535 of the slow join process.

Figure 32A:
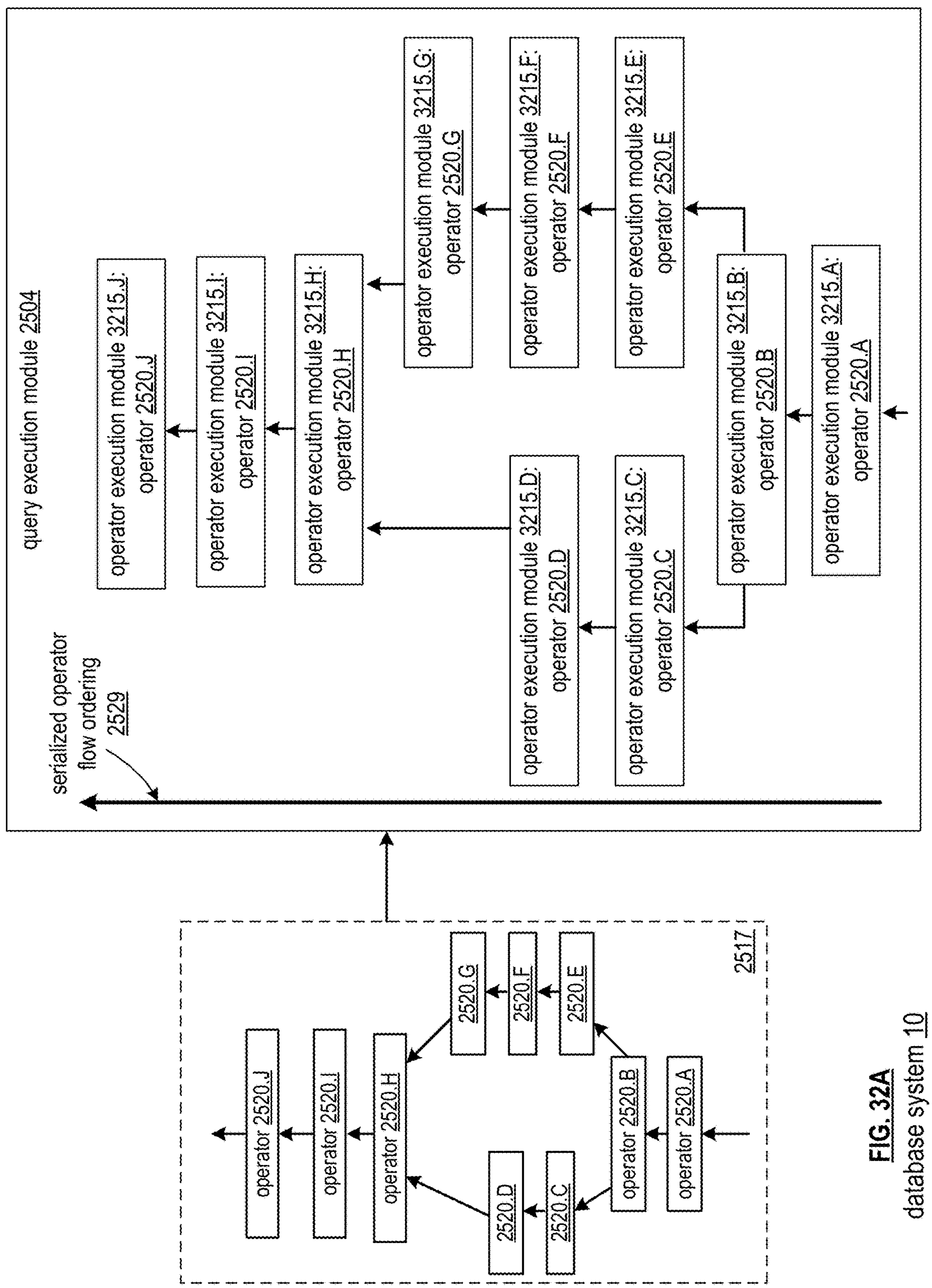
FIG. 32A is a is a schematic block diagram of a database system that executes a plurality of operators of a query operator execution flow via a plurality of operator execution modules in accordance with various embodiments.

FIG. 32A illustrates an embodiment of a query execution module 2504 that executes each of a plurality of operators of a given operator execution flow 2517 via a corresponding one of a plurality of operator execution modules 3215. The operator execution modules 3215 of FIG. 32A can be implemented to execute any operators 2520 being executed by a query execution module 2504 for a given query as described herein. Some or all features and/or functionality of operator execution modules 3215 of FIG. 32A can implement the operator execution modules 3215 of FIG. 24J and/or any other embodiment of operator execution modules 3215 described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

As used herein, a child operator of a given operator corresponds to an operator immediately before the given operator serially in a corresponding query operator execution flow. A given operator can have a single child operator or multiple child operators. A given operator optionally has no child operators based on being an IO operator and/or otherwise being a bottommost and/or first operator in the corresponding serialized ordering of the query operator execution flow.

The operator execution modules 3215 one or more child operators can be implemented by a same node 37 of a given node 37 implementing the operator execution module 3215 of the given operator. Alternatively or in addition, the operator execution modules 3215 of one or more child operators can be implemented by one or more different nodes 37 from a given node 37 implementing the operator execution module 3215 of the given operator, such as a child node of the given node in a corresponding query execution plan that is participating in a level below the given node in the query execution plan.

As used herein, a parent operator of a given operator corresponds to an operator immediately after the given operator serially in a corresponding query operator execution flow. A given operator can have a single parent operator or multiple parent operators. A given operator optionally has no parent operators based on being a topmost and/or final operator in the corresponding serialized ordering of the query operator execution flow. If a first operator is a child operator of a second operator, the second operator is thus a parent operator of the first operator.

The operator execution modules 3215 of one or more parent operators can be implemented by a same node 37 of a given node 37 implementing the operator execution module 3215 of the given operator. Alternatively or in addition, the operator execution modules 3215 of one or parent operators can be implemented by one or more different nodes 37 from a given node 37 implementing the operator execution module 3215 of the given operator, such as a parent node of the given node in a corresponding query execution plan that is participating in a level above the given node in the query execution plan.

As used herein, a lateral network operator of a given operator corresponds to an operator parallel with the given operator in a corresponding query operator execution flow. The set of lateral operators can optionally communicate data blocks with each other, for example, in addition to sending data to parent operators and/or receiving data from child operators. For example, a set of lateral operators are implemented as one or more broadcast operators of a broadcast operation, and/or one or more broadcast operators of a shuffle operation. For example, a set of lateral operators are implemented via corresponding plurality of parallel processes 2550, for example, of a join process or other operation, As another example, data is optionally transferred between lateral network operators via a corresponding shuffle and/or broadcast operation, for example, to communicate right input rows of a right input row set of a join operation to ensure all operators have a full set of right input rows.

The operator execution modules 3215 of one or more lateral network operators can be implemented by a same node 37 of a given node 37 implementing the operator execution module 3215 of the given operator lateral with these one or more lateral network operators. Alternatively or in addition, the operator execution modules 3215 of one or lateral network operators can be implemented by one or more different nodes 37 from a given node 37 implementing the operator execution module 3215 of the given operator lateral with the one or more lateral network operators. For example, different lateral network operators are executed via different nodes 37 in a same shuffle node set 37.

Figure 32B:
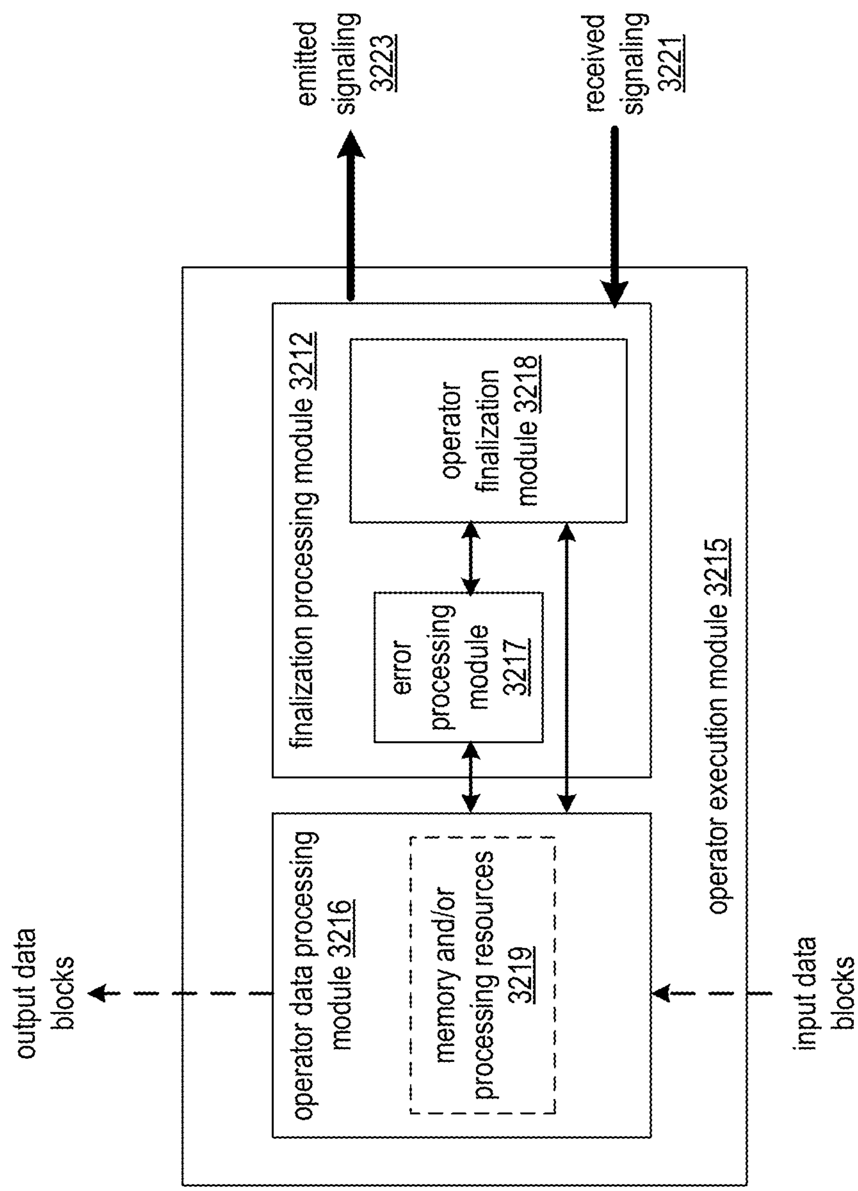
FIG. 32B is a schematic block diagram of an operator execution module that includes an operator data processing module, an error processing module, and an operator finalization module in accordance with various embodiments.

FIG. 32B illustrates an embodiment of an operator execution module 3215 implemented via a query execution module 2504 for execution of a given operator 2520. Some or all features and/or functionality of the operator execution module 3215 of FIG. 32B can implement some or all operator execution modules 3215 of FIG. 32A, and/or can be implemented to execute any operator 2520 described herein.

The operator execution module 3215 can implement an operator data processing module 3216, which can be operable to process input data block to generate output data blocks, for example, based on the type of the corresponding operator and/or configuration of the corresponding operator in conjunction with execution of the corresponding query. The operator data processing module 3216 can be implemented to process and emit input and output rows of data blocks 2522 as discussed previously. The operator data processing module 3216, can process input data block to generate output data blocks based on consuming various memory and/or processing resources 3219 during the respective executions.

The input data blocks can be generated by and received from one or more other operator data processing modules 3216 of one or more child operators of the given operator. The output data blocks can be sent to for processing by one or more other operator data processing modules 3216 of one or more parent operators of the given operator. Alternatively or in addition, input data blocks can be generated by and received from one or more other operator data processing modules 3216 of one or more lateral network operators of the given operator, and/or the output data blocks can be sent to for processing by one or more other operator data processing modules 3216 of one or more lateral network operators of the given operator.

The operator execution module 3215 can alternatively or additionally implement a finalization processing module 3212, which can be implemented to determine to finalize, initiate finalization of, and/or complete finalization of a query encountered in query execution. The finalization processing module 3212 can be implemented via an error processing module 3217 and/or an operator finalization module 3218.

The error processing module 3217 and/or the operator finalization module 3218 of the finalization processing module 3212 can be implemented to perform operations in based on received signaling 3221 and/or can be implemented to generate emitted signaling 3221. The received signaling 3221 received and processed by the finalization processing module 3212 of a given operator execution module 3215 can be generated by and received from the finalization processing module 3212 of another operator execution module 3215 of an operator that is a parent of the given operator, a child of the given operator, and/or a lateral network operator of the given operator. The emitted signaling 3223 by the finalization processing module 3212 of a given operator execution module 3215 can be sent to for processing by the finalization processing module 3212 of another operator execution module 3215 of an operator that is a parent of the given operator, a child of the given operator, and/or a lateral network operator of the given operator.

In a given query execution, some or all operator execution modules 3215 receive signaling 3221 from one or more other operator execution modules 3215. Ina given query execution, some or all operator execution modules 3215 optionally receive no signaling 3221 any other operator execution modules 3215, based on this signaling not being required in the given execution to facilitate full finalization. In a given query execution, some or all operator execution modules 3215 emit signaling 3223 to one or more other operator execution modules 3215. In a given query execution, some or all operator execution modules 3215 optionally emit no signaling 3223 any other operator execution modules 3215, based on this signaling not being required in the given execution to facilitate full finalization.

The error processing module 3217 can be implemented to detect and handle errors encountered in query execution. This can include detecting and handling errors encountered by the operator data processing module 3216 of operator execution module 3215 itself, for example, due to exceptions thrown and/or other errors encountered when processing data blocks. This can alternatively or additionally include detecting errors encountered by other operators, for example, as indicated in received signaling 3221 received from other operator execution modules, such as operator execution modules of child operators that are immediately below the given operator in the query operator execution flow 2517 and/or operator execution modules of lateral network operators that work in parallel with and/or are in a same shuffle node set as the given operator in the query operator execution flow 2517. Errors detected by error processing module can trigger finalization of the operator via the operator finalization module. Errors detected by error processing module can trigger sending of emitted signals 3223 to one or more other operator execution modules, such as one or more parent operators that are immediately above the given operator in the query operator execution flow 2517.

The operator finalization module 3218 can be operable to finalize the operator 2520, based on the finalization processing module 3212 determining to finalize the corresponding operator 2520. For example, the finalization processing module 3212 determines to trigger finalization via operator finalization module 3218 based on the operator data processing module 3216 being determined to have completed its processing of all incoming data blocks, based on received signaling 3221 triggering finalization, for example, before operator data processing module 3216 completes its processing of all data blocks, and/or based on error processing module 3217 identifying an error triggering finalization, for example, before operator data processing module 3216 completes its processing of all data blocks.

The operator finalization module 3218 can finalize the corresponding operator 2520 accordingly by releasing all memory and/or processing resources 3219 utilized by the operator during its execution. Alternatively or in addition, the operator finalization module 3218 can finalize the corresponding operator 2520 accordingly by removing itself from a query manager and/or scheduler implemented by the query execution module 2504 to schedule and/or facilitate the operator executions of the set of operators. Alternatively or in addition, the operator finalization module 3218 can finalize the corresponding operator 2520 accordingly by destroying itself, for example, based on ending corresponding processing, removing itself from memory, and/or otherwise destroying itself.

Figure 32C:
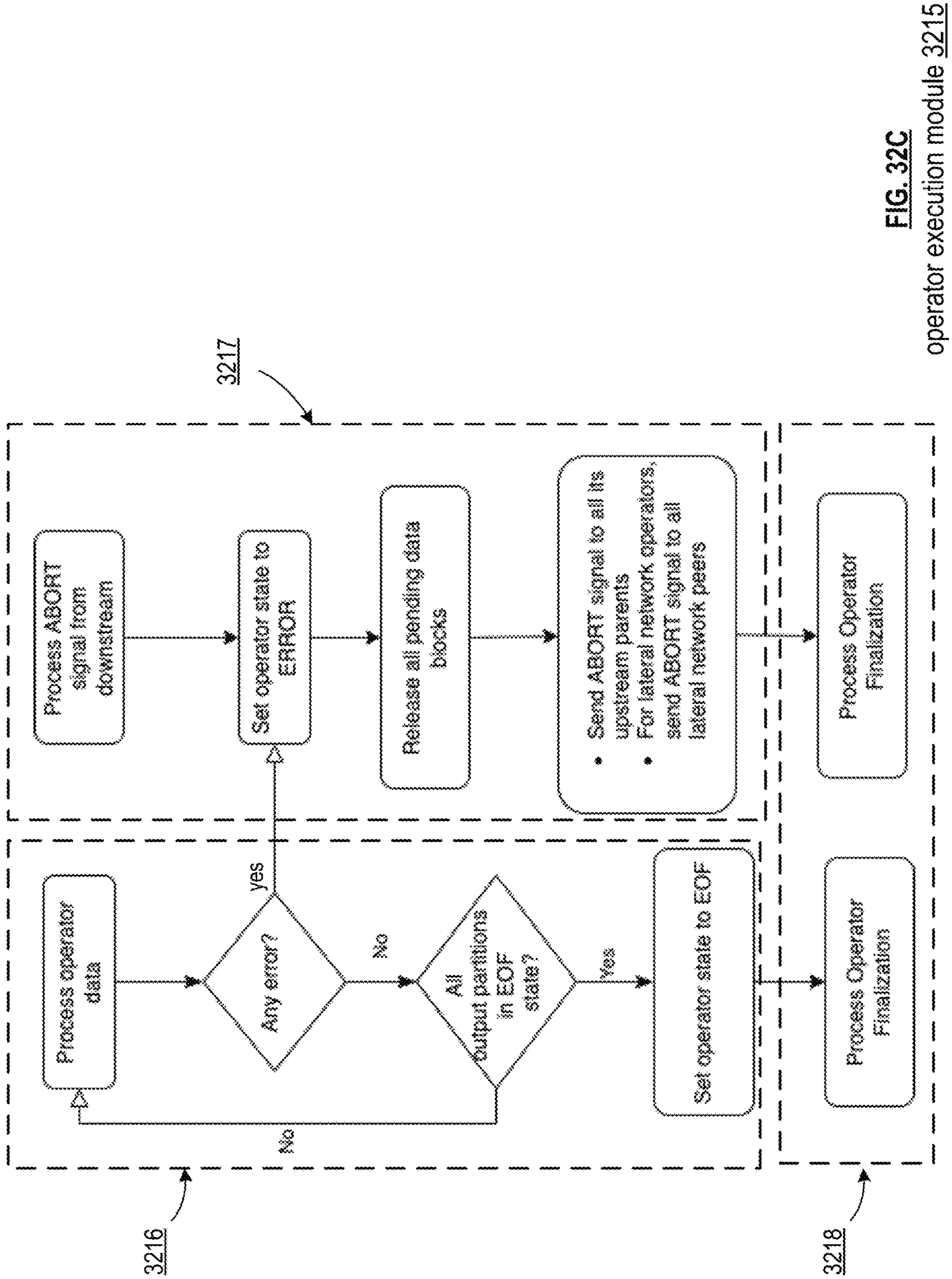
FIGS. 32C and 32D illustrates example flow diagrams implemented by an operator execution module in accordance with various embodiments.
Figure 32D:
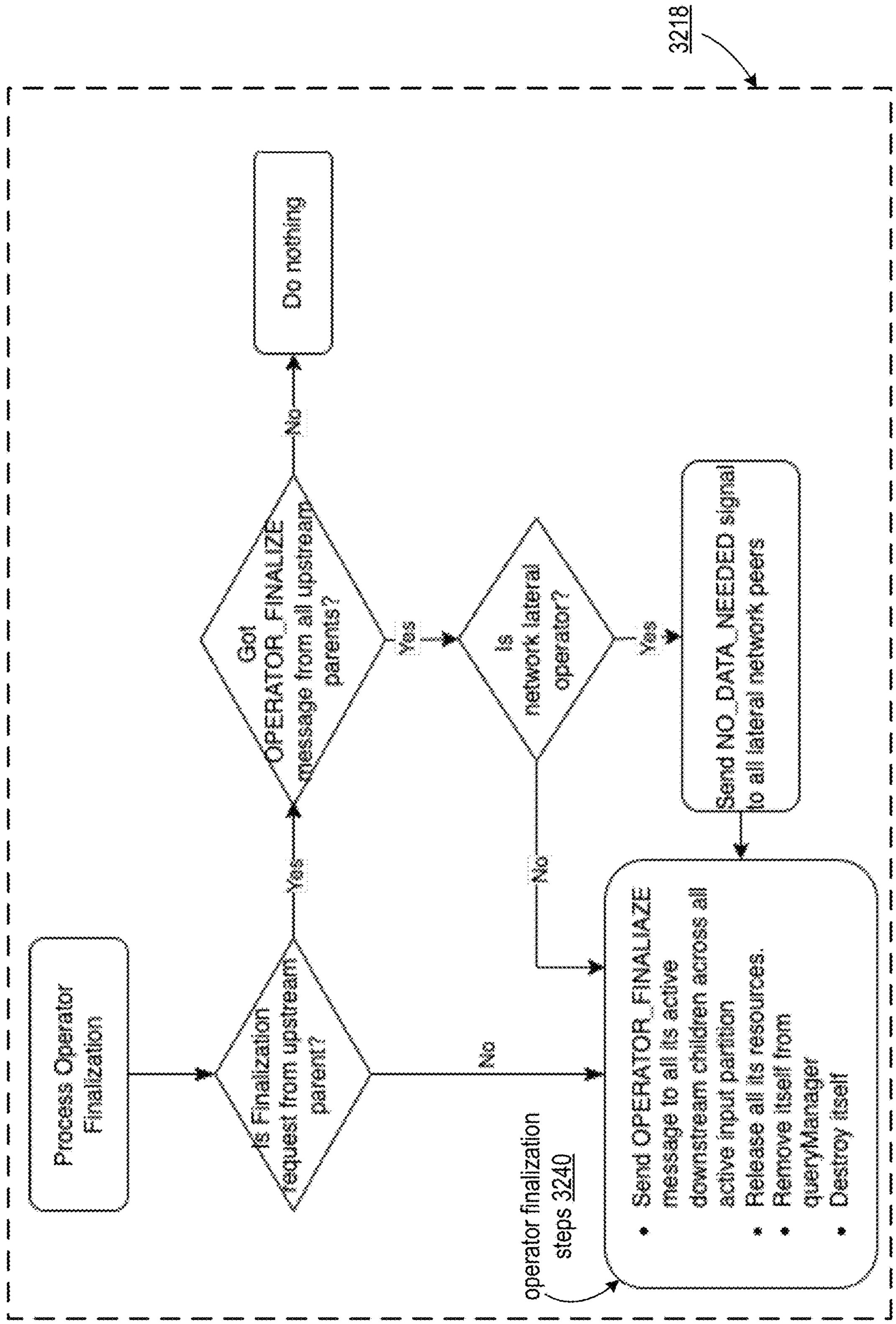

FIGS. 32C and 32D illustrate an example flow implemented by an operator execution module 3215. Some or all features and/or functionality of the flow presented in FIGS. 32C and 32D can implement the operator execution module 3215 of FIG. 32B and/or any other embodiment of operator execution module 3215 and/or any execution of operators 2520 described herein.

As illustrated in FIG. 32C, an operator execution module 3215 can process operator data, for example, via operator data processing module 3216. When no error is encountered, and once all output partitions are in an EOF state, such as an end of file state and/or are otherwise all received and processed, the operator state can be set to EOF and/or otherwise can indicate that all processing of operator data by the operator is complete. Operator finalization can then be initiated, where operator finalization is then processed as illustrated in conjunction with FIG. 32D.

If any error is detected, the error can be processed, for example, via error processing module 3217. The error can be detected as an error detected during processing of the operator data before processing is complete, and/or can be detected based on receiving an abort signal, for example, as received signaling 3221 from a child operator and/or from a lateral network operator if the operator is in a set of lateral network operators.

When an error is detected, the operator state can be set to indicate the error, all pending data blocks can be released, and/or an abort signal can be sent, for example, as emitted signaling 3223 to one or more parent operators. If the operator is a lateral network operator in set of lateral network operators, the abort signal can be sent, for example, as emitted signaling 3223, to one or more other lateral network operators in this set of lateral network operators. Operator finalization can then be initiated, where operator finalization is then processed as illustrated in conjunction with FIG. 32D.

FIG. 32D illustrates example flow for execution, for example, by the operator finalization module 3218 of operator execution module 3215, once operator finalization is triggered, for example, by the flow of FIG. 32C.

The operator finalization of the operator can be performed via a set of operator finalization steps 3240. The set of operator finalization steps 3240 can include sending a message to finalize operators to all active child operators, for example, as emitted signaling 3223. The set of operator finalization steps 3240 can include releasing all resources, such as the memory and/or processing resources 3219. The set of operator finalization steps 3240 can include removing itself from a query manager and/or scheduler. The set of operator finalization steps 3240 can include destroying itself.

This set of operator finalization steps 3240 can be performed upon the operator finalization module 3218 determining to perform its own finalization itself, for example, based on being triggered via a detected error and/or based on successful completion of all processing as illustrated in FIG. 32C. When the operator finalization is triggered by finalization signaling received from other operators, the flow can include performing additional checks prior to performing the set of operator finalization steps 3240.

When the finalization is triggered based on receiving a finalization request from a parent operator, for example, as received signaling 3221, but not all parent operators indicate that the operator finalize, then finalization does not yet take place. Once finalization signaling is received from all parent operators, the set of operator finalization steps 3240 can be performed. If the operator is a lateral network operator, a no data needed signal can be sent to lateral network peers, for example, as emitted signaling 3223, only once all parent operators indicate initiation of finalization.

FIGS. 32E-32H illustrate an example of operators finalizing over time in a different ordering than their serialized ordering. Some or all features and/or functionality of the operator execution modules 3215 of FIGS. 32E-32H can be utilized to implement the operator execution modules 3215 of FIG. 32A and/or any execution of operators 2520 described herein. The execution of operator execution modules 3215 of FIGS. 32E-32H can correspond to an example execution of the query operator execution flow 2517 of FIG. 32A.

Dashed arrows of FIGS. 32E-32H can indicate the flow of data blocks between operators. In particular, data flows in accordance with the serialized ordering of operators in the corresponding query operator execution flow 2517.

Bolded arrows of FIGS. 32E-32H can indicate the flow of various signaling, where one operator execution module 3215 sends the signaling as an emitted signal 3223 for receipt by another operator execution module 3215 as a received signal 3221.

Bolded boxing of operator execution modules 3215 of FIGS. 32E-32H can indicate operator execution modules 3215 that have initiated and/or completed finalization Unbolded boxing of operator execution modules 3215 of FIGS. 32E-32H can indicate operator execution modules 3215 that have not yet initiated and/or completed finalization, for example, where these operator execution modules are processing data blocks and/or are awaiting data blocks for processing.

Figure 32E:
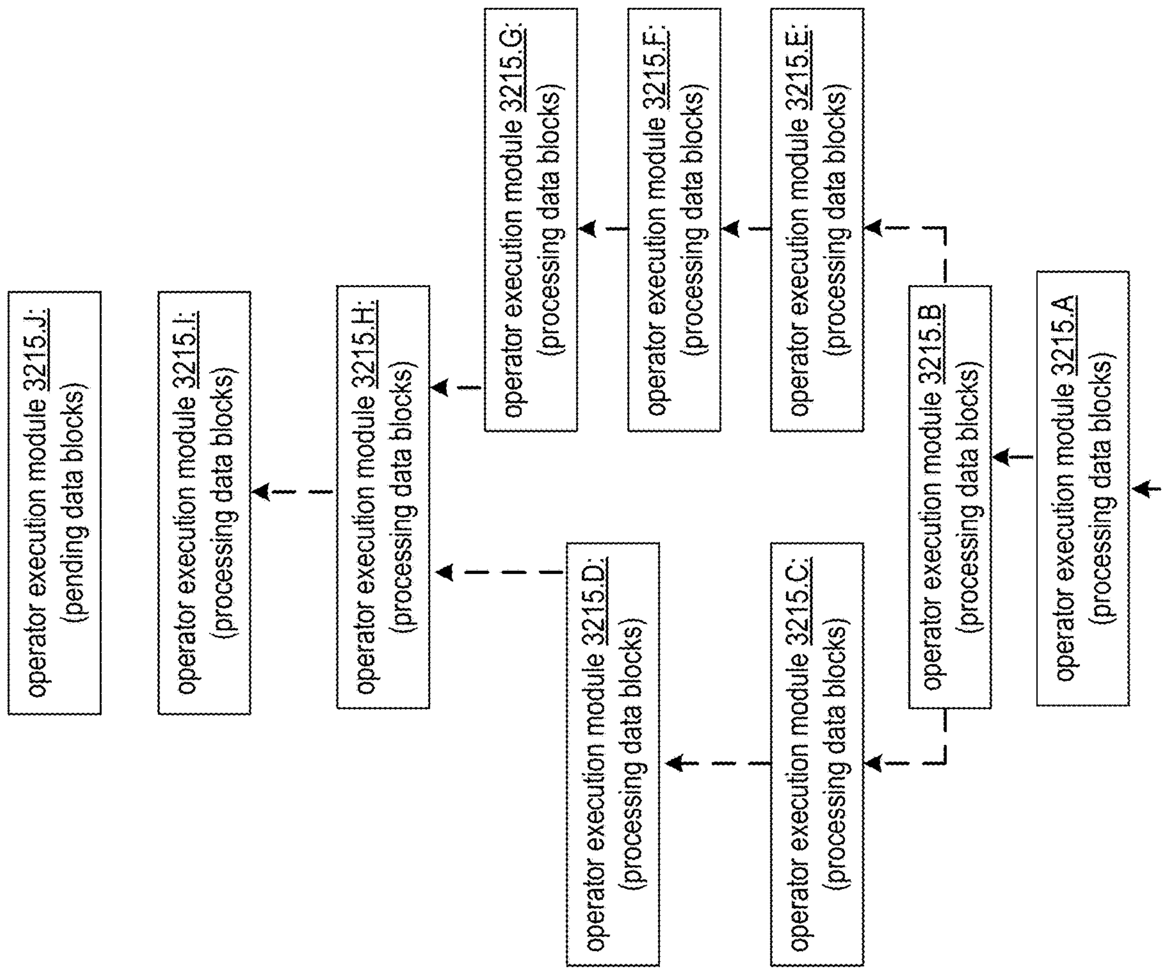
FIGS. 32E-32H illustrate example finalization of a plurality of operators over time in accordance with various embodiments.

FIG. 32E illustrates execution of operators 2520 by operator execution modules 3215 at a first time to after execution is initiated in accordance with their serialized ordering. At this time, no operators have yet finalized Operator execution module 3215.J has not yet begun processing based on operator 3215.1 not yet emitting data blocks. All other operators have emitted at least one data block.

Figure 32F:
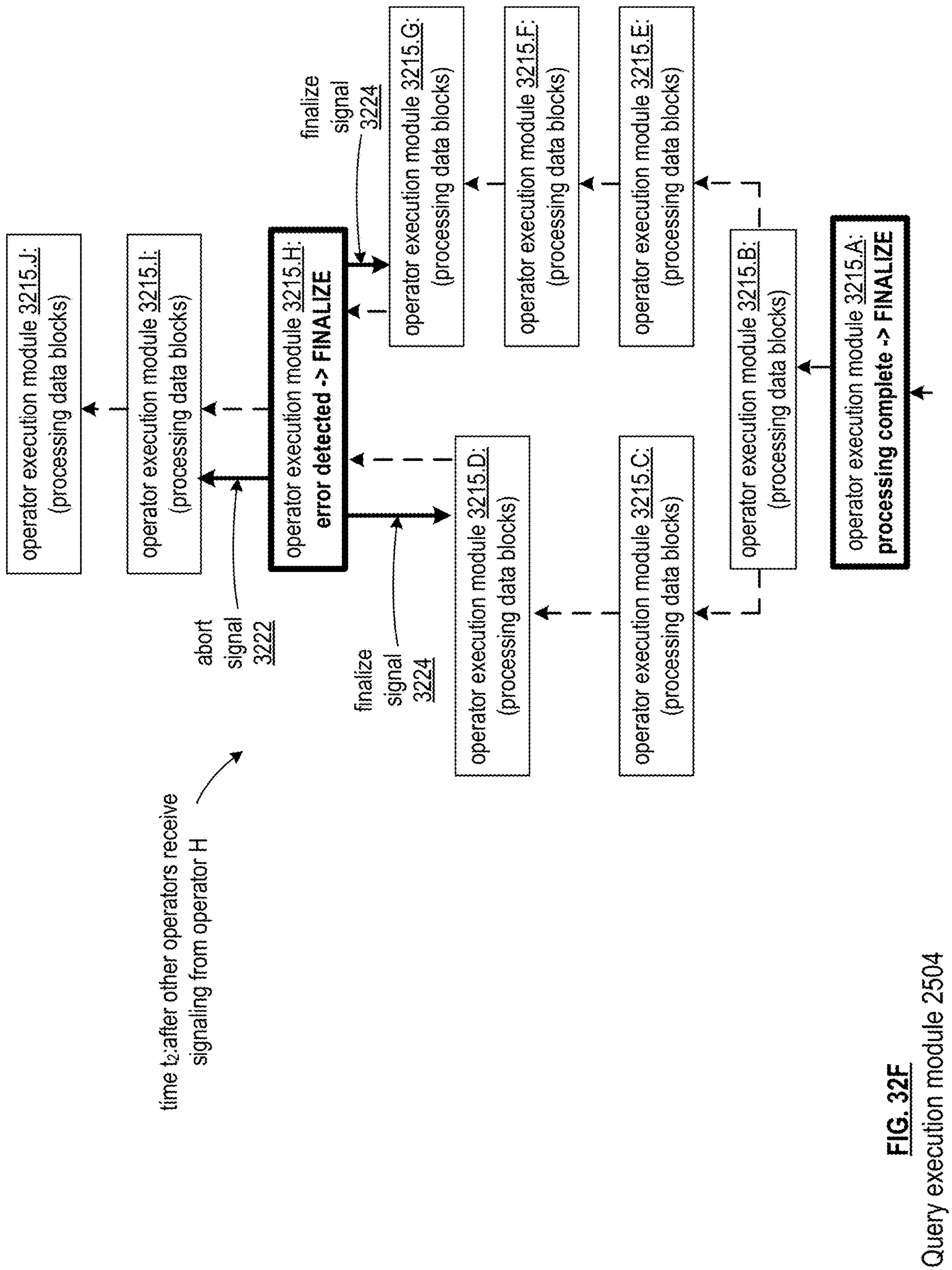

FIG. 32F illustrates execution of operators 2520 by operator execution modules 3215 at a time $t_1$ after time $t_0$, when an error is detected by operator execution module 3215.H. For example, the error is detected as an error during the processing of this operators own data blocks by operator data processing modules 3216 of this operator execution module 3215.H. Based on detecting the error, the operator execution module 3215.H sends an abort signal 3222 to operator execution module 3215.1 based on operator 2520.1 being a parent operator of operator 2520.H. Based on detecting the error, the operator execution module 3215.H also sends finalize signals 3224 to operator execution modules 3215.D and 3215.G based on operators 2520.D and 3215.G being child operators of operator 2520.H. Operator execution module 3215.H further facilitates its own finalization, for example, by releasing memory and/or processing resources 3219 and/or destroying the corresponding instance of operator 2520.H. Operator execution module 3215.A independently finalizes based on having completed its own processing of data blocks successfully, for example, by releasing memory and/or processing resources 3219 and/or destroying the corresponding instance of operator 2520.A.

Figure 32G:
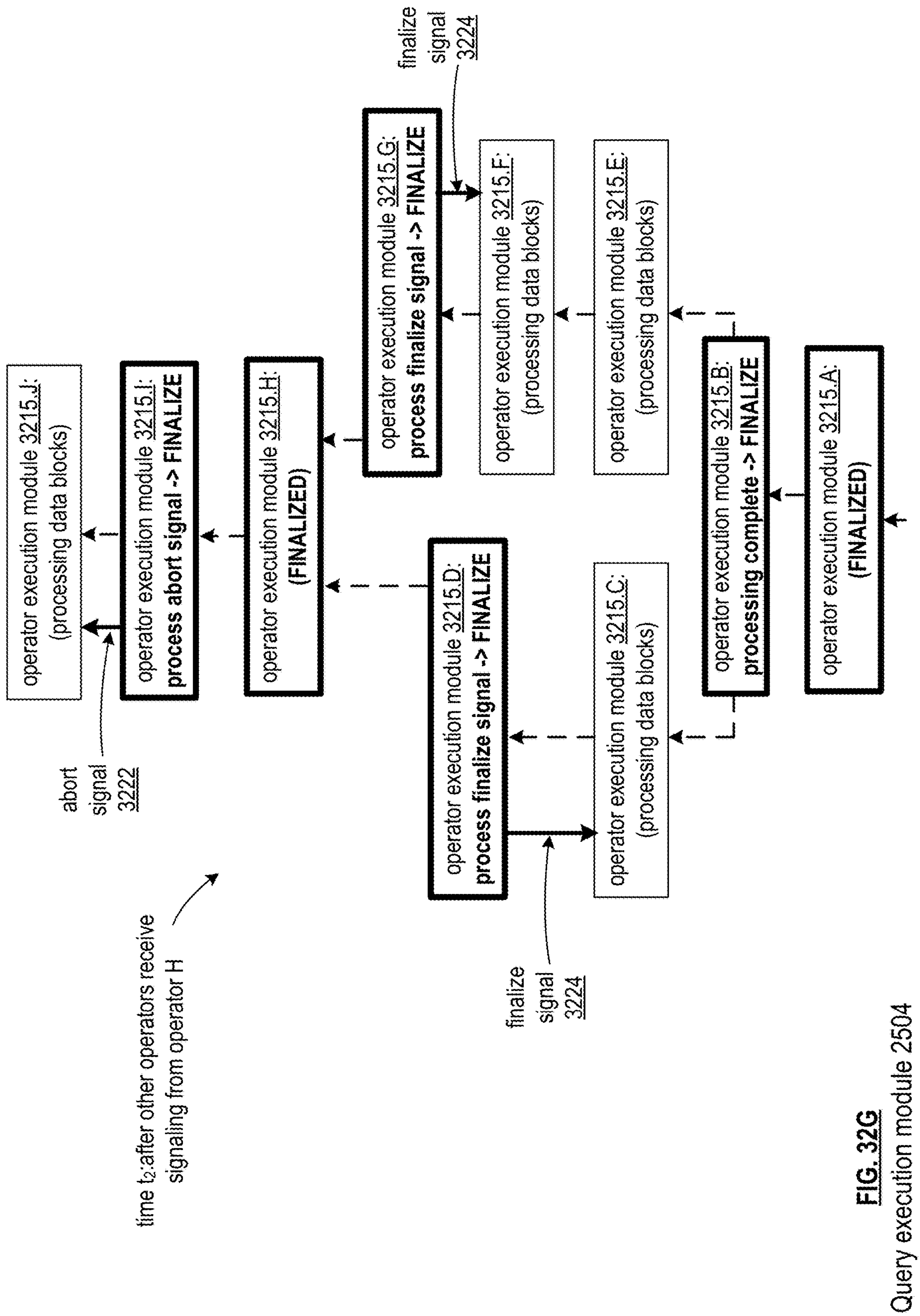

FIG. 32G illustrates execution of operators 2520 by operator execution modules 3215 at a time $t_2$ after time $t_1$. Based on receiving the abort signal 3222 from operator execution module 3215.H, operator execution module

3215.1 sends an abort signal 3222 to operator execution module 3215.J based on operator 2520.J being a parent operator of operator 2520.1. Operator execution module 3215.1 further facilitates its own finalization, for example, by performing some or all operator finalization steps 3240. Based on receiving the finalize signal 3224 from operator execution module 3215.H, and/or based on operator 2520.H being the only parent of operator 2520.D, operator execution module 3215.D sends a finalize signal 3224 to operator execution module 3215.C based on operator 2520.0 being a child operator of operator 2520.D. Similarly, based on receiving the finalize signal 3224 from operator execution module 3215.H, and/or based on operator 2520.H being the only parent of operator 2520.G, operator execution module 3215.G sends a finalize signal 3224 to operator execution module 3215.F based on operator 2520.F being a child operator of operator 2520.F. Operator execution module 3215.D and operator execution module 3215.G each facilitate their own finalization, for example, by releasing memory and/or processing resources 3219 and/or destroying the corresponding instance of operator 2520.D and operator 2520.1, respectively. Operator execution module 3215.B independently finalizes based on having completed its own processing of data blocks successfully, for example, by releasing memory and/or processing resources 3219 and/or destroying the corresponding instance of operator 2520.B.

Figure 32H:
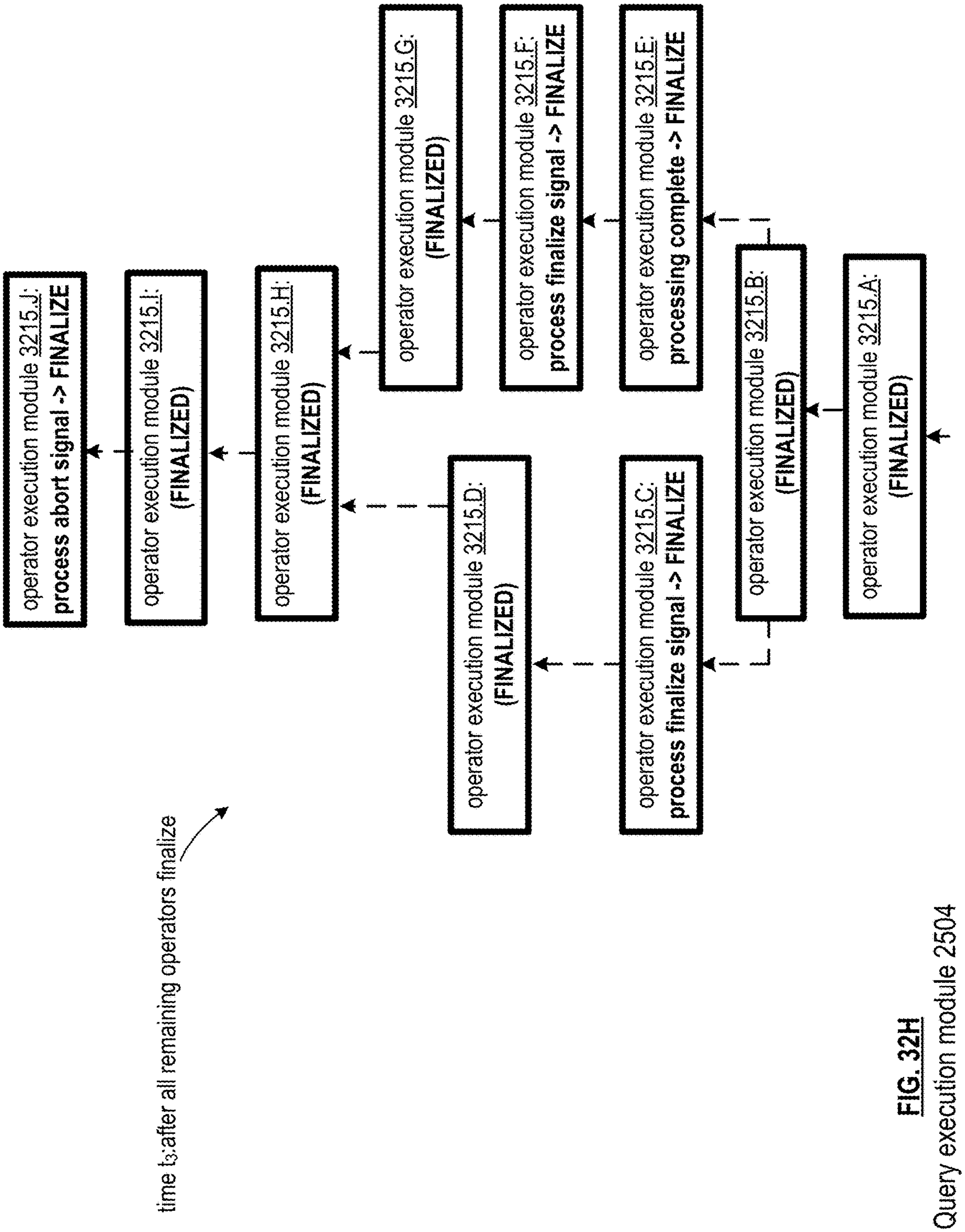

FIG. 32H illustrates completion of operator finalization by operator execution modules 3215 at a time t 3 after time $t_2$. Based on receiving the finalize signal 3224 from operator execution module 3215.D, and/or based on operator 2520.D being the only parent of operator 2520.C, operator execution module 3215.C finalizes, for example, by releasing memory and/or processing resources 3219 and/or destroying the corresponding instance of operator 2520.C. Similarly, based on receiving the finalize signal 3224 from operator execution module 3215.G, and/or based on operator 2520.G being the only parent of operator 2520.F, operator execution module 3215. F finalizes, for example, by releasing memory and/or processing resources 3219 and/or destroying the corresponding instance of operator 2520.F. Operator execution module 3215.E independently finalizes based on having completed its own processing of data blocks successfully, for example, by releasing memory and/or processing resources 3219 and/or destroying the corresponding instance of operator 2520.E.

Figure 32I:
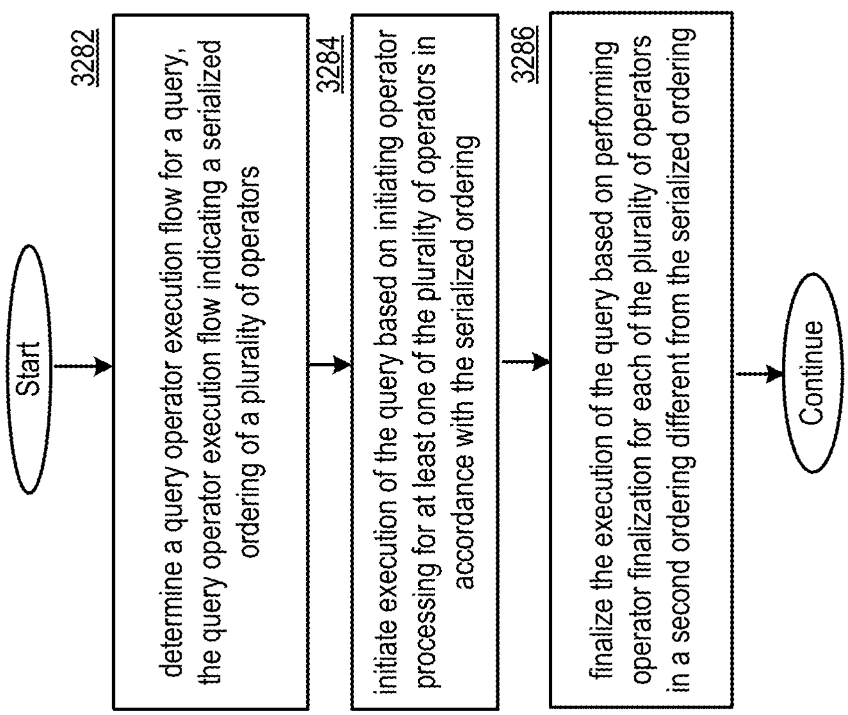
FIG. 32I is a logic diagram illustrating a method for execution in accordance with various embodiments.

FIG. 32I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32I. In particular, a node 37 can utilize the query processing module 2435 to execute some or all of the steps of FIG. 32I, where multiple nodes 37 implement their own query processing modules 2435 to independently execute the steps of FIG. 32I, for example, to facilitate execution of a query as participants in a query execution plan 2405. Some or all of the method of FIG. 32I can be performed by the query processing system 2510, for example, by utilizing an operator flow generator module 2514 and/or a query execution module 2504. In particular, some or all of the method of FIG. 32I can be performed via implementing a plurality of operator execution modules 3215. Some or all of the steps of FIG. 32I can optionally be performed by any other processing module of the database system Some or all of the steps of FIG. 32I can be performed to implement some or all of the functionality of the database system 10 as described in conjunction with FIGS. 32A-32H, for example, by implementing some or all of the functionality of the query processing system 2510 as described in conjunction with FIGS. 25A-32H. Some or all of the steps of FIG. 32I can be performed to implement some or all of the functionality regarding execution of a query via the plurality of nodes in the query execution plan 2405 as described in conjunction with some or all of FIGS. 24A-24I. Some or all steps of FIG. 32I can be performed by database system 10 in accordance with other embodiments of the database system 10 and/or nodes 37 discussed herein. Some or all steps of FIG. 32I can be performed in conjunction with one or more steps of FIG. 26G, one or more steps of FIG. 27F, one or more steps of FIG. 28C, one or more steps of FIGS. 29H-29J, one or more steps of FIG. 30H, one or more steps of FIG. 31H, and/or one or more steps of any other method described herein.

Step 3282 includes determining a query operator execution flow for a query, the query operator execution flow indicating a serialized ordering of a plurality of operators. For example, a first operator of the plurality of operators is serially before a second operator of the plurality of operators in the query operator execution flow.

Step 3284 includes initiating execution of the query based on initiating operator processing for at least one of the plurality of operators in accordance with the serialized ordering. For example, performance of second operator processing for the second operator is initiated after first operator processing for the first operator based on the second operator being serially after the first operator in the query operator execution flow. In some examples, operator processing is initiated for all of the plurality of operators. In other examples, operator processing is not initiated for at least one of the plurality of operators.

Step 3286 includes finalizing the execution of the query based on performing operator finalization for each of the plurality of operators in a second ordering different from the serialized ordering. For example, first operator finalization is performed for the first operator after second operator finalization is performed for the second operator.

In various examples, performance of second operator processing for the second operator includes processing input data blocks. In various examples, the input data blocks are based on first output data blocks outputted via first operator processing for the first operator.

In various examples, the input data blocks include one of: the first output data blocks, or intermediate output data blocks generated via at least one intermediate operator between the first operator and the second operator in the serialized ordering. In various examples, the intermediate output data blocks are generated based on the at least one intermediate operator processing the first output data blocks outputted via the first operator processing for the first operator.

In various examples, an error is detected during the first operator processing for the first operator. In various examples, in response to the error: all pending data blocks of the first operator are released; and/or an abort signal is sent to at least one other operator, for example, via the first operator. In various examples, the at least one other operator includes each of a set of parent operators of the first operator serially after the first operator in the query operator execution flow. In various examples, the set of parent operators of the first operator includes the second operator. In various examples, the at least one other operator further includes each of a set of lateral network operators lateral with the first operator in the query operator execution flow, such as other operators implemented by other nodes of a shuffle network as described in conjunction with FIG. 24E. In various examples, at least one of the set of parent operators from the first operator are also parent operators of at least one of the set of lateral network operators. In various examples, the abort signal is sent to each of the set of lateral network operators based on the first operator being implemented as a shuffle operator and/or broadcast operator. In various examples, the first operator is implemented as the shuffle operator or the broadcast operator based on the query operator execution flow implementing a join process, for example, as described in conjunction with some or all of FIGS. 25A-28C.

In various examples, for each operator of the plurality of operators, corresponding operator finalization is performed in response to detecting one of a set of finalization conditions is met. In various embodiments, the set of finalization conditions includes: the each operator successfully performing all corresponding operator processing for the each operator; the each operator encountering an error while performing the corresponding operator processing; the each operator receiving a finalize signal from a parent operator of the each operator serially after each operator in the query operator execution flow; and/or the each operator receiving an abort signal from a child operator of the each operator serially before the each operator in the query operator execution flow.

In various examples, for each operator of the plurality of operators, the performing the corresponding operator finalization includes sending another finalize signal to all of a set of child operators of the each operator serially before the each operator in the query operator execution flow, where the set of child operators includes the child operator.

In various examples, the another finalize signal sent to the all of the set of child operators indicates an error code based on: the each operator encountering the error while performing the corresponding operator processing; the each operator receiving the finalize signal from the parent operator, and the finalize signal received from the parent operator indicating the error code; and/or the each operator receiving the abort signal from a child operator of the each operator serially before the each operator in the query operator execution flow. In various examples the another finalize signal sent to all of a set of child operators indicates no error code based on at least one of: the each operator successfully performing all of the corresponding operator processing; and/or the each operator receiving the finalize signal from the parent operator, and the finalize signal received from the parent operator indicating no error code.

In various examples, the query operator execution flow is implemented via a plurality of nodes at a plurality of levels of a query execution plan. In various examples, the first operator is a child operator of the second operator and/or the second operator is a parent operator of the first operator. In various examples, the first operator is implemented via a set of first nodes at one level of the query execution plan. In various examples, the second operator is implemented via at least one second node at another level of the query execution plan. In various examples, the another level is higher than the one level. In various examples, at least one first node of the set of first nodes is a child node of one second node of the at least one second node. In various examples, the second operator finalization is performed for the second operator via the one second node based on the one second node receiving the abort signal from one first node of the at least one first node, for example, where the one first node sent the abort signal based on the one first node detecting an error when performing the first operator processing for the first operator. In various examples, the first operator finalization is performed for the first operator via the one first node based on the one first node receiving the finalize signal from the one second node, for example, where the one second node sent the finalize signal based on the one second node performing second operator finalization for the second operator.

In various examples, operator processing is initiated for each of the plurality of operators of the query operator execution flow. In various examples, operator processing is not initiated for at least one other operator of the plurality of operators of the query operator execution flow based on the corresponding operator finalization being performed for each operator of the at least one other operator before the corresponding operator processing for the each operator is initiated, based on, for each operator of the at least one other operator: the each operator receiving the finalize signal, before the corresponding operator processing for the each operator is initiated, from the parent operator serially after the each operator; and/or the each operator receiving the abort signal, before the corresponding operator processing for the each operator is initiated, from a child operator serially before the each operator.

In various examples, the first operator finalization is performed for the first operator in response to a first one of the set of finalization conditions. In various examples, the second operator finalization is performed for the second operator in response to a second one of the set of finalization conditions.

In various examples, the first operator finalization is performed for the first operator in response to receiving a finalize signal from the second operator. In various examples, the second operator sends the finalize signal to the first operator based on the second operator finalization for the second operator being performed before the first operator finalization for first operator.

In various examples, the first operator is implemented as a lateral network operator. In various examples, performing the first operator finalization for the first operator includes sending a no data needed signal to each of a set of lateral network operators lateral with the first operator in the query operator execution flow based on receiving the finalize signal from the second operator and further based on the first operator being implemented as the lateral network operator.

In various examples, the query operator execution flow implements a limit-based query. In various examples, the second operator implements a limit operator, such as a limit operator 2710 of FIGS. 27A-27E. In various examples, the first operator includes sends the no data needed signal to each of the set of lateral network operators lateral with the first operator based on the query operator execution flow implementing the limit-based query.

In various examples, for each operator of the plurality of operators, performing corresponding operator finalization includes at least one of: sending a finalize signal to all of a set of child operators of the each operator serially before the each operator in the query operator execution flow; releasing all resources utilized by the each operator during operator processing performed for the each operator; removing the each operator from a query manager; and/or destroying the each operator.

In various embodiments, any one of more of the various examples listed above are implemented in conjunction with performing some or all steps of FIG. 32I. In various embodiments, any set of the various examples listed above can be implemented in tandem, for example, in conjunction with performing some or all steps of FIG. 32I.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 32I described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 32I, for example, in conjunction with further implementing any one or more of the various examples described above.

In various embodiments, the operational instructions, when executed by the at least one processor, cause the database system to: determine a query operator execution flow for a query, the query operator execution flow indicating a serialized ordering of a plurality of operators, where a first operator is serially before a second operator in the query operator execution flow; initiate execution of the query based on initiating operator processing for at least one of the plurality of operators in accordance with the serialized ordering, where performance of second operator processing for the second operator is initiated after first operator processing for the first operator based on the second operator being serially after the first operator in the query operator execution flow; and/or finalize the execution of the query based on performing operator finalization for each of the plurality of operators in a second ordering different from the serialized ordering, where first operator finalization is performed for the first operator after second operator finalization is performed for the second operator.

As used herein, an "AND operator" can correspond to any operator implementing logical conjunction. As used herein, an "OR operator" can correspond to any operator implementing logical disjunction.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:

determining a query for execution; and executing a left join operation for the query by:

generating a hash map for a plurality of right input rows;

receiving a plurality of left input rows;

forwarding all of the plurality of left input rows by reference as first output;

for each left input row of the plurality of left input rows:

determining whether any of the plurality of right input rows matches with the each left input row based on the hash map;

when one of the plurality of right input rows is identified as matching with the each left input row, copy and emit a value of one of the plurality of right input rows in conjunction with the each left input row in the first output; and when none of the plurality of right input rows are identified as matching with the each left input row, emit a null value in conjunction with the each left input row in the first output.

2. The method of claim 1, wherein the first output includes at least one output data block indicating, for each given one of the plurality of left input rows, one of: exactly one of the plurality of right input rows matching with the each given one of the plurality of left input rows, or a null value.

3. The method of claim 2, wherein the plurality of left input rows are included in at least one input data block stored in at least one corresponding memory location, wherein receiving the plurality of left input is based on processing the at least one input data block, and wherein forwarding the all of the plurality of left input rows by reference as the first output is based on the at least one output data block including at least one memory reference indicating the at least one corresponding memory location.

4. The method of claim 2, wherein a subset of the plurality of left input rows are determined to match with multiple ones of the plurality of right input rows; wherein, for each of the subset of the plurality of left input rows, the first output indicates the exactly one of the plurality of right input rows as one of the multiple ones of the plurality of right input rows matching with the each of the subset of the plurality of left input rows, further comprising:

emitting second output that includes a second plurality of output data blocks indicating, for the each of the subset of the plurality of left input rows, all additional ones of the plurality of right input rows matching with the each of the subset of the plurality of left input rows.

5. The method of claim 4, wherein the method further comprises maintaining two output data blocks at a time to processing the each left input row of the plurality of left input rows, wherein a first one of the two output data blocks is included in the first output, wherein a second one of the two output data blocks is included in the second output, and wherein the second one of the two output data blocks is only utilized when a corresponding left input row of the plurality of left input rows matches with multiple right input rows.

6. The method of claim 2, wherein the a plurality of data blocks utilizes a set of output column streams for a set of column values of a set of columns of the plurality of right input rows.

7. The method of claim 1, wherein the left join operation is performed based on a JOIN expression indicated by the query, wherein the join expression indicates a conditional statement relating the plurality of left input rows to the plurality of right input rows, and wherein the each left input row is determined to match with the each given one of the plurality of right input rows based on the conditional statement.

8. The method of claim 7, wherein the conditional statement indicates a given column of the plurality of right input rows and further indicates another given column of the plurality of left input rows, further comprising:

generating the hash map based on utilizing column values of the given column for each of the plurality of right input rows as keys of the hash map; and identifying the one of the plurality of right input rows as matching with the each left input row based on determining a value of the another given column of the each left input row matches with a corresponding key of the hash map mapping to the one of the plurality of right input rows.

9. The method of claim 8, wherein the conditional statement indicates at least one relational operator of a set of relational operators that includes at least one of: an equality operator, an inequality operator, a less than operator, a greater than operator, a less than or equal to operator, or a greater than or equal to operator; and wherein identifying the one of the plurality of right input rows as matching with the each left input row is based on determining the corresponding key and the value of the another given column of the each left input row meet a condition defined by the at least one relational operator.

10. The method of claim 1, wherein the left join operation for the query is executed as part of executing a full outer join, further comprising:

determining a subset of the plurality of right input rows of the hash map not matching with any of the plurality of left input rows based on tracking ones of the plurality of right input rows in the hash map matching ones of the plurality of left input rows; and outputting the subset of the plurality of right input rows.

11. The method of claim 1, further comprising:

determining a second query for execution; and executing an inner join operation for the second query by:

generating a second hash map from a second plurality of right input rows;

receiving a second plurality of left input rows;

initiating forwarding of all of second plurality of left input rows as other first output;

when forwarding each left input row of the second plurality of left input rows:

determining whether any of the second plurality of right input rows matches with the each left input row based on the hash map;

when one of the second plurality of right input rows is identified as matching with the each left input row, copy a value of one of the second plurality of right input rows in conjunction with the each left input row in the other first output; and when none of the plurality of right input rows are identified as matching with the each left input row, forego forwarding of the second plurality of left input rows by, for remaining ones of the second plurality of left input rows, generate the other first output by writing copies of ones of the second plurality of left input rows identified to match with ones of the second plurality of right input rows in conjunction with copying of values of the ones of the second plurality of right input rows.

12. The method of claim 11, wherein the inner join operation is executed as a portion of executing a right join operation for the second query, further comprising:

determining a second subset of the second plurality of right input rows of the second hash map not matching with any of the second plurality of left input rows based on tracking ones of the second plurality of right input rows in the hash map matching ones of the second plurality of left input rows; and outputting the second subset of the plurality of right input rows.

13. The method of claim 1, wherein the left join operation for the query is executed by a plurality of nodes in parallel based on each of the plurality of nodes:

generating the hash map for all of the plurality of right input rows;

receiving a corresponding proper subset of a plurality of proper subsets of the plurality of left input rows, wherein the plurality of proper subsets of the plurality of left input rows are mutually exclusive and collectively exhaustive with respect to the plurality of left input rows;

forwarding all of the corresponding proper subset of the plurality of left input rows as a corresponding first output of a plurality of first output generated across the plurality of nodes; and for each left input row of the corresponding proper subset of the plurality of left input rows:

determining whether any of the plurality of right input rows matches with the each left input row based on the hash map;

when one of the plurality of right input rows is identified as matching with the each left input row, copy a value of one of the plurality of right input rows in conjunction with the each left input row in the first output; and when none of the plurality of right input rows are identified as matching with the each left input row, forward a null value in conjunction with the each left input row in the first output.

14. The method of claim 13, wherein the plurality of nodes execute their portions of the query in a same level of a query execution plan for the query, and wherein a parent node at a higher level of the query execution plan receives the plurality of first output generated across the plurality of nodes based on the plurality of nodes being child nodes of the parent node, and wherein the parent node emits output based on applying a union to the plurality of first output.

15. The method of claim 1, wherein the method is executed by a node of a query execution plan collectively executing the query, and wherein the plurality of left input rows are received from at least one child node of the node.

16. The method of claim 15, wherein the at least one child node read the plurality of left input rows from at least one segment stored in at least one memory drive accessible by the at least one child node.

17. The method of claim 15, wherein the a hash map for a plurality of right input rows is generated based on communication between the node and a plurality of other nodes in a same level as the node in a query execution plan, wherein each of the plurality of other nodes have a least one other child node that is distinct from the at least one child node of the node.

18. The method of claim 1, wherein executing the left join operation is based on:

performing two join operations in parallel; and based on determining a set of output rows outputted by the two join operations has reached a threshold maximum number of output rows indicated by the query, finalizing execution of the query before at least one of the two join operations has finished processing its input rows.

19. A database system comprises:

at least one processor; and a memory that stores operational instructions that, when executed by the at least one processor, cause the database system to:

determine a query for execution; and execute a left join operation for the query by:

generating a hash map for a plurality of right input rows;

receiving a plurality of left input rows;

forwarding all of the plurality of left input rows by reference as first output;

for each left input row of the plurality of left input rows:

determining whether any of the plurality of right input rows matches with the each left input row based on the hash map;

when one of the plurality of right input rows is identified as matching with the each left input row, copy and emit a value of one of the plurality of right input rows in conjunction with the each left input row in the first output; and when none of the plurality of right input rows are identified as matching with the each left input row, emit a null value in conjunction with the each left input row in the first output.

20. A non-transitory computer readable storage medium comprises:

at least one memory section that stores operational instructions that, when executed by at least one processing module that includes a processor and a memory, causes the at least one processing module to:

determine a query for execution; and execute a left join operation for the query by:

generating a hash map for a plurality of right input rows;

receiving a plurality of left input rows;

forwarding all of the plurality of left input rows by reference as first output;

for each left input row of the plurality of left input rows:

determining whether any of the plurality of right input rows matches with the each left input row based on the hash map;

when one of the plurality of right input rows is identified as matching with the each left input row, copy and emit a value of one of the plurality of right input rows in conjunction with the each left input row in the first output; and when none of the plurality of right input rows are identified as matching with the each left input row, emit a null value in conjunction with the each left input row in the first output.

* * * * *